(12) United States Patent
Koike

(10) Patent No.: US 7,227,704 B2
(45) Date of Patent: Jun. 5, 2007

(54) DIFFRACTIVE OPTICAL ELEMENT, OBJECTIVE LENS MODULE, OPTICAL PICKUP, AND OPTICAL INFORMATION RECORDING AND REPRODUCING APPARATUS

(75) Inventor: Katsuhiro Koike, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 44 days.

(21) Appl. No.: 11/246,640

(22) Filed: Oct. 11, 2005

(65) Prior Publication Data

US 2006/0146422 A1 Jul. 6, 2006

(30) Foreign Application Priority Data

Oct. 8, 2004 (JP) .............................. 2004-296983

(51) Int. Cl.
  *G02B 13/18* (2006.01)
  *G02B 3/02* (2006.01)
  *G11B 7/00* (2006.01)
(52) U.S. Cl. .............. 359/719; 369/112.03; 369/112.07
(58) Field of Classification Search ........ 359/717–719, 359/708, 741, 742; 369/112.03, 112.04, 369/112.05, 112.06, 112.07, 44.23, 44.32, 369/44.37, 44.38, 112.08
See application file for complete search history.

(56) References Cited

U.S. PATENT DOCUMENTS

2003/0202451 A1* 10/2003 Kimura et al. ......... 369/112.08

FOREIGN PATENT DOCUMENTS

JP  2001-235676 A  8/2001

\* cited by examiner

*Primary Examiner*—Alicia M Harrington
(74) *Attorney, Agent, or Firm*—Sughrue Mion, PLLC

(57) ABSTRACT

An objective lens module includes a light-converging lens that is coaxially disposed with respect to an optical axis of first laser light having a first wavelength, and a transmission-type diffractive optical element that is coaxially disposed to cause diffracted light of first laser light to be incident on the light-converging lens. The diffractive optical element has an incident surface and an emergent surface, and first, second, and third regions that are provided on at least of the incident surface and the emergent surface in the vicinity of the optical axis, and are sequentially defined according to different radius distances from the optical axis to have different diffraction gratings of different diffraction angles, respectively. The first region diffracts odd-order diffracted light of first laser light to the light-converging lens, the second region diffracts even-order diffracted light of first laser light to the light-converging lens, and the third region diffracts even-order or zero-order diffracted light of first laser light to the light-converging lens, such that the light-converging lens converges diffracted light from the first, second, and third regions with a predetermined numerical aperture.

60 Claims, 117 Drawing Sheets

EFFECTIVE DIAMETER
OF
DIFFRACTIVE OPTICAL ELEMENT

LONGITUDINAL SPHERICAL ABERRATION FOR CD

FRONT VIEW OF
DIFFRACTIVE LENS STRUCTURE 1

$$z = \frac{h^2/R}{1+\sqrt{1-(cc+1)\cdot h^2/R^2}} + \sum_i Ai \cdot h^i$$

NUMBERING METHOD OF
STEP AND ORBICULAR ZONE SURFACE

DEFINITION OF SIGN OF STEP AMOUNT

SAG AMOUNT x IS POSITIVE
IN OPTICAL AXIS DIRECTION

BD SPOT SHAPE (GENERAL VIEW)

DVD SPOT SHAPE (GENERAL VIEW)

CD SPOT SHAPE (GENERAL VIEW)

BD SPOT SHAPE (SIDE ROBE)

DVD SPOT SHAPE (SIDE ROBE)

CD SPOT SHAPE (SIDE ROBE)

SPOT HALF-WIDTH AT THE TIME OF DISC TILT OF DVD

SPOT HALF-WIDTH AT THE TIME OF DISC TILT OF CD

SIDE ROBE INTENSITY AT THE TIME OF DISC TILT OF DVD

SIDE ROBE INTENSITY AT THE TIME OF DISC TILT OF CD

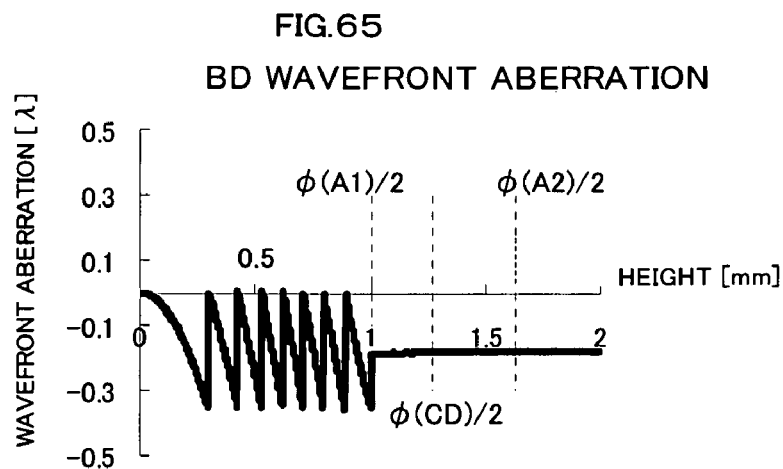
FIG.65 BD WAVEFRONT ABERRATION
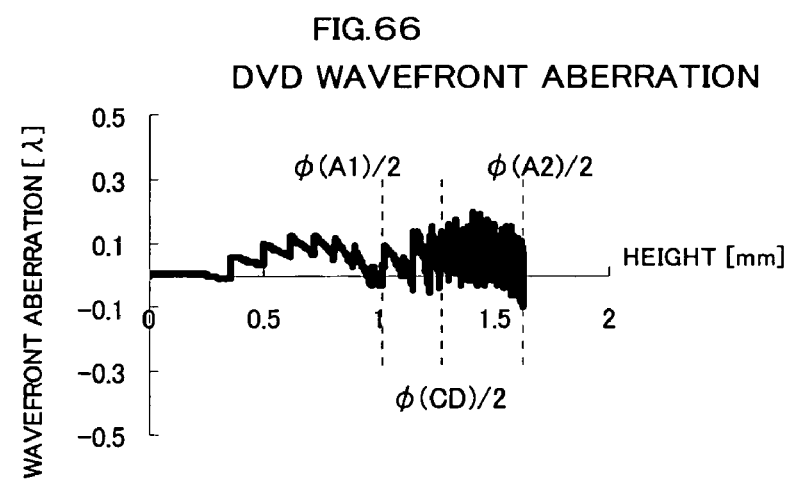
FIG.66 DVD WAVEFRONT ABERRATION
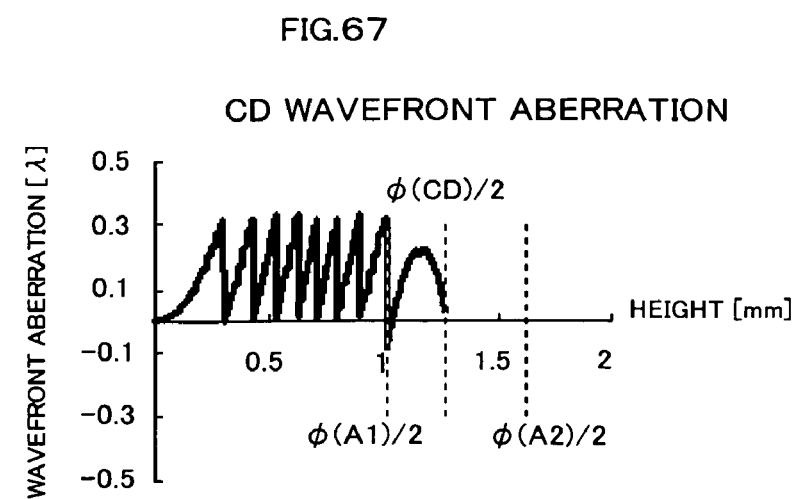
FIG.67 CD WAVEFRONT ABERRATION

BD SPOT SHAPE (GENERAL VIEW)

DVD SPOT SHAPE (GENERAL VIEW)

CD SPOT SHAPE (GENERAL VIEW)

BD SPOT SHAPE (SIDE ROBE)

DVD SPOT SHAPE (SIDE ROBE)

CD SPOT SHAPE (SIDE ROBE)

SPOT HALF-WIDTH AT THE TIME OF DISC TILT OF DVD

SPOT HALF-WIDTH AT THE TIME OF DISC TILT OF CD

SIDE ROBE INTENSITY AT THE TIME OF DISC TILT OF DVD

SIDE ROBE INTENSITY AT THE TIME OF DISC TILT OF CD

BD WAVEFRONT ABERRATION AT WAVELENGTH 408 nm

BD WAVEFRONT ABERRATION AT WAVELENGTH 403 nm

※ MOVEMENT AMOUNT OF IMAGE SURFACE = $-1.569\,\mu$m

BD WAVEFRONT ABERRATION AT WAVELENGTH 413 nm

※ MOVEMENT AMOUNT OF IMAGE SURFACE = $1.407\,\mu$m

SECTIONAL SHAPE OF DIFFRACTIVE LENS STRUCTURE B

SECTIONAL SHAPE OF DIFFRACTIVE LENS STRUCTURE A

SCHEMATIC VIEW SHOWING SECTIONAL SHAPE OF SYNTHESIZED SURFACE
OF
DIFFRACTIVE LENS STRUCTURE B AND DIFFRACTIVE LENS STRUCTURE A

BD WAVEFRONT ABERRATION

DVD WAVEFRONT ABERRATION

CD WAVEFRONT ABERRATION

BD SPOT SHAPE (GENERAL VIEW)

DVD SPOT SHAPE (GENERAL VIEW)

CD SPOT SHAPE (GENERAL VIEW)

BD SPOT SHAPE (SIDE ROBE)

DVD SPOT SHAPE (SIDE ROBE)

CD SPOT SHAPE (SIDE ROBE)

SIDE ROBE INTENSITY AT THE TIME OF DISC TILT OF DVD

SIDE ROBE INTENSITY AT THE TIME OF DISC TILT OF CD

BD WAVEFRONT ABERRATION AT WAVELENGTH 408 nm

BD WAVEFRONT ABERRATION AT WAVELENGTH 403 nm

BD WAVEFRONT ABERRATION AT WAVELENGTH 413 nm

BD SPOT SHAPE (SIDE ROBE)

BD SPOT SHAPE (SIDE ROBE)

SECTIONAL SHAPE OF DIFFRACTIVE LENS STRUCTURE B

SECTIONAL SHAPE OF DIFFRACTIVE LENS STRUCTURE A

BD WAVEFRONT ABERRATION

DVD WAVEFRONT ABERRATION

CD WAVEFRONT ABERRATION

BD SPOT SHAPE (GENERAL VIEW)

DVD SPOT SHAPE (GENERAL VIEW)

CD SPOT SHAPE (GENERAL VIEW)

BD SPOT SHAPE (SIDE ROBE)

DVD SPOT SHAPE (SIDE ROBE)

CD SPOT SHAPE (SIDE ROBE)

SIDE ROBE INTENSITY AT THE TIME OF DISC TILT OF DVD

SIDE ROBE INTENSITY AT THE TIME OF DISC TILT OF CD

BD WAVEFRONT ABERRATION AT WAVELENGTH 408 nm

BD WAVEFRONT ABERRATION AT WAVELENGTH 403 nm

BD WAVEFRONT ABERRATION AT WAVELENGTH 413 nm

BD SPOT SHAPE (GENERAL VIEW)

BD SPOT SHAPE (GENERAL VIEW)

BD SPOT SHAPE (SIDE ROBE)

BD SPOT SHAPE (SIDE ROBE)

CD WAVEFRONT ABERRATION

BD SPOT SHAPE (GENERAL VIEW)

BD SPOT SHAPE (SIDE ROBE)

DVD SPOT SHAPE (SIDE ROBE)

CD SPOT SHAPE (SIDE ROBE)

SPOT HALF-WIDTH AT THE TIME OF DISC TILT OF DVD

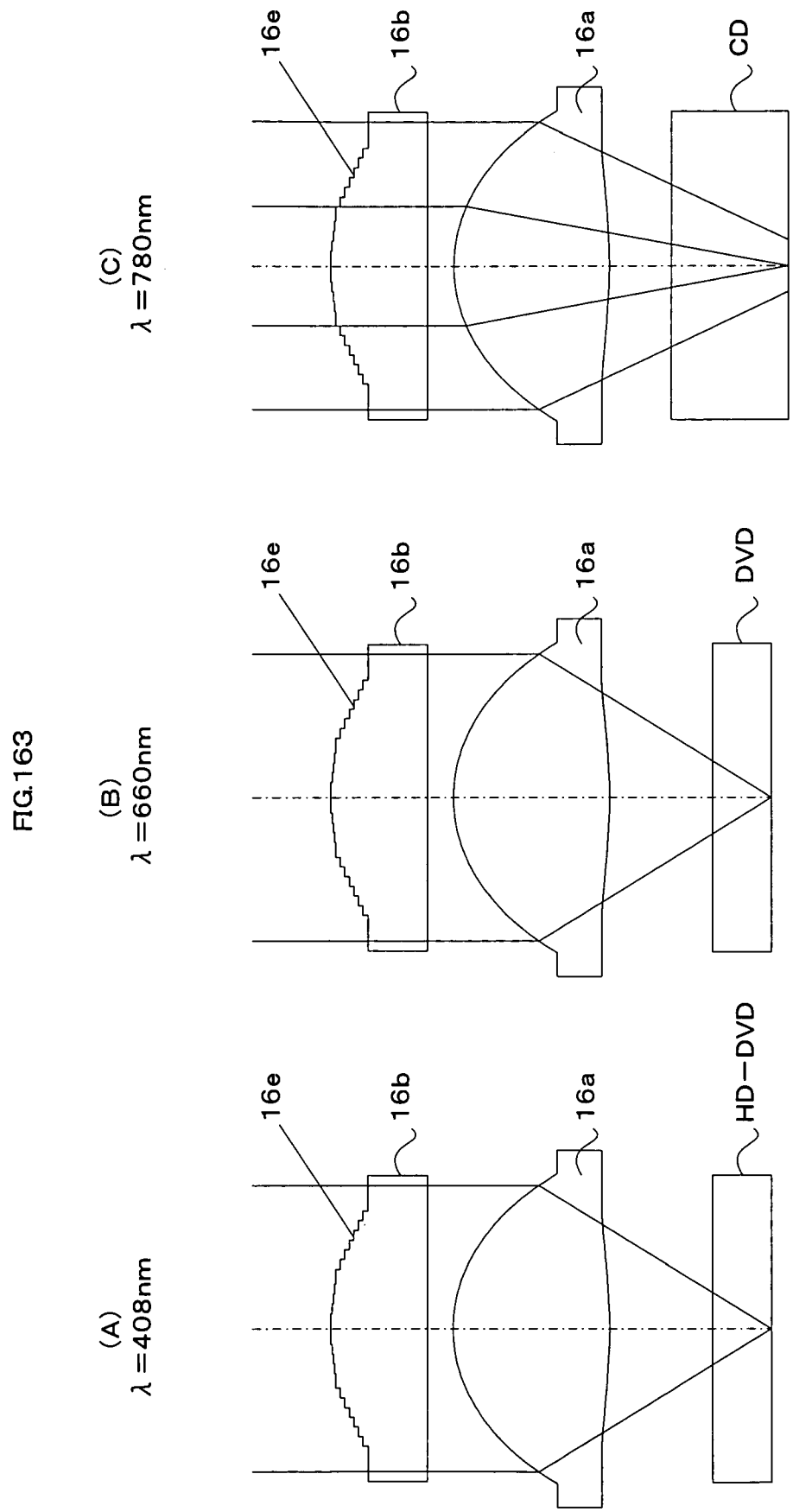

CD SPOT SHAPE (GENERAL VIEW)

HD-DVD SPOT SHAPE (SIDE ROBE)

CD WAVEFRONT ABERRATION

HD-DVD SPOT SHAPE (GENERAL VIEW)

HD-DVD SPOT SHAPE (SIDE ROBE)

DVD SPOT SHAPE (SIDE ROBE)

CD SPOT SHAPE (SIDE ROBE)

SPOT HALF-WIDTH AT THE TIME OF DISC TILT OF HD-DVD

SPOT HALF-WIDTH AT THE TIME OF DISC TILT OF CD

SIDE ROBE INTENSITY AT THE TIME OF DISC TILT OF HD-DVD

DIFFRACTIVE OPTICAL ELEMENT, OBJECTIVE LENS MODULE, OPTICAL PICKUP, AND OPTICAL INFORMATION RECORDING AND REPRODUCING APPARATUS

BACKGROUND OF THE INVENTION

1. Field of the Invention

The present invention relates to an optical system of an optical pickup in an optical information recording and reproducing apparatus which records and reproduces information for optical discs having different corresponding wavelengths. More particularly, the present invention relates to an optical information recording and reproducing apparatus which allows compatibility for a plurality of optical recording mediums using laser light sources of different wavelengths, to an optical pickup, to an objective lens module, and to a diffractive optical element.

2. Description of Related Art

As an optical information recording and reproducing apparatus, an optical disc apparatus is known in which recorded information can be read from an optical recording medium, that is, an optical disc, such as digital versatile disc (hereinafter, referred to as DVD), compact disc (hereinafter, referred to as CD), or the like.

A compatible optical disc apparatus is known in which recorded information can be read from DVD and CD. As for DVD, the substrate thickness is 0.6 mm, the corresponding wavelength is in a range of 635 nm to 655 nm, and the numerical aperture (NA) of an objective lens is about 0.6. As for CD, the substrate thickness is 1.2 mm, the corresponding wavelength is in a range of 760 to 800 nm, and the numerical aperture of an objective lens is about 0.45. In the compatible optical disc apparatus, there is a case in which a laser light source having a wavelength $\lambda_{DVD}$ in the vicinity of the wavelength 660 nm for DVD and a laser light source having a wavelength $\lambda_{CD}$ in the vicinity of the wavelength 780 nm for CD are mounted.

For example, a technology is suggested in which an optical pickup device for allowing information to be recorded and reproduced for information recording mediums having different substrate thicknesses for DVD/CD, and an objective lens and an optical element used for the optical pickup device are provided (JP-A-2001-235676). The optical pickup device is suggested in which the objective lens having diffractive orbicular zones is used for the optical pickup device, such that, with an outside light flux of a predetermined numerical aperture in a use state of a small numerical aperture as a flare, recording and reproducing of information are performed for various information recording mediums having different thicknesses. The objective lens having such diffractive orbicular zones includes a diffraction surface having the diffractive orbicular zones. Here, when a function of an optical path difference of the diffraction surface is $\Phi(h)$ (where h is a distance from an optical axis), $d\Phi(h)/dh$ is a discontinuous or substantially discontinuous function at a place of a predetermined distance h.

On the other hand, as for blue-ray disc (hereinafter, referred to as BD), the thickness of a transmissive protection layer (which corresponds to the thickness of a transparent substrate of DVD or the like) is 0.1 mm, the corresponding wavelength is 408 nm, and the numerical aperture of an objective lens is about 0.85. Accordingly, in a BD/DVD/CD compatible optical disc apparatus, a laser light source which emits laser light of $\lambda_{BD}$ in the vicinity of the wavelength 408 nm, that is, an optical system, needs to be mounted, in addition to the configuration of the above-described compatible optical disc apparatus. Further, since the optical discs of BD, DVD, and CD have different thicknesses, a unit for correcting three kinds of different spherical aberrations needs to be provided. In addition, since all of them have different numerical apertures, a corresponding unit also needs to be provided. However, in JP-A-2001-235676 described above, the specified descriptions of these units are not given. That is, it is difficult to realize compatibility of three or more kinds of recording mediums having different light source wavelengths, numerical apertures (effective diameters), optical disc thicknesses (the thickness of a transmissive protection layer), such as BD, DVD, CD, and the like by use of a single objective lens according to the related art.

In order to realize an optical pickup for a compatible apparatus, a method is suggested in which an objective lens exclusively used for BD and a DVD/CD compatible objective lens are used, and are switched according to wavelengths. In this case, however, since two objective lenses are used, a complex lens switching mechanism needs to be provided, which causes a problem in that manufacturing costs are increased. In addition, since an actuator is made large, it is disadvantageous to reduce the size of the apparatus. Further, a method may be considered in which an objective lens and a collimator lens are incorporated, but, since the collimator is fixed with respect to the objective lens, it may be difficult to maintain performance at the time of movement of the objective lens.

In any cases, if a plurality of light sources are used, and an optical system of exclusive prism, lens, and the like is configured in order to ensure compatibility of BD, DVD, and CD, an optical pickup or an overall optical head is complicated, and tends to have the large size.

SUMMARY OF THE INVENTION

Accordingly, it is an object of the present invention to provide an optical information recording and reproducing apparatus which is capable of recording and reproducing for optical discs or recording surfaces having different corresponding wavelengths and is suitable for reducing the size, an optical pickup device, and a diffractive optical element.

According to a first aspect of the present invention, an objective lens module includes a light-converging lens that is coaxially disposed with respect to an optical axis of first laser light having a first wavelength, and a transmission-type diffractive optical element that is coaxially disposed to cause diffracted light of first laser light to be incident on the light-converging lens. The diffractive optical element has an incident surface and an emergent surface, and first, second, and third regions that are provided on at least of the incident surface and the emergent surface in the vicinity of the optical axis, and are sequentially defined according to different radius distances from the optical axis to have different diffraction gratings of different diffraction angles, respectively. The first region diffracts odd-order diffracted light of first laser light to the light-converging lens, the second region diffracts even-order diffracted light of first laser light to the light-converging lens, and the third region diffracts even-order or zero-order diffracted light of first laser light to the light-converging lens, such that the light-converging lens converges diffracted light from the first, second, and third regions with a predetermined numerical aperture.

According to a second aspect of the present invention, there is provided a diffractive optical element which is provided on an optical path common to first laser light and plural laser light in order to cause an objective lens for converging first laser light on a first recording medium to be shared for plural laser light having wavelengths different from that of first laser light and a plurality of recording mediums corresponding to plural laser light. Plural laser light have second laser light corresponding to a second recording medium and third laser light corresponding to a third recording medium. The diffractive optical element includes a first diffractive lens structure that is provided in the vicinity of an optical axis so as to correct an aberration to be generated on the basis of the difference in wavelength between first laser light and second and third laser light, and a second diffractive lens structure that is provided in the vicinity of the first diffractive lens structure so as to correct an aberration to be generated on the basis of the difference in wavelength between first laser light and second laser light.

In the diffractive optical element according to the second aspect of the present invention, it is preferable that the first recording medium have a recording layer for receiving light through a transmissive protection layer having a first thickness, the second recording medium have a recording layer for receiving light through a transmissive protection layer having a second thickness equal to or larger than the first thickness, and the third recording medium have a recording layer for receiving light through a transmissive protection layer having a third thickness larger than the second thickness.

In the diffractive optical element according to the second aspect of the present invention, it is preferable that the first diffractive lens structure correct the aberration to be generated on the basis of the difference between the first thickness of the transmissive protection layer and the second and third thicknesses of the transmissive protection layers, in addition to the difference in wavelength between first laser light and second and third laser light. Further, it is preferable that the second diffractive lens structure correct the aberration to be generated on the basis of the difference between the first thickness of the transmissive protection layer and the second thickness of the transmissive protection layer, in addition to the difference in wavelength between first laser light and second laser light.

In addition, the diffractive optical element according to the second aspect of the present invention may further include a third diffractive lens structure that is provided on an incident surface or an emergent surface of the diffractive optical element so as to correct a chromatic aberration to be generated due to a wavelength change of first laser light by a very small amount.

According to a third aspect of the present invention, an optical pickup includes the above-described objective lens module or diffractive optical element. Further, according to a fourth aspect of the present invention, an optical information recording and reproducing apparatus includes the above-described optical pickup.

In such a configuration of the objective lens module or the pickup in which the diffractive optical element is used, with the study for the diffractive optical element, BD, DVD, and CD can be designed as an infinite system, such that an optical path of the pickup can be simplified.

At the time of BD/DVD/CD compatible, a diffractive lens structure for chromatic aberration correction may be added to a diffractive optical element for spherical aberration correction, and thus a discontinuous chromatic aberration can be corrected.

The diffractive lens structure for spherical aberration correction and the diffractive lens structure for chromatic aberration correction may be integrated. Therefore, it is possible to prevent a trouble in correcting a discontinuous chromatic aberration correction due to an adjustment error at the time of assembling or a lens shift caused by tracking.

BRIEF DESCRIPTION OF THE DRAWINGS

FIG. 65 is a graph showing a calculation result of a wavefront aberration for BD of an objective lens module, which uses the diffractive optical element according to Example 2 of the present invention, by data having an actual shape;

FIG. 66 is a graph showing a calculation result of a wavefront aberration for DVD of an objective lens module, which uses the diffractive optical element according to Example 2 of the present invention, by data having an actual shape;

FIG. 67 is a graph showing a calculation result of a wavefront aberration for CD of an objective lens module, which uses the diffractive optical element according to Example 2 of the present invention, by data having an actual shape;

FIG. 115 is a graph schematically showing a section of a diffractive lens structure B, which is formed in a diffractive optical element according to Example 4 of the present invention;

FIG. 116 is a graph schematically showing a section of a diffractive lens structure A, which is formed in the diffractive optical element according to Example 4 of the present invention;

FIG. 117 is a graph schematically showing a section when the diffractive lens structure A and the diffractive lens structure B, which are formed in the diffractive optical element according to Example 4 of the present invention, are synthesized;

FIG. 118 is a graph showing a calculation result of a wavefront aberration for BD of an objective lens module, which uses the diffractive optical element according to Example 4 of the present invention, by data having an actual shape;

FIG. 119 is a graph showing a calculation result of a wavefront aberration for DVD of an objective lens module, which uses the diffractive optical element according to Example 4 of the present invention, by data having an actual shape;

FIG. 120 is a graph showing a calculation result of a wavefront aberration for CD of an objective lens module, which uses the diffractive optical element according to Example 4 of the present invention, by data having an actual shape;

FIG. 121 is a graph showing a spot shape on BD calculated by a wavefront aberration of an objective lens module calculated by data having an actual surface shape of the diffractive lens structure in the diffractive optical element according to Example 4 of the present invention;

FIG. 122 is a graph showing a spot shape on DVD calculated by a wavefront aberration of an objective lens module which is calculated by data having an actual surface shape of the diffractive lens structure in the diffractive optical element according to Example 4 of the present invention;

FIG. 123 is a graph showing a spot shape on CD calculated by a wavefront aberration of an objective lens module which is calculated by data having an actual surface shape of the diffractive lens structure in the diffractive optical element according to Example 4 of the present invention;

FIG. 124 is a graph showing a spot side-robe shape on BD calculated by a wavefront aberration of an objective lens module which is calculated by data having an actual surface shape of the diffractive lens structure in the diffractive optical element according to Example 4 of the present invention;

FIG. 125 is a graph showing a spot side-robe shape on DVD calculated by a wavefront aberration of an objective lens module which is calculated by data having an actual surface shape of the diffractive lens structure in the diffractive optical element according to Example 4 of the present invention;

FIG. 126 is a graph showing a spot side-robe shape on CD calculated by a wavefront aberration of an objective lens module which is calculated by data having an actual surface shape of the diffractive lens structure in the diffractive optical element according to Example 4 of the present invention;

Figure 127:
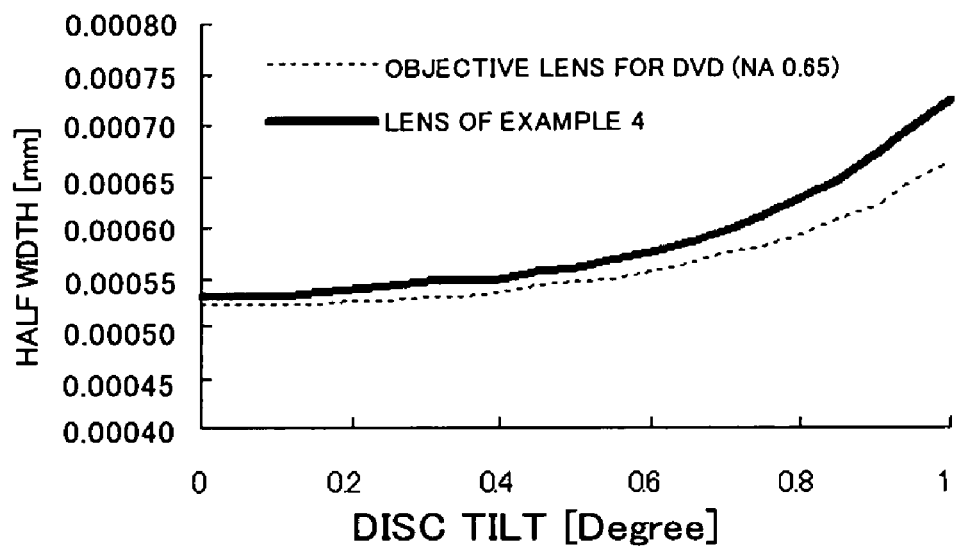
Figure 128:
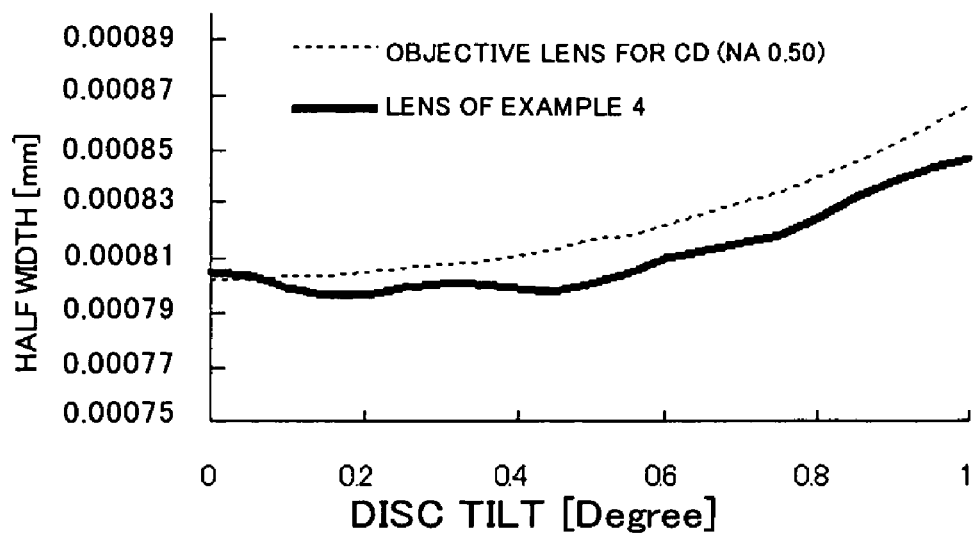
Figure 129:
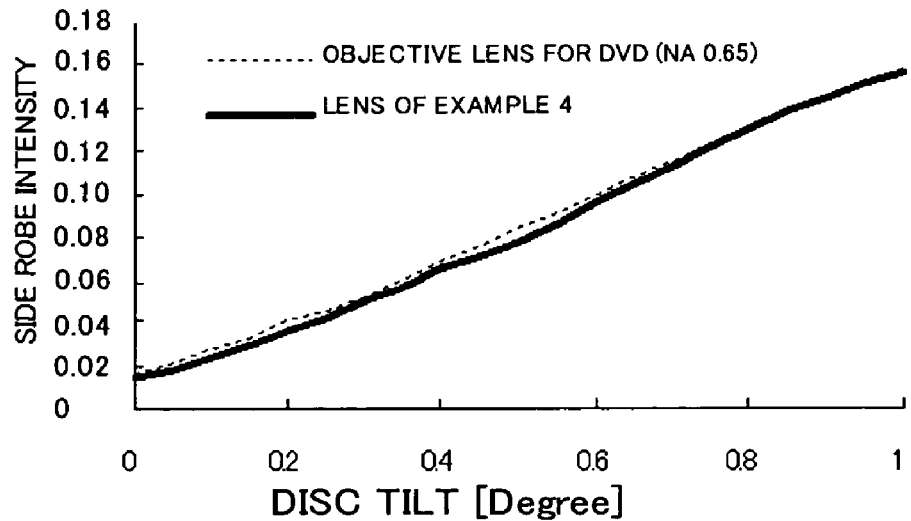
Figure 130:
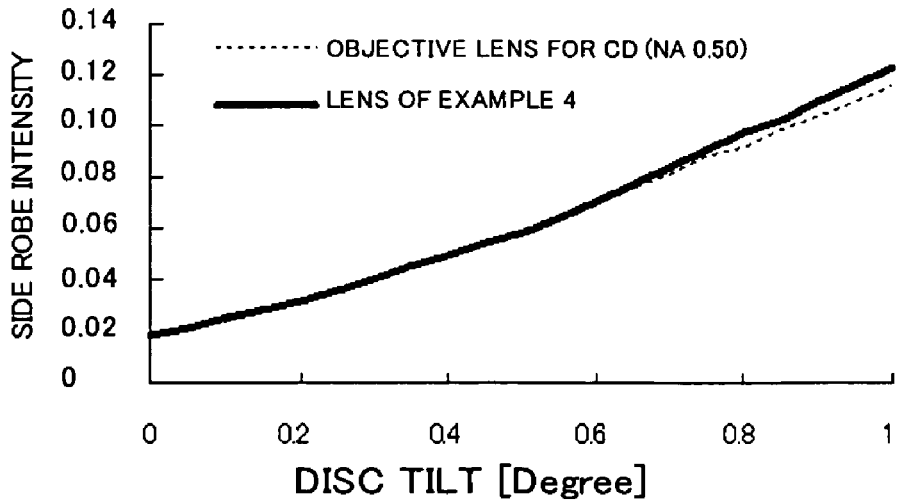
Figure 131:
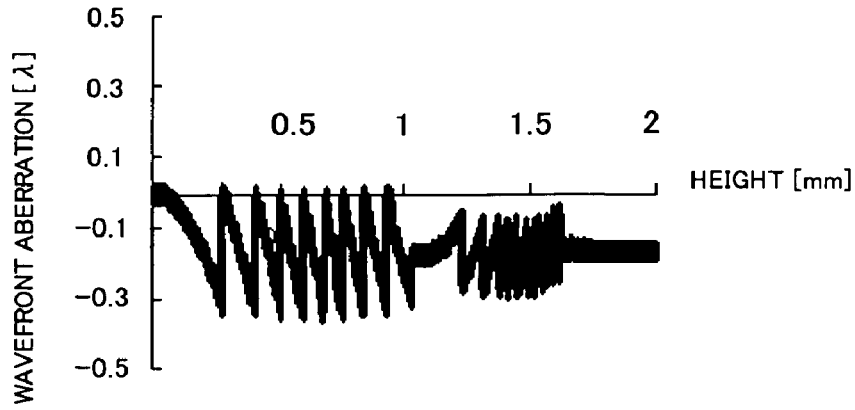
Figure 132:
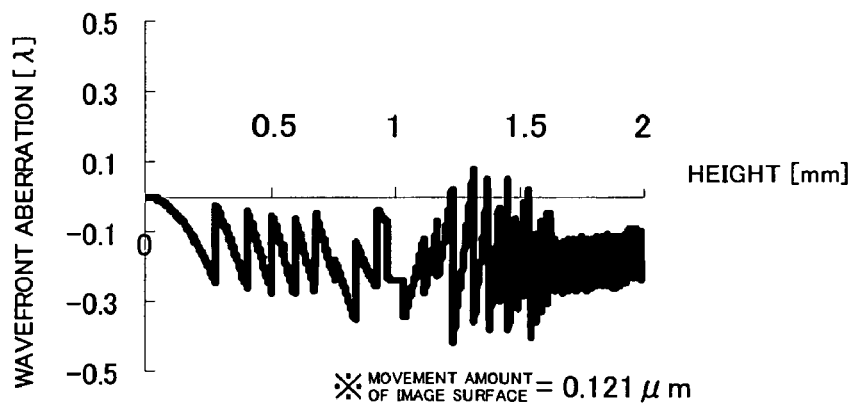
Figure 133:
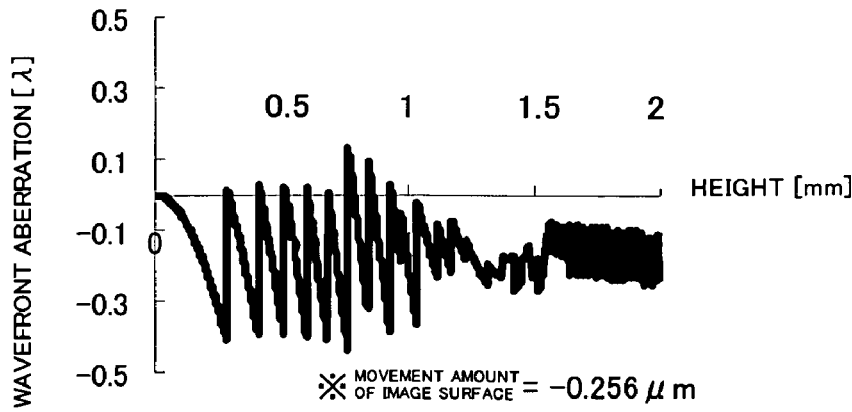
Figure 134:
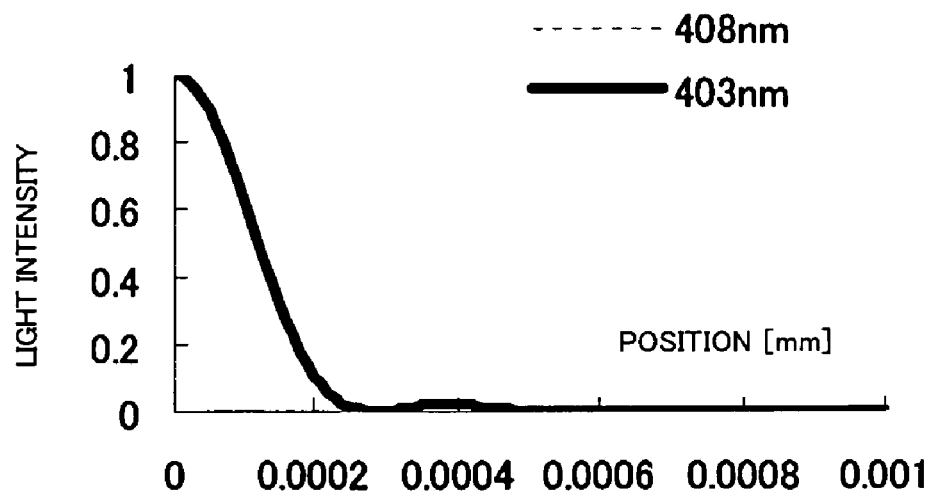
Figure 135:
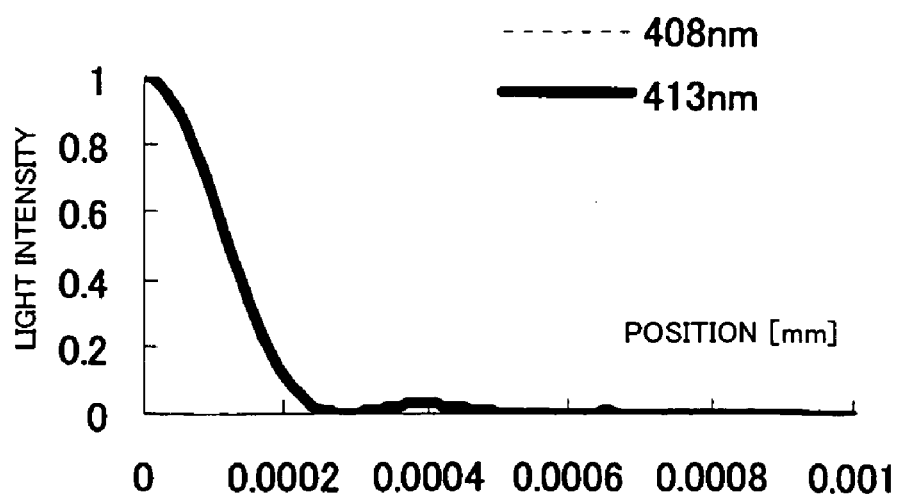
Figure 136:
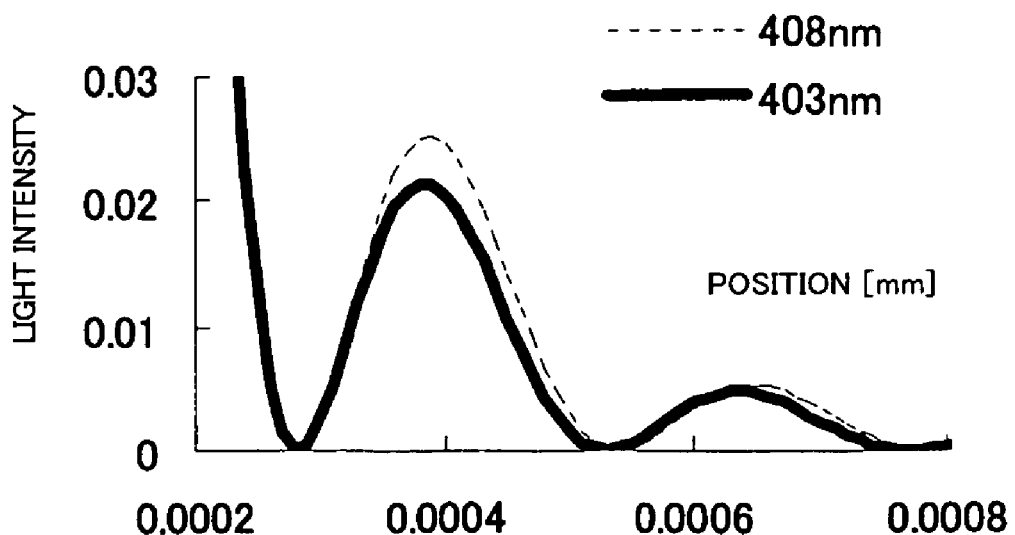
Figure 137:
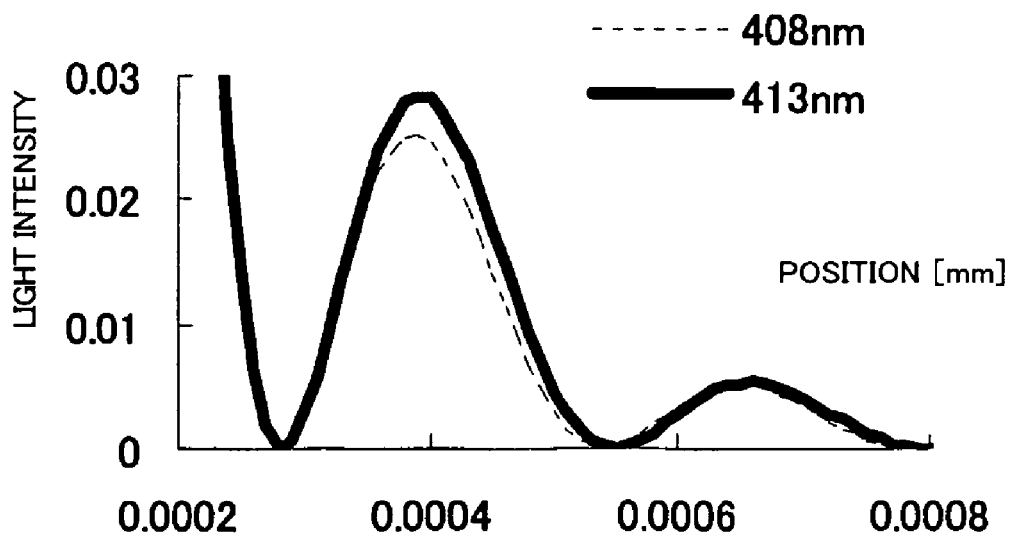
Figure 138:
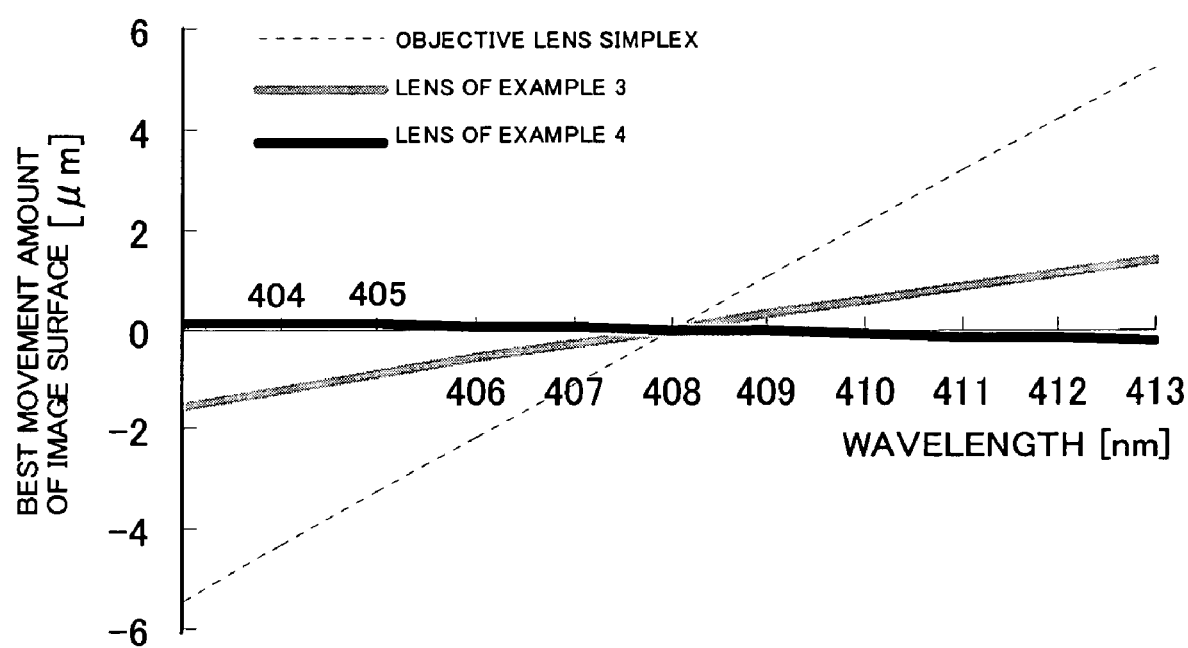
Figure 139:
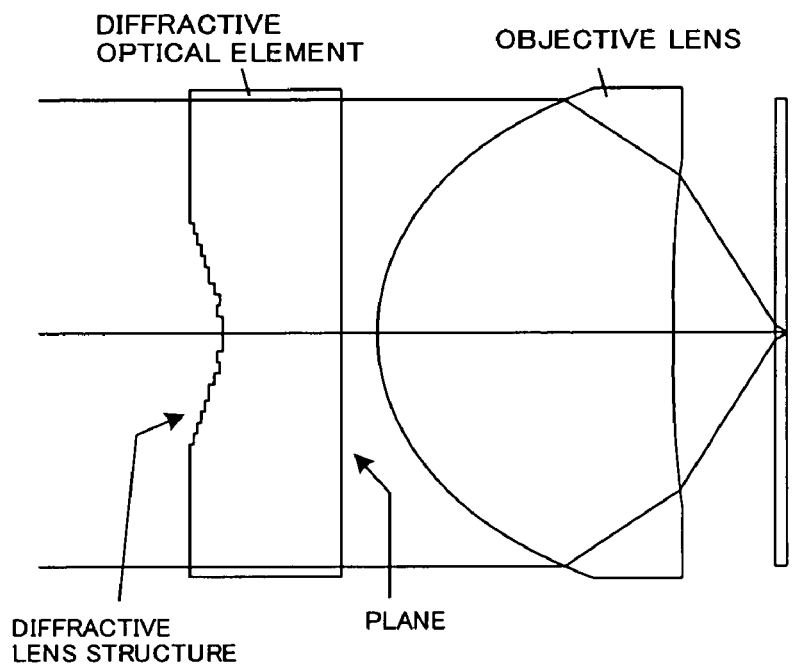
Figure 140:
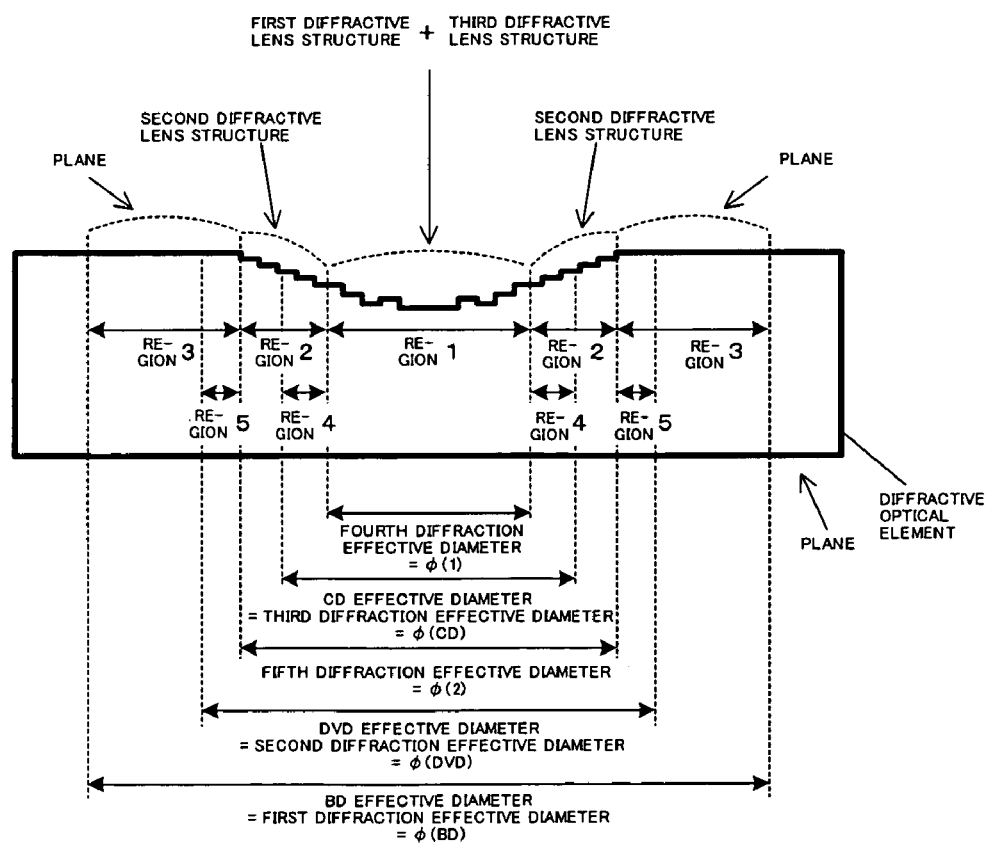
Figure 141:
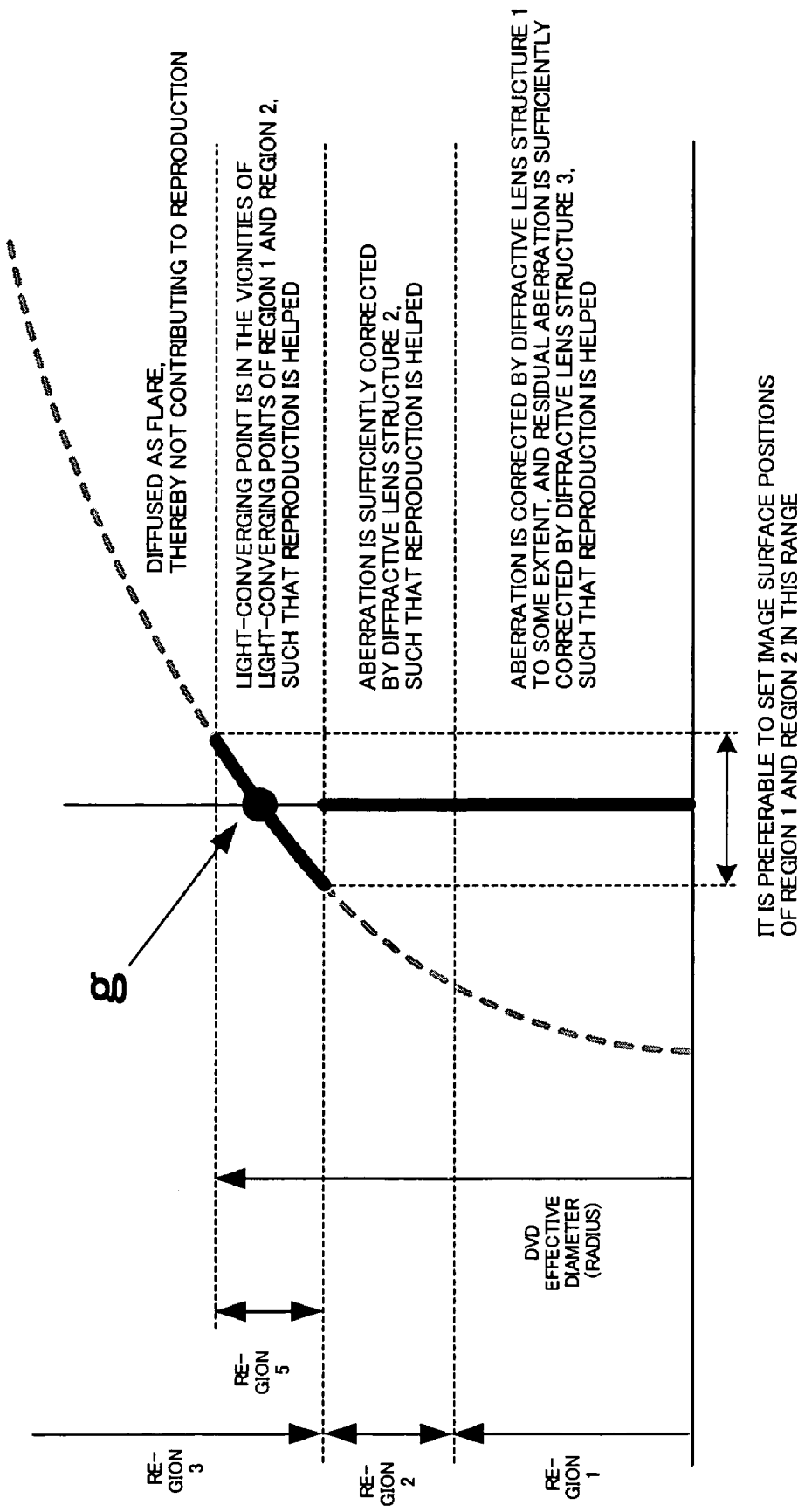
Figure 142:
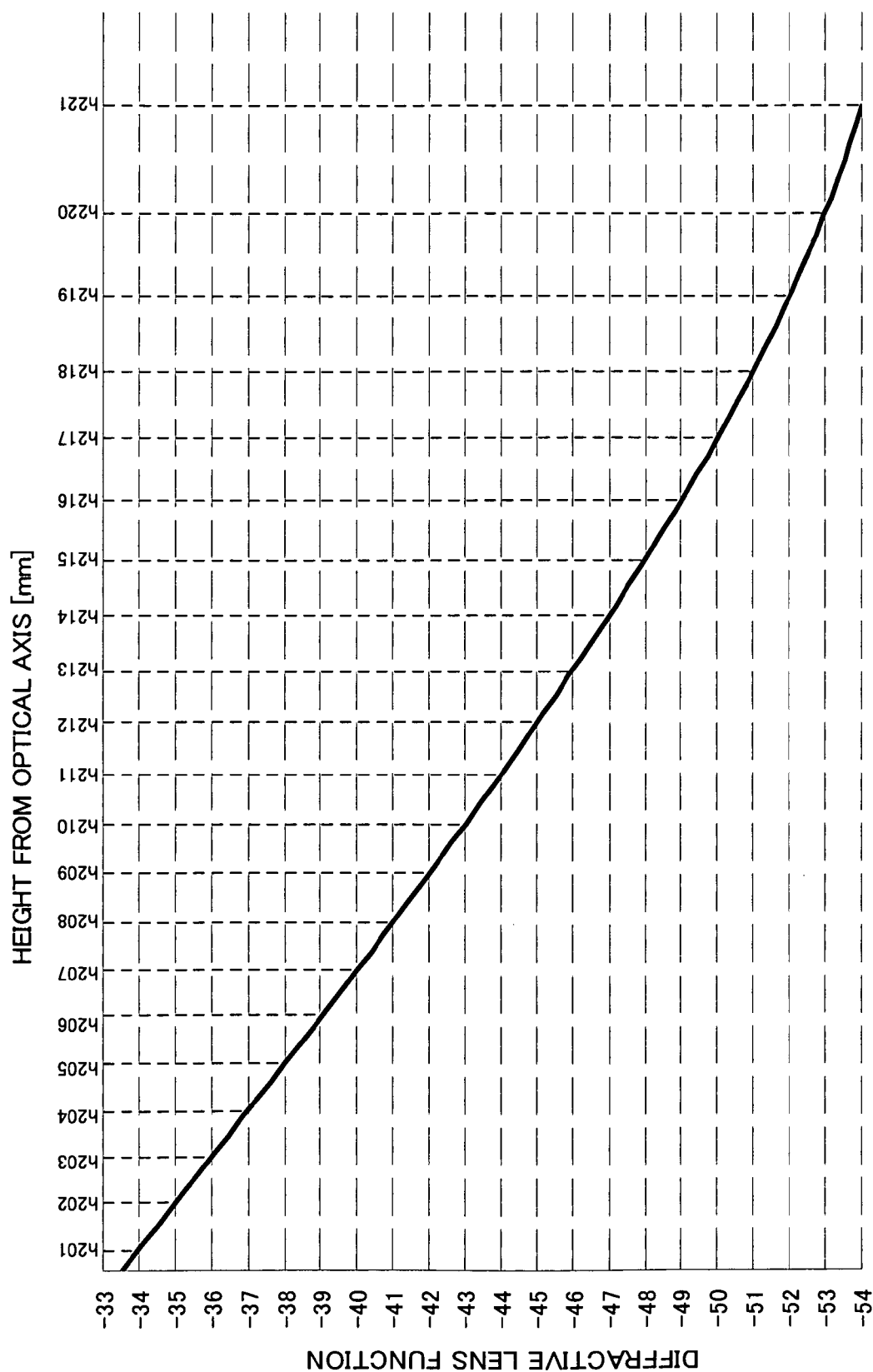
Figure 143:
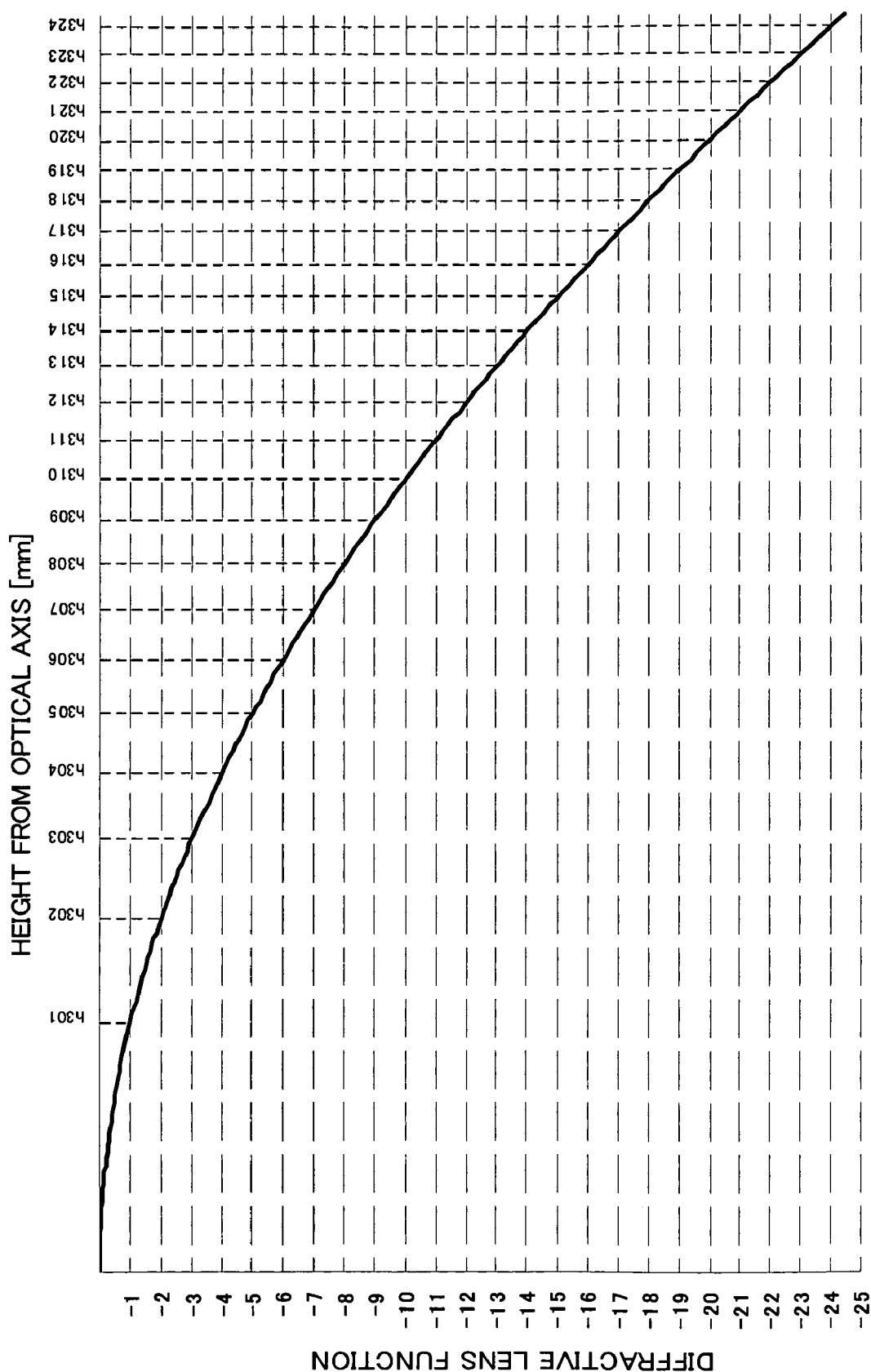
Figure 144:
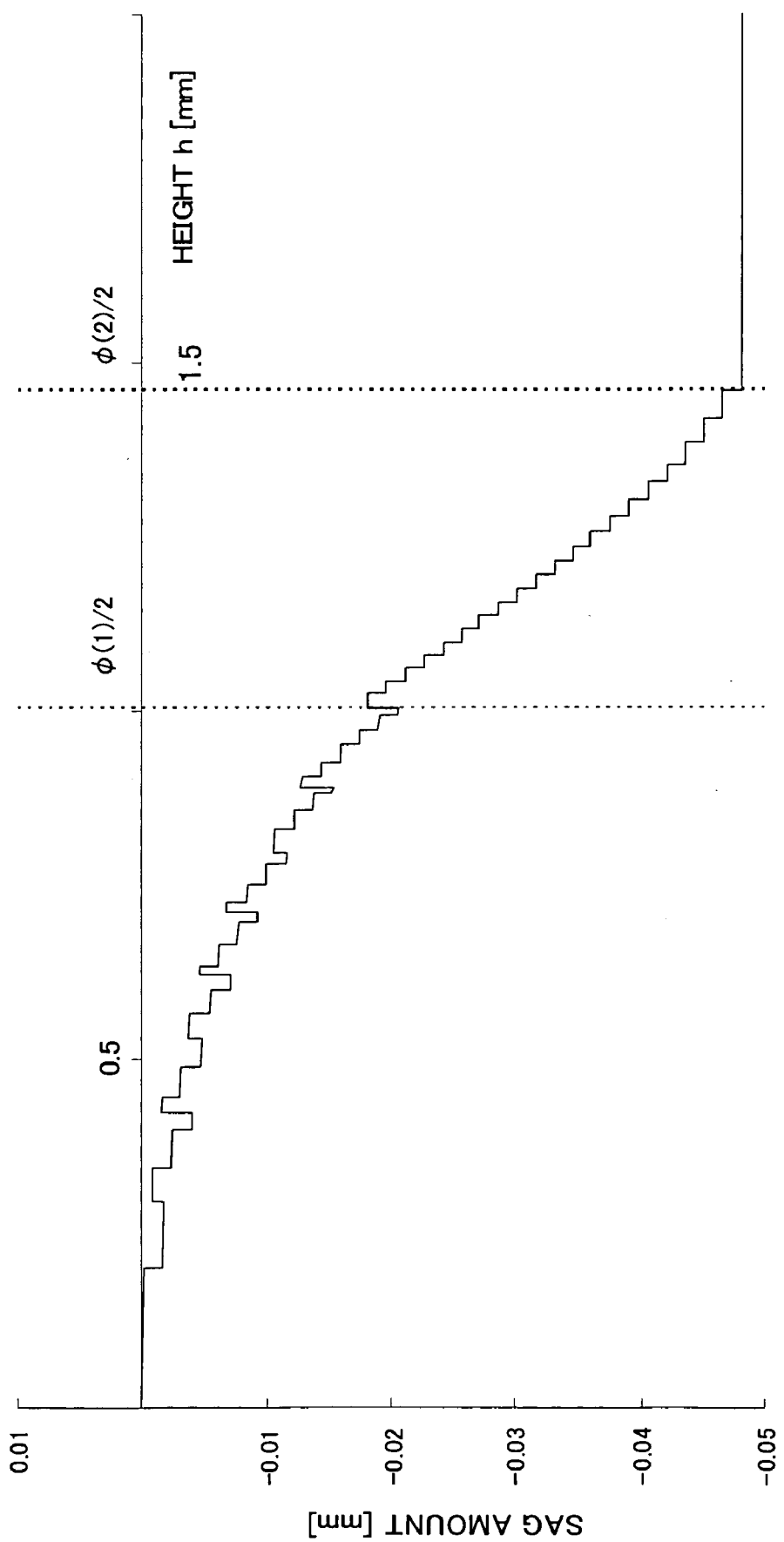
Figure 145:
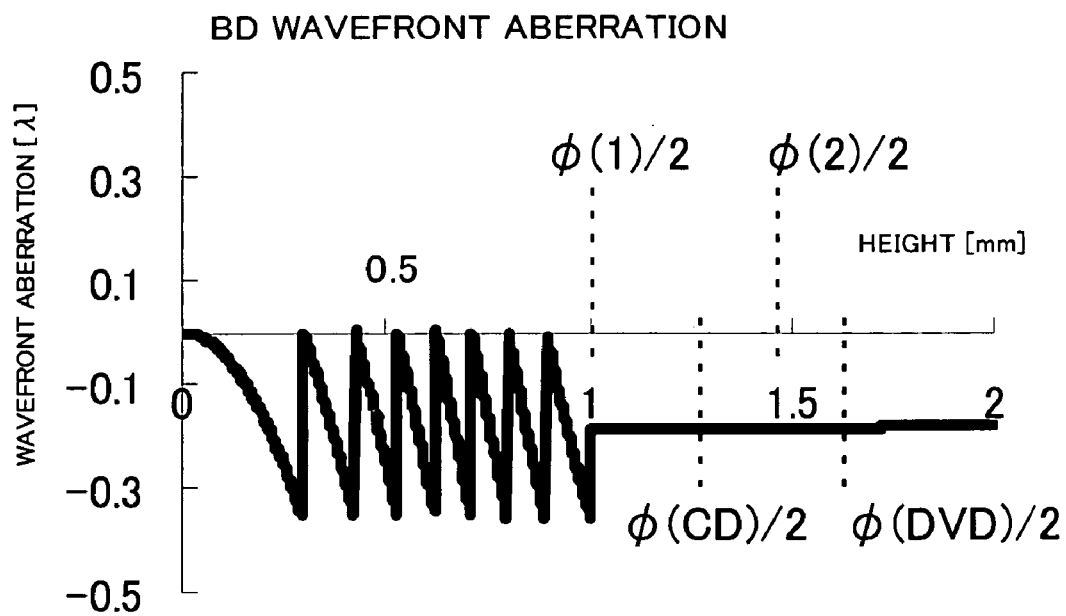
Figure 146:
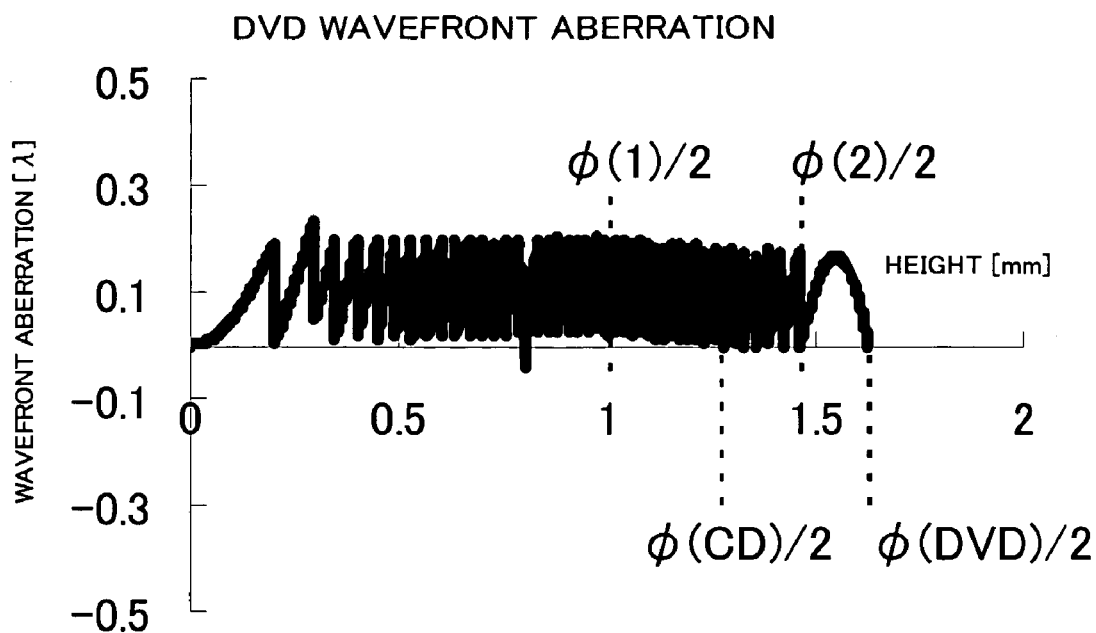
Figure 147:
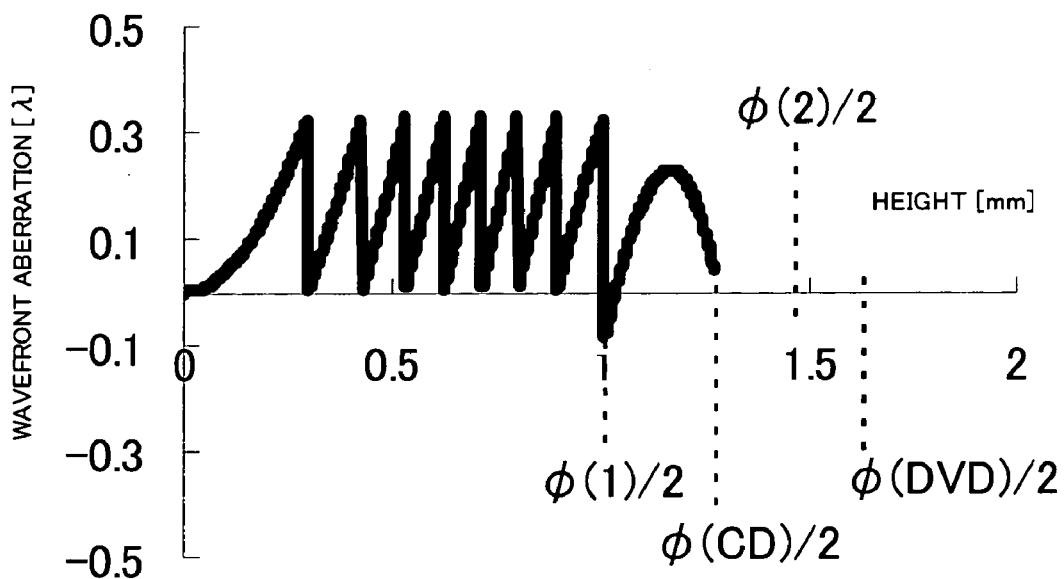
Figure 148:
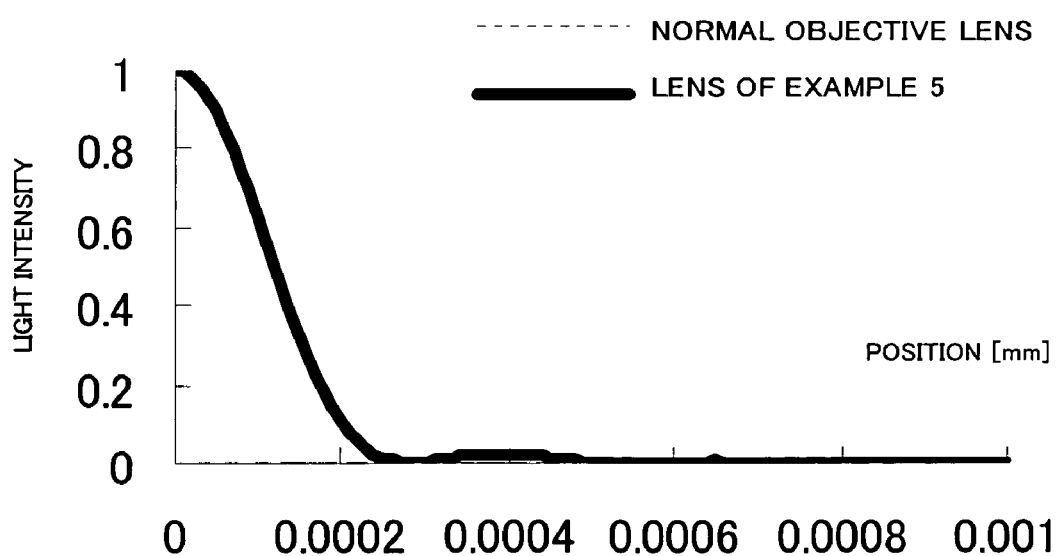
Figure 149:
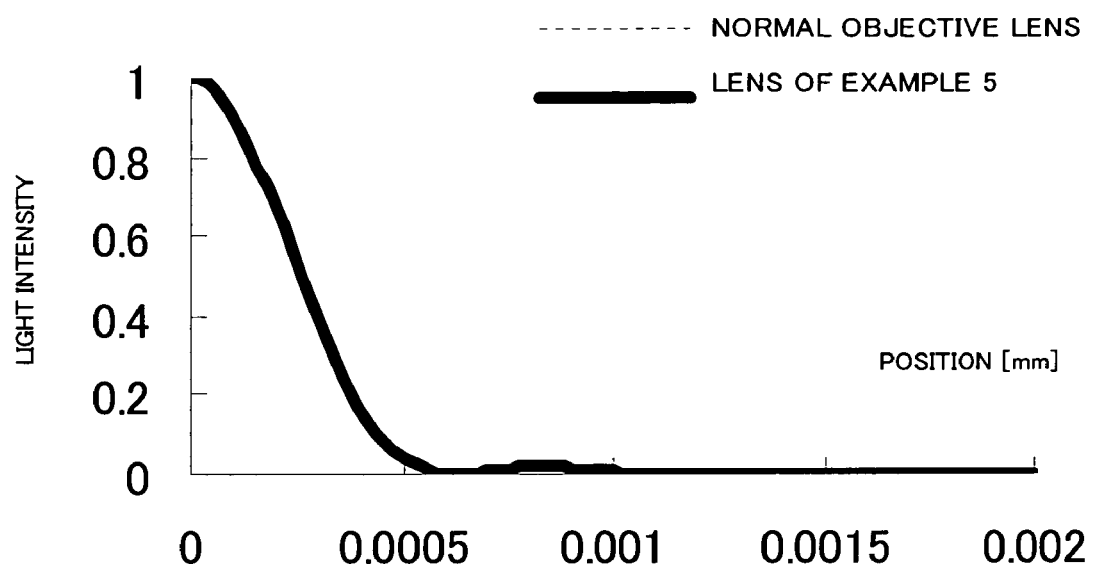
Figure 150:
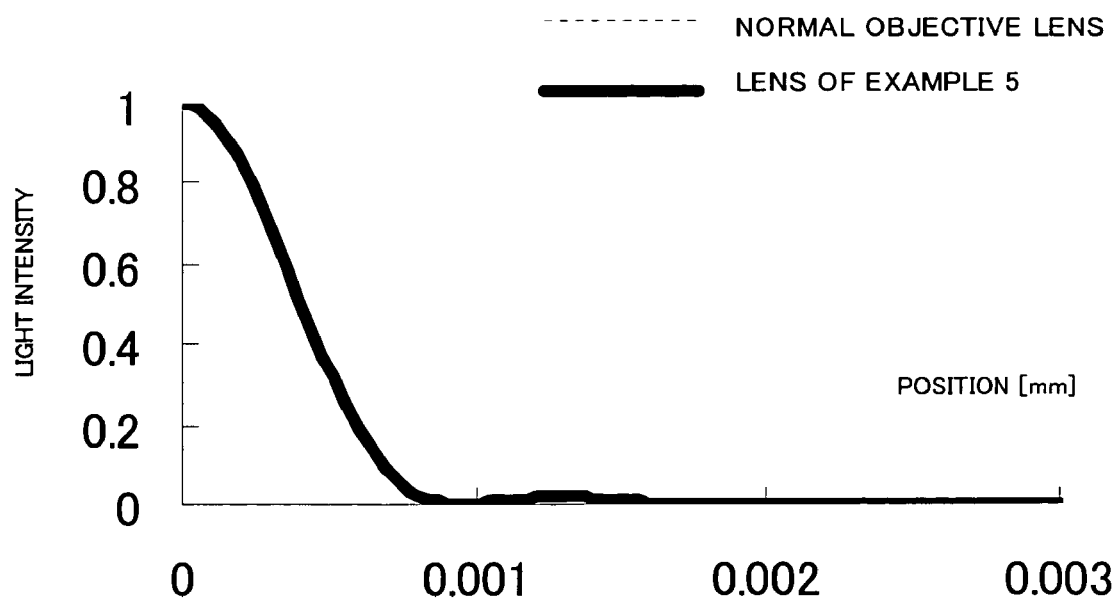
Figure 151:
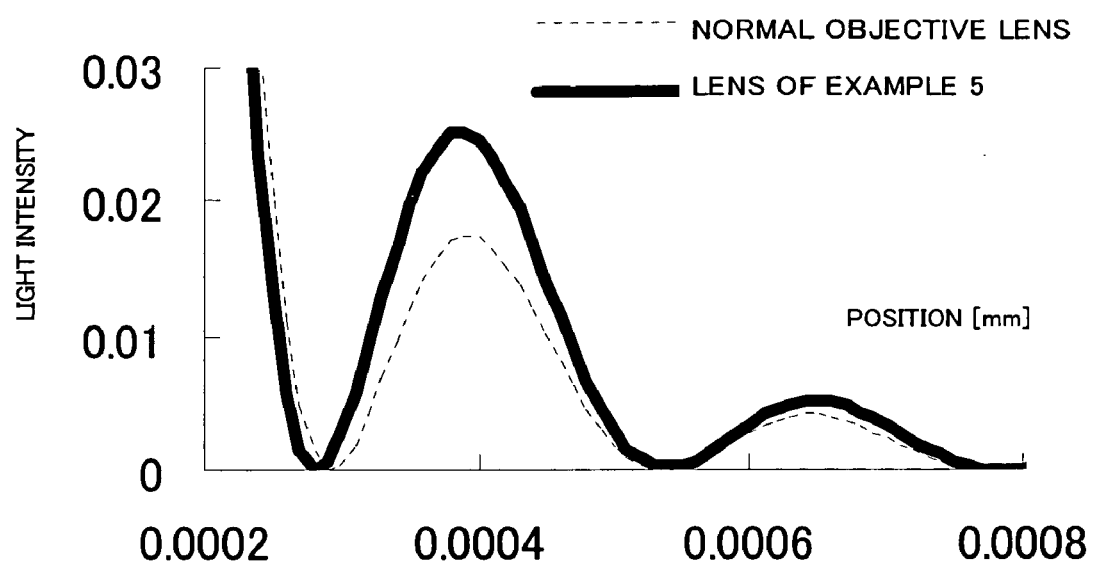
Figure 152:
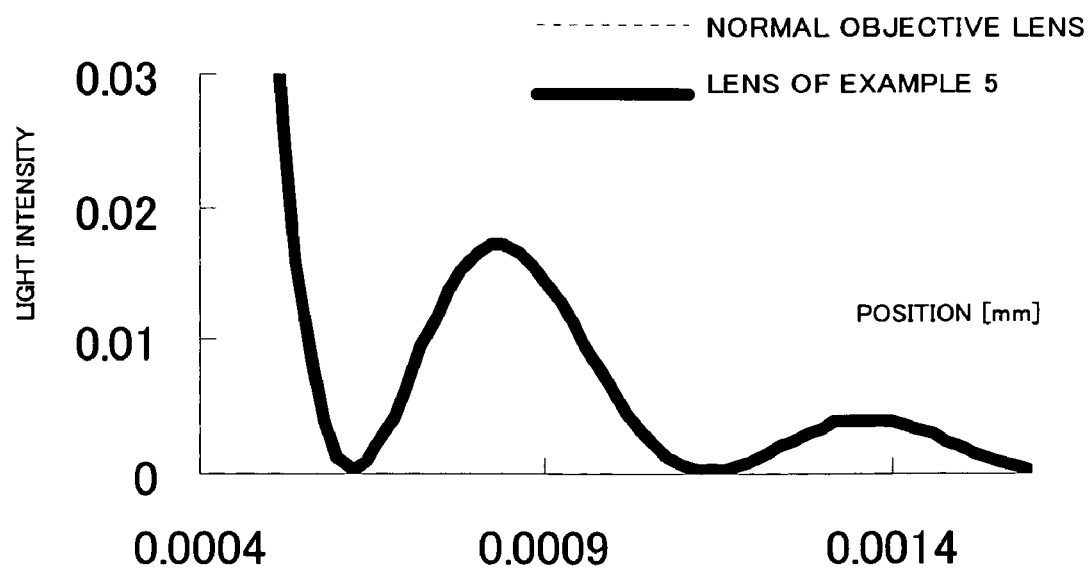
Figure 153:
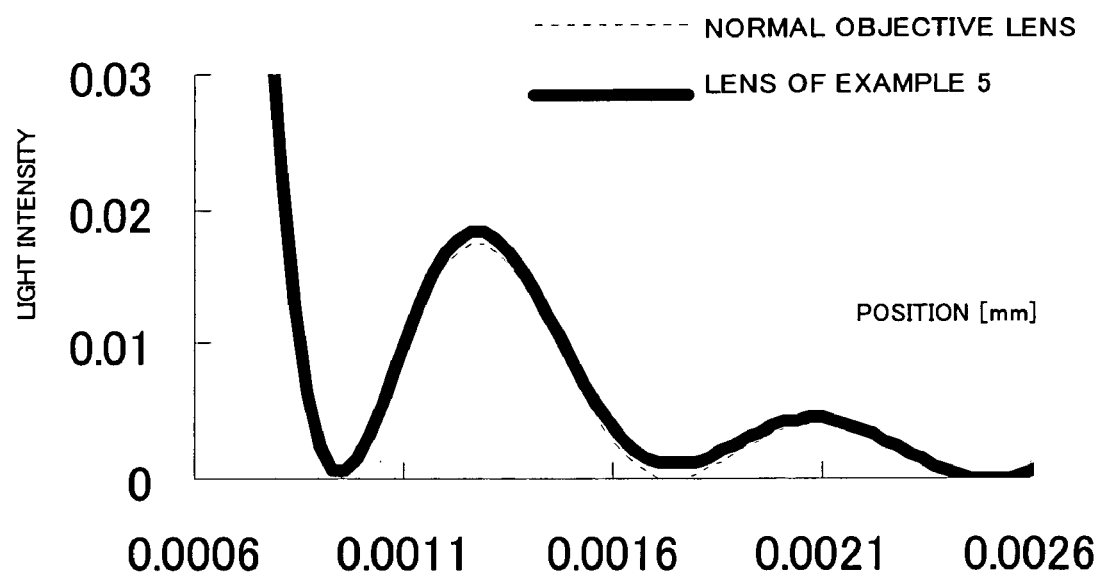
Figure 154:
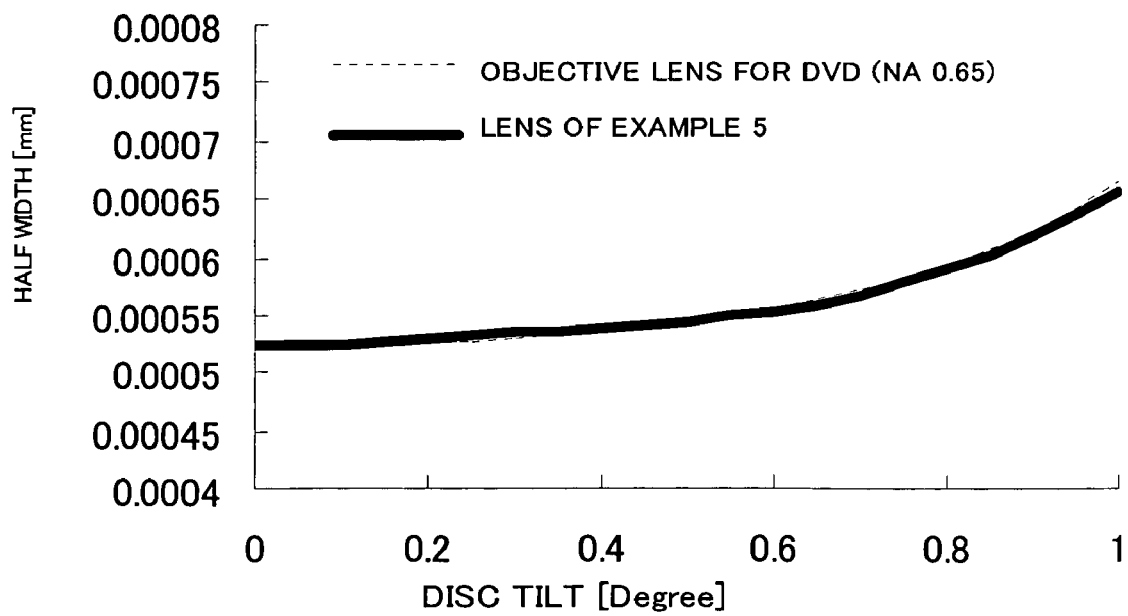
Figure 155:
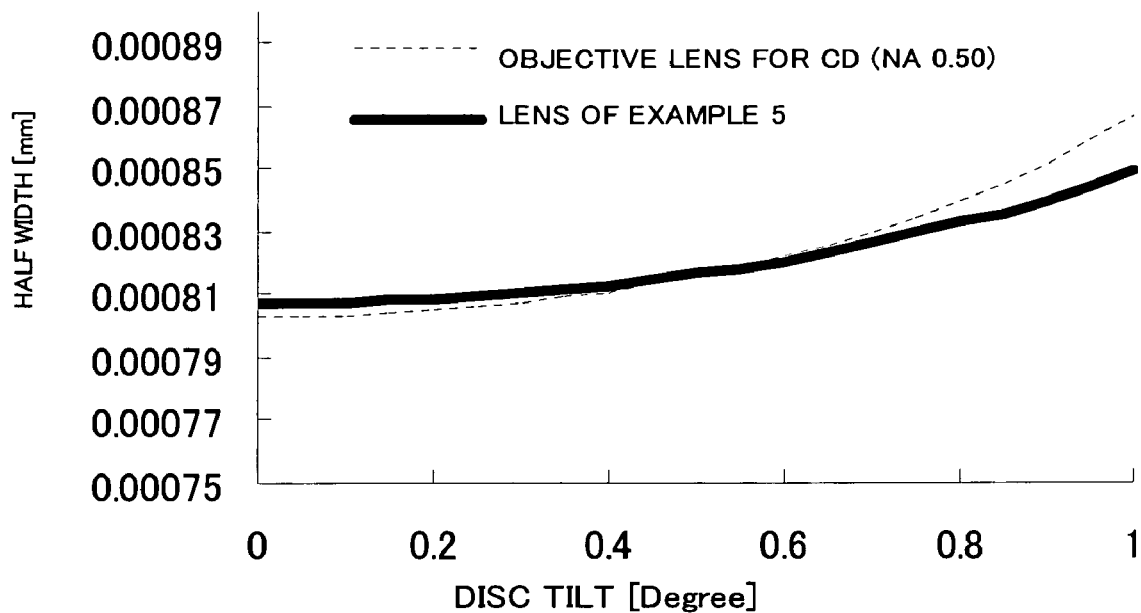
Figure 156:
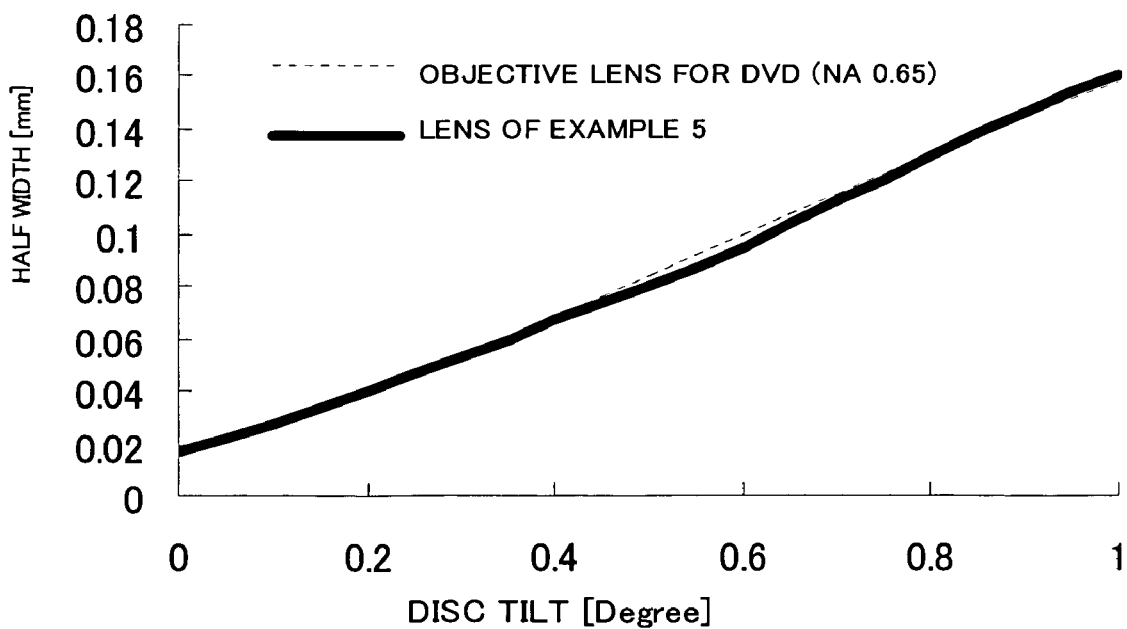
Figure 157:
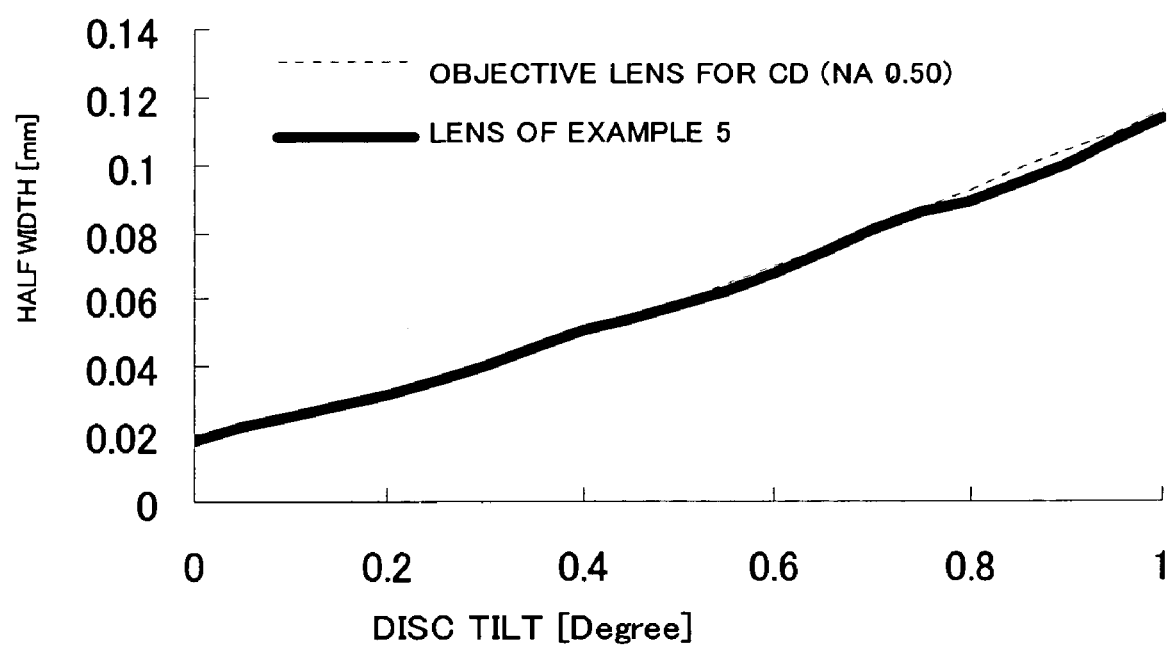
Figure 158A:
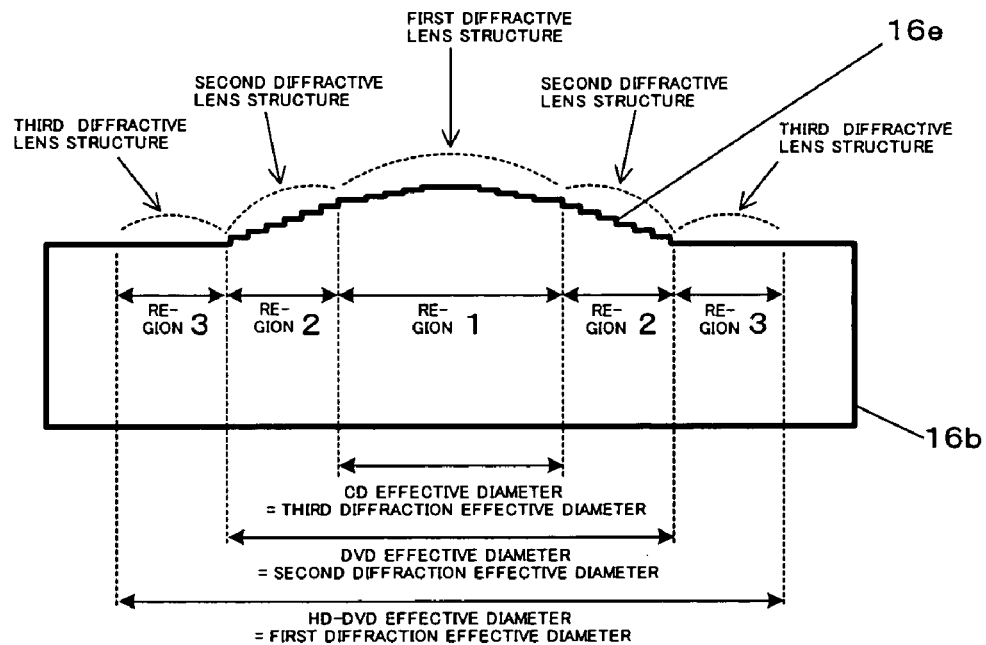
Figure 158B:
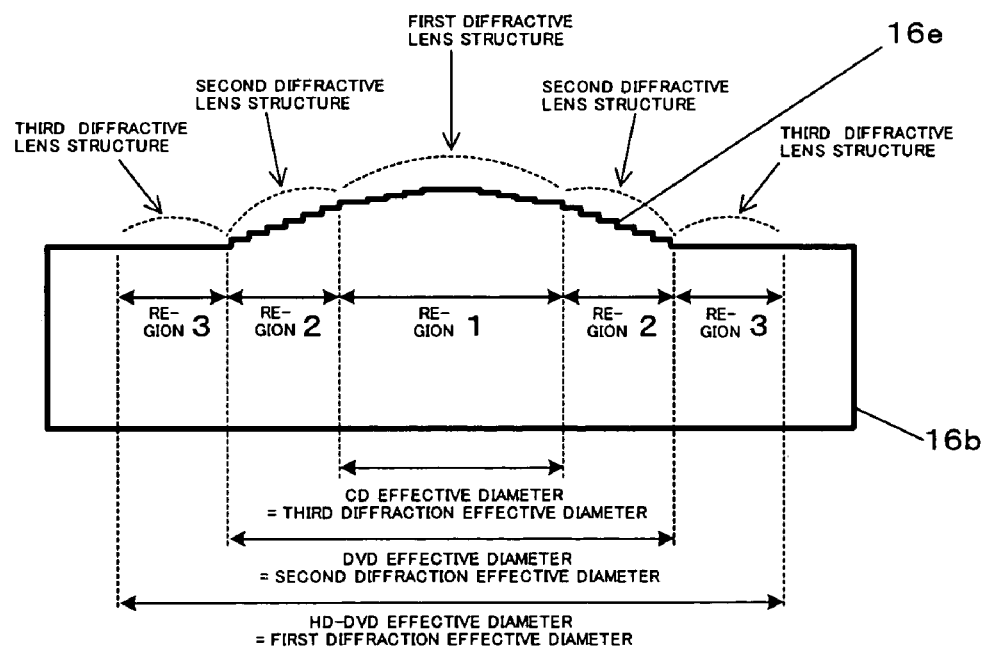
Figure 158C:
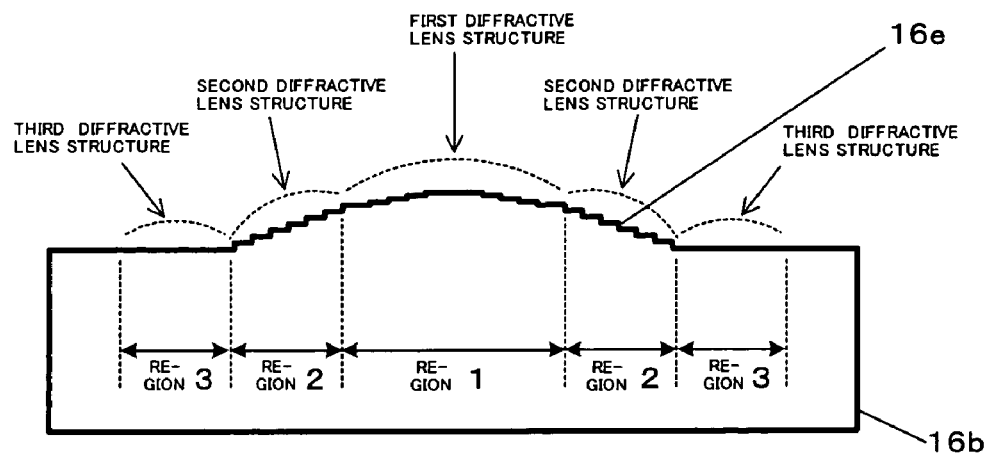
Figure 158D:
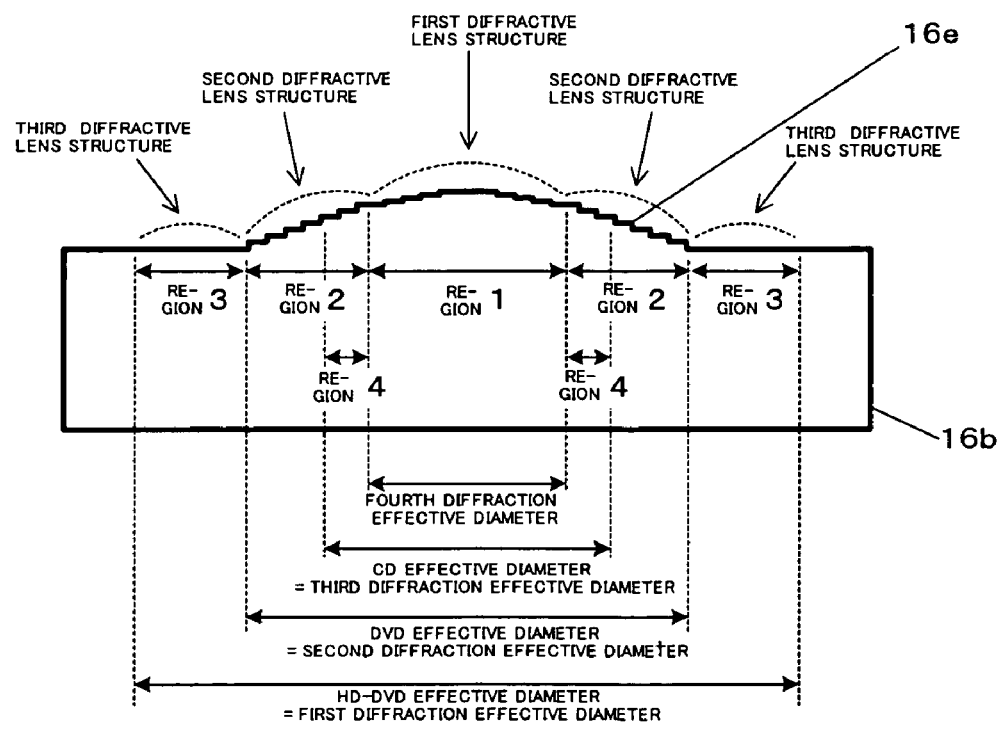
Figure 160A:
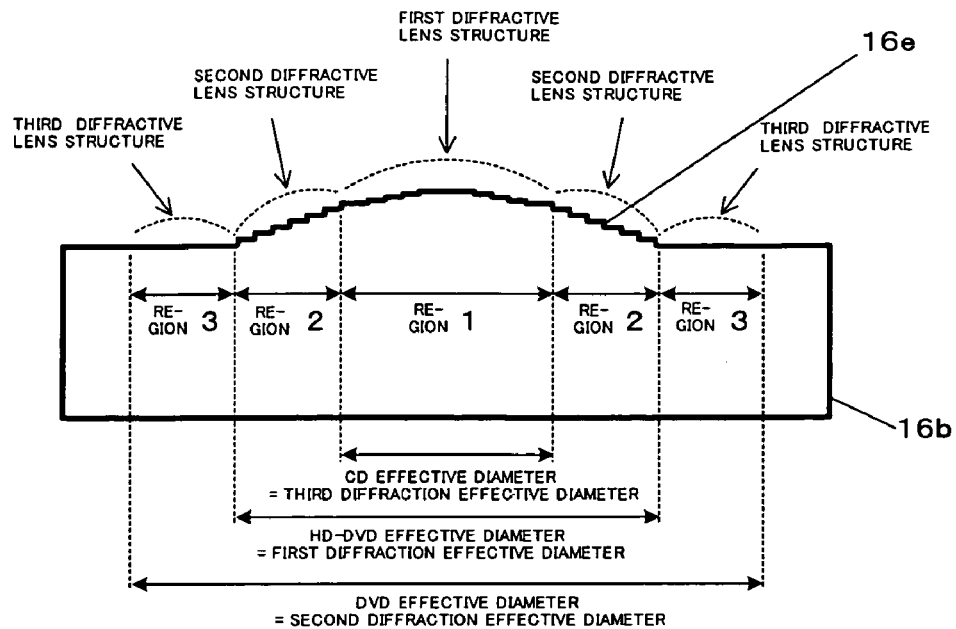
Figure 160B:
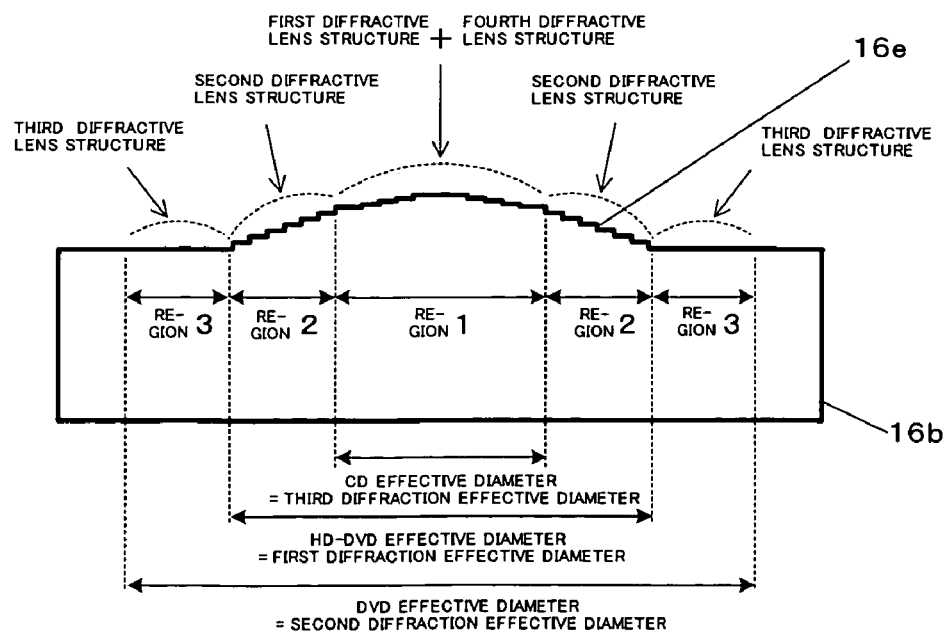
Figure 160C:
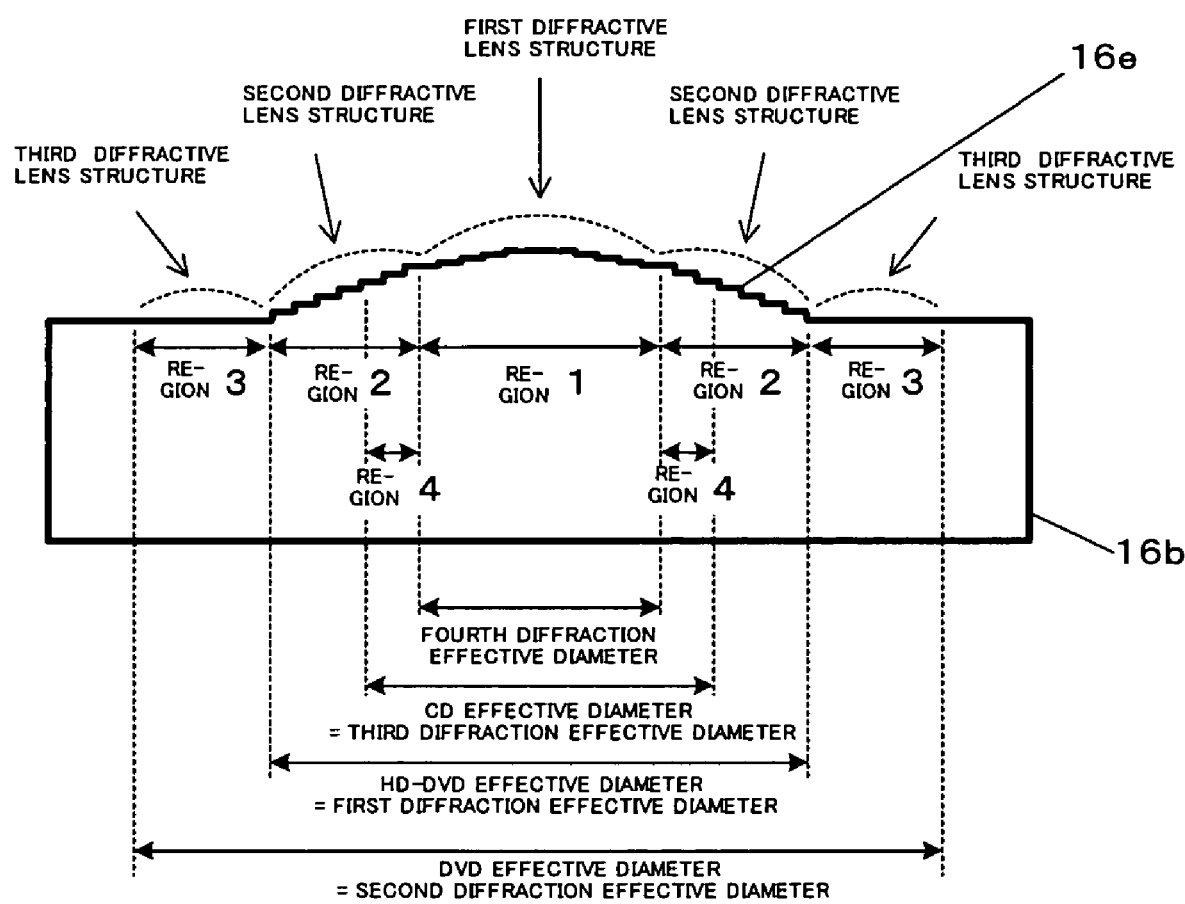
Figure 162A:
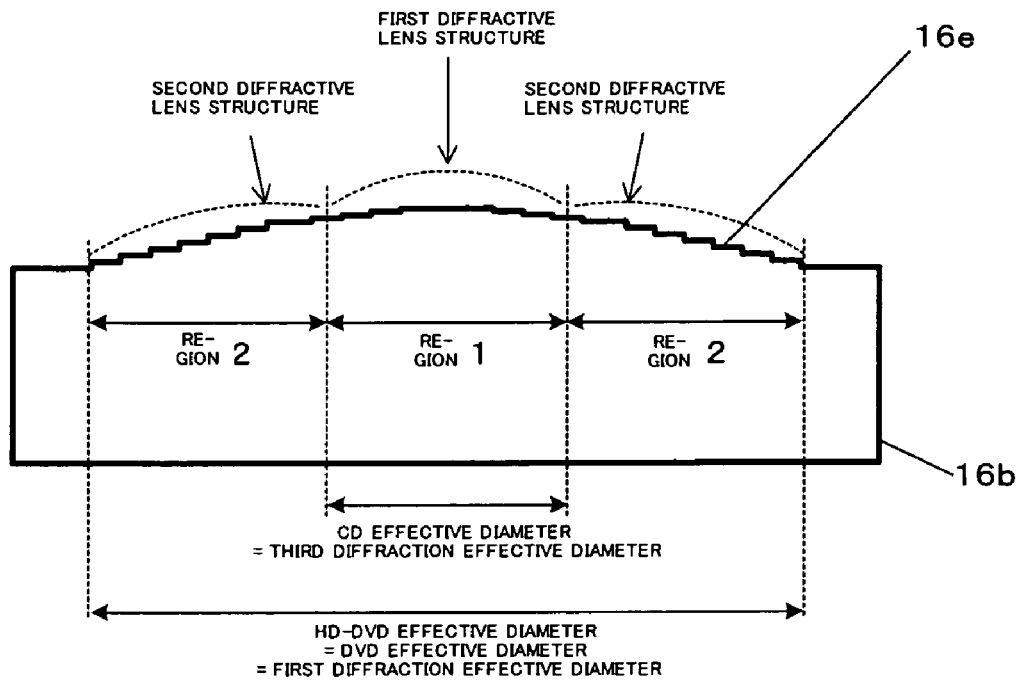
Figure 162B:
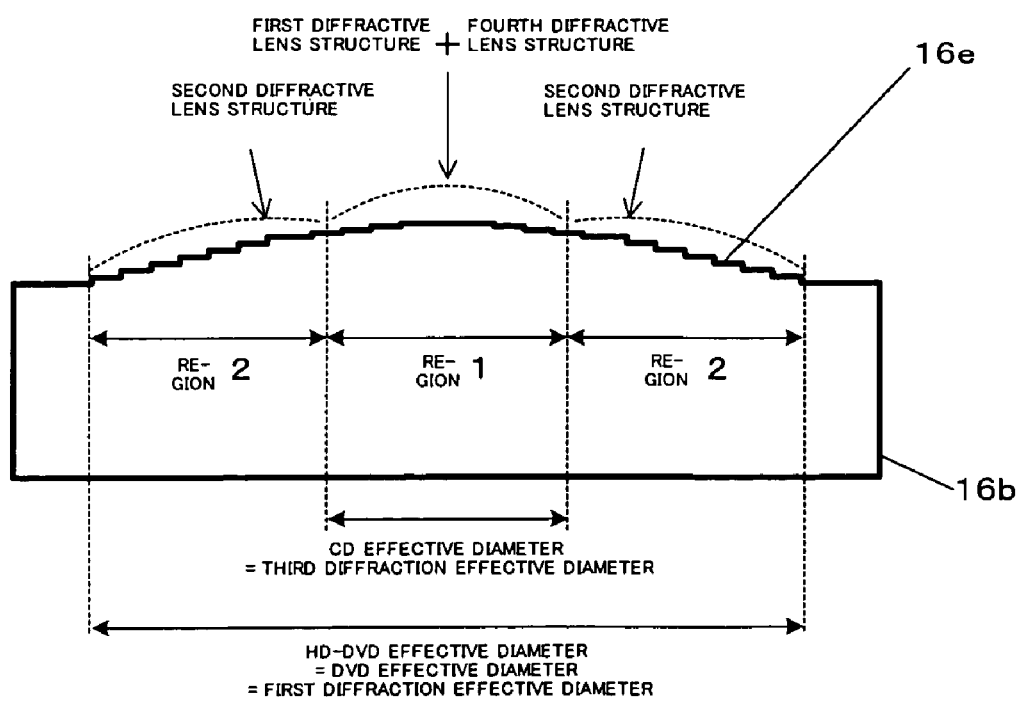
Figure 162C:
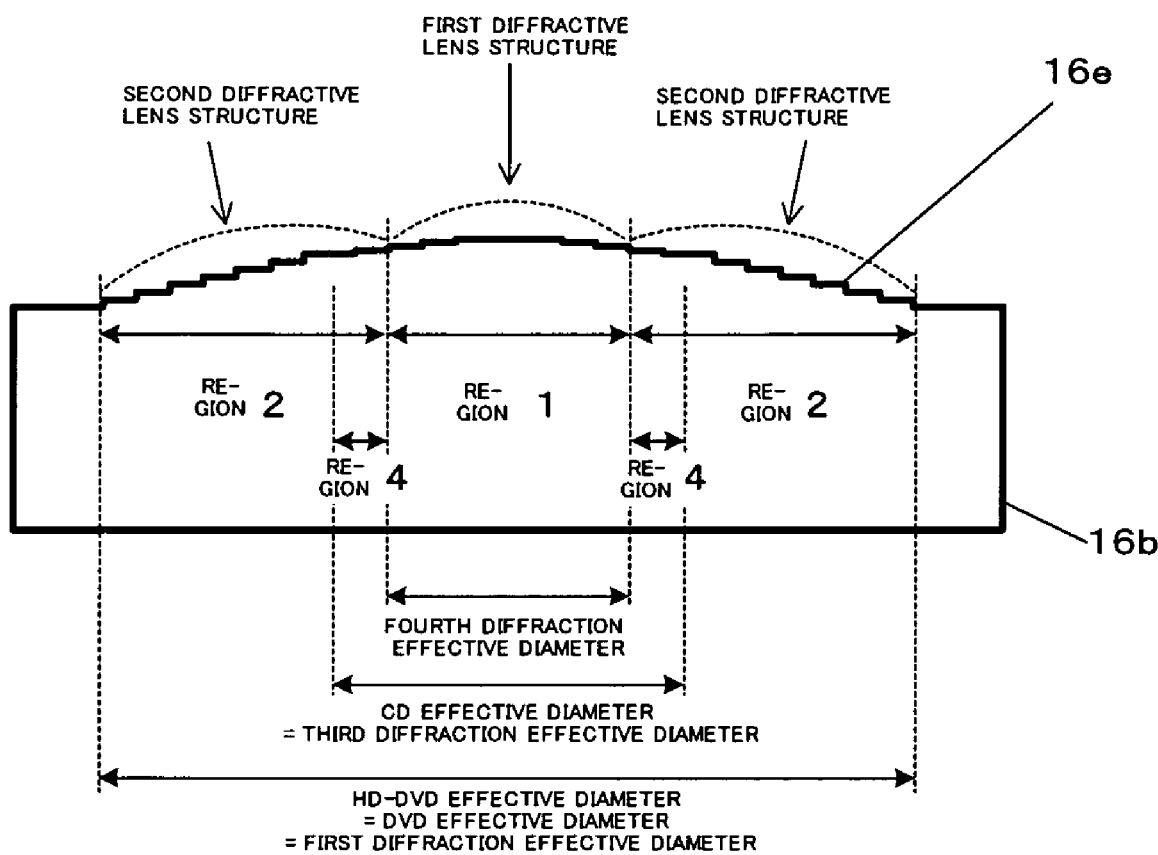
Figure 164:
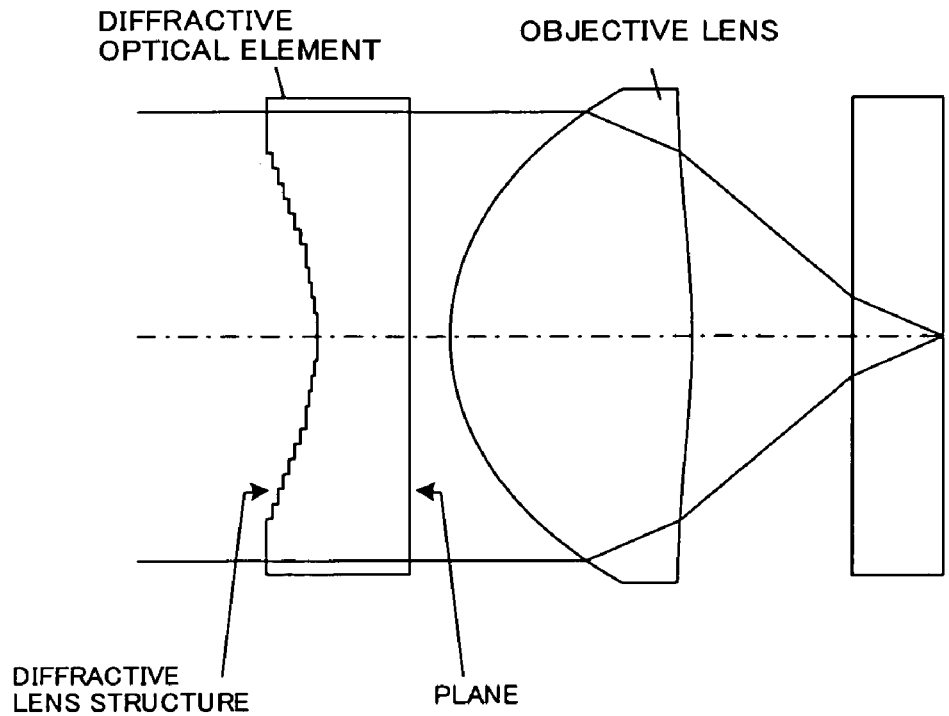
Figure 165:
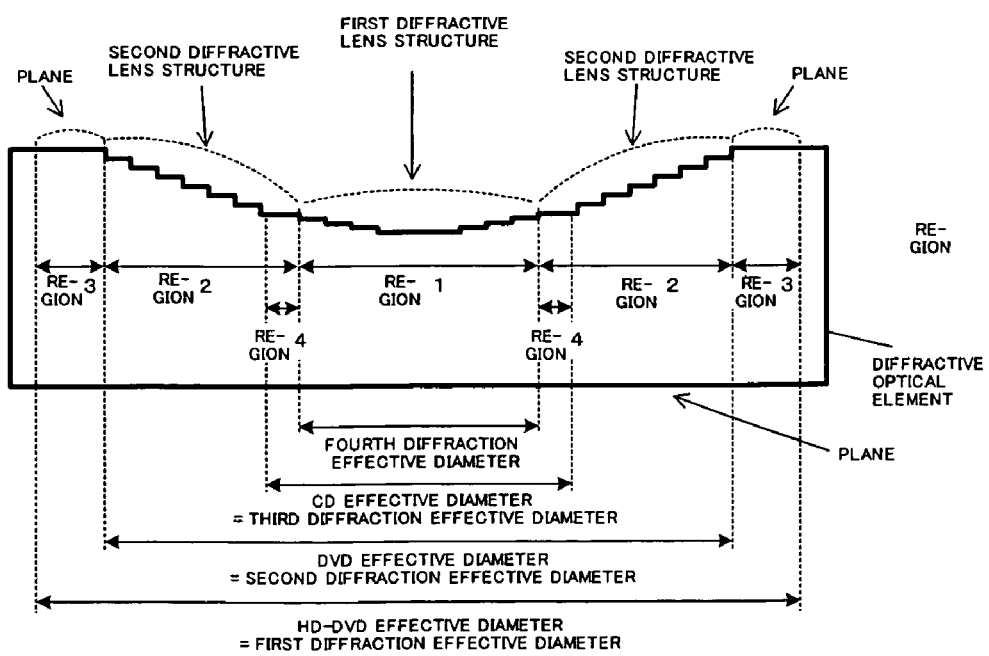
Figure 166:
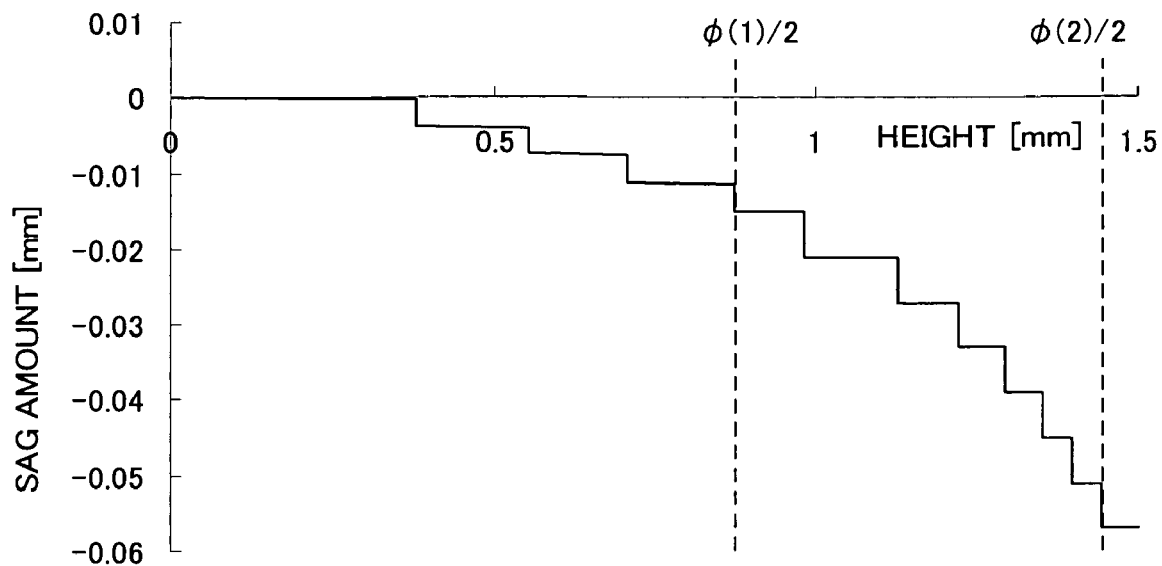
Figure 167:
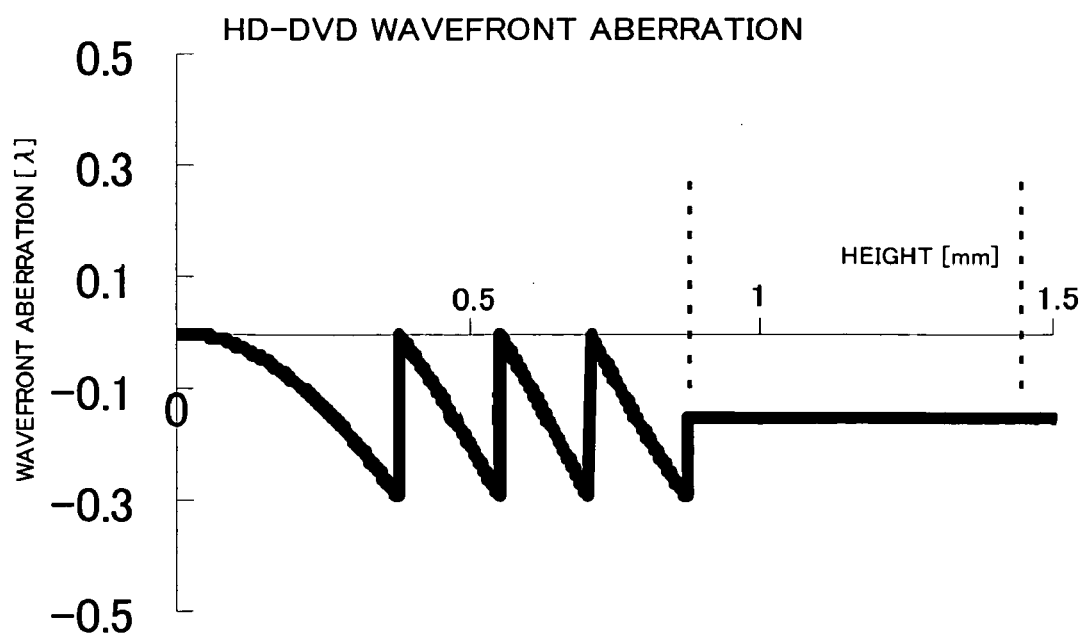
Figure 168:
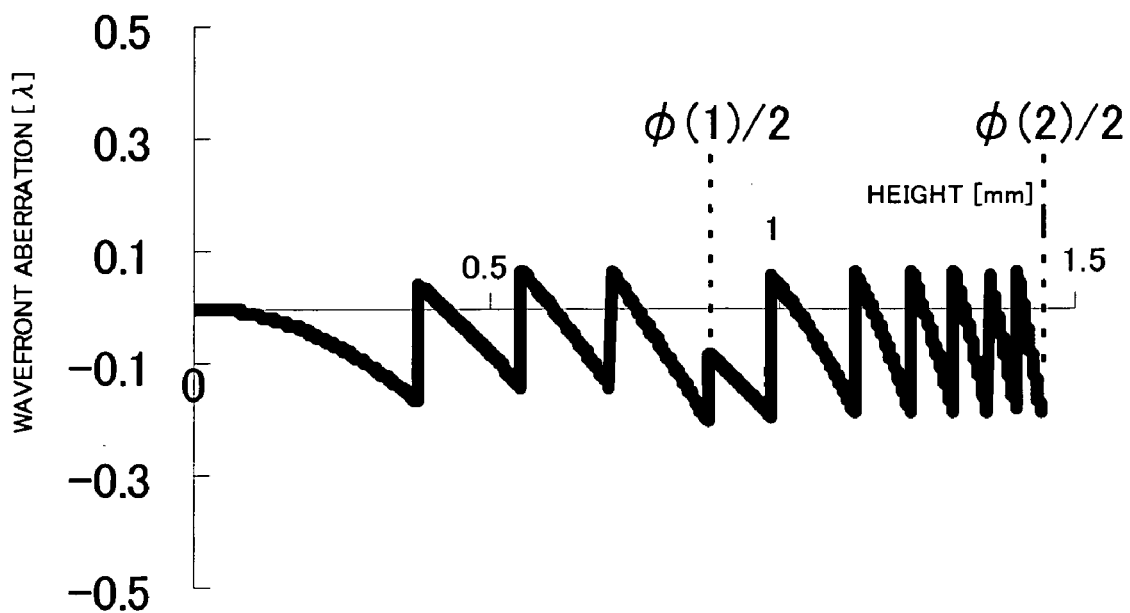
Figure 169:
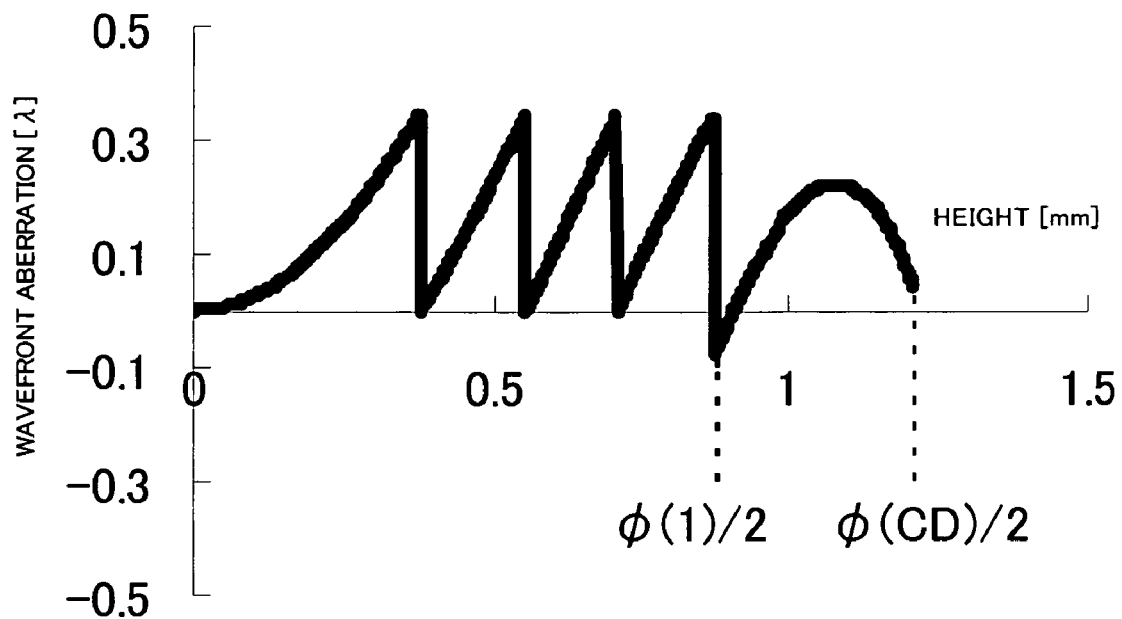
Figure 170:
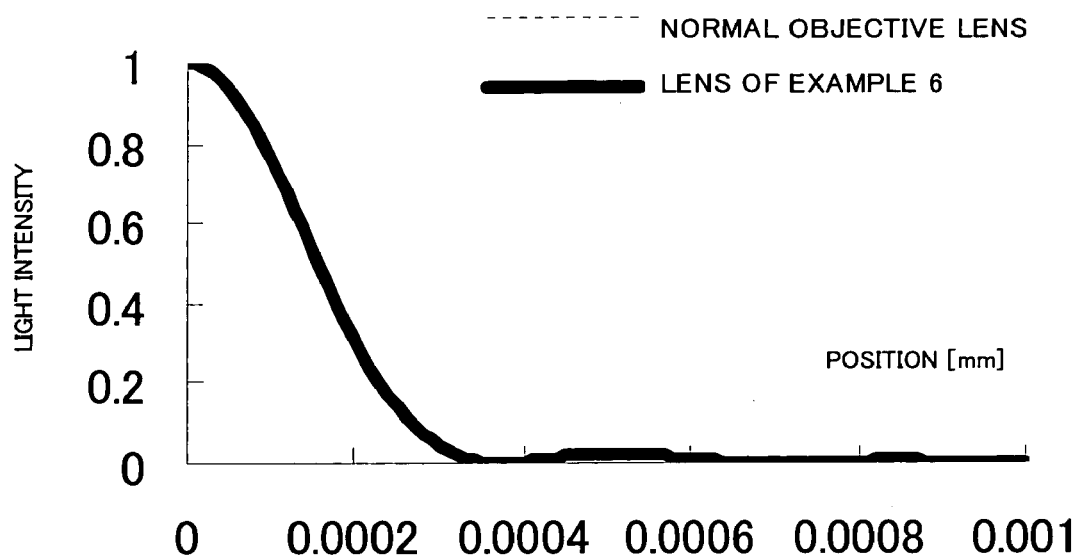
Figure 171:
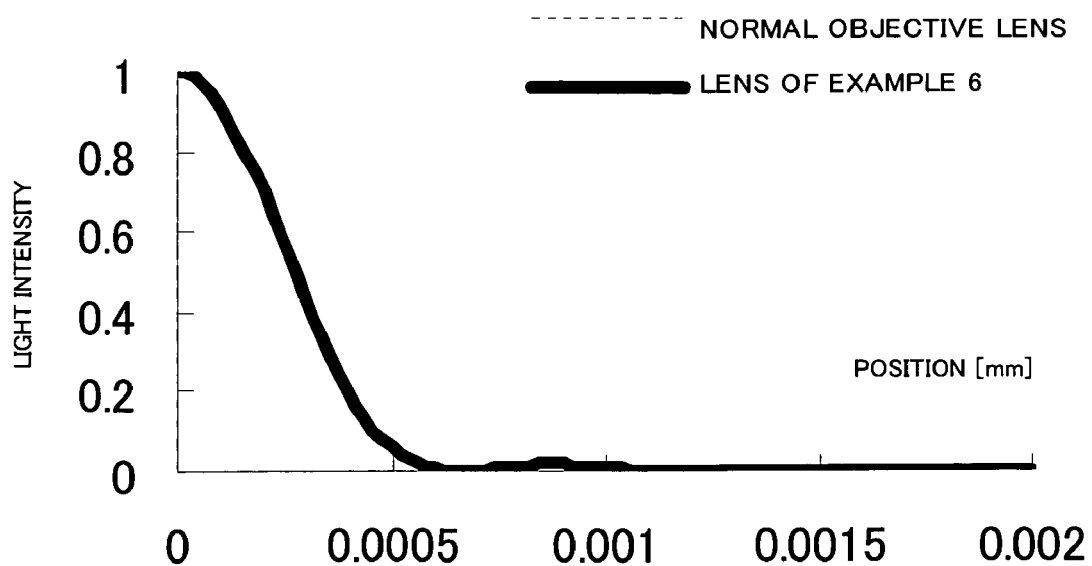
Figure 172:
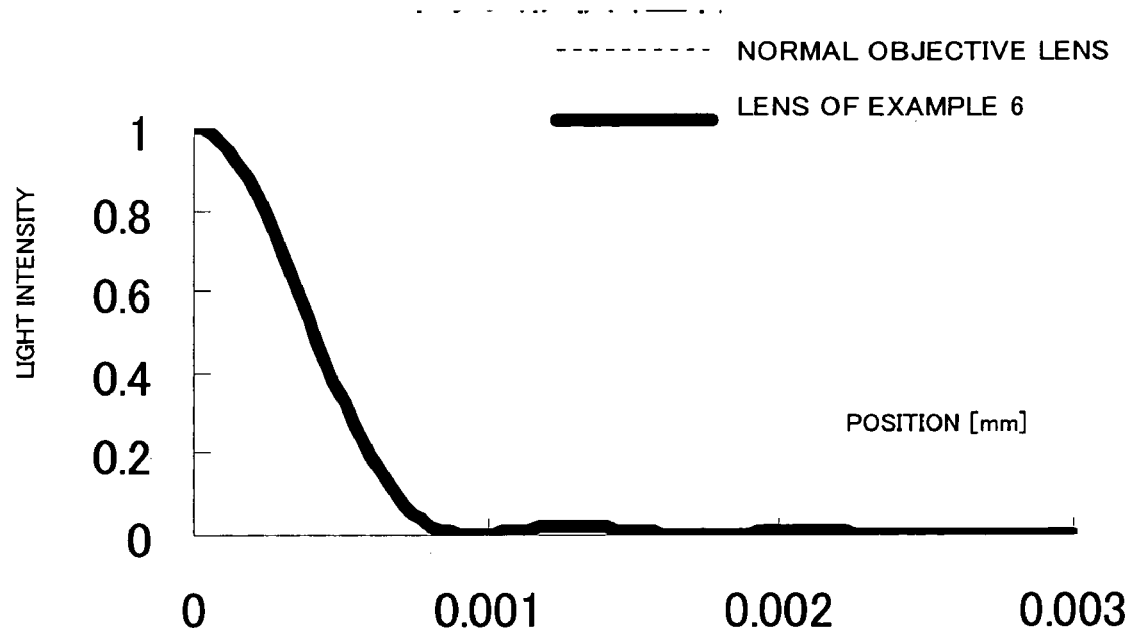
Figure 173:
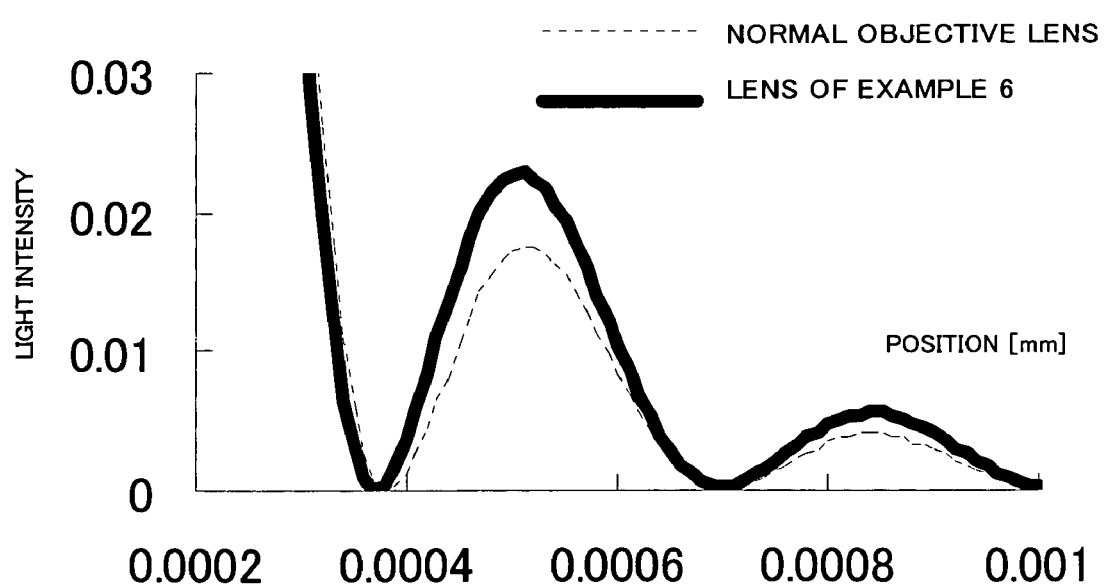
Figure 174:
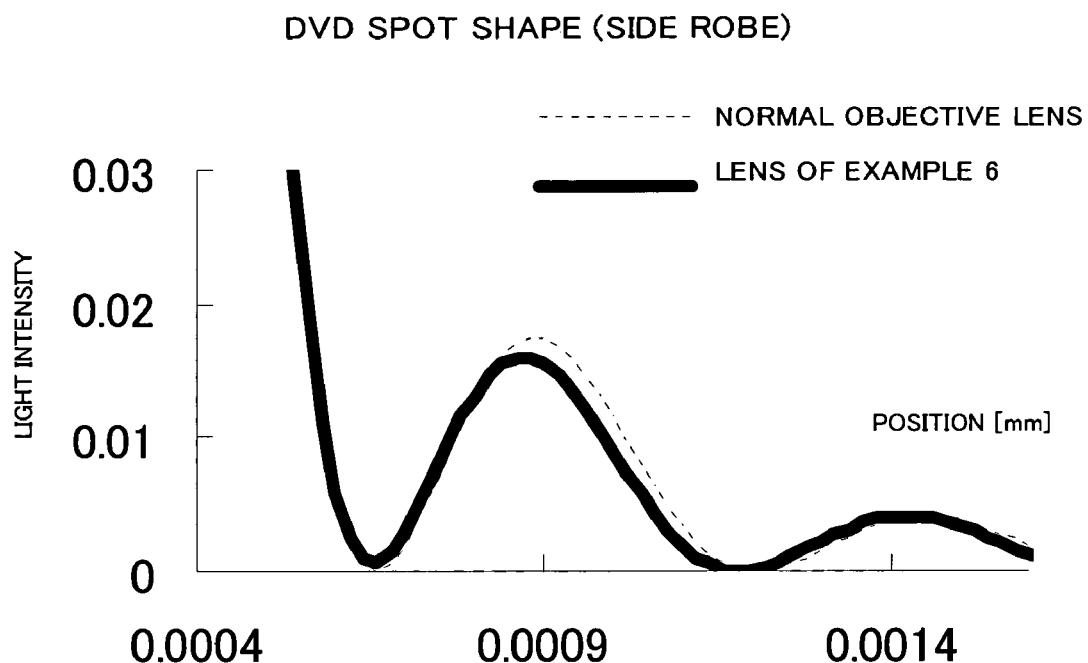
Figure 175:
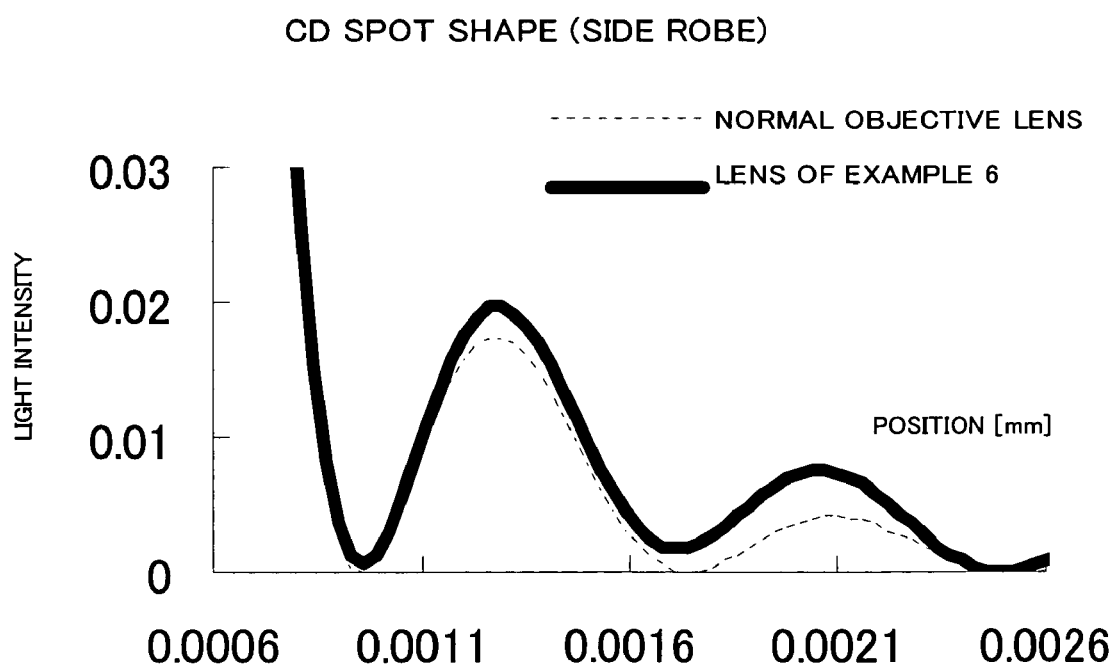
Figure 176:
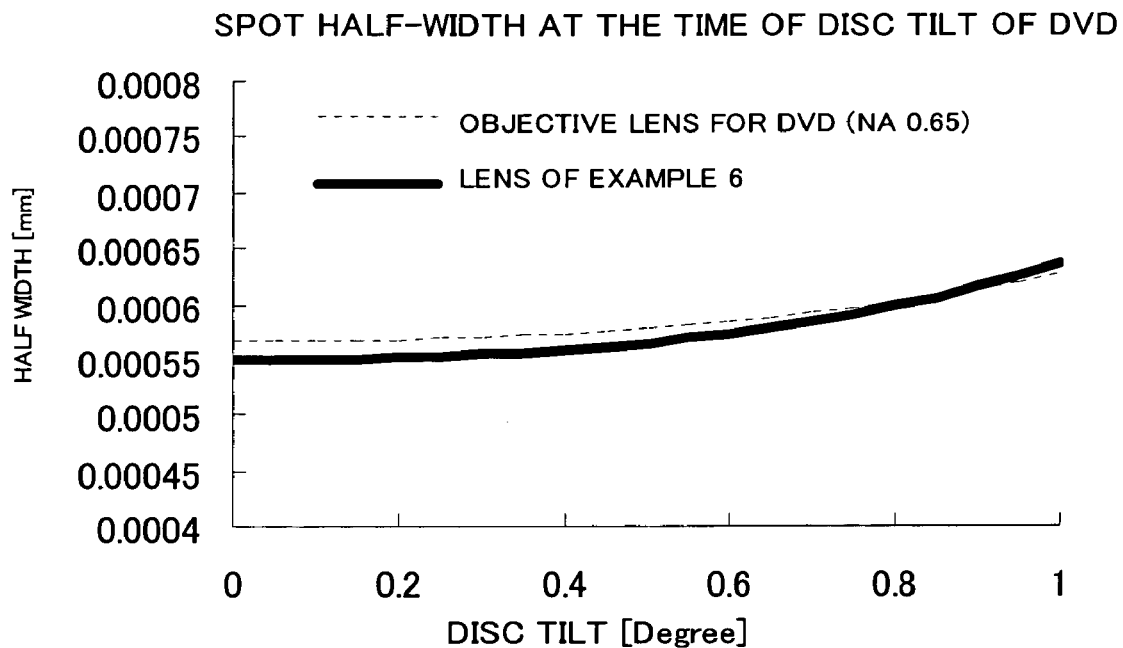
Figure 177:
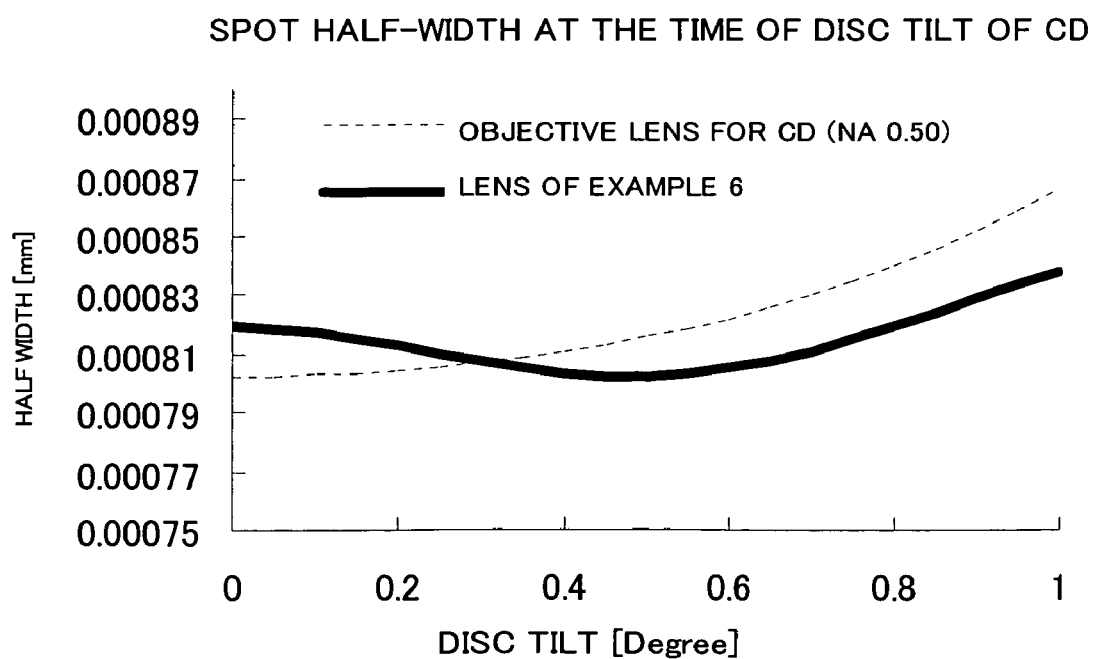
Figure 178:
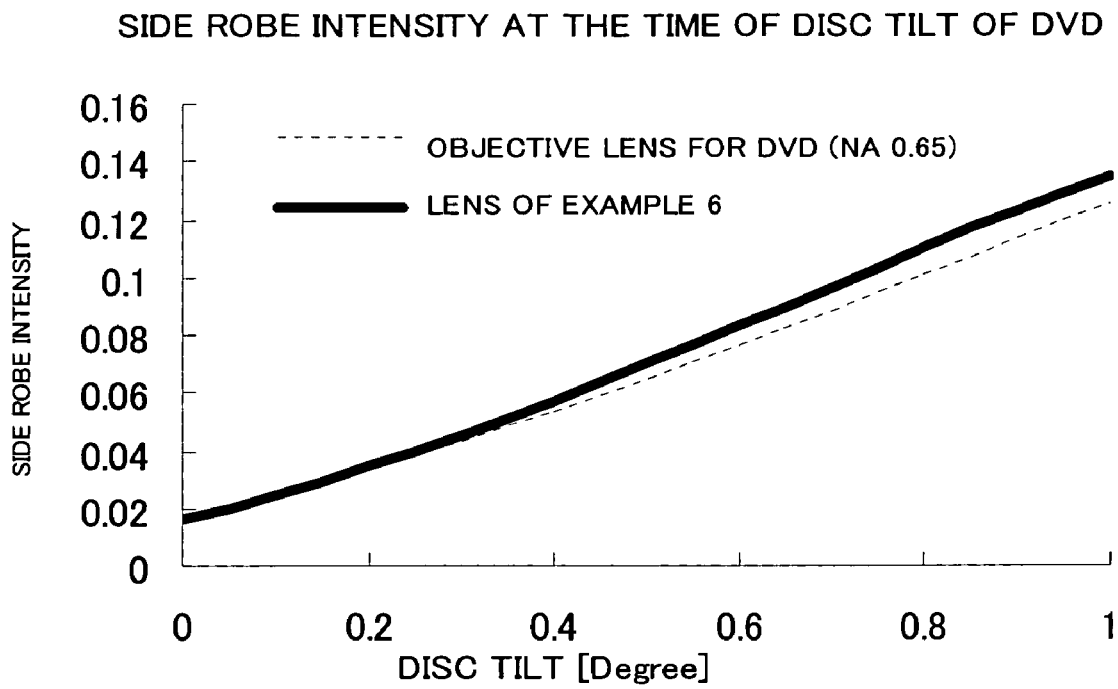
Figure 179:
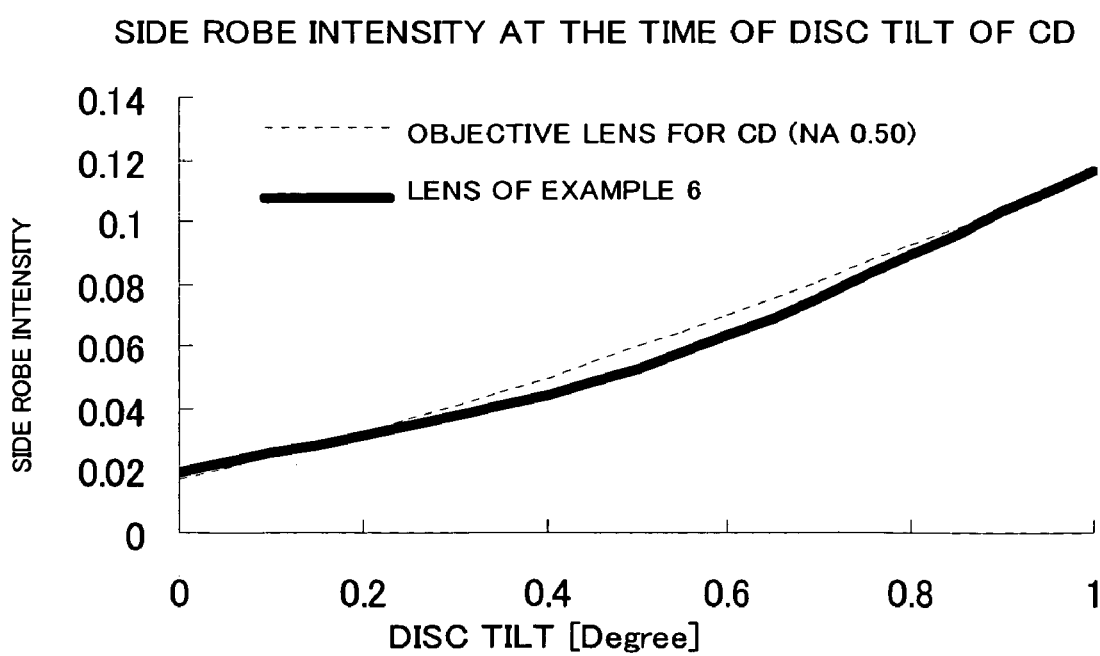
Figure 180:
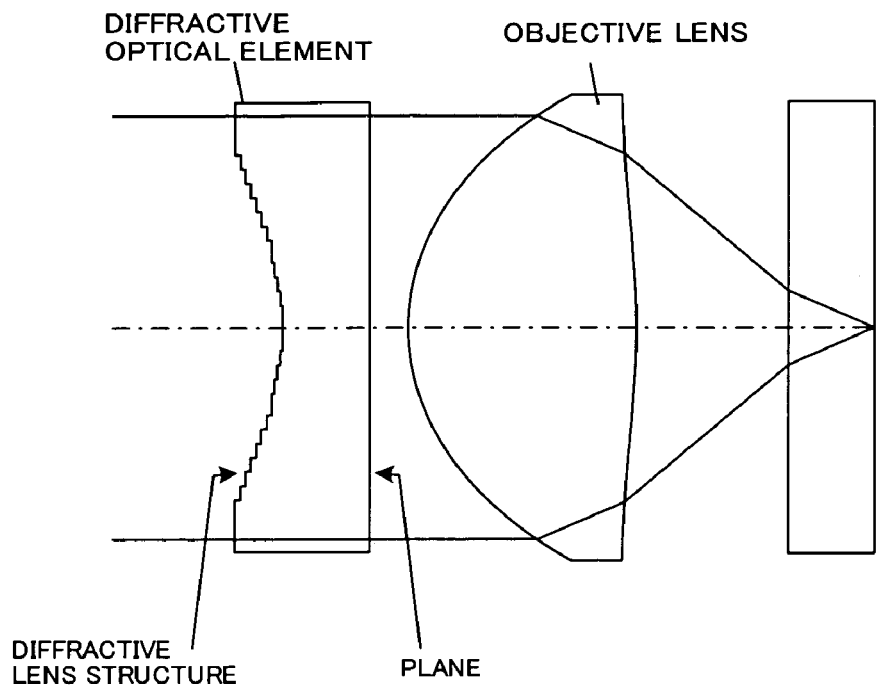
Figure 181:
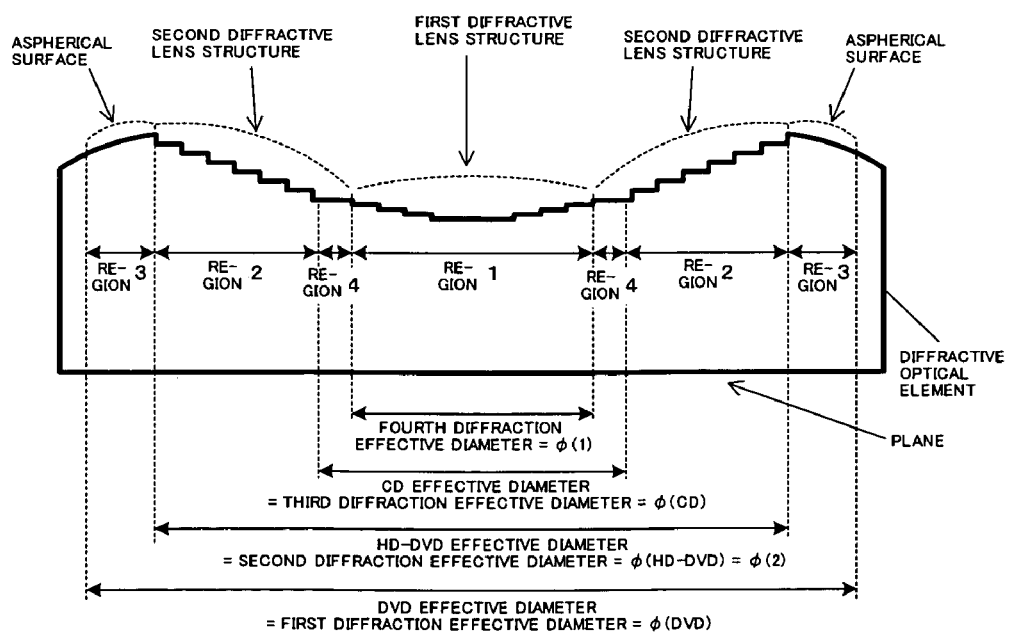
Figure 182:
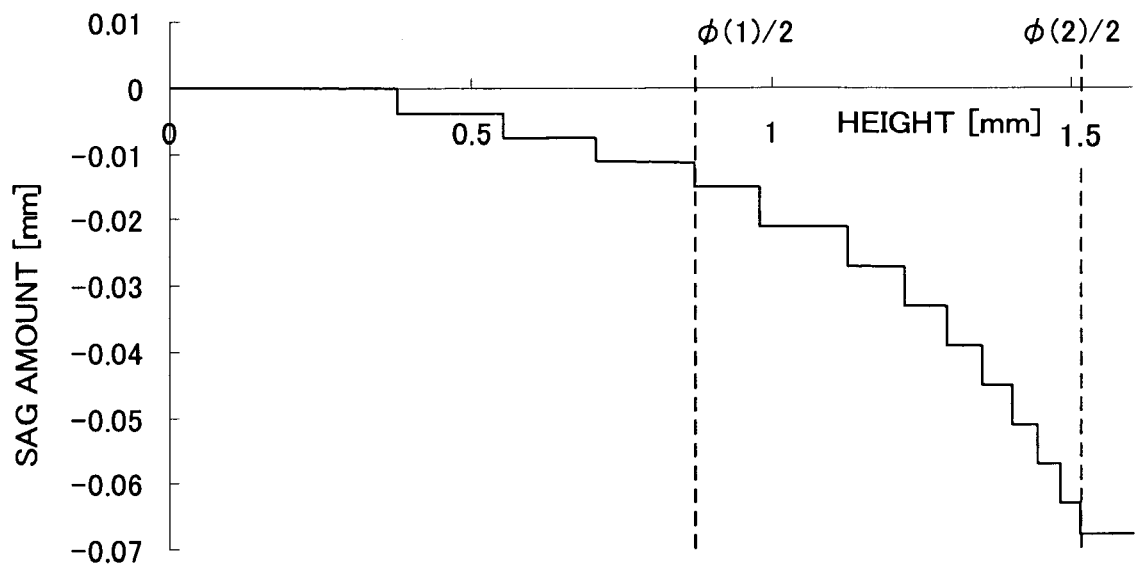
Figure 183:
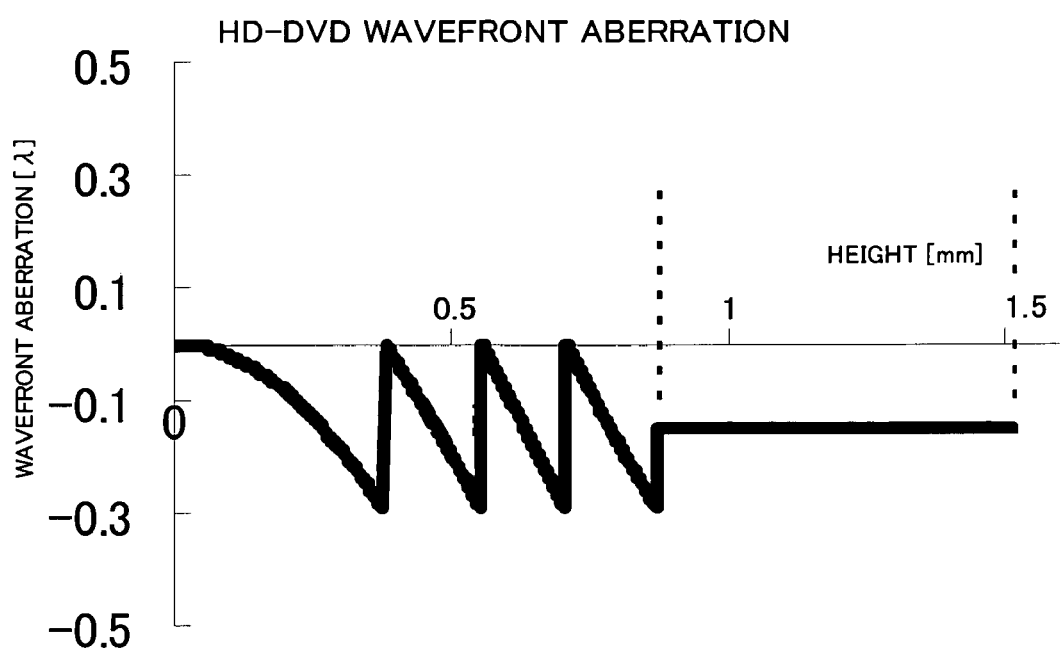
Figure 184:
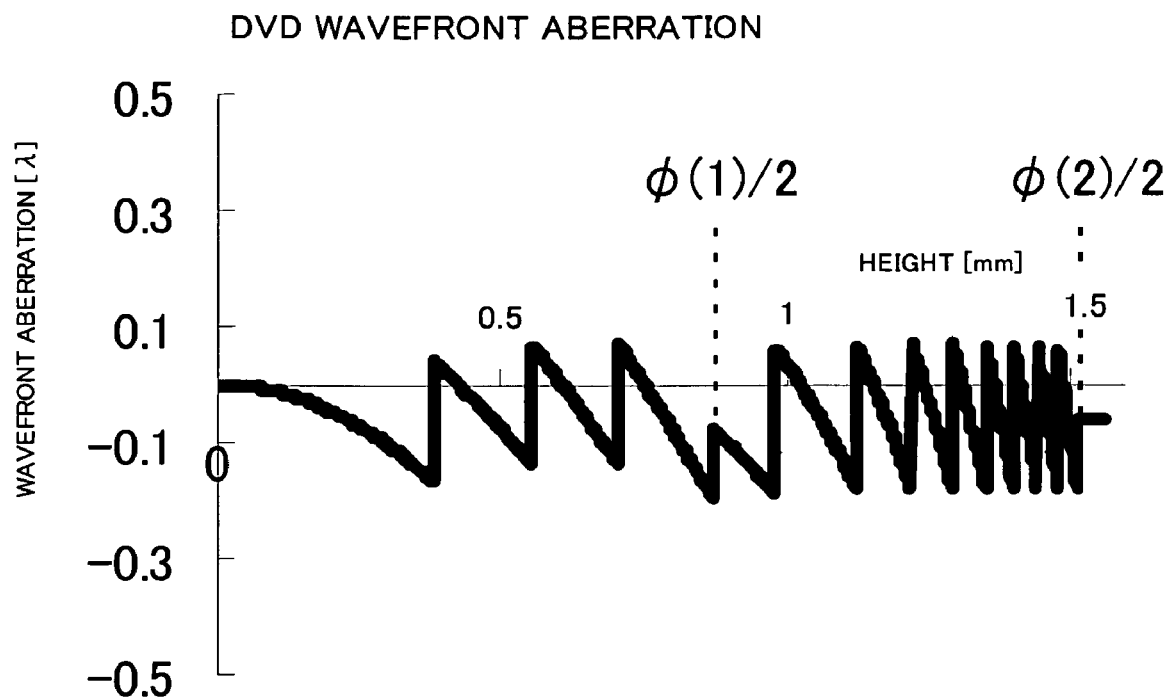
Figure 185:
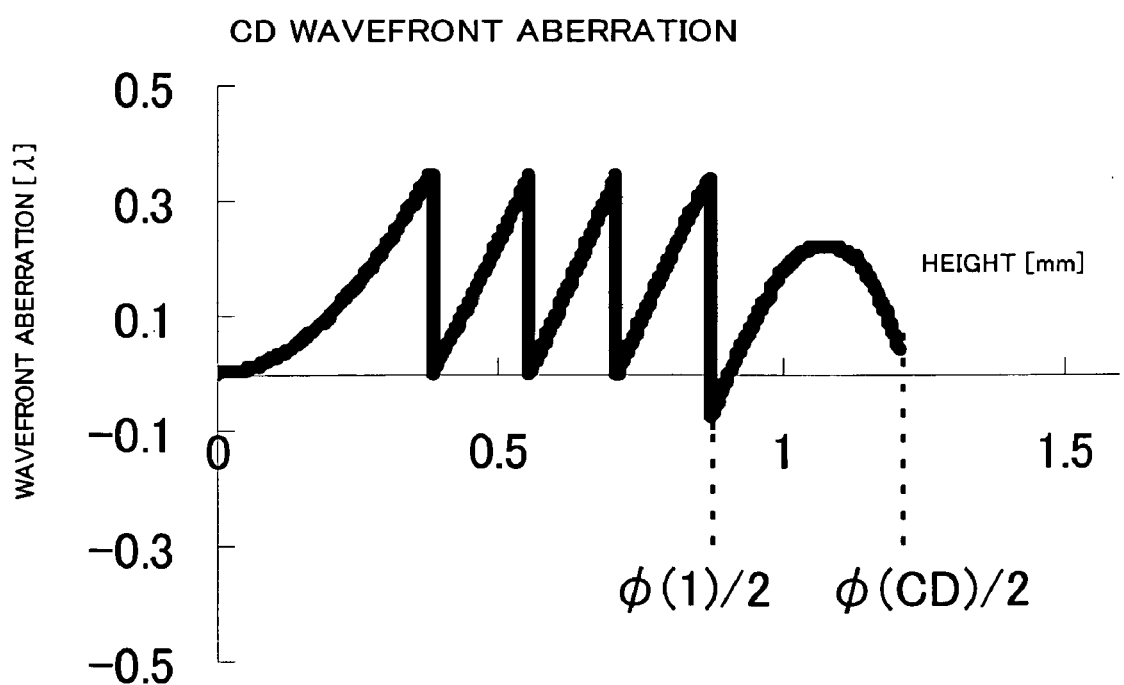
Figure 186:
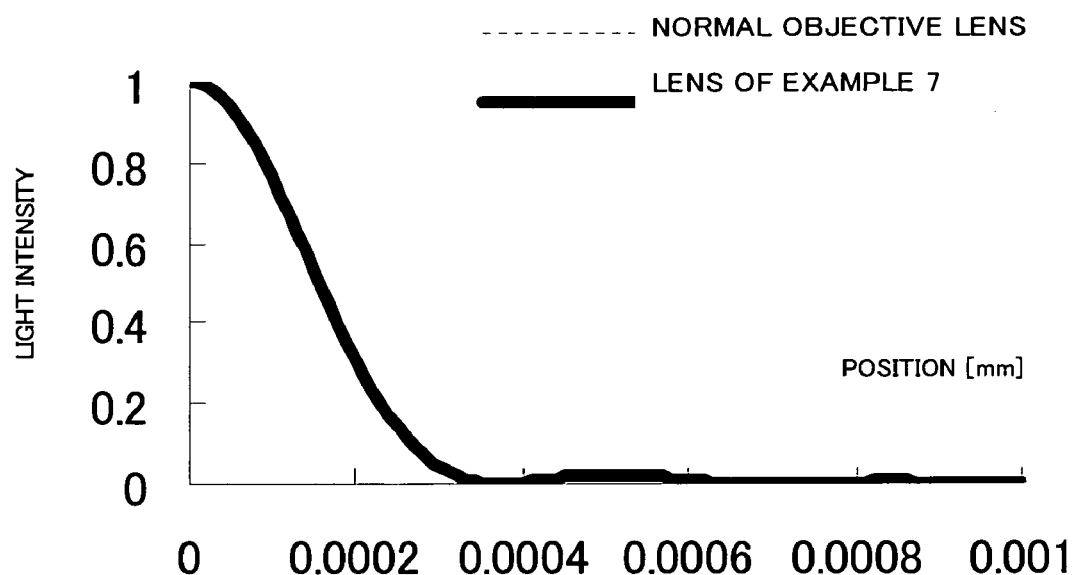
Figure 187:
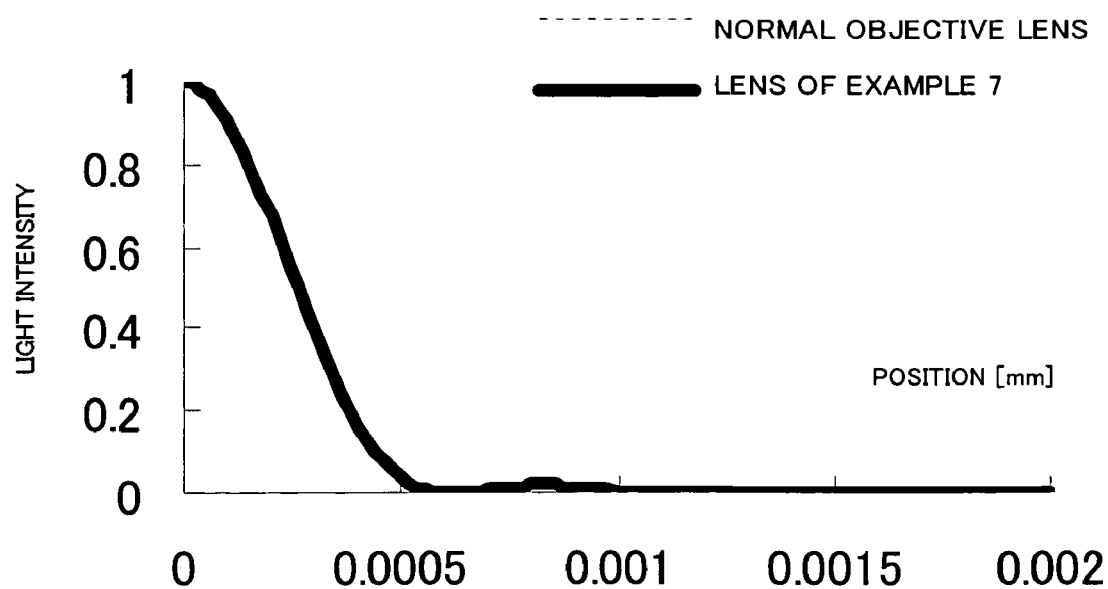
Figure 188:
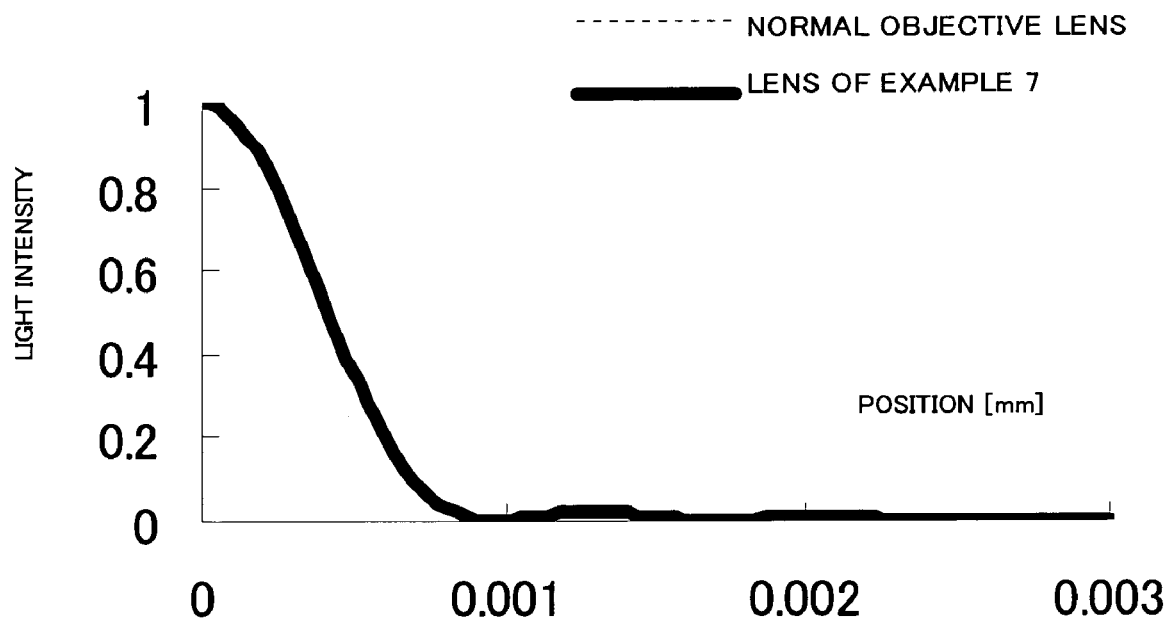
Figure 189:
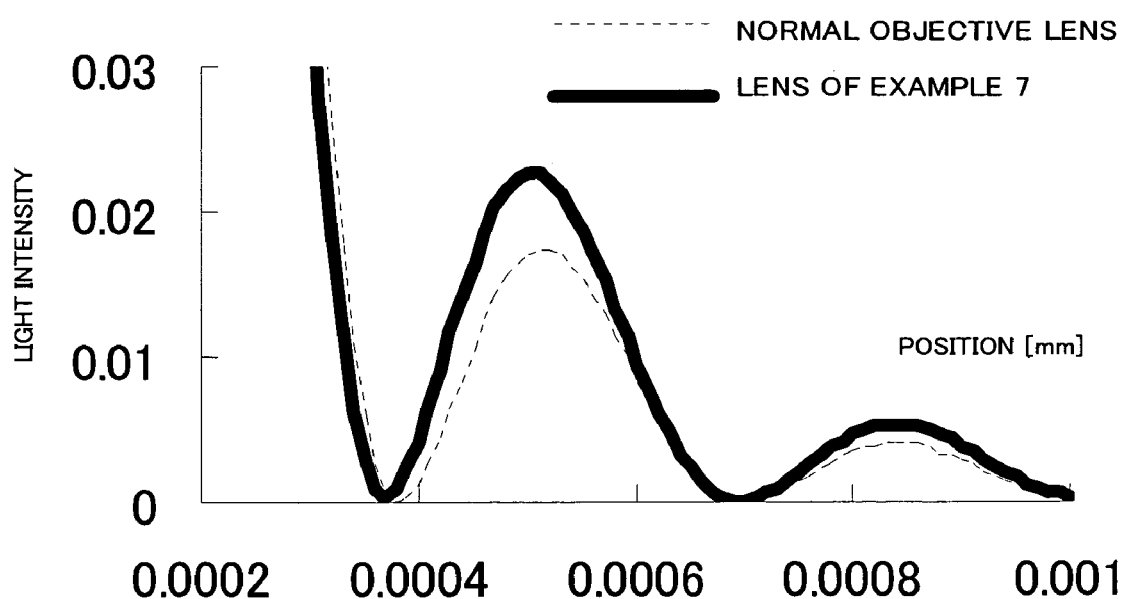
Figure 190:
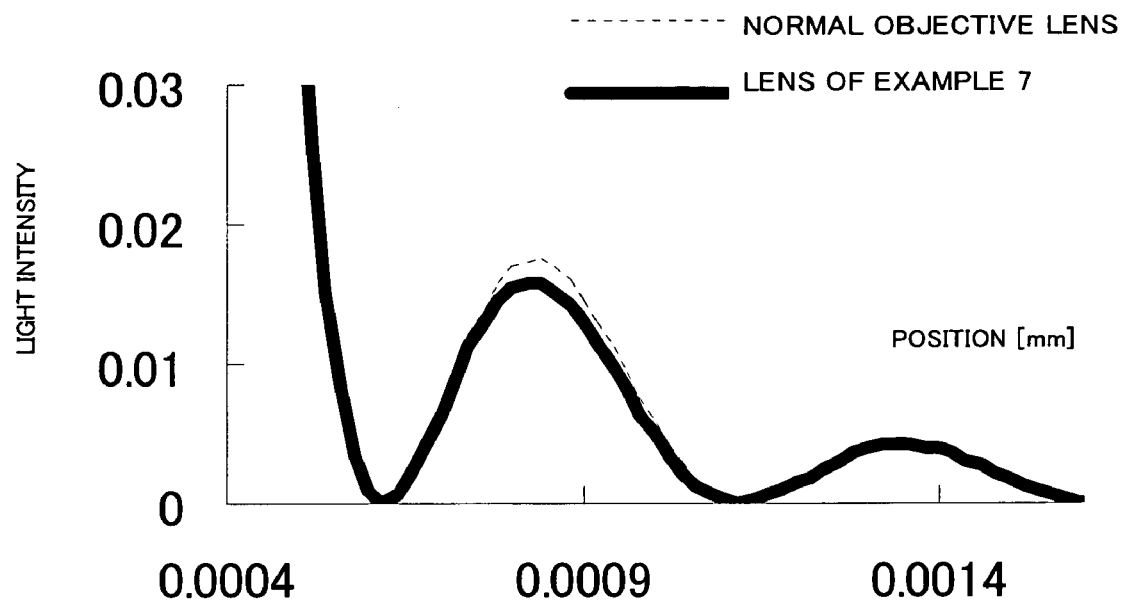
Figure 191:
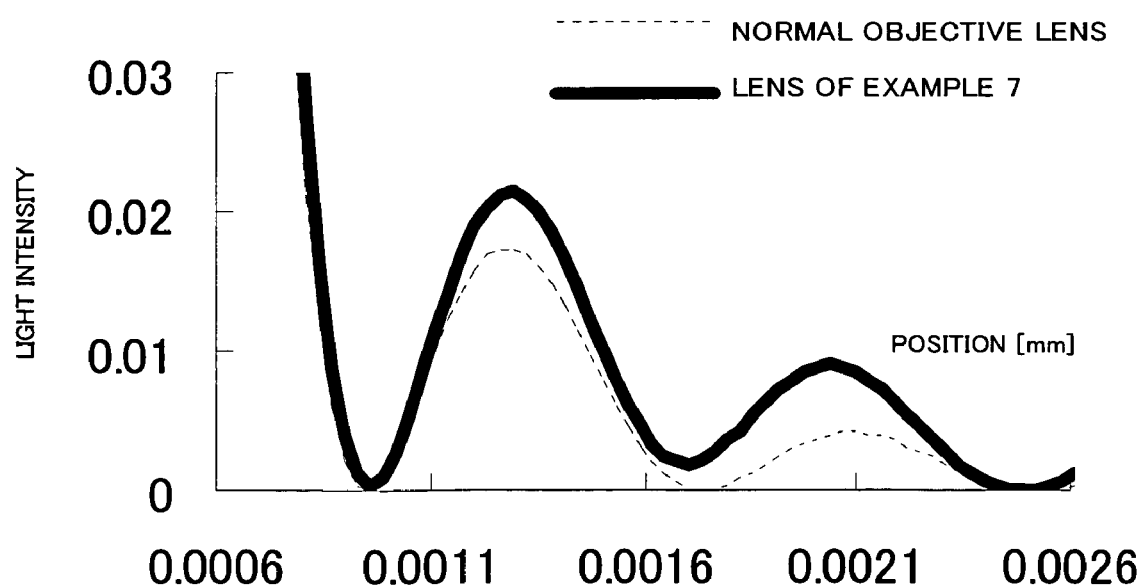
Figure 192:
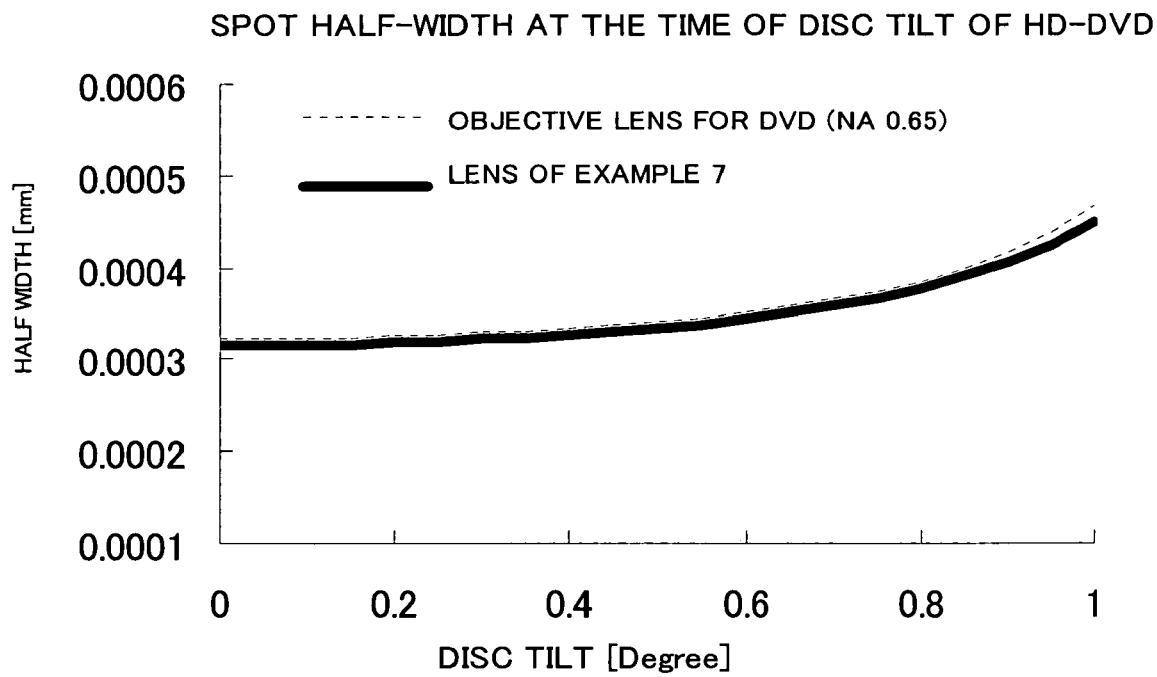
Figure 193:
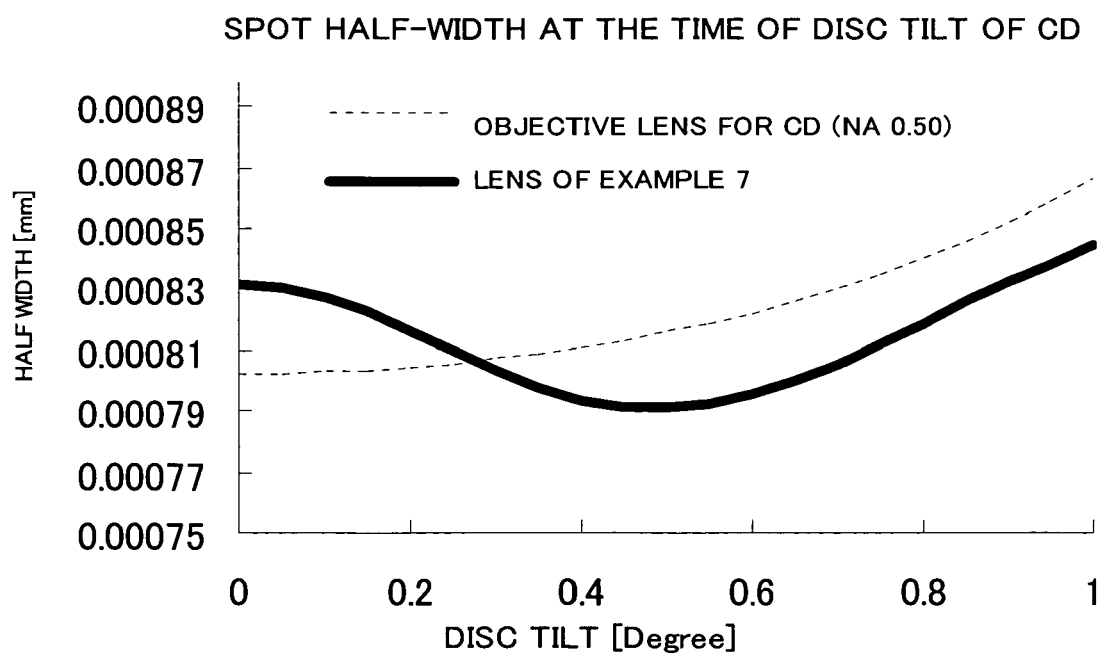
Figure 194:
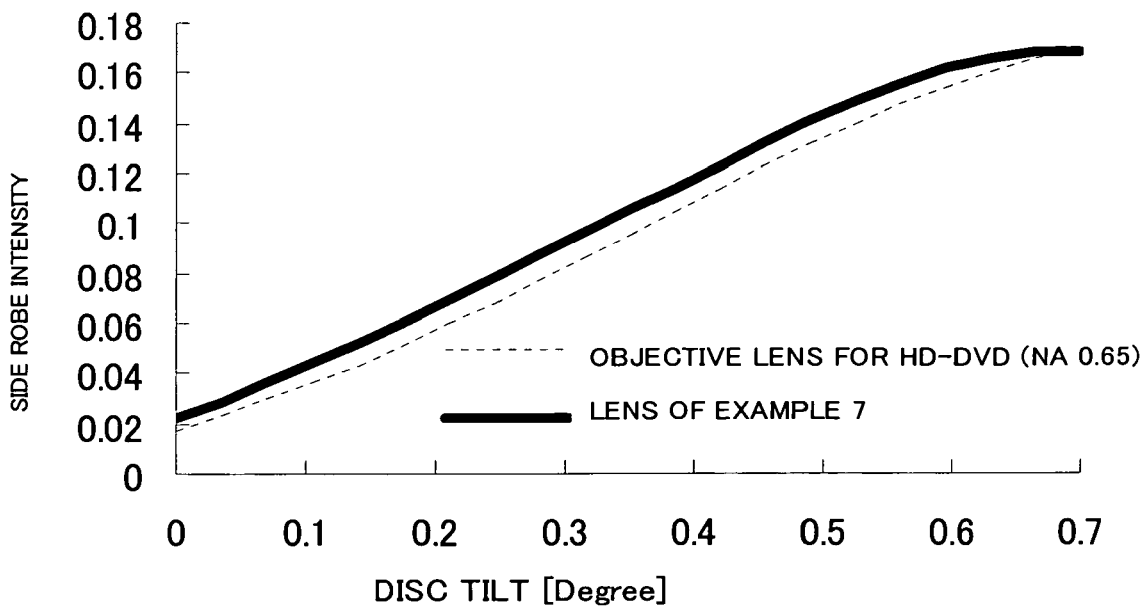
Figure 195:
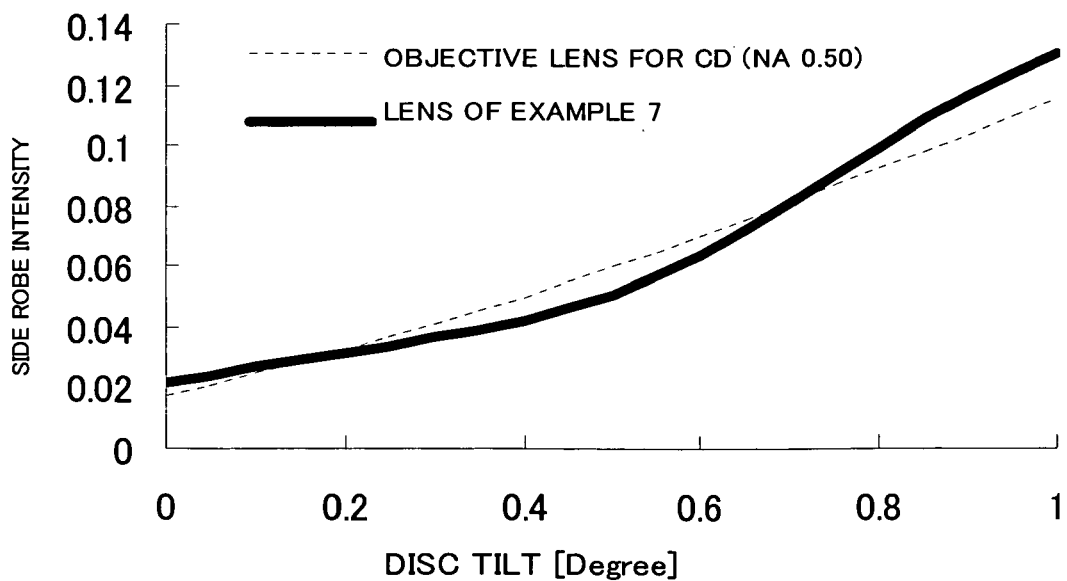
Figure 196:
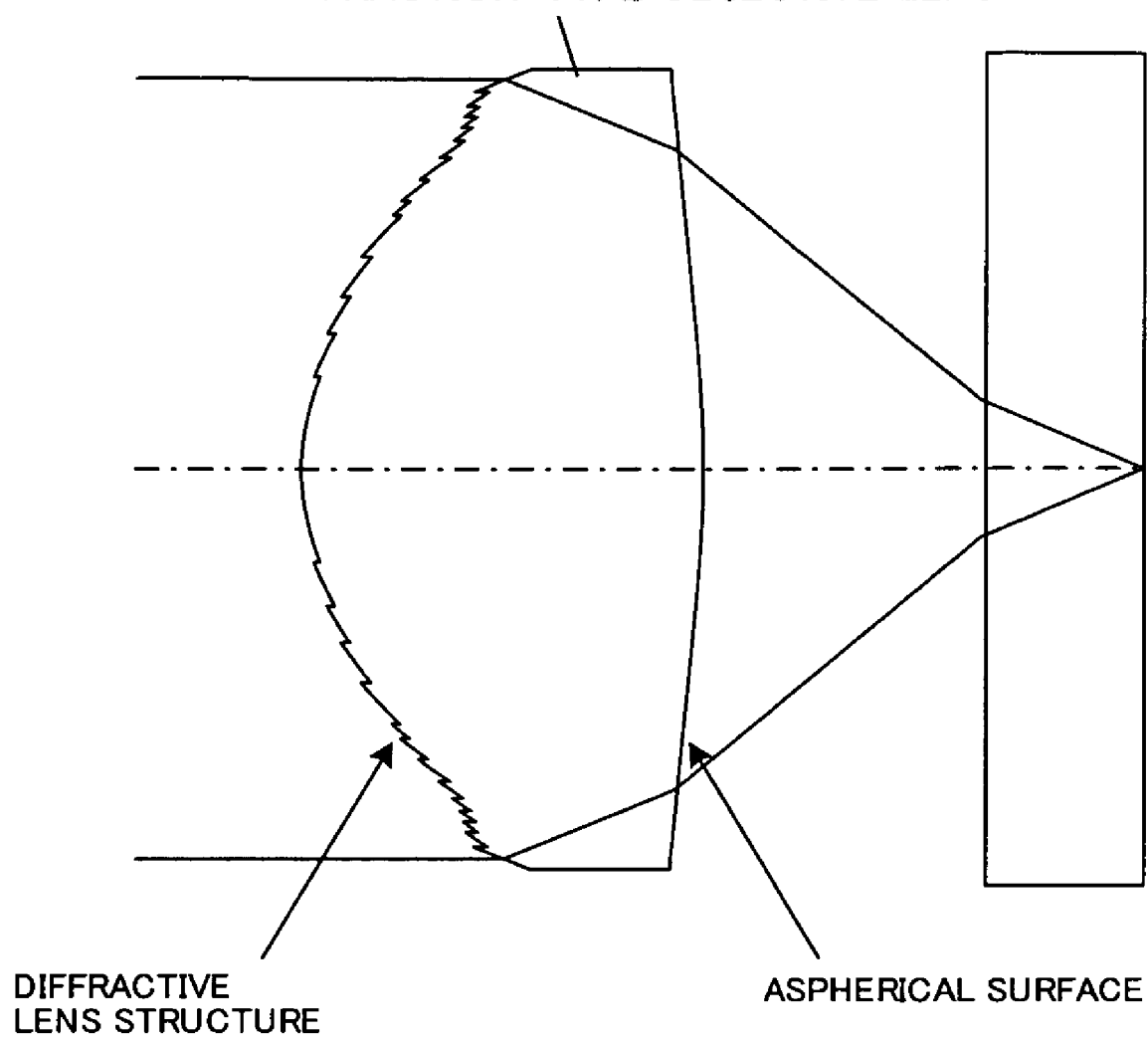
Figure 197:
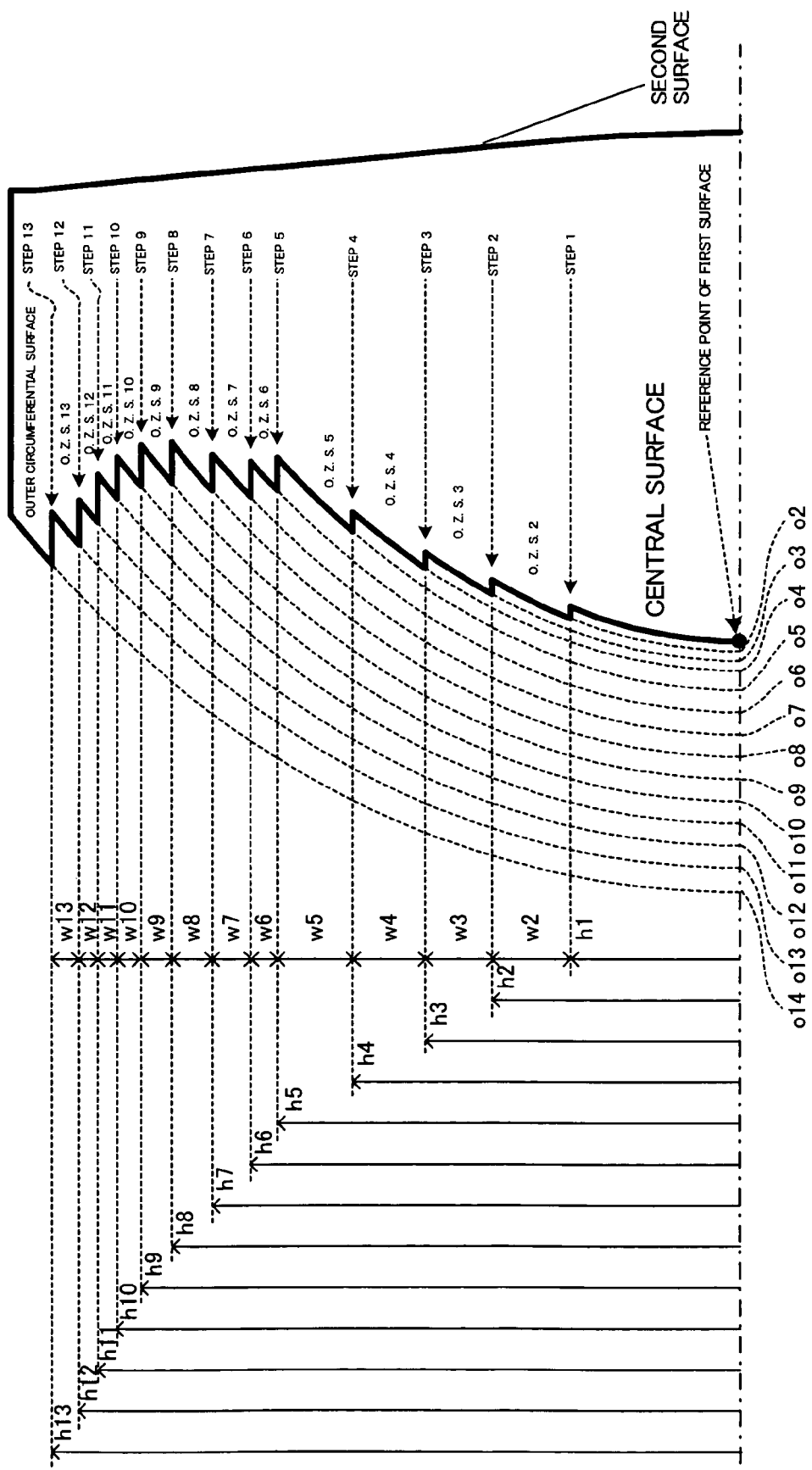
Figure 198:
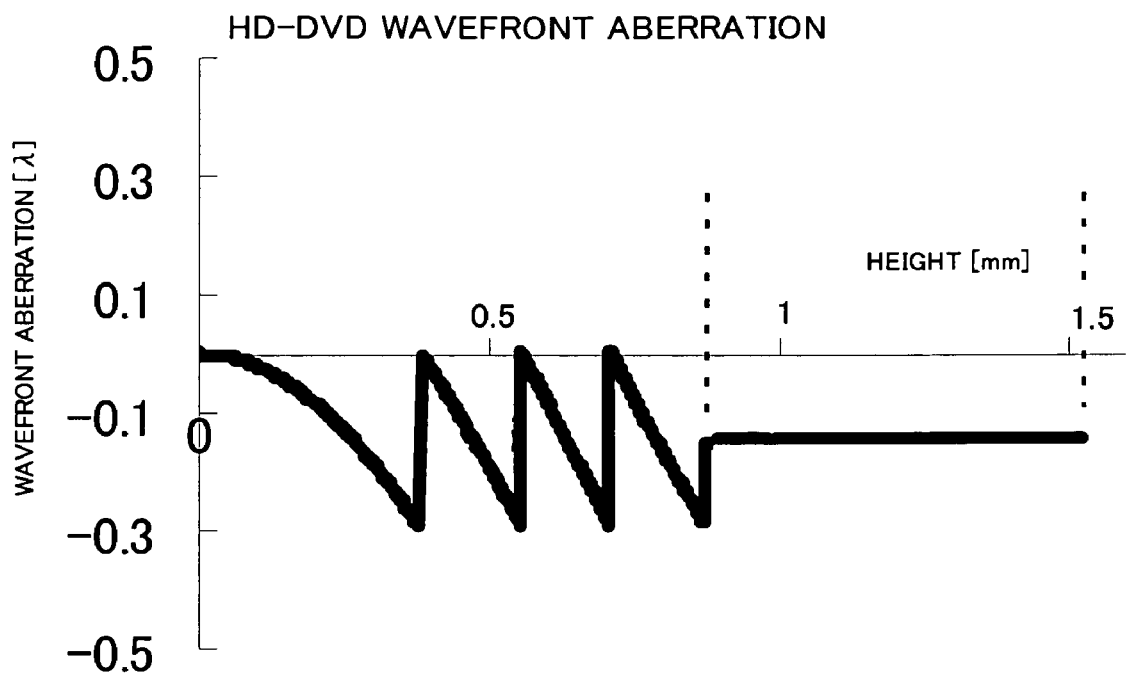
Figure 199:
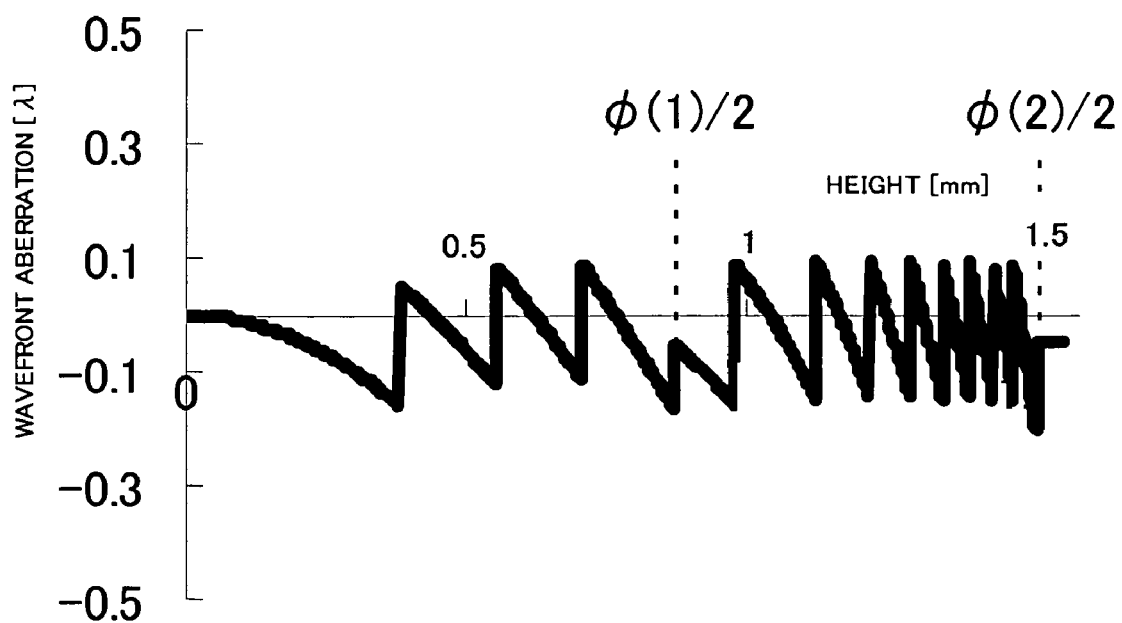
Figure 200:
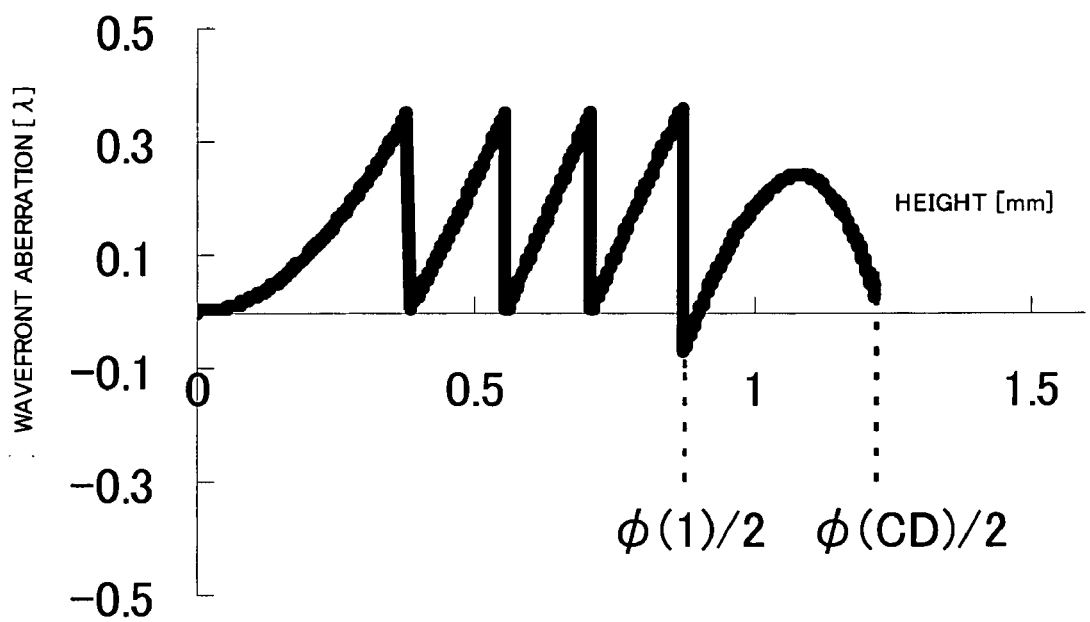
Figure 201:
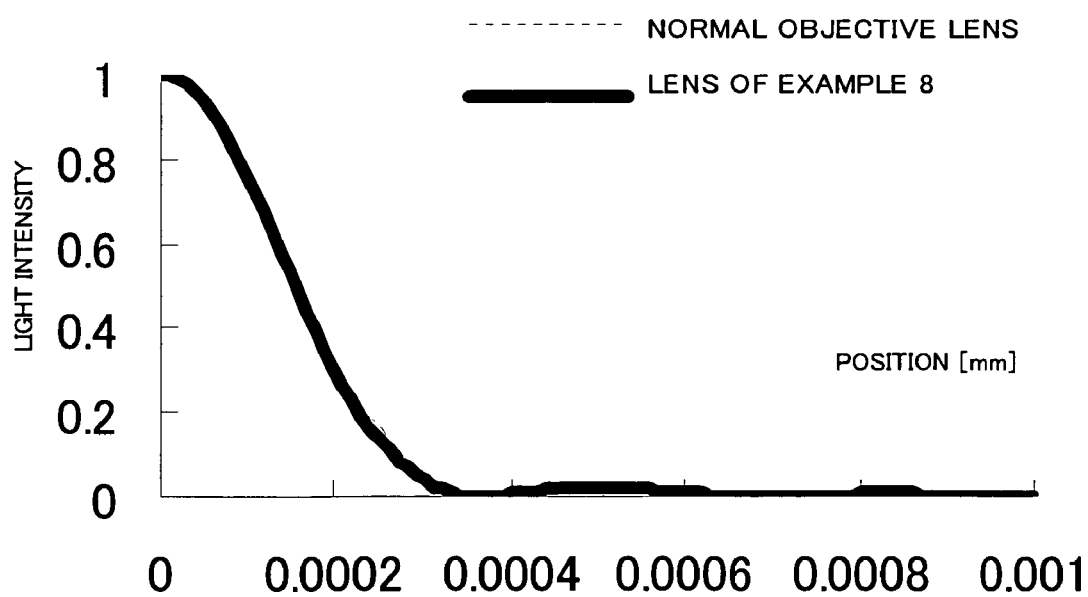
Figure 202:
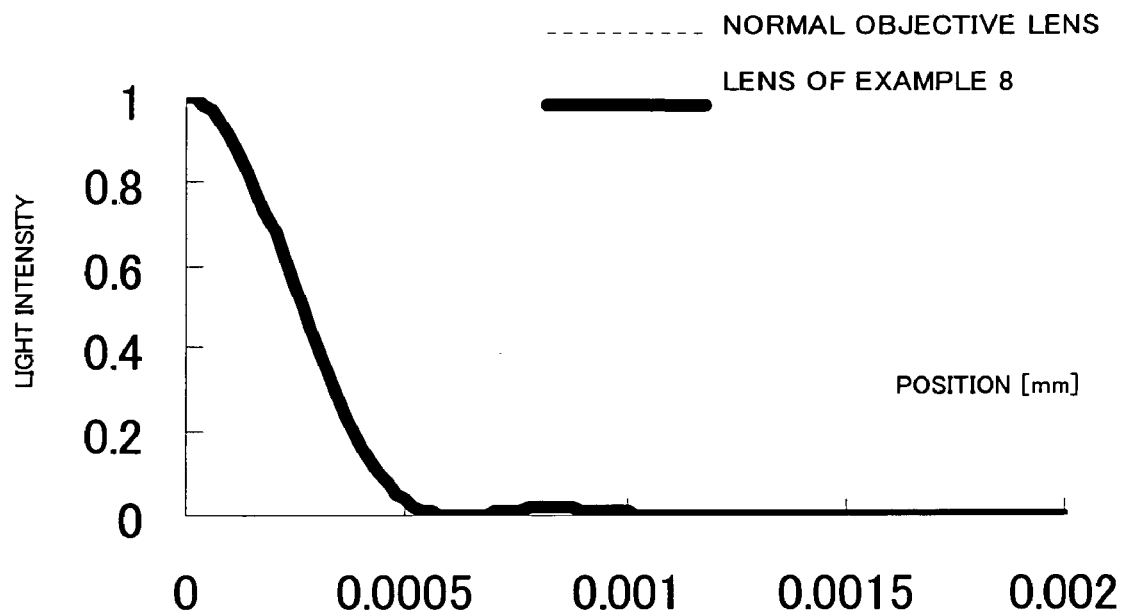
Figure 203:
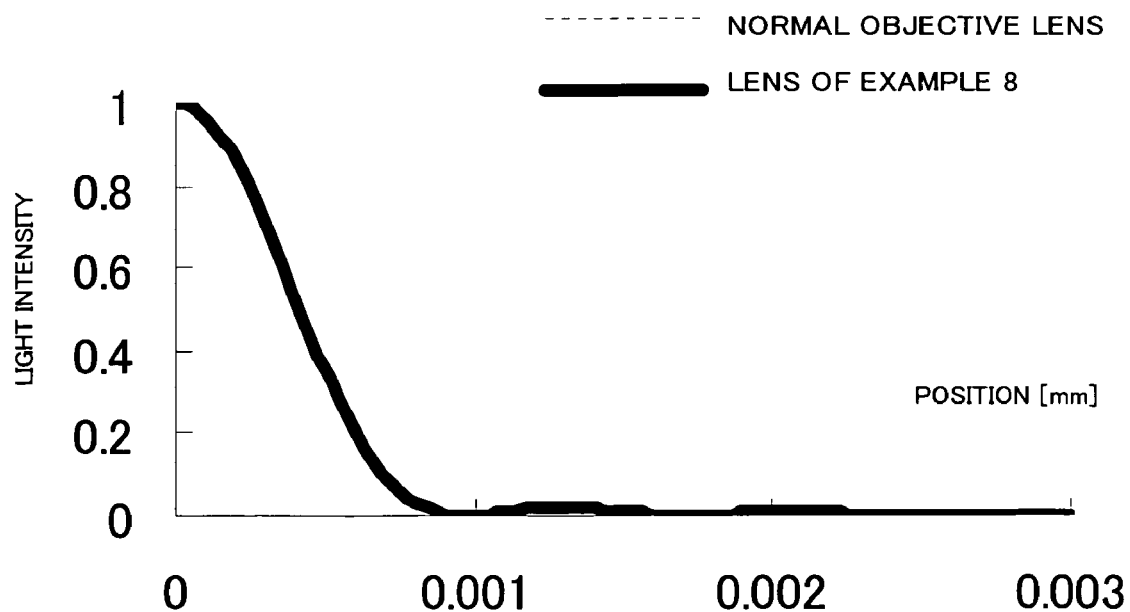
Figure 204:
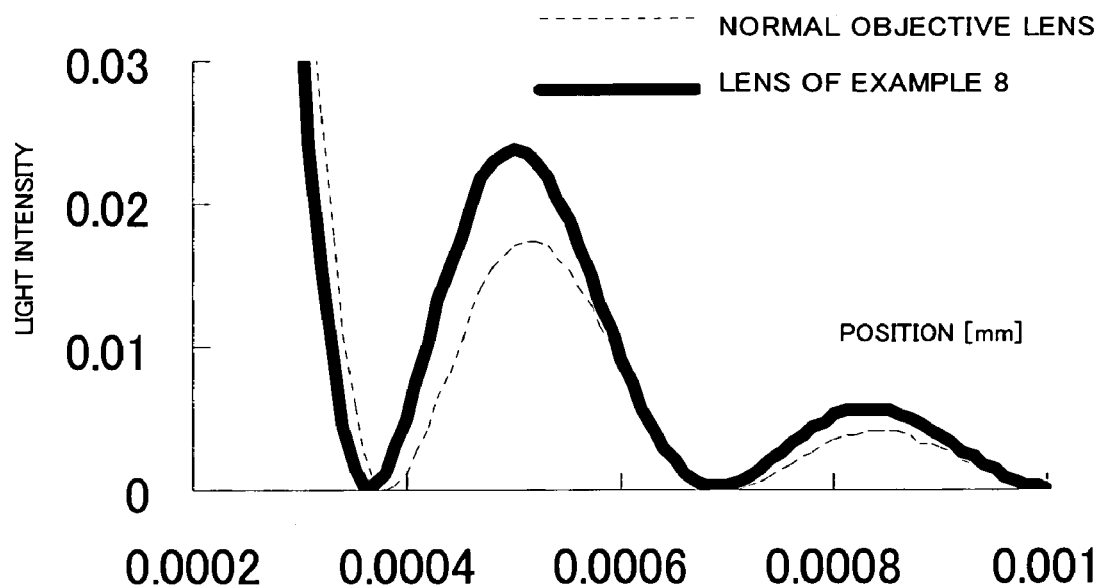
Figure 205:
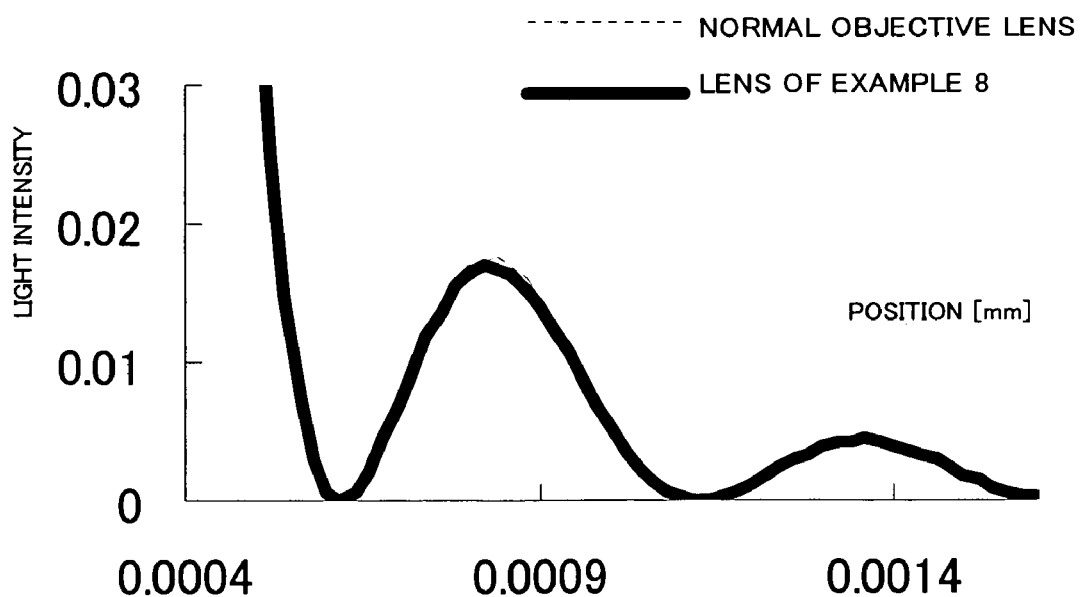
Figure 206:
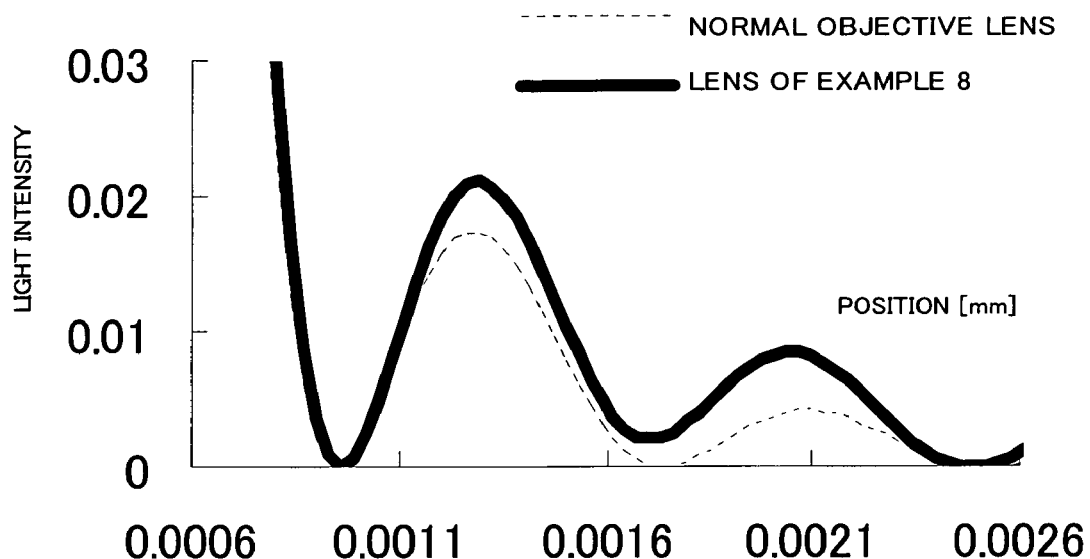
Figure 207:
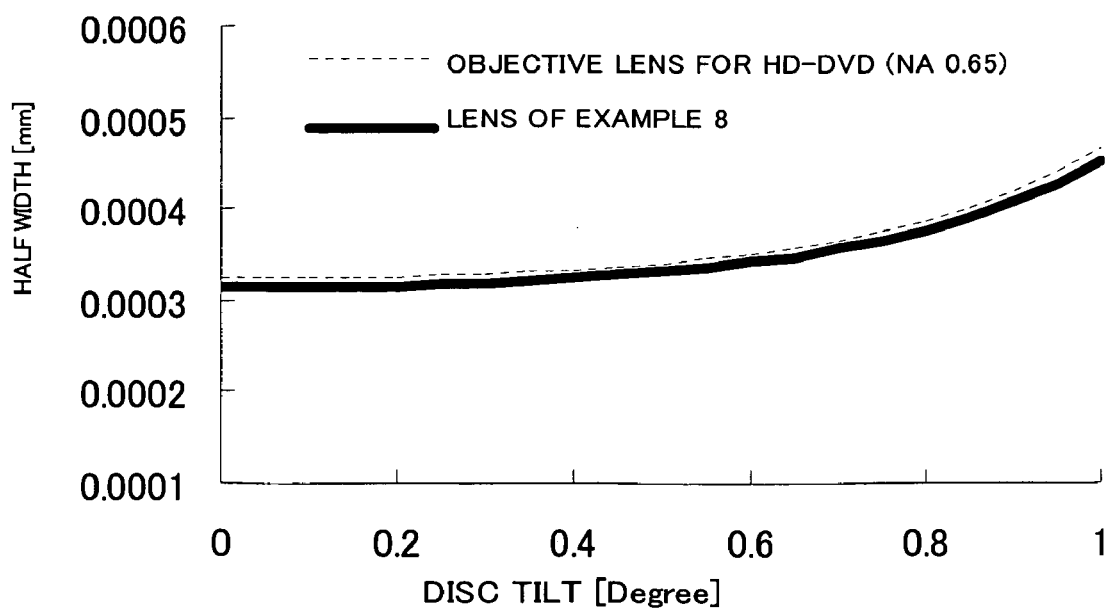
Figure 208:
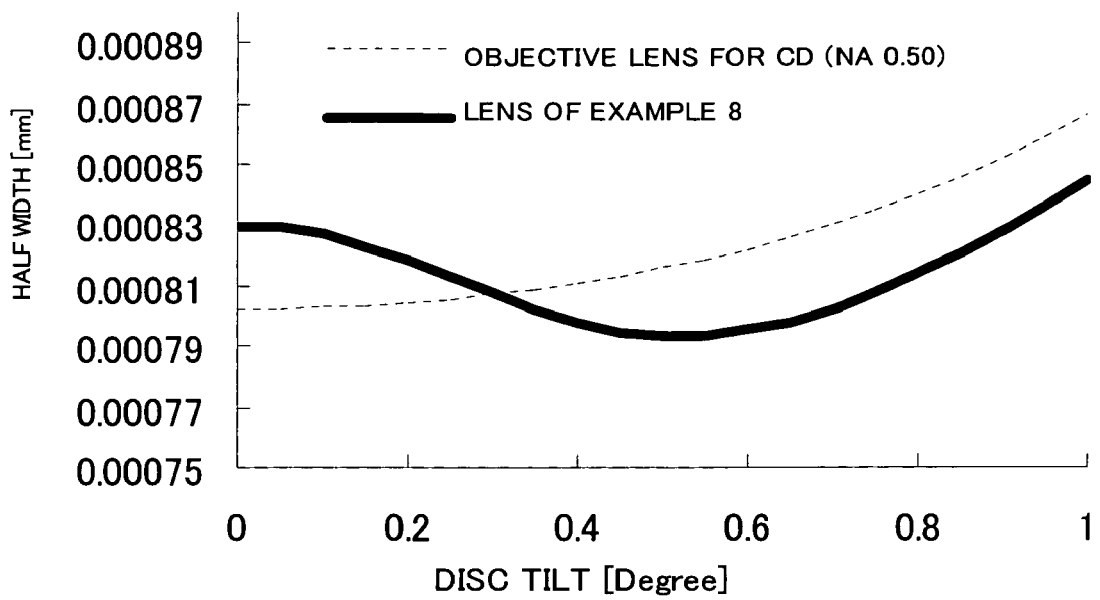
Figure 209:
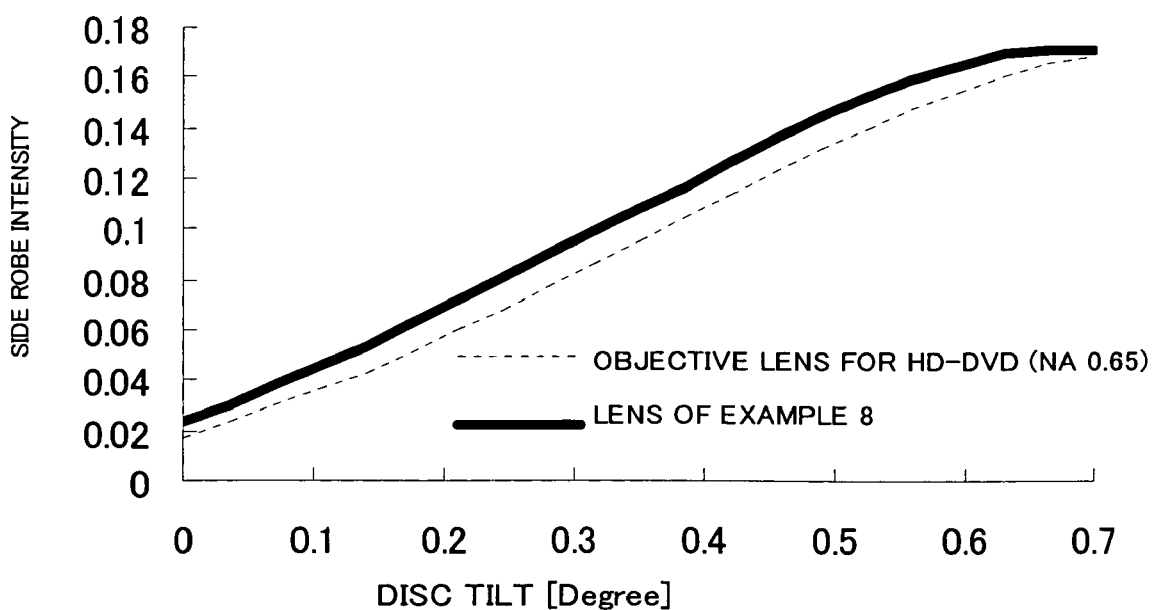
Figure 210:
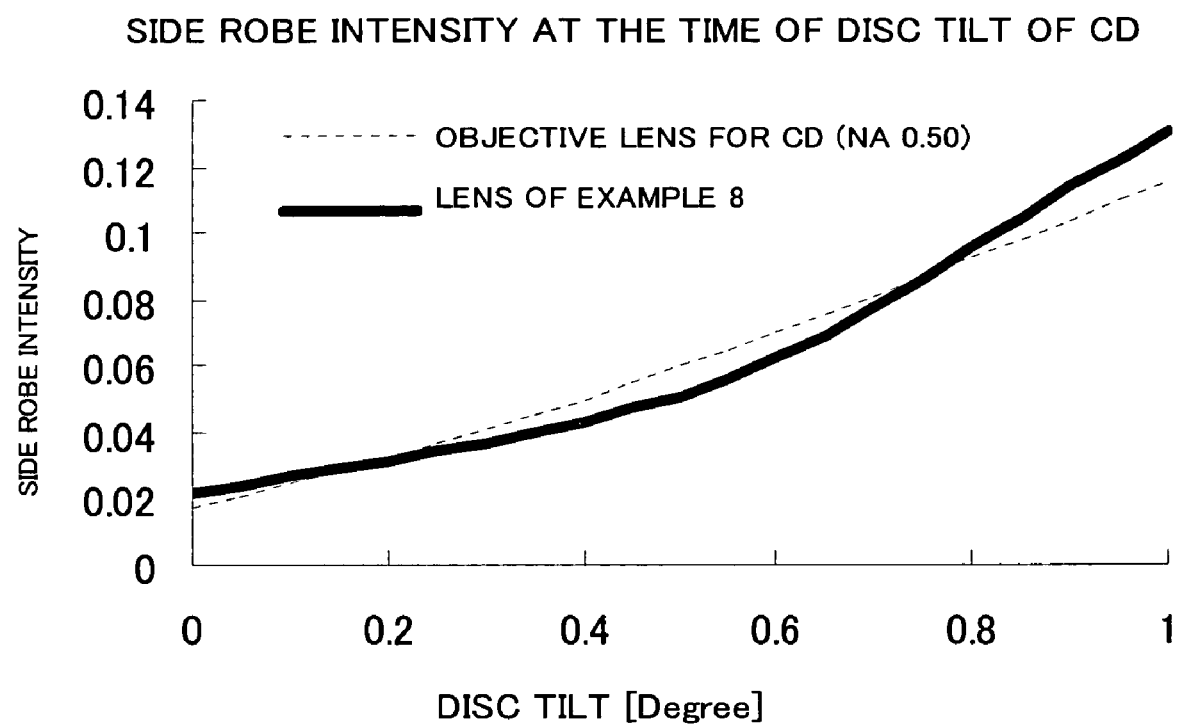

FIG. 127 is a graph showing a relationship between a full width at half maximum of a spot and a disc tilt angle at the time of tilt with respect to DVD when the objective lens module according to Example 4 of the present invention is used;

FIG. 128 is a graph showing a relationship between a full width at half maximum of a spot and a disc tilt angle at the time of tilt with respect to CD when the objective lens module according to Example 4 of the present invention is used;

FIG. 129 is a graph showing a relationship between a spot side-robe intensity and a disc tilt angle at the time of tilt with respect to DVD when the objective lens module according to Example 4 of the present invention is used;

FIG. 130 is a graph showing a relationship between a spot side-robe intensity and a disc tilt angle at the time of tilt with respect to CD when the objective lens module according to Example 4 of the present invention is used;

FIG. 131 is graph showing a wavefront aberration shape for BD in a best image surface by the objective lens module according to Example 4 of the present invention;

FIG. 132 is a graph showing a wavefront aberration shape for BD in a best image surface by the objective lens module according to Example 4 of the present invention when the wavelength of a light source is changed to 403 nm;

FIG. 133 is a graph showing a wavefront aberration shape for BD in a best image surface by the objective lens module according to Example 4 of the present invention when the wavelength of a light source is changed to 413 nm;

FIG. 134 is a graph showing an entire spot shape at the wavelength 403 nm for BD in the objective lens module according to Example 4 of the present invention;

FIG. 135 is a graph showing an entire spot shape at the wavelength 413 nm for BD in the objective lens module according to Example 4 of the present invention;

FIG. 136 is a graph showing a side robe of a spot at the wavelength 403 nm for BD in the objective lens module according to Example 4 of the present invention;

FIG. 137 is a graph showing a side robe of a spot at the wavelength 413 nm for BD in the objective lens module according to Example 4 of the present invention;

FIG. 138 is a graph showing a movement amount of a best image surface (light-converging point) with respect to the wavelength change of a lens, which uses the diffractive optical element according to Example 4 of the present invention;

FIG. 139 is a schematic cross-sectional view of an objective lens module according to Example 5 of the present invention having a diffractive optical element and an objective lens;

FIG. 140 is a schematic cross-sectional view of the diffractive optical element according to Example 5 of the present invention;

FIG. 141 is a diagram illustrating a graph, which shows a calculation result of a longitudinal spherical aberration for DVD using the phase function method when the diffractive optical element according to Example 5 of the present invention and an objective lens for BD are incorporated;

FIG. 142 is a graph of a diffractive lens function of a diffractive lens structure 2 with respect to the height from the optical axis in the diffractive optical element according to Example 5 of the present invention;

FIG. 143 is a graph of a diffractive lens function of a diffractive lens structure 3 with respect to the height from the optical axis in the diffractive optical element according to Example 5 of the present invention;

FIG. 144 is a graph schematically showing a section of a diffractive lens structure, which is formed in the diffractive optical element according to Example 5 of the present invention;

FIG. 145 is a graph showing a calculation result of a wavefront aberration for BD of an objective lens module, which uses the diffractive optical element according to Example 5 of the present invention, by data having an actual shape;

FIG. 146 is a graph showing a calculation result of a wavefront aberration for DVD of an objective lens module, which uses the diffractive optical element according to Example 5 of the present invention, by data having an actual shape;

FIG. 147 is a graph showing a calculation result of a wavefront aberration for CD of an objective lens module, which uses the diffractive optical element according to Example 5 of the present invention, by data having an actual shape;

FIG. 148 is a graph showing a spot shape on BD calculated by a wavefront aberration of an objective lens module which is calculated by data having an actual surface shape of the diffractive lens structure in the diffractive optical element according to Example 5 of the present invention;

FIG. 149 is a graph showing a spot shape on DVD calculated by a wavefront aberration of an objective lens module which is calculated by data having an actual surface shape of the diffractive lens structure in the diffractive optical element according to Example 5 of the present invention;

FIG. 150 is a graph showing a spot shape on CD calculated by a wavefront aberration of an objective lens module which is calculated by data having an actual surface shape of the diffractive lens structure in the diffractive optical element according to Example 5 of the present invention;

FIG. 151 is a graph showing a spot side-robe shape on BD calculated by a wavefront aberration of an objective lens module which is calculated by data having an actual surface shape of the diffractive lens structure in the diffractive optical element according to Example 5 of the present invention;

FIG. 152 is a graph showing a spot side-robe shape on DVD calculated by a wavefront aberration of an objective lens module which is calculated by data having an actual surface shape of the diffractive lens structure in the diffractive optical element according to Example 5 of the present invention;

FIG. 153 is a graph showing a spot side-robe shape on CD calculated by a wavefront aberration of an objective lens module which is calculated by data having an actual surface shape of the diffractive lens structure in the diffractive optical element according to Example 5 of the present invention;

FIG. 154 is a graph showing a relationship between a full width at half maximum of a spot and a disc tilt angle at the time of tilt with respect to DVD when the objective lens module according to Example 5 of the present invention is used;

FIG. 155 is a graph showing a relationship between a full width at half maximum of a spot and a disc tilt angle at the time of tilt with respect to CD when the objective lens module according to Example 5 of the present invention is used;

FIG. 156 is a graph showing a relationship between a spot side-robe intensity and a disc tilt angle at the time of tilt with respect to DVD when the objective lens module according to Example 5 of the present invention is used;

FIG. 157 is a graph showing a relationship between a spot side-robe intensity and a disc tilt angle at the time of tilt with respect to CD when the objective lens module according to Example 5 of the present invention is used;

FIG. 158A is a cross-sectional view of a diffractive optical element according to an embodiment of the present invention;

FIG. 158B is a cross-sectional view of a diffractive optical element according to an embodiment of the present invention;

FIG. 158C is a cross-sectional view of a diffractive optical element according to an embodiment of the present invention;

FIG. 158D is a cross-sectional view of a diffractive optical element according to an embodiment of the present invention;

FIG. 159A is a schematic cross-sectional view of an objective lens module for illustrating an operation of an objective lens module having a diffractive optical element according to an embodiment of the present invention and an objective lens;

FIG. 159B is a schematic cross-sectional view of an objective lens module for illustrating an operation of an objective lens module having a diffractive optical element according to an embodiment of the present invention and an objective lens;

FIG. 159C is a schematic cross-sectional view of an objective lens module for illustrating an operation of an objective lens module having a diffractive optical element according to an embodiment of the present invention and an objective lens;

FIG. 160A is a cross-sectional view of a diffractive optical element according to an embodiment of the present invention;

FIG. 160B is a cross-sectional view of a diffractive optical element according to an embodiment of the present invention;

FIG. 160C is a cross-sectional view of a diffractive optical element according to an embodiment of the present invention;

FIG. 161A is a schematic cross-sectional view of an objective lens module for illustrating an operation of an objective lens module having a diffractive optical element according to an embodiment of the present invention and an objective lens;

FIG. 161B is a schematic cross-sectional view of an objective lens module for illustrating an operation of an objective lens module having a diffractive optical element according to an embodiment of the present invention and an objective lens;

FIG. 161C is a schematic cross-sectional view of an objective lens module for illustrating an operation of an objective lens module having a diffractive optical element according to an embodiment of the present invention and an objective lens;

FIG. 162A is a cross-sectional view of a diffractive optical element according to an embodiment of the present invention;

FIG. 162B is a cross-sectional view of a diffractive optical element according to an embodiment of the present invention;

FIG. 162C is a cross-sectional view of a diffractive optical element according to an embodiment of the present invention;

FIG. 163A is a schematic cross-sectional view of an objective lens module for illustrating an operation of an objective lens module having a diffractive optical element according to an embodiment of the present invention and an objective lens;

FIG. 163B is a schematic cross-sectional view of an objective lens module for illustrating an operation of an objective lens module having a diffractive optical element according to an embodiment of the present invention and an objective lens;

FIG. 163C is a schematic cross-sectional view of an objective lens module for illustrating an operation of an objective lens module having a diffractive optical element according to an embodiment of the present invention and an objective lens;

FIG. 164 is a schematic cross-sectional view of an objective lens module having a diffractive optical element according to Example 6 of the present invention and an objective lens;

FIG. 165 is a schematic cross-sectional view of the diffractive optical element according to Example 6 of the present invention;

FIG. 166 is a graph schematically showing a section of a diffractive lens structure, which is formed in the diffractive optical element according to Example 6 of the present invention;

FIG. 167 is a graph showing a calculation result of a wavefront aberration for HD-DVD of an objective lens module, which uses the diffractive optical element according to Example 6 of the present invention, by data having an actual shape;

FIG. 168 is a graph showing a calculation result of a wavefront aberration for DVD of an objective lens module, which uses the diffractive optical element according to Example 6 of the present invention, by data having an actual shape;

FIG. 169 is a graph showing a calculation result of a wavefront aberration for CD of an objective lens module, which uses the diffractive optical element according to Example 6 of the present invention, by data having an actual shape;

FIG. 170 is a graph showing a spot shape on HD-DVD calculated by a wavefront aberration of an objective lens module which is calculated by data having an actual surface shape of the diffractive lens structure in the diffractive optical element according to Example 6 of the present invention;

FIG. 171 is a graph showing a spot shape on DVD calculated by a wavefront aberration of an objective lens module which is calculated by data having an actual surface shape of the diffractive lens structure in the diffractive optical element according to Example 6 of the present invention;

FIG. 172 is a graph showing a spot shape on CD calculated by a wavefront aberration of an objective lens module which is calculated by data having an actual surface shape of the diffractive lens structure in the diffractive optical element according to Example 6 of the present invention;

FIG. 173 is a graph showing a spot side-robe shape on HD-DVD calculated by a wavefront aberration of an objective lens module which is calculated by data having an actual surface shape of the diffractive lens structure in the diffractive optical element according to Example 6 of the present invention;

FIG. 174 is a graph showing a spot side-robe shape on DVD calculated by a wavefront aberration of an objective lens module which is calculated by data having an actual surface shape of the diffractive lens structure in the diffractive optical element according to Example 6 of the present invention;

FIG. 175 is a graph showing a spot side-robe shape on CD calculated by a wavefront aberration of an objective lens module which is calculated by data having an actual surface shape of the diffractive lens structure in the diffractive optical element according to Example 6 of the present invention;

FIG. 176 is a graph showing a relationship between a full width at half maximum of a spot and a disc tilt angle at the time of tilt with respect to DVD when the objective lens module according to Example 6 of the present invention is used;

FIG. 177 is a graph showing a relationship between a full width at half maximum of a spot and a disc tilt angle at the time of tilt with respect to CD when the objective lens module according to Example 6 of the present invention is used;

FIG. 178 is a graph showing a relationship between a spot side-robe intensity and a disc tilt angle at the time of tilt with respect to DVD when the objective lens module according to Example 6 of the present invention is used;

FIG. 179 is a graph showing a relationship between a spot side-robe intensity and a disc tilt angle at the time of tilt with respect to CD when the objective lens module according to Example 6 of the present invention is used;

FIG. 180 is a schematic cross-sectional view of an objective lens module having a diffractive optical element according to Example 7 of the present invention and an objective lens;

FIG. 181 is a schematic cross-sectional view of the diffractive optical element according to Example 7 of the present invention;

FIG. 182 is a graph schematically showing a section of a diffractive lens structure, which is formed in the diffractive optical element according to Example 7 of the present invention;

FIG. 183 is a graph showing a calculation result of a wavefront aberration for HD-DVD of an objective lens module, which uses the diffractive optical element according to Example 7 of the present invention, by data having an actual shape;

FIG. 184 is a graph showing a calculation result of a wavefront aberration for DVD of an objective lens module, which uses the diffractive optical element according to Example 7 of the present invention, by data having an actual shape;

FIG. 185 is a graph showing a calculation result of a wavefront aberration for CD of an objective lens module, which uses the diffractive optical element according to Example 7 of the present invention, by data having an actual shape;

FIG. 186 is a graph showing a spot shape on HD-DVD calculated by a wavefront aberration of an objective lens module which is calculated by data having an actual surface shape of the diffractive lens structure in the diffractive optical element according to Example 7 of the present invention;

FIG. 187 is a graph showing a spot shape on DVD calculated by a wavefront aberration of an objective lens module which is calculated by data having an actual surface shape of the diffractive lens structure in the diffractive optical element according to Example 7 of the present invention;

FIG. 188 is a graph showing a spot shape on CD calculated by a wavefront aberration of an objective lens module which is calculated by data having an actual surface shape of the diffractive lens structure in the diffractive optical element according to Example 7 of the present invention;

FIG. 189 is a graph showing a spot side-robe shape on HD-DVD calculated by a wavefront aberration of an objective lens module which is calculated by data having an actual surface shape of the diffractive lens structure in the diffractive optical element according to Example 7 of the present invention;

FIG. 190 is a graph showing a spot side-robe shape on DVD calculated by a wavefront aberration of an objective lens module which is calculated by data having an actual surface shape of the diffractive lens structure in the diffractive optical element according to Example 7 of the present invention;

FIG. 191 is a graph showing a spot side-robe shape on CD calculated by a wavefront aberration of an objective lens module which is calculated by data having an actual surface shape of the diffractive lens structure in the diffractive optical element according to Example 7 of the present invention;

FIG. 192 is a graph showing a relationship between a full width at half maximum of a spot and a disc tilt angle at the time of tilt with respect to HD-DVD when the objective lens module according to Example 7 of the present invention is used;

FIG. 193 is a graph showing a relationship between a full width at half maximum of a spot and a disc tilt angle at the time of tilt with respect to CD when the objective lens module according to Example 7 of the present invention is used;

FIG. 194 is a graph showing a relationship between a spot side-robe intensity and a disc tilt angle at the time of tilt with respect to HD-DVD when the objective lens module according to Example 7 of the present invention is used;

FIG. 195 is a graph showing a relationship between a spot side-robe intensity and a disc tilt angle at the time of tilt with respect to CD when the objective lens module according to Example 7 of the present invention is used;

FIG. 196 is a schematic cross-sectional view of an objective lens having the diffractive lens structure according to Example 8 of the present invention;

FIG. 197 is a schematic cross-sectional view of an objective lens having a diffractive lens structure according to Example 8 of the present invention;

FIG. 198 is a graph showing a calculation result of a wavefront aberration for HD-DVD of an objective lens, which has the diffractive lens structure according to Example 8 of the present invention, by data having an actual shape;

FIG. 199 is a graph showing a calculation result of a wavefront aberration for DVD of an objective lens, which has the diffractive lens structure according to Example 8 of the present invention, by data having an actual shape;

FIG. 200 is a graph showing a calculation result of a wavefront aberration for CD of an objective lens, which has the diffractive lens structure according to Example 8 of the present invention, by data having an actual shape;

FIG. 201 is a graph showing a spot shape on HD-DVD calculated by a wavefront aberration of an objective lens module which is calculated by data having an actual surface shape of an objective lens having the diffractive lens structure according to Example 8 of the present invention;

FIG. 202 is a graph showing a spot shape on DVD calculated by a wavefront aberration of an objective lens module which is calculated by data having an actual surface shape of an objective lens having the diffractive lens structure according to Example 8 of the present invention;

FIG. 203 is a graph showing a spot shape on CD calculated by a wavefront aberration of an objective lens module which is calculated by data having an actual surface shape of an objective lens having the diffractive lens structure according to Example 8 of the present invention;

FIG. 204 is a graph showing a spot side-robe shape on HD-DVD calculated by a wavefront aberration of an objective lens module which is calculated by data having an actual surface shape of an objective lens having the diffractive lens structure according to Example 8 of the present invention;

FIG. 205 is a graph showing a spot side-robe shape on DVD calculated by a wavefront aberration of an objective lens module which is calculated by data having an actual surface shape of an objective lens having the diffractive lens structure according to Example 8 of the present invention;

FIG. 206 is a graph showing a spot side-robe shape on CD calculated by a wavefront aberration of an objective lens module which is calculated by data having an actual surface shape of an objective lens having the diffractive lens structure according to Example 8 of the present invention;

FIG. 207 is a graph showing a relationship between a full width at half maximum of a spot and a disc tilt angle at the time of tilt with respect to HD-DVD when an objective lens having the diffractive lens structure according to Example 8 of the present invention is used;

FIG. 208 is a graph showing a relationship between a full width at half maximum of a spot and a disc tilt angle at the time of tilt with respect to CD when an objective lens having the diffractive lens structure according to Example 8 of the present invention is used;

FIG. 209 is a graph showing a relationship between a spot side-robe intensity and a disc tilt angle at the time of tilt with respect to HD-DVD when an objective lens having the diffractive lens structure according to Example 8 of the present invention is used; and FIG. 210 is a graph showing a relationship between a spot side-robe intensity and a disc tilt angle at the time of tilt with respect to CD when an objective lens having the diffractive lens structure according to Example 8 of the present invention is used.

DETAILED DESCRIPTION OF THE INVENTION

Hereinafter, embodiments of the present invention will be described with reference to the drawings.

(Optical Pickup)

Figure 1:
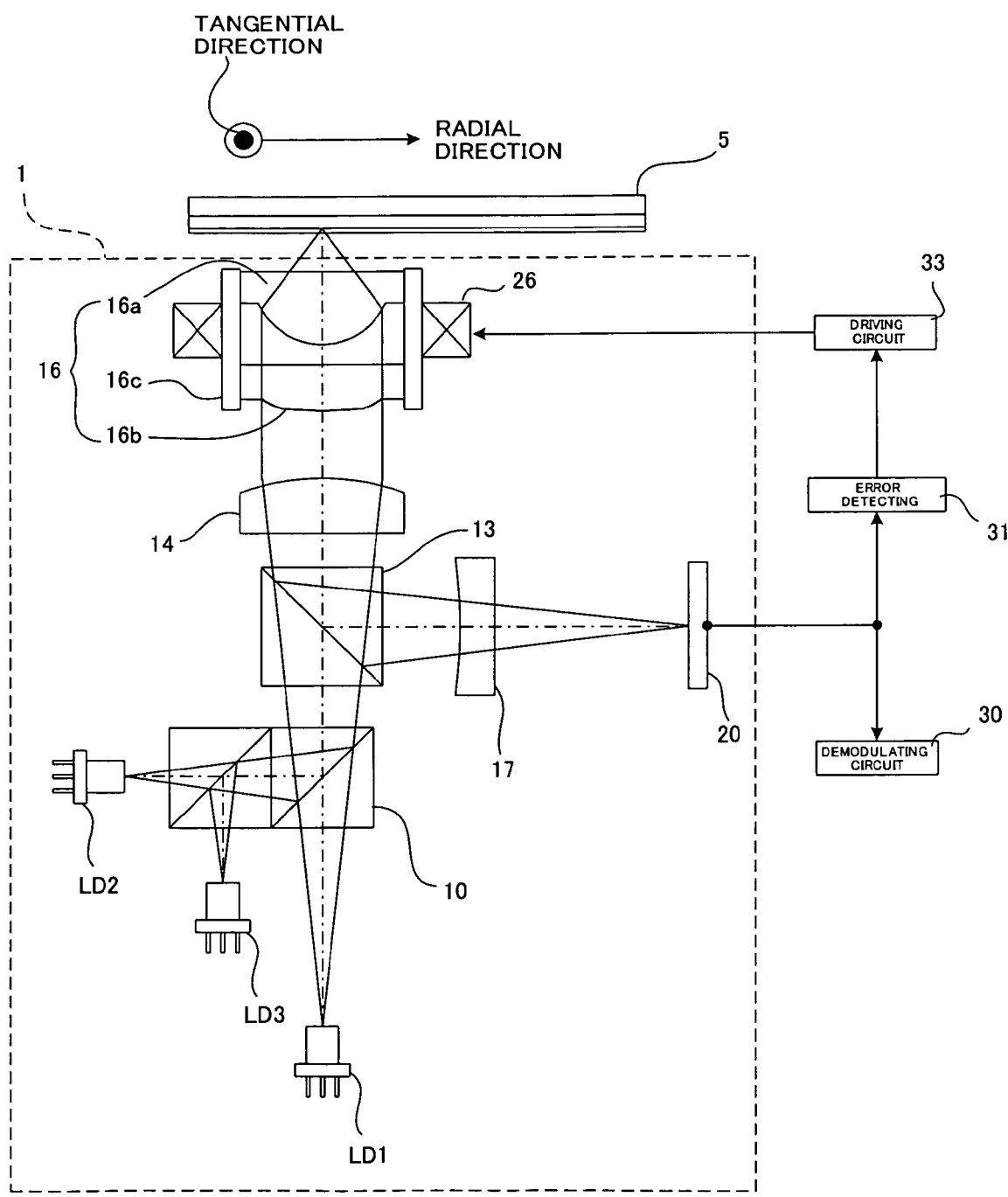
FIG. 1 is a diagram schematically showing an internal configuration of an optical pickup according to an embodiment of the present invention.

FIG. 1 schematically shows an optical pickup according to an embodiment. The optical pickup has a semiconductor laser LD1 for BD that emits a short wavelength $\lambda_{BD}$ in the vicinity of a first wavelength of 400 nm to 410 nm, for example, 408 nm, a semiconductor laser LD2 for DVD that emits a long wavelength $\lambda_{DVD}$ for DVD in the vicinity of a second wavelength, longer than the first wavelength, of 630 nm to 670 nm, for example, 660 nm, and a semiconductor laser LD3 for CD that emits a long wavelength $\lambda_{CD}$ for CD in the vicinity of a third wavelength, longer than the second wavelength, of 760 nm to 800 nm, for example, 780 nm. The semiconductor lasers LD1, LD2, and LD3 are selectively turned on for BD, DVD, and CD, respectively.

In addition, the optical pickup has an optical axis coupling prism (color synthesizing prism) 10 of an optical axis coupling element for providing an optical path common to first, second, and third laser light $\lambda_{BD}$, $\lambda_{DVD}$, and $\lambda_{CD}$. As shown in FIG. 1, the optical axis coupling prism 10 of the optical system is designed to provide an optical path common to divergent laser light of the semiconductor lasers LD1, LD2, and LD3, and has a function of substantially tuning the optical axes of three light fluxes with one another. An individual dichroic mirror in the optical axis coupling prism 10 has a property to transmit or reflect laser light having a predetermined wavelength, and is formed of a multi-layered thin dielectric film so as to have incident angle dependency. Further, the optical axis coupling element for synthesizing the optical axes is not limited to the optical axis coupling prism. For example, instead of the dichroic mirror, a diffraction grating using the wavelength difference of a diffraction angle, a liquid crystal cholesteric layer, or the like can be used for the optical axis coupling element.

Further, on a downstream side of the optical axis of the optical axis coupling prism 10, the optical pickup has a beam splitter 13, a collimator lens 14, and an objective lens module 16. With such an optical irradiation optical system, laser light from at least one of the first semiconductor laser LD1 and the second semiconductor laser LD2 passes through the optical axis coupling prism 10 and the beam splitter 13, becomes parallel laser light while transmitting the collimator lens 14, and is converged by the objective lens module 16 toward an optical disc 5, which is disposed in the vicinity of a focal point of the objective lens module 16 to form an optical spot on the pit row of an information recording surface of the optical disc 5.

In addition to such an irradiation optical system, the optical pickup further has a detection optical system, such as a detecting lens 17. Here, the objective lens module 16 and the beam splitter 13 are also used for the detection optical system. Reflected light from the optical disc 5, such as BD, DVD, or CD, is converged by the objective lens module 16 to be directed toward a detection light-converging lens 17 by the beam splitter 13. Light converged by the detecting lens 17 passes through an astigmatism generating element (not shown), such as a cylindrical lens, a multi lens, or the like, and forms an optical spot in the vicinity of a center of a light-receiving surface 20 of a quadrisected optical detector, which has four light-receiving surfaces quadrisected by two line segments perpendicular to each other.

Further, the light-receiving surface 20 of the optical detector is connected to a demodulating circuit 30 and an error detecting circuit 31. The error detecting circuit 31 is connected to a driving circuit 33 which drives a mechanism including an actuator 26 for tracking control and focus control of the objective lens module.

The quadrisected optical detector supplies an electrical signal in accordance with an optical spot image formed in the vicinity of the center of the light-receiving surface 20 to the demodulating circuit 30 and the error detecting circuit 31. The demodulating circuit 30 generates a recording signal on the basis of the electrical signal. The error detecting circuit 31 generates a focus error signal, a tracking error signal, or other servo signals on the basis of the electrical signal, and supplies the individual driving signals to the actuator through the driving circuit 33 of the actuator so as to servo-control and -drive the objective lens module 16 and the like in accordance with various driving signals.

(Objective Lens Module)

As shown in FIG. 1, laser light lays from the laser light sources LD1, LD2, and LD3 for BD, DVD, and CD share one optical path by the optical axis coupling prism 10, and are converged on the recording surface of the optical disc, such as BD, DVD, or CD, by the objective lens module 16.

The objective lens module 16 is an assembly of compound objective lenses, in which a light-converging lens (reference lens) 16*a* for converging laser light on the recording surface and a diffractive optical element 16*b* (DOE) having diffractive orbicular zones (rotary symmetrical member about an optical axis), which are a plurality of phase steps on a transmissive flat plate, that is, diffraction gratings, are incorporated. The light-converging lens 16*a* and the diffractive optical element 16*b* are coaxially disposed with respect to the optical axis by a holder 16*c*, and the diffractive optical element 16*b* having the diffraction gratings is disposed on the optical path from the light source, that is, the optical axis coupling prism 10 up to the light-converging lens 16*a*.

As the light-converging lens 16*a*, an aspherical lens (objective lens for BD), which has a numerical aperture 0.85 with a corrected aberration for the wavelength range of $\lambda_{BD}$ of 400 nm to 410nm, and the thickness of the transmissive protection layer of 0.1 mm, is used.

Figure 2:
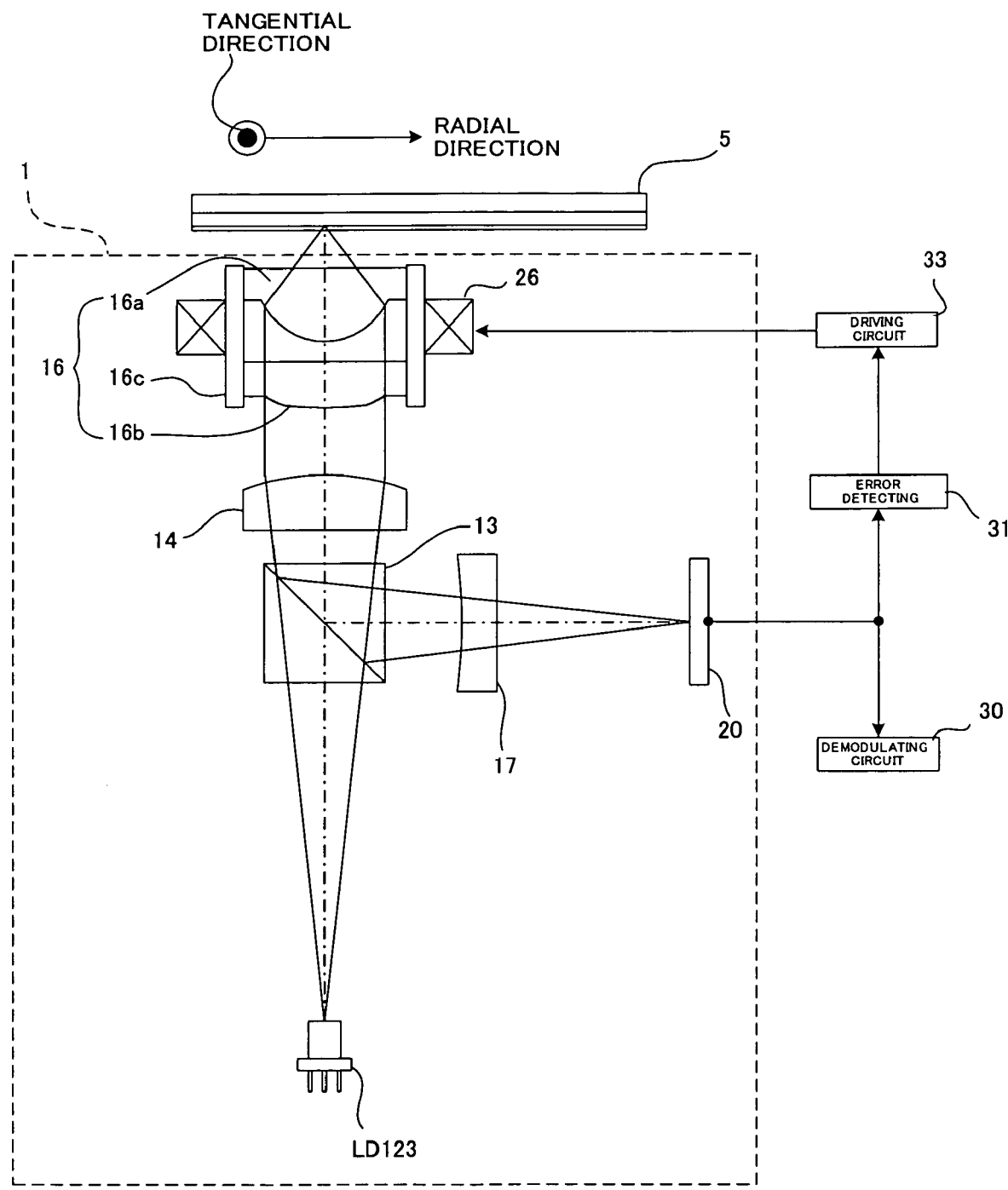
FIG. 2 is a diagram schematically showing an internal configuration of an optical pickup according to another embodiment of the present invention.

FIG. 2 schematically shows an optical pickup according to another embodiment. Instead of the above-described semiconductor lasers LD1, LD2, and LD3, a three-wavelength laser LD123 which emits the first, second, and third wavelengths is used as a light source. In this case, the optical axis coupling prism or the like can be omitted, and thus the optical path of the optical pickup can be simplified.

(Diffractive Optical Element)

The diffractive optical element 16*b* of the present embodiment can record and reproduce for DVD and CD, together with the objective lens for BD.

Figure 3:
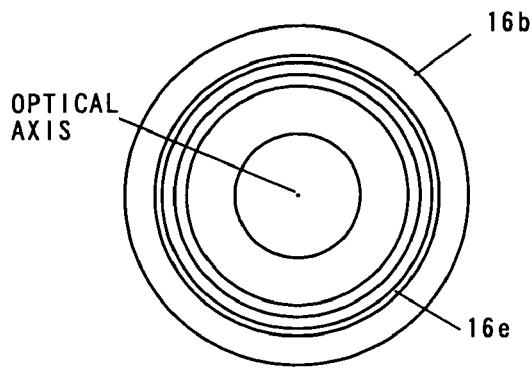
FIG. 3 is a front view of a diffractive optical element according to an embodiment of the present invention as viewed on an optical axis.

As shown in FIG. 3, the diffractive optical element 16*b* has the diffraction gratings, that is, the diffractive orbicular zones 16*e*, which are formed on at least one of an incident surface and an emergent surface of a substrate formed of glass, plastic, or the like. The diffractive orbicular zones 16*e* are ring-shaped grooves or convex orbicular zones, which are cut into a plurality of concentric circles around the optical axis or are laminated by photolithography. Moreover, instead of the above-described physical step structure, even when a structure having a concentric discontinuous refractive index distribution is used, the same effects are obtained. That is, the diffractive orbicular zones may cause the step in the phase of a wavefront of light transmitting therethrough through the physical step structure, the concentric discontinuous refractive index distribution, or any other units. As such, the structures for causing the steps in the phase of the wavefront of light are collectively referred to as a phase step or a phase step structure. Further, the amount of the phase step may be represented by the size of the physical step structure, the refractive index difference on the basis of the discontinuous refractive index, or the amount of the optical path difference or the phase difference occurring therein. In general, there are many cases in which the sectional shape of each of the diffractive orbicular zones 16*e* is formed in a blaze shape, that is, a serrate shape, or a step shape. For example, a diffraction grating having a serrate section is advantageous since it has higher diffraction efficiency than others. As a method of creating a sectional shape of a diffraction grating, a method which utilizes a photolithography technology or a method which precisely cuts by use of a diamond bite or the like may be used. Even when any method is used, a multi-stage blaze or a blaze-shaped diffraction grating can be formed. Further, when such a multi-stage blaze or blaze shape is formed as a sample with a mold, a plurality of diffractive optical elements can be copied from a transparent material by use of injection molding or a so-called 2P method.

Figure 4A:
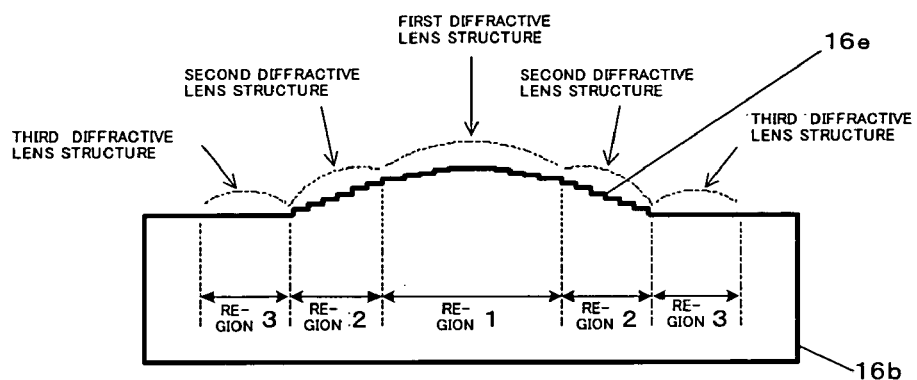
FIG. 4A is a cross-sectional view of a diffractive optical element according to the embodiment of the present invention.

The diffractive orbicular zones 16*e* of the diffractive optical element constitute a diffractive lens structure. A diffractive lens is a lens which is obtained by forming a diffraction surface on a surface of an aspherical lens, and the diffractive lens structure has concentric phase steps formed on a macroscopic aspherical shape. As shown in FIG. 4A, the diffractive lens structure is provided on at least one surface of a substrate, and is divided into a plurality of regions which are defined at different radius positions according to effective diameters of the objective lens corresponding to recording mediums. The diffractive lens structure is formed so as to correct a spherical aberration due to a difference in thickness between transmissive protection layers or a difference in wavelength. The detailed structure of the diffractive lens structure is as follows.

In an innermost region 1, in order to realize a diffractive lens structure in which a spherical aberration correction effect on first laser light (laser light for BD, the wavelength 408 nm) is not obtained, and spherical aberration correction effects on second laser light (laser light for DVD, the wavelength 660 nm) and third laser light (laser light for CD, the wavelength 780 nm) are obtained, a first diffractive lens structure (a first aberration correction unit) is formed such that the combination of diffracted light {for example, (BD: first-order light, DVD: first-order light, CD: first-order light), (BD: third-order light, DVD: second-order light, CD: second-order light), (BD: seventh-order light, DVD: fourth-order light, CD: third-order light), or (BD: ninth-order light, DVD: fifth-order light, CD: fourth-order light)} can be utilized. Moreover, the combination of (BD: fifth-order light, DVD: third-order light, CD: second or third-order light) may be excluded since phase differences caused by the phase steps constituting the diffractive lens structure are made uniform by laser light for BD and laser light for DVD. Accordingly, the first diffractive lens structure is designed such that, from diffracted light to be generated when first laser light passes through the first diffractive lens structure, diffracted light having the maximum diffraction efficiency has an odd diffraction order, excluding a multiple of five. The diffraction efficiency of diffracted light to be generated by the diffractive lens structure can be adjusted by the step amount of the concentric phase step constituting the diffractive lens structure. In particular, in the region 1, if the phase step amount is determined such that diffraction efficiency of laser light for BD becomes the maximum, diffracted light of a desired diffraction order of laser light for CD cannot have sufficient diffraction efficiency, and simultaneously unnecessary diffracted light occurs. Accordingly, it is preferable that the diffractive lens structure be designed in consideration of the balance between diffraction efficiency of laser light for BD and diffraction efficiency of laser light for CD. Moreover, when the diffractive lens structure is designed in consideration of the diffraction efficiency balance, as the difference in optical path length caused by the phase steps is shifted from an integer multiple of a wavelength, a serrate wavefront aberration partially occurs. However, since deterioration of the spot shape due to the serrate wavefront aberration almost not occurs, a problem is not caused. The depth of each of the phase steps constituting the diffractive lens structure is designed such that the difference in optical path length to be generated is the same in all the phase steps, but is designed such that the difference in optical path length caused by an outermost phase step is different from the differences in optical path length caused by other phase steps. Therefore, the phase can be further accurately adapted to the wavefront passing through other regions, and more favorable light-converging property can be obtained.

In a region 2 of an intermediate portion outside the region 1, in order to realize a diffractive lens structure in which spherical aberration correction effects on laser light for BD and laser light for CD are not obtained, and a spherical aberration correction effect on laser light for DVD is obtained, a second diffractive lens structure (a second aberration correction unit) is formed such that the combination of diffracted light {for example, (BD: second-order light, DVD: first-order light, CD: first-order light), (BD: fourth-order light, DVD: second-order light, CD: second-order light), (BD: sixth-order light, DVD: fourth-order light, CD: third-order light), or (BD: eighth-order light, DVD: fifth-order light, CD: fourth-order light)} can be utilized. At the time of tenth-order diffracted light on BD, phase differences caused by the phase steps constituting the diffractive lens structure on laser light corresponding to recording and reproducing all the recording mediums are made uniform, and the aberration correction effect is not selectively exerted only on laser light for DVD. Accordingly, the second diffractive lens structure is designed such that, from diffracted light to be generated when laser light for BD passes through the second diffractive lens structure, diffracted light having the maximum diffraction efficiency has an even diffraction order, excluding a multiple of ten. The depth of each of the phase steps constituting the diffractive lens structure may be set to generate the difference in optical path length such that diffraction efficiency of laser light for BD is the maximum according to a required specification or such that diffraction efficiency of laser light for BD and diffraction efficiency of laser light for DVD are balanced. Further, when a serrate wavefront aberration occurs, like the region 1, if the difference in optical path length caused by only an outermost phase step is different from others, more favorable light-converging property can be obtained.

In a region 3 of an outer circumferential portion outside the region 2, in order to realize a diffractive lens structure in which spherical aberration correction effects on all the wavelengths are not obtained, a third diffractive lens structure (a third aberration correction unit) is formed such that the combination of diffracted light (for example, BD: tenth-order light, DVD: sixth-order light, CD: fifth-order light) can be utilized. Further, the region 3 may not have the diffractive lens structure (so as to transmit only zero-order light). Accordingly, a predetermined numerical aperture for BD of 0.85 is implemented.

In the example of FIG. 4A, the first diffractive lens structure, the second diffractive lens structure, and the third diffractive lens structure are formed on the same surface. As such, when all the diffractive lens structures are formed on one surface, a plurality of molds each having minute structures for forming the phase steps do not need to be provided, and thus the diffractive lens structures can be easily manufactured at a low cost. Further, in each diffractive lens structure, by suitably setting the diffraction order of laser light for BD or the image surface positions of DVD and CD, the directions of all the phase steps can be made uniform, as shown in FIG. 4A. Here, the direction of the phase step is represented by a movement direction of a surface on an outer circumference side on the basis of a surface on an inner circumference side. As such, by arranging the directions of all the phase steps in the same direction, the surface shape has a simple step shape, with no minute orbicular hollow or protrusion. Therefore, a mold can be easily manufactured, and mold-release property can be suppressed from deteriorating. As a result, the mold can have long life span, and percentage of molding defectives can be reduced.

As such, the diffractive optical element of the present embodiment is provided with the diffractive lens structure which has minute concentric phase steps on at least one surface thereof in order to correct the spherical aberration caused by the difference in thickness between the transmissive protection layers of BD/DVD/CD. Accordingly, the spherical aberration can be corrected for all BD, DVD, and CD as an infinite system, and simultaneously apertures can be limited to the numerical apertures required for recording and reproducing of the individual optical discs.

Next, the action of the diffractive lens structure for realizing the limitation of different numerical apertures (effective diameters) of DVD/CD by the selection of the diffraction order will be described in detail.

The diffractive lens structure is formed of a plurality of minute phase steps on a surface of an optical material. If laser light of a wavelength $\lambda$ passes through a phase step having a depth d formed on an optical material of a refractive index N, the difference of optical path length of $\{(N-1)d/\lambda\} \times \lambda$ occurs in a wavefront corresponding to the phase step. When the difference in optical path length caused by each of the phase steps constituting the diffractive lens structure is $\{(N-1)d/\lambda\} \times \lambda$, in the diffractive lens structure for light of the wavelength $\lambda$, diffraction efficiency of ROUND $[(N-1)d/\lambda]$-order light becomes the maximum. However, ROUND [ ] is an integer number obtained by rounding off a numerical value in [ ] to the nearest integer. Further, the aberration amount to be corrected in one of the phase steps constituting the diffractive lens structure is represented by [ROUND $[(N-1)d/\lambda]-\{(N-1)d/\lambda\}]\lambda$. That is, when $(N-1)d/\lambda$ is an integer number, that is, the difference in optical path length caused by the phase step is an integer multiple of the wavelength, the aberration amount to be corrected in the phase step is zero, and diffraction efficiency substantially becomes 100%. In contrast, as $(N-1)d/\lambda$ is shifted from the integer number, that is, as the difference in optical path length caused by the phase step is shifted from the integer multiple of the wavelength, the aberration amount to be corrected in one phase step is made large, and diffraction efficiency is decreased.

The refractive index N of the optical material is different according to the wavelength. That is, as the wavelength is made short, the refractive index is made high. The wavelength $\lambda_{BD}$ of laser light for BD is about 408 nm, the wavelength $\lambda_{CD}$ of laser light for CD is about 780 nm, and the refractive index changes according to the wavelength, as described above. Accordingly, when laser light for BD and laser light for CD pass through the same phase step, the ratio of the values of $(N-1)d/\lambda$ substantially becomes 2:1.

That is, in the phase step that generates the difference in optical path length of $2m\lambda_{BD}$ (where m is an integer number) on laser light for BD, the difference in optical path length of about $m\lambda_{CD}$ is generated on laser light for CD. Accordingly, 2m-th-order light of laser light for BD has the maximum diffraction efficiency. Then, when the diffractive lens structure is designed such that the spherical aberration correction effect is not obtained on laser light for BD, m-th-order light of laser light for CD has the maximum diffraction efficiency. Here, since the diffractive lens structure does not have the spherical aberration correction effect on laser right for CD, the correction of the spherical aberration on CD is disabled.

On the other hand, if the phase step amount of the diffractive lens structure is set such that the difference in optical path length of $(2m+1)\lambda_{BD}$ is generated on laser light for BD, diffracted light of an odd order of $(2m+1)$-th-order has the maximum diffraction efficiency. In this case, the difference in optical path length caused by the phase step on laser light for CD becomes about $(m+\frac{1}{2})\lambda_{CD}$. That is, in laser light for BD and laser light for CD, the shift amount from the integer multiple of the wavelength of the difference in optical path length caused by the phase step is different. Therefore, it is possible to implement a diffractive lens structure in which the aberration correction effect on laser light for BD is not obtained, and the aberration correction effect on laser light for CD is obtained.

Figure 4B:
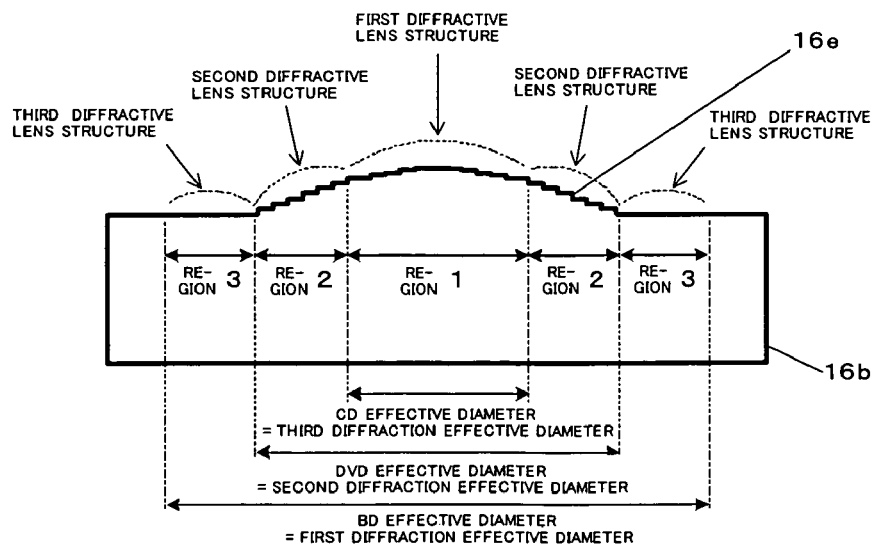
FIG. 4B is a cross-sectional view of a diffractive optical element according to the embodiment of the present invention.

In addition, with such a phenomenon, as shown in FIG. 4B, as for the region 1 of a third diffraction effective diameter corresponding to the CD effective diameter, the first diffractive lens structure, which uses odd-order diffracted light of laser light for BD, is used, and thus the aberration of CD can be corrected to some extent by the first diffractive lens structure, which is designed so as to correct the spherical aberration of DVD, without causing the spherical aberration in BD. Further, as for the region 2 outside the third diffraction effective diameter, the second diffractive lens structure, which uses even-order diffracted light of laser light for BD, is used, and thus the spherical aberration of CD can be remained without being corrected, by the second diffractive lens structure, which is designed so as to correct the spherical aberration of DVD, without causing the spherical aberration in BD.

However, when the diffractive lens structures are designed such that the difference in optical path length caused by each of the phase steps constituting the individual diffractive lens structures becomes 5 $\lambda_{BD}$, the difference in optical path length caused by the phase step becomes about 3 $\lambda_{DVD}$ on laser light for DVD, the correction of the spherical aberration in DVD is disabled, without causing the spherical aberration in BD. That is, the first diffractive lens structure may be a structure which uses odd-order diffracted light of laser light for BD, excluding a multiple of five, and the second diffractive lens structure may be a structure which uses even-order diffracted light of laser light for BD, excluding a multiple of ten.

As for the region 3 outside the second diffraction effective diameter corresponding to the DVD effective diameter, if the spherical aberration is not corrected on both DVD and CD, light can be diffused as flares on both DVD and CD, without causing the aberration for BD. In addition, in the region 2 within the second diffraction effective diameter and outside the third diffraction effective diameter, since the spherical aberration exists only on CD, light only on CD can be diffused as flares.

As such, from diffracted light to be generated when laser light having the shortest wavelength of a plurality of light-source wavelengths to be used is incident, the diffraction order of diffracted light having the maximum diffraction efficiency becomes an odd number (excluding the multiple of five) in the diffractive lens structure formed in the region 1, and becomes an even number (excluding the multiple of ten) in the diffractive lens structure formed in the region 2 between the innermost circumference and the outermost circumference. Then, the spherical aberration is corrected only on light in the effective diameters corresponding to three different numerical apertures, but is not corrected on light outside the effective diameters, such that light outside the effective diameters can be diffused as flares.

Accordingly, the diffractive lens structure, which is divided into three regions by two circles around the optical axis and which has concentric minute phase steps in at least two regions, can impart the most suitable numerical aperture for light of BD/DVD/CD having different numerical apertures.

Moreover, as a method of imparting the most suitable numerical aperture for light of BD/DVD/CD, without using such a configuration, a method can also be considered in which a concentric film having transmittance of wavelength selectivity is provided. In this case, however, it is difficult to partially provide the film, which causes the manufacturing process to be complicated.

Next, a unit for correcting the different amount of the spherical aberration of DVD/CD will be described in detail.

Since the thickness of the transmissive protection layer (the substrate) of DVD is 0.6 mm and the thickness of the transmissive protection layer (the substrate) of CD is 1.2 mm, the amount of the spherical aberration to be corrected is different. That is, in a diffractive lens structure which is designed for BD/DVD compatible, it may be impossible to completely correct the spherical aberration for CD. Similarly, in a diffractive lens structure which is designed for BD/CD compatible, it may be impossible to completely correct the spherical aberration for DVD. This is because the ratio of the values of the amount of the aberration [ROUND [(N−1)×d/λ]−{(N−1)×d/λ}]λ to be corrected in one of the phase steps constituting the diffractive lens structure cannot be set to be equal to the ratio of the amounts of the spherical aberration to be corrected of DVD and CD. In this case, by making incident light to either DVD or CD as divergent light or convergent light, the spherical aberration, which was not corrected by the diffractive lens structure, can be corrected. However, when BD/DVD is set as parallel incident light and only CD is set as divergent light or convergent light, the configuration of a pickup may be complicated. From this viewpoint, all BD/DVD/CD are preferably set as parallel incident light.

As a method for implementing this, three methods to be described below are considered.

As a first method, a method may be considered in which, in the configuration shown in FIG. 4B, the first diffractive lens structure to be formed in the region 1 common to DVD/BD is designed so as to correct the spherical aberration of an intermediate amount between the amount of the spherical aberration to be corrected in DVD and the amount of the spherical aberration to be corrected in CD, such that the residual amounts of the spherical aberration in DVD and CD are balanced. With this method, design can be obtained such that the aberration in both DVD and CD is equal to or less than 0.07 λ rms.

Figure 4C:
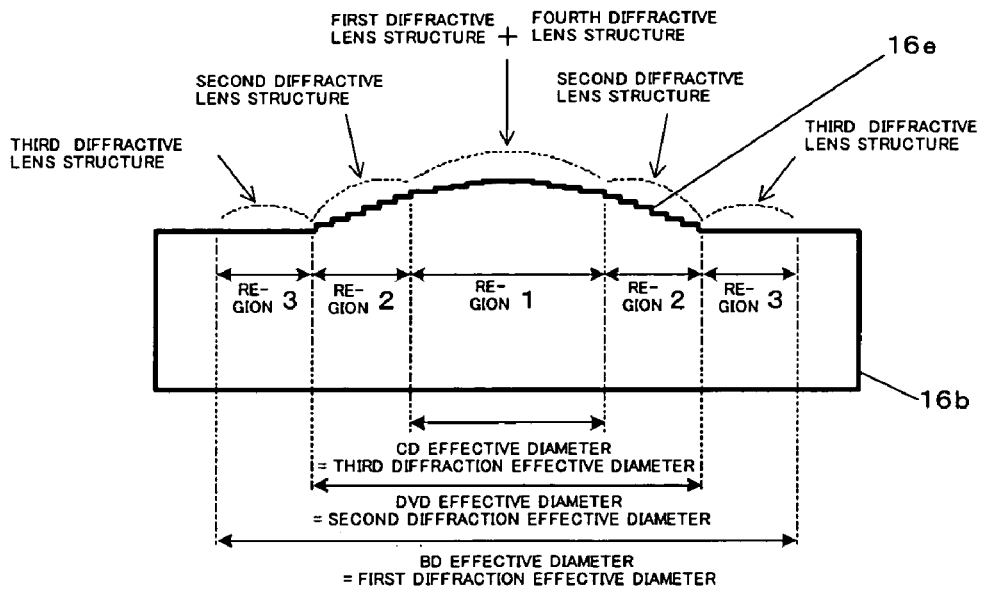
FIG. 4C is a cross-sectional view of a diffractive optical element according to the embodiment of the present invention.

As a second method, as shown in FIG. 4C, a method may be considered in which the first diffractive lens structure and a fourth diffractive lens structure for generating even-order diffracted light on laser light for BD, excluding ten, are mixed in the region 1. With this method, first, the first diffractive lens structure is designed for BD/CD compatible. The first diffractive lens structure has the spherical aberration correction effect on laser light for DVD. However, since the correction amount is different from the amount of the spherical aberration to be corrected, and a spherical aberration corresponding to this difference remains. Like the second diffractive lens structure which should correct the residual spherical aberration in DVD, the fourth diffractive lens structure, which generates even-order diffracted light on laser light for BD, is added so as to correct the residual aberration. The fourth diffractive lens structure is designed so as to generate even-order diffracted light while not having the aberration correction effect on laser light for BD and, and thus does not have the aberration correction effect on laser light for CD. That is, there is no bad influence on the wavefront of CD due to the addition of the fourth diffractive lens structure. With this method, design can be achieved to suppress the aberration of the region 1 in DVD/CD to a sufficient small value. Moreover, according to the design result, the intervals between the phase steps constituting the first diffractive lens structure and the phase steps constituting the fourth diffractive lens structure may be made drastically small. In this case, however, by synthesizing two phase steps into one phase step, the total number of phase steps can be reduced. That is, a phase step having a step amount, which is the sum of the step amounts of two adjacent phase steps, may be disposed at one of the positions of the two phase steps or at any position between them. As such, when the phase steps are synthesized, the individual phase steps are slightly shifted from the original design values, and thus a little performance deterioration occurs. However, when the two phase steps to be synthesized are close to each other, the shift is small, and thus performance deterioration is not problematic. As such, by synthesizing the two phase steps, two phase steps to be required can be reduced to one. Therefore, the mold can be easily manufactured, and mold-release property can be enhanced. As a result, the mold can have long life span, and percentage of molding defectives can be reduced.

As a third method, the inventors have found that all BD/DVD/CD can be set to parallel incident light through a design method different from the above-described first and second methods. Hereinafter, the detailed description thereof will be given.

Figure 4D:
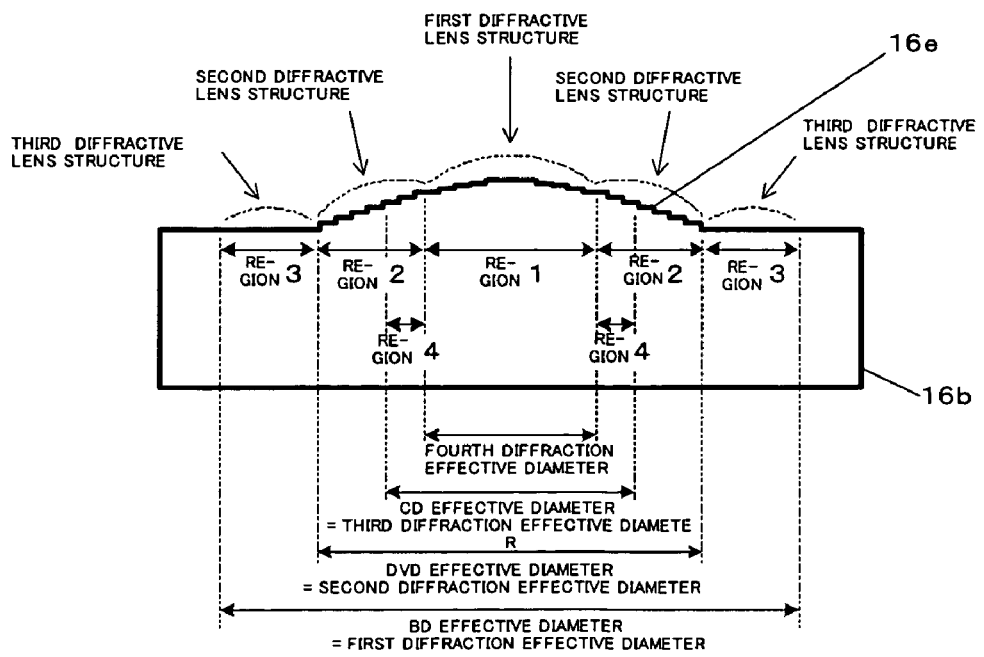
FIG. 4D is a cross-sectional view of a diffractive optical element according to the embodiment of the present invention.
Figure 5:
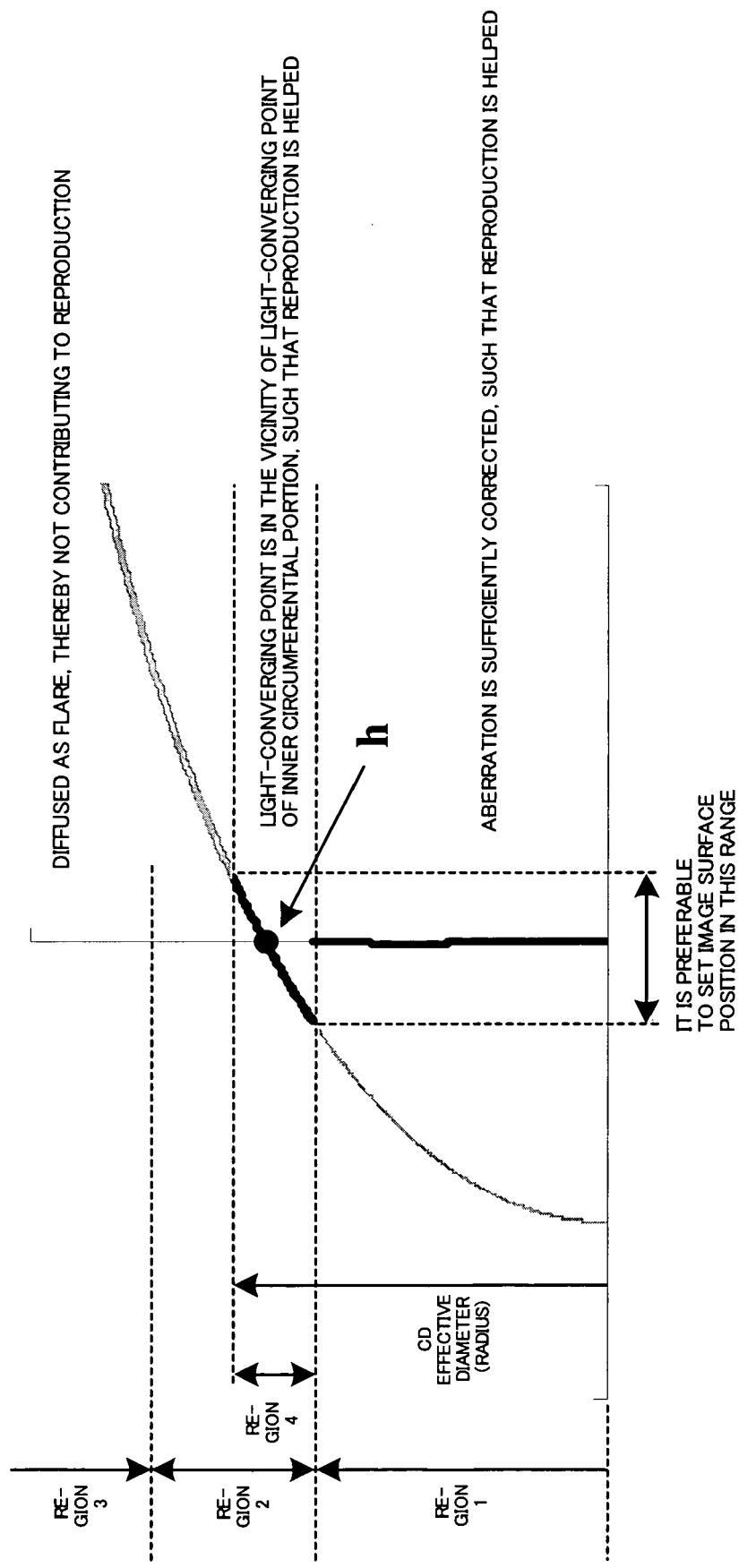
FIG. 5 is a diagram illustrating a graph which shows a longitudinal spherical aberration for CD by an objective lens module including a diffractive optical element according to the embodiment of the present invention.
Figure 6:
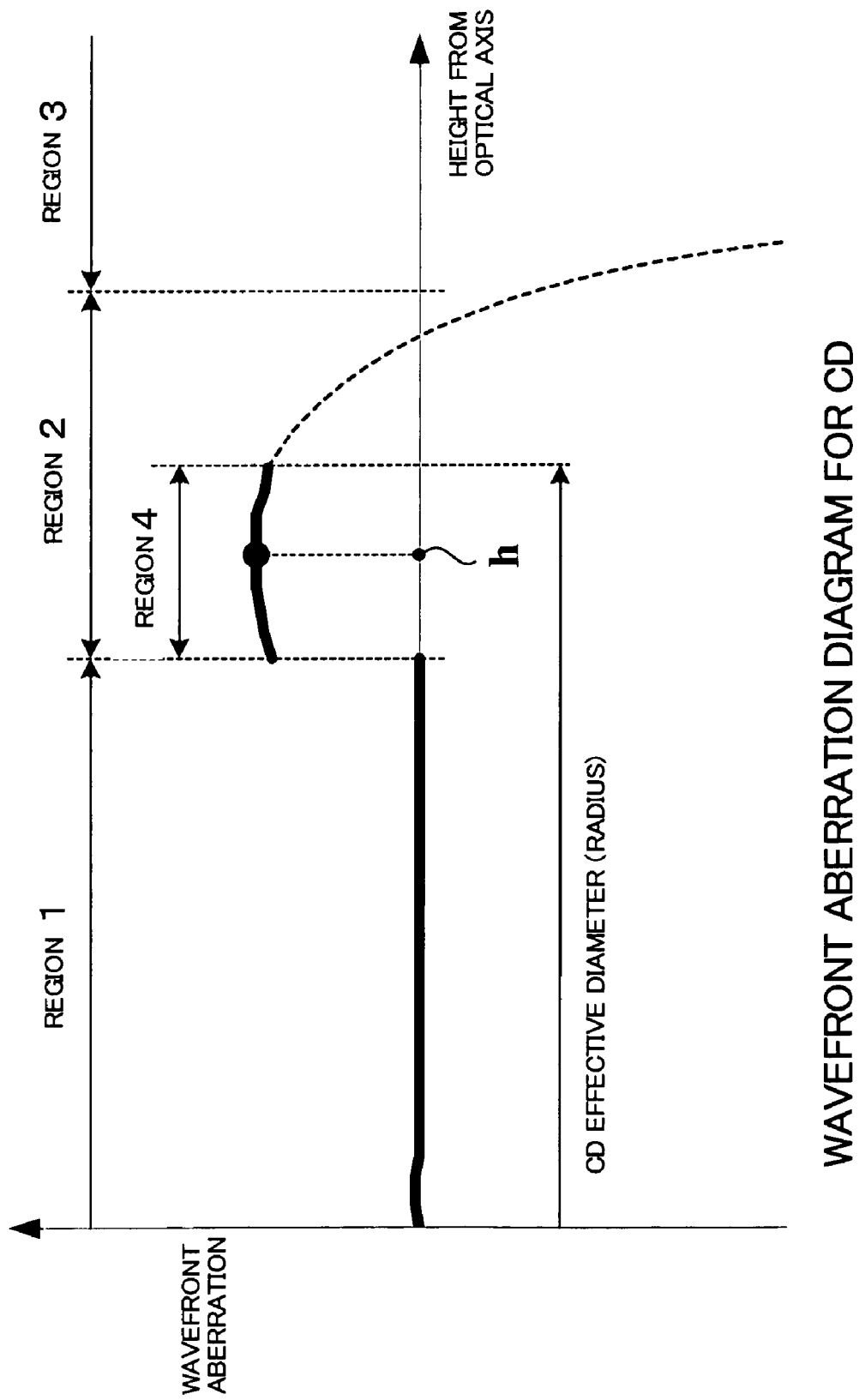
FIG. 6 is a diagram illustrating a graph which shows a wavefront aberration diagram for CD by the objective lens module including a diffractive optical element according to the embodiment of the present invention.

The spherical aberration is proportional to the fourth power of the numerical aperture of the lens. Accordingly, as shown in FIG. 4D, by making the region 1 serving as the common design region of DVD/CD smaller than the third diffraction effective diameter corresponding to the effective diameter of CD and decreasing the numerical aperture, the amount of a non-corrected residual spherical aberration can be reduced. For example, when the common design region of DVD/CD is about 80%, the amount of the residual spherical aberration is reduced up to 41%. However, if the common design region is simply decreased, the numerical aperture for CD is made small, which causes a trouble in recording and reproducing of CD. Then, the inventors have paid attention to a light-converging position of laser light for CD passing through the region 1. FIG. 5 is a diagram showing a longitudinal spherical aberration for CD. In FIG. 5, a vertical axis represents a distance in a direction perpendicular to the optical axis on the basis of the optical axis, that is, the height from the optical axis, and a horizontal axis represents a position in the optical axis direction. In the example shown in FIG. 5, the diffractive lens structure of the region 1 is designed such that the aberration for CD is corrected. As shown in FIG. 5, a method is suggested in which the light-converging position of desired diffracted light of laser light for CD is set at a position where the longitudinal spherical aberration before the correction becomes zero in the region 2 and at any point in the CD effective diameter, and the region 1 is limited to be narrower than the CD effective diameter, such that the residual spherical aberration of the region 1 in DVD is reduced. That is, as shown in FIG. 4D, in consideration of the region 2 and a region 4 in the third diffraction effective diameter corresponding to the CD effective diameter, the region 1 is limited to be narrower than the CD effective diameter. Further, FIG. 6 is a diagram showing a wavefront aberration for CD. In FIG. 6, a vertical axis represents the height from the optical axis, and a horizontal axis represents the amount of an aberration. As shown in FIG. 6, the inclination of the wavefront becomes zero at the height h from the optical axis where the longitudinal spherical aberration becomes zero, and the inclination of the wavefront in its vicinity is relatively gentle. Accordingly, in view of only that region, the aberration is not made large so much. That is, the wavefront of the region 4 in the vicinity of h can be used for reproducing CD by tuning its phase to the wavefront passing through the region 1, even when the spherical aberration is not corrected. As described above, when the first diffractive lens structure is designed, by setting an image surface position at any place of the region 4 in CD where the longitudinal spherical aberration becomes zero, the region 1 can be narrowed. When a diffractive optical element designed in such a manner is used, in DVD, a slight aberration remains in the region 1, but the amount of the aberration is a little, and thus it does not matter. Further, as for a design method, the phase steps constituting a plurality of diffractive lens structures are not mixed in the region 1, design can be achieved without increasing the number of phase steps. In addition, as described above, in particular, in the region 1, the balance of diffraction efficiency to laser light for BD needs to be considered, but, since the area of the region 1 is narrowed, even when diffraction efficiency of laser light for BD in consideration of diffraction efficiency of laser light for CD is decreased, the influence can be suppressed small as compared with the case in which the region 1 is not narrowed.

In view of the diffraction orders of BD/DVD/CD having the maximum diffraction efficiency and the spherical aberration correction and aperture limitation effects, the combination of the diffraction orders of laser light for BD to be used for the individual regions can be collected, as shown in Table 1.

TABLE 1

| Wavelength | Region 1 | Region 2 | Region 3 |
|---|---|---|---|
| 408 nm | odd or odd + even order | even order | even order or none |

(Operation of Objective Lens Module)

Figure 7:
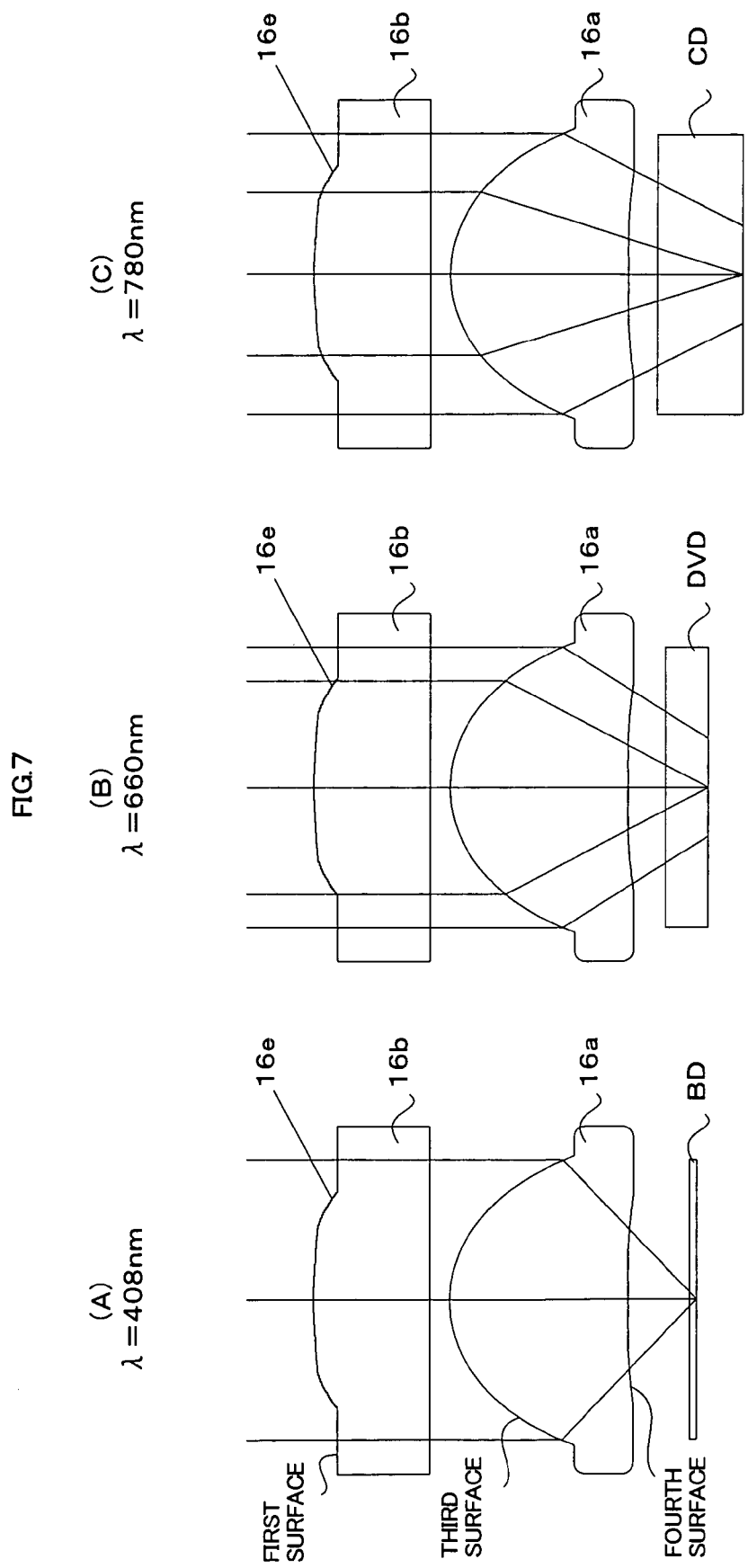
FIG. 7A is a schematic cross-sectional view of an objective lens module for illustrating an operation of an objective lens module having a diffractive optical element and an objective lens according to the embodiment of the present invention.
FIG. 7B is a schematic cross-sectional view of an objective lens module for illustrating an operation of an objective lens module having a diffractive optical element and an objective lens according to the embodiment of the present invention.
FIG. 7C is a schematic cross-sectional view of an objective lens module for illustrating an operation of an objective lens module having a diffractive optical element and an objective lens according to the embodiment of the present invention.

FIGS. 7A to 7C show the operation of the objective lens module.

As shown in FIG. 7A, when first laser light of $\lambda_{BD}$ is incident on the diffractive optical element 16b as substantially parallel light, light passing through all regions is guided the objective lens 16a as substantially parallel light as it is. Light converged by the objective lens 16a passes through a protection layer for BD and is converged on a signal recording surface.

Further, as shown in FIG. 7B, when second laser light of $\lambda_{DVD}$ is incident as substantially parallel light, light passing through the region 1 and the region 2 within the second diffraction effective diameter corresponding to the DVD effective diameter in the diffractive optical element is converged by the objective lens 16a, passes through a protection layer for DVD, and is converged on the signal recording surface. On the other hand, light outside the second diffraction effective diameter in the diffractive optical element is converged by the objective lens 16a and passes through the protection layer for DVD. In this case, however, since the spherical aberration is not corrected, light becomes flares, such that light does not contribute to reproduction.

In addition, as shown in FIG. 7C, third laser light of $\lambda_{CD}$ is incident as substantially parallel light, light passing through the region 1 and the region 4 within the third diffraction effective diameter corresponding to the CD effective diameter is converged by the objective lens 16a, passes through the transmissive protection layer for CD, and is converged on the signal recording surface. On the other hand, light outside the third diffraction effective diameter is converged by the objective lens 16a and passes through the transmissive protection layer for CD. In this case, however, since the spherical aberration is not corrected, light becomes flares, such that light does not contribute to reproduction.

(Chromatic Aberration Correction)

When the diffractive optical element has a chromatic aberration correction function, a discontinuous chromatic aberration due to the addition of the diffractive lens structure for spherical aberration correction can be corrected, and a stable operation can be implemented even when the wavelength of laser changes.

In BD, the numerical aperture of a corresponding objective lens is very large, that is, 0.85, and the wavelength of a light source to be used is short, a focal depth becomes shallow. Accordingly, it is preferable to correct the chromatic aberration. In general, the chromatic aberration may be corrected by combining lenses formed of glasses having different refractive indexes and by causing the chromatic aberrations of the lenses to cancel each other. Alternatively, the chromatic aberration may be corrected by causing to cancel a chromatic aberration to be generated by a separate diffractive optical element.

In case of the present embodiment, in order to simultaneously perform the spherical aberration correction and the aperture limitation of DVD or CD, the diffractive optical element having the diffractive lens structures of partially different properties is adopted, and thus a different chromatic aberration property is obtained for each region. In such a case, the aberration correction is complicated with a general combined lens in which two spherical lenses formed of optical materials having different wavelength dispersions are combined. The inventors have adopted the diffractive lens structures in order to correct such a discontinuous chromatic aberration. Specifically, the diffractive lens structure for spherical aberration correction is designed such that the chromatic aberrations in the region 1 and the region 2 are not discontinuous and the diffractive lens structure for chromatic aberration correction is formed in the region 3 such that the chromatic aberration of the region 3 is not discontinuous.

In the present embodiment, since the spherical aberration is corrected by the above-described BD/DVD/CD compatible diffractive lens structure, there is no case in which a surplus aberration other than the chromatic aberration correction occurs for all BD, DVD, and CD. In the present embodiment, the third diffractive lens structure is the diffractive lens structure for chromatic aberration correction, and can use the combination of, for example, BD: tenth-order light, DVD: sixth-order light, and CD: fifth-order light, which does not occur a surplus aberration other than the chromatic aberration correction for all BD, DVD, and CD. In this case, the third diffractive lens structure is designed such that, from diffracted light to be generated when first laser light passes through the third diffractive lens structure, diffracted light having the maximum diffraction efficiency has a diffraction order of a multiple of ten.

Figure 8:
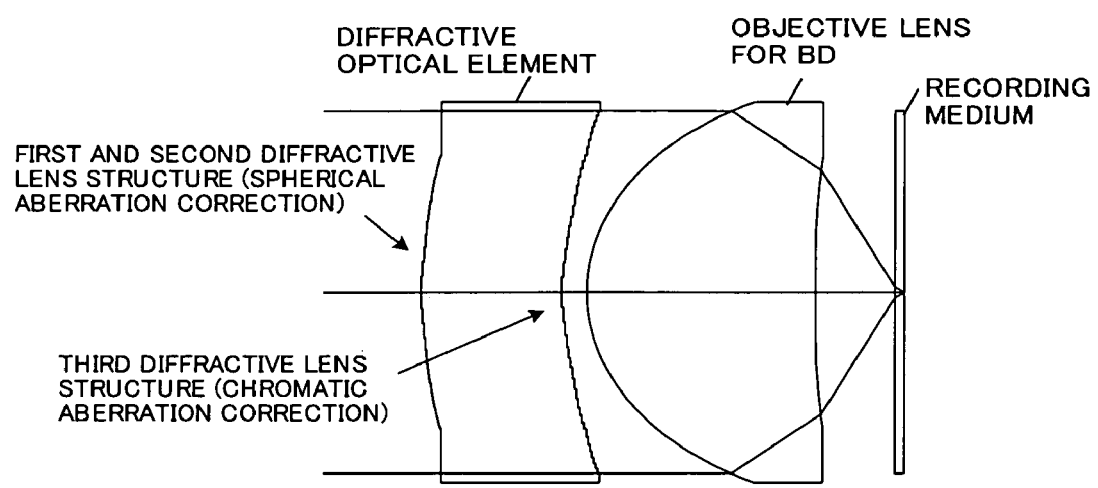
FIG. 8 is a schematic cross-sectional view of an objective lens module having a diffractive optical element and an objective lens according to another embodiment of the present invention.

In order to correct the discontinuous chromatic aberrations by the first and second diffractive lens structures (for spherical aberration correction) formed in the region 1 and the region 2 and simultaneously a chromatic aberration of the objective lens itself, the third diffractive lens structure (a chromatic aberration correction unit) needs to be formed on the entire surface of the BD effective diameter (including the DVD and CD effective diameters). In this case, it is not desirable that the diffractive lens structure for spherical aberration correction and the diffractive lens structure for chromatic aberration correction are shifted on the basis of the optical axis, and thus the diffractive lens structure for spherical aberration correction and the diffractive lens structure for chromatic aberration correction are preferably provided in one diffractive optical element. As shown in FIG. 8, the third diffractive lens structure for chromatic aberration correction can be formed on a surface different from the first and second diffractive lens structures for spherical aberration correction, thereby achieving one diffractive optical element. Therefore, the number of components is reduced, as compared with a case in which a separate optical element for chromatic aberration correction is used, like the related art. As a result, the pickup can be reduced in size or costs can be reduced.

Besides, the first diffractive lens structure may be formed on a surface different from the second diffractive lens structure and the third diffractive lens structure. Further, the second diffractive lens structure may be formed on a surface different from the first diffractive lens structure and the third diffractive lens structure. Preferably, the first diffractive lens structure, the second diffractive lens structure, and the third diffractive lens structure are formed on one surface, and all the directions of the phase steps formed in the individual surfaces (depthwise directions) are the same.

Figure 9:
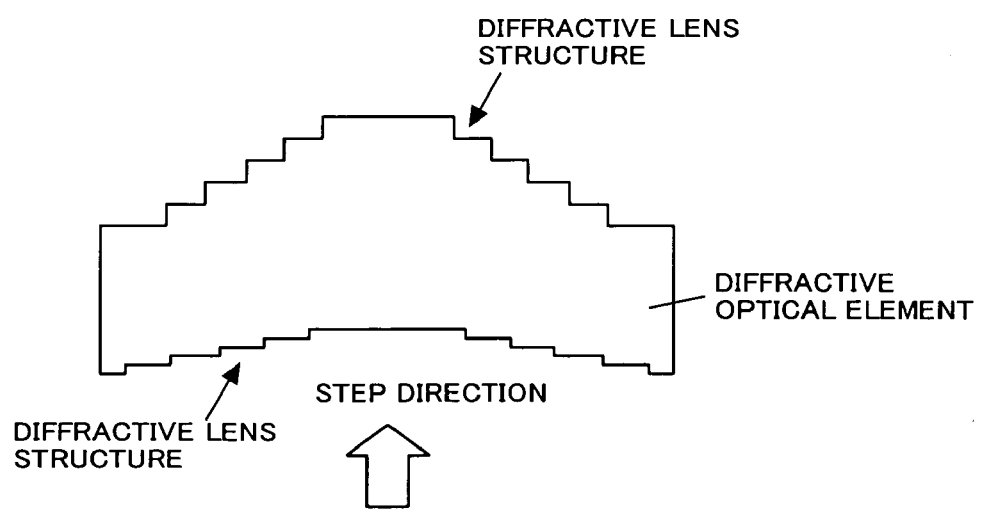
FIG. 9 is a schematic cross-sectional view of a diffractive optical element according to another embodiment of the present invention.

When these diffractive lens structures are provided in one diffractive optical element, as shown in FIG. 9, the diffractive lens structures can be divided on both surfaces and the directions of the phase steps of the diffractive lens structure on each surface can be arranged. Therefore, since the sectional shape of the diffractive lens structure is a simple step shape, a mold processing can easily performed, molding defectives can be reduced, and the mold can have long life span. As a result, a diffractive optical element can be maintained with high quality and the costs can be reduced.

Moreover, the difference in optical path length caused by each of the phase steps constituting the third diffractive lens structure and the difference in optical path length caused by each of the phase steps constituting one of the first and second diffractive lens structures are preferably different from each other. Further, there may be a case in which, from the phase steps constituting the third diffractive lens structure, in order to tune the phases with each other between the regions, one of or all the phase steps in the vicinities of the first, second, and fourth diffraction effective diameters are preferably set to generate the difference in optical path length different from those of other phase steps.

Figure 10:
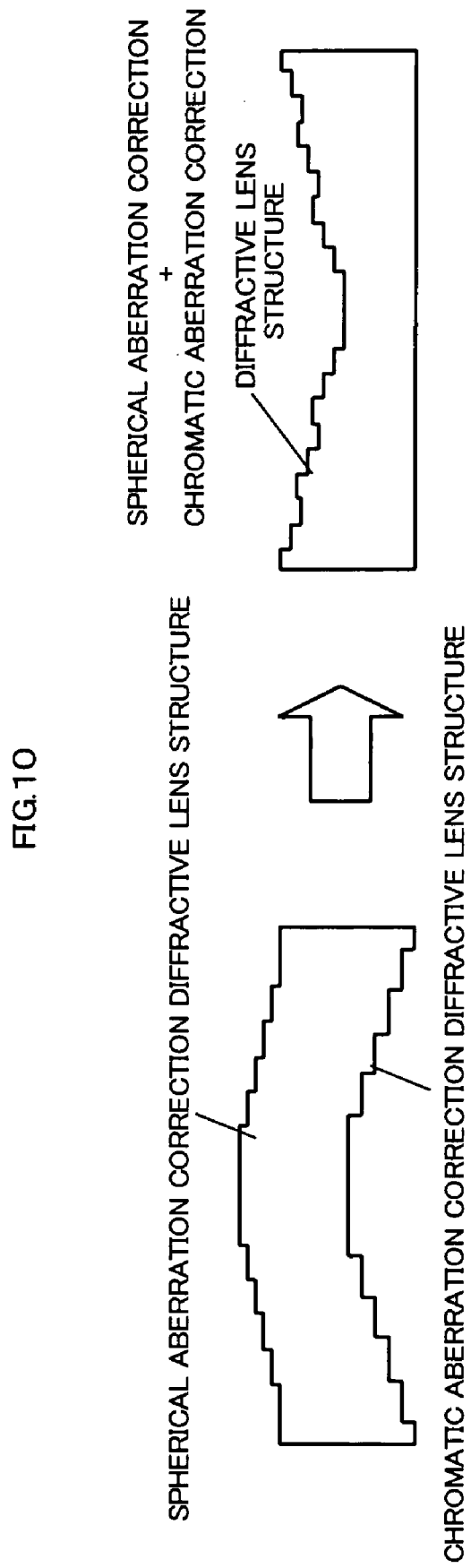
FIG. 10 is a schematic cross-sectional view of a diffractive optical element according to another embodiment of the present invention.

In addition, in the diffractive optical element having the plurality of diffractive lens structures, as shown in FIG. 10, all the diffractive lens structures may be collected on one surface. In this case, since the mold having minute steps, which are hard to manufacture, does not need to be manufactured for two surfaces, the costs of the diffractive optical element can be reduced. That is, in a region within the third diffraction effective diameter in an incident or emergent surface of the diffractive optical element, all the phase steps constituting the first diffractive lens structure, some of the phase steps constituting the second diffractive lens structure, and some of the phase steps constituting the third diffractive lens structure may be mixed. In addition, in a region between the fourth diffraction effective diameter and the second diffraction effective diameter in the incident or emergent surface of the diffractive optical element, some of the phase steps constituting the second diffractive lens structure and some of the phase steps constituting the third diffractive lens structure may be mixed.

At the time of forming the plurality of diffractive lens structures on the same surface and in the same region such that the diffractive lens structures are collected on one surface, when two adjacent phase steps are close to each other, the two phase steps are synthesized into one phase step so as to reduce the number of phase steps. Therefore, the mold can be easily manufactured and mold-release property can be enhanced, such that molding defectives are reduced. As a result, a diffractive optical element can be maintained with high quality and the costs can be reduced. Further, a loss of the amount of light due to a manufacturing error, such as roundness of an edge of the step or sag of a step wall surface is increased in accordance with the number of the steps, so it is further preferable to decrease the step numbers for reducing the loss of the amount of light.

Figure 11:
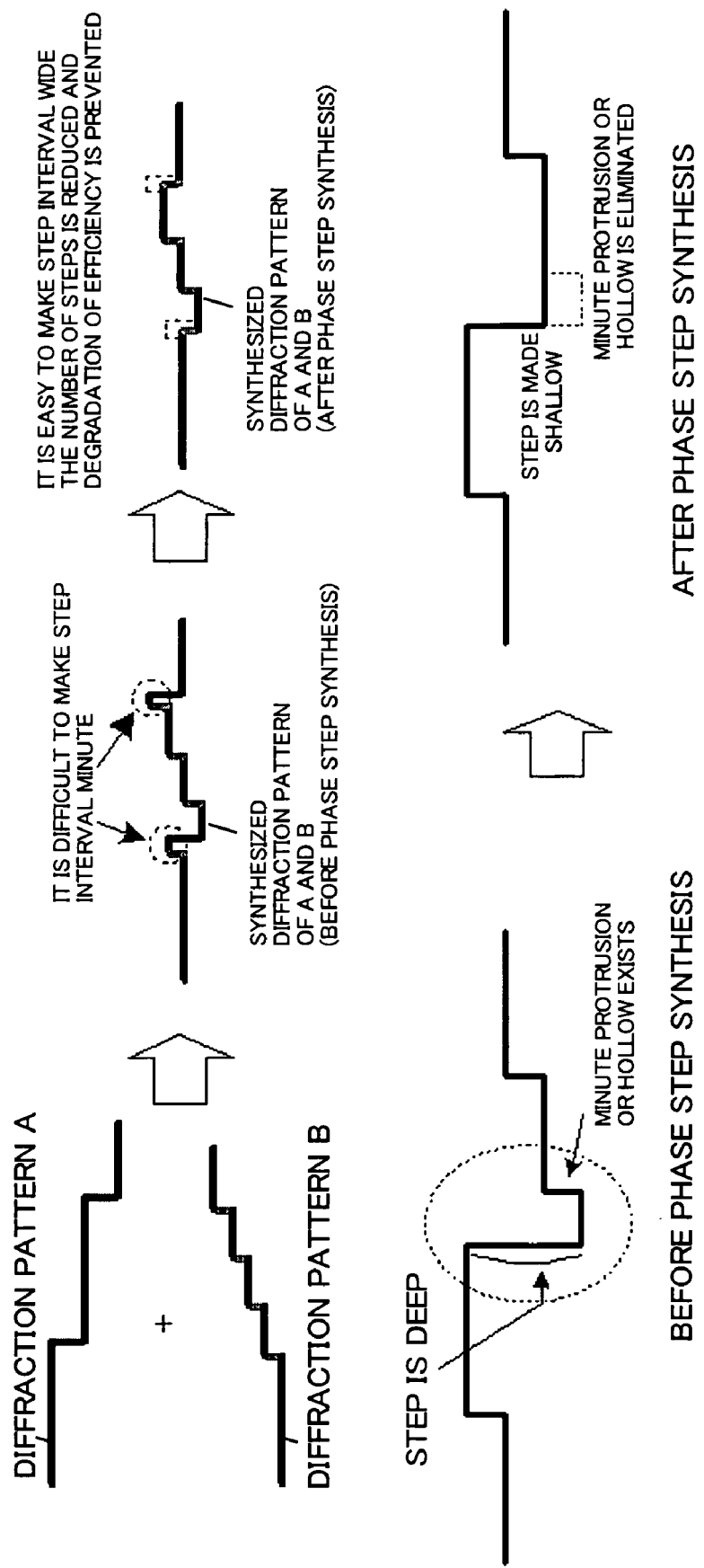
FIG. 11 is a diagram illustrating synthesis of diffractive lens structures in a diffractive optical element according to another embodiment of the present invention.

As shown in FIG. 11, the phase step in a different direction is incorporated into the phase step to be synthesized, such that the number of deep steps can be reduced. In this case, in particular, the loss of the amount of light due to the manufacturing error, in particular, the sag of the wall surface, that is, the step is not perpendicular, is reduced. In addition, as shown in FIG. 11, since a minute protrusion shape or crater is eliminated (a dotted line), the mold processing can be easily performed, mold-release property at the time of molding can be enhanced, and thus molding defectives can be reduced. Further, the life span of the mold can be prevented from being shortened due to a residual material in the minute crater of the mold, such that the diffractive optical element can be maintained with high quality and the costs can be reduced. In this case, at least one phase step having a depth, which is the sum of the step amount of each of the phase steps constituting the first diffractive lens structure and the step amount of each of the phase steps constituting the third diffractive lens structure, exists within the fourth diffraction effective diameter of the diffractive optical element. Further, at least one phase step having a depth, which is the sum of the step amount of each of the phase steps constituting the second diffractive lens structure and the step amount of each of the phase steps constituting the third diffractive lens structure exists within a region between the fourth diffraction effective diameter and the second diffraction effective diameter of the diffractive optical element.

Figure 12:
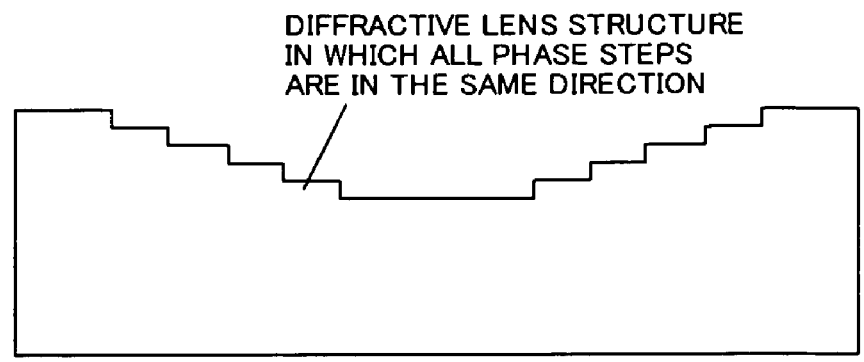
FIG. 12 is a schematic cross-sectional view of a diffractive optical element according to another embodiment of the present invention.

By suitably selecting diffraction orders, which are used for the plurality of diffractive lens structures to be synthesized, as shown in FIG. 12, all the phase steps can be arranged in the same direction on one surface. Accordingly, a mold shape can be simplified, and thus the processing can be easily performed. Further, mold-release property at the time of molding can be enhanced, and thus the molding defectives can be reduced. In addition, the life span of the mold can be prevented from being shortened due to the residual material in the minute crater of the mold. Therefore, the diffractive optical element can be maintained with high quality and the costs can be reduced.

Figure 13:
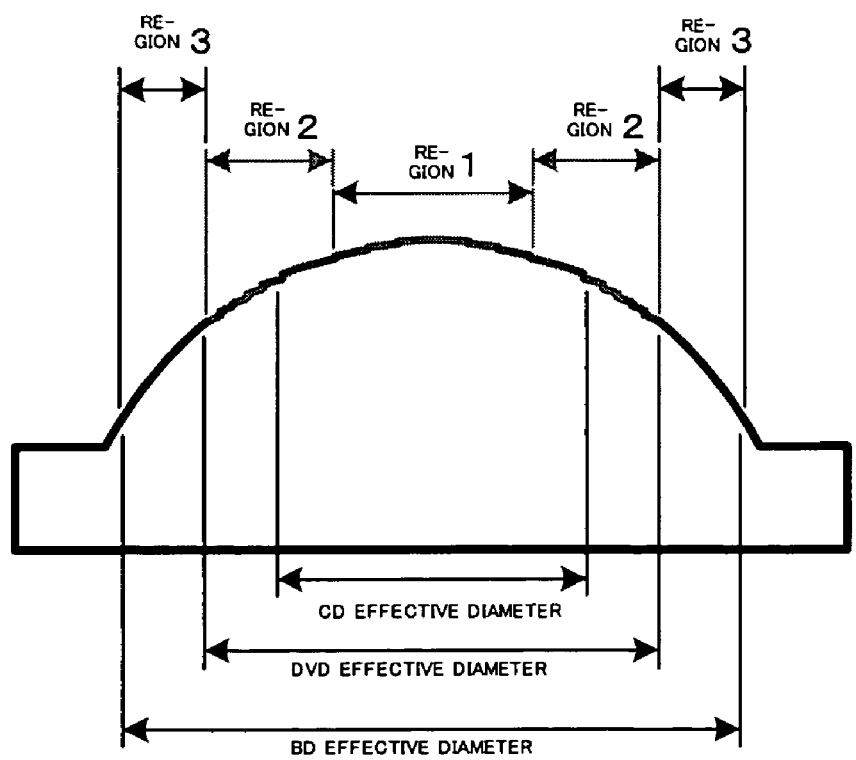
FIG. 13 is a schematic cross-sectional view of a compound objective lens having a diffractive optical element structure according to another embodiment of the present invention.
Figure 14:
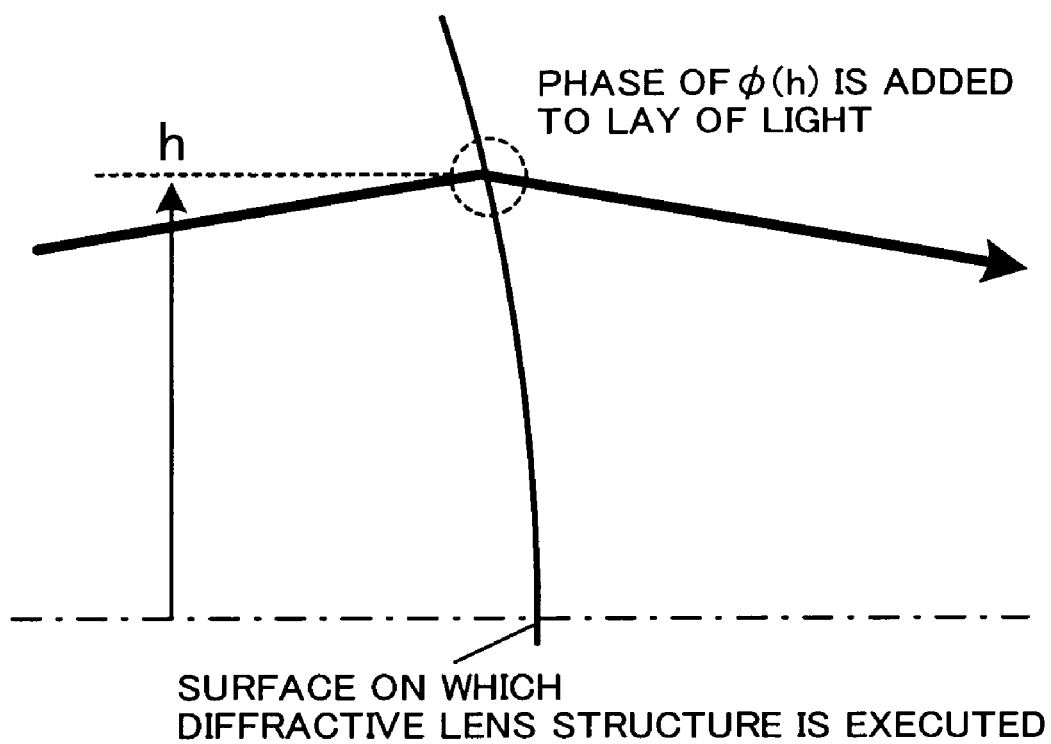
FIG. 14 is a diagram illustrating a phase function method which is used for optical design included in a method of manufacturing a diffractive optical element according to the present invention.

Further, although the diffractive optical element having the diffractive lens structures and the objective lens are described as separate optical elements in the above description, as shown in FIG. 13, the diffractive lens structures may be directly formed in the objective lens. In this case, the number of components can be further reduced.

As shown in Table 2, the combination of the diffraction orders used for the individual regions can be specifically collected.

Table 2 shows the diffraction orders of DVD and CD with respect to the diffraction order of the diffractive lens structure used for BD, the amount of the aberration correction by one phase step (the value obtained by subtracting the difference in optical path length caused by the step from the diffraction order to be used), and diffraction efficiency. Moreover, diffraction efficiency shown in Table 2 is an example in which the diffractive lens structure is blazed such that diffraction efficiency on the laser source for BD becomes one. As for actual design, by changing the phase step amount, design can be achieved in consideration of the balance of diffraction efficiency in BD, DVD, and CD. Accordingly, in an actual diffractive lens manufacture, the combinations A to D of diffraction efficiency of BD, DVD, and CD are not limited to the numerical values of Table 2.

TABLE 2

|    |                              | A    | B    | A    | B    | D    |      | B    | A    | B    | A    | C |
|----|------------------------------|------|------|------|------|------|------|------|------|------|------|---|
| BD | Diffraction Order            | 1    | 2    | 3    | 4    | 5    |      | 6    | 7    | 8    | 9    | 10 |
|    | Diffraction Efficiency       | 1    | 1    | 1    | 1    | 1    |      | 1    | 1    | 1    | 1    | 1 |
| DVD| Diffraction Order            | 1    | 1    | 2    | 2    | 3    |      | 4    | 4    | 5    | 5    | 6 |
|    | Amount of Aberration Correction [λ] | +0.4 | −0.2 | +0.2 | −0.4 | 0 |      | +0.4 | −0.2 | +0.2 | −0.4 | 0 |
|    | Diffraction Efficiency       | 0.573| 0.875| 0.875| 0.573| 1    |      | 0.4  | 0.875| 0.875| 0.573| 1 |
| CD | Diffraction Order            | 1    | 1    | 2    | 2    | 2    | 3    | 3    | 3    | 4    | 4    | 5 |
|    | Amount of Aberration Correction [λ] | +0.5 | 0 | +0.5 | 0 | −0.5 | +0.5 | 0 | −0.5 | 0 | −0.5 | 0 |
|    | Diffraction Efficiency       | 0.405| 1    | 0.405| 1    | 0.405| 0.405| 1   | 0.405| 1    | 0.405| 1 |

*A: The spherical aberration can be corrected for both CD and DVD (used in the region 1).
B: The spherical aberration can be corrected only for DVD (used in the region 2).
C: Only the chromatic aberration can be corrected (used in the region 3).
D: The spherical aberration can be corrected only for CD.

In general, the difference in optical path length $\Delta$ caused by the step formed in the material having the refractive index N satisfies $\Delta=(N-1)d$. Here, d is a distance between the steps, that is, between the surfaces of adjacent steps. Accordingly, the differences in optical path length $\Delta_{BD}$, $\Delta_{DVD}$, and $\Delta_{CD}$ caused by the step d of the diffractive lens structure formed in the materials having the refractive indexes $N_{BD}$, $N_{DVD}$, and $N_{CD}$, respectively, with respect to the wavelengths $\lambda_{BD}$, $\lambda_{DVD}$, and $\lambda_{CD}$ of laser light for BD, DVD, and CD satisfy the following equations:

$$\Delta_{BD}=(N_{BD}-1)d \quad (1)$$

$$\Delta_{DVD}=(N_{DVD}-1)d \quad (2)$$

$$\Delta_{CD}=(N_{CD}-1)d \quad (3)$$

In the equations (1), (2), and (3), since d is a common value of a physical size of one of the phase steps constituting the diffractive lens structure, from the equations (1) and (2), the following relationship is derived:

$$d=\Delta_{BD}/(N_{BD}-1)=\Delta_{DVD}/(N_{DVD}-1)$$

Then, if this equation is further modified, the difference in optical path length $\Delta_{DVD}$ is represented by the following equation:

$$\Delta_{DVD}=(N_{DVD}-1)/(N_{BD}-1)\times\Delta_{BD} \quad (4)$$

Here, when the difference in optical path length caused by one of the phase steps constituting the diffractive lens structure is $F_{BD} \times \lambda_{BD}$ with respect to laser light for BD (where $F_{BD}$ is an integer number and is a diffraction order of diffracted light of laser light for BD), that is, when the following equation satisfies:

$$\Delta_{BD} = F_{BD} \times \lambda_{BD} \qquad (5)$$

diffraction efficiency of $F_{BD}$-order light with respect to laser light for BD becomes 100% in theory. At this time, from the equations (4) and (5), the difference in optical path length $\Delta_{DVD}$ caused by the phase step with respect to the light source for DVD is represented by the following equation:

$$\Delta_{DVD} = (N_{DVD} - 1)/(N_{BD} - 1) \times F_{BD} \times \lambda_{BD}$$

If this equation is modified, the following equation is obtained:

$$\Delta_{DVD} = \{\lambda_{BD}/(N_{BD} - 1) \times (N_{DVD} - 1)/\lambda_{DVD} \times F_{BD}\} \times \lambda_{DVD} \qquad (6)$$

Accordingly, from diffracted light of laser light for DVD to be generated by such a diffractive lens structure, the diffraction order $F_{DVD}$ of diffracted light having the maximum diffraction efficiency is represented by the following equation:

$$F_{DVD} = \text{ROUND}\,[\lambda_{BD}/(N_{BD} - 1) \times (N_{DVD} - 1)/\lambda_{DVD} \times F_{BD}] \qquad (7)$$

Here, ROUND [ ] is a so-called round-off function of rounding off the value in [ ] with no digits after a decimal point so as to obtain an integer number. Accordingly, at the time of design of the diffractive lens structure, when $F_{BD}$-order light of laser light for BD is used, $F_{DVD}$-order light of laser light for DVD satisfying the above-described equation is preferably used. Therefore, at the time of recording and reproducing of DVD, it is desirable to use $F_{DVD}$-order light.

On the other hand, with respect to the light source for CD, from the above-described equations (1) and (3), the following relationship is derived:

$$d = \Delta_{BD}/(N_{BD} - 1) = \Delta_{CD}/(N_{CD} - 1)$$

Then, the difference in optical path length $\Delta_{CD}$ is represented by the following equation:

$$\Delta_{CD} = (N_{CD} - 1)/(N_{BD} - 1) \times \Delta_{BD} \qquad (8)$$

If the equation (5) substitutes with this equation, the difference in optical path length with respect to the light source for CD caused by the phase step is represented by the following equation:

$$\Delta_{CD} = (N_{CD} - 1)/(N_{BD} - 1) \times F_{BD} \times \lambda_{BD}$$

That is, the following equation is obtained:

$$\Delta_{CD} = \{\lambda_{BD}/(N_{BD} - 1) \times (N_{CD} - 1)/\lambda_{CD} \times F_{BD}\} \times \lambda_{CD} \qquad (9)$$

Since the wavelength of the light source for BD and the wavelength of the light source for CD are 408 nm and 780 nm, respectively, and, in general, the shorter the wavelength is, the larger the refractive index of the optical material is, as for the optical material to be generally used, the following relationship is established:

$$\Delta_{CD} \cong 1/2 \times F_{BD} \times \lambda_{CD} \qquad (10)$$

That is, the ratio of the differences in optical path length caused by the phase steps in the light source for BD and the light source for CD substantially becomes 2:1. Accordingly, when the diffraction order $F_{BD}$ of BD is an even number, the difference in optical path length to be generated with respect to the light source for CD also substantially becomes an integer number, and thus the diffractive lens structure, which does not have the aberration correction effect on the light source for CD, can be designed. In this case, the diffraction order $F_{CD}$ of CD is determined by the following equation:

$$F_{CD} = \text{ROUND}\,[\lambda_{BD}/(N_{BD} - 1) \times (N_{CD} - 1)/\lambda_{CD} \times F_{BD}] \qquad (11)$$
$$= F_{BD}/2$$

When the diffraction order $F_{BD}$ of BD is an odd number, the difference in optical path length to be generated with respect to the light source for CD is not an integer number, and thus the diffractive lens structure, which also has the aberration correction effect with respect to CD, can be designed. Since DVD or CD has a laser light transmissive layer thicker than that of BD, the signs of the spherical aberration to be corrected with respect to the objective lens for BD are the same in DVD and CD. Therefore, when the diffractive lens structure has the aberration correction effect on both DVD and CD, the spherical aberration correction effect of the phase step needs to be the same sign. That is, when the diffraction order $F_{DVD}$ used for DVD calculated by the above-described condition satisfies the following condition:

$$F_{DVD} > \lambda_{BD}/(N_{BD}-1) \times (N_{DVD}-1)/\lambda_{DVD} \times F_{BD} \quad (12)$$

the following equation is obtained:

$$F_{DVD} = \text{ROUND } [\lambda_{BD}/(N_{BD}-1) \times (N_{DVD}-1)/\lambda_{DVD} \times F_{BD}] \quad (13)$$

$$= CEIL[\lambda_{BD}/(N_{BD}-1) \times (N_{DVD}-1)/\lambda_{DVD} \times F_{BD}]$$

Here, since the amount of the aberration correction by the phase step with respect to laser light for DVD is positive, $F_{CD}$-order light, which is calculated by the following equation, is used, such that the amount of the aberration correction by the phase step with respect to laser light for CD is positive:

$$F_{CD} = CEIL[\lambda_{BD}/(N_{BD}-1) \times (N_{CD}-1)/\lambda_{CD} \times F_{BD}] \quad (14)$$

Here, CEIL [ ] is a function of rounding-up the value in [ ] with no digits after a decimal point so as to obtain an integer number.

Further, when the diffraction order $F_{DVD}$ satisfies the following condition:

$$F_{DVD} < \lambda_{BD}/(N_{BD}-1) \times (N_{DVD}-1)/\lambda_{DVD} \times F_{BD} \quad (15)$$

the following equation is obtained:

$$F_{DVD} = \text{ROUND } [\lambda_{BD}/(N_{BD}-1) \times (N_{DVD}-1)/\lambda_{DVD} \times F_{BD}] \quad (16)$$

$$= \text{FLOOR } [\lambda_{BD}/(N_{BD}-1) \times (N_{DVD}-1)/\lambda_{DVD} \times F_{BD}]$$

Here, since the amount of the aberration correction by the phase step with respect to laser light for DVD is negative, $F_{CD}$-order light, which is calculated by the following equation, is used, such that the amount of the aberration correction by the phase step with respect to laser light for CD is negative:

$$F_{CD} = \text{FLOOR } [\lambda_{BD}/(N_{BD}-1) \times (N_{CD}-1)/\lambda_{CD} \times F_{BD}] \quad (17)$$

Here, FLOOR [ ] is a function of rounding-down the value in [ ] with no digits after a decimal point so as to obtain an integer number. In this case, there is a case in which the following relationship is not established:

$$F_{CD} = \text{ROUND } [\lambda_{BD}/(N_{BD}-1) \times (N_{CD}-1)/\lambda_{CD} \times F_{BD}] \quad (18)$$

That is, when $F_{BD}$ is an odd number, from diffracted light having the spherical aberration correction effect of the same sign as that of DVD, $F_{CD}$-order light of laser light for CD has the maximum diffraction efficiency, but diffracted light having the maximum diffraction efficiency from diffracted light to be generated is not limited.

In such a manner, the combination of the diffraction orders for BD, DVD, and CD shown in Table 2 can be obtained. As for the eleventh or more diffraction orders of BD, the combination of Table 2 is repeated.

Moreover, in Table 2, a specified design condition, which has diffraction efficiency of 100% in theory with respect to laser light for BD is described such that the optimum combination of the diffraction orders or the amount of the aberration correction by one phase step can be intuitively understood. However, in the actual diffractive lens structure, the amount of the aberration correction is determined only by the distribution of the plurality of phase steps constituting the diffractive lens structure and a macroscopic aspherical shape. Therefore, actually, even when the phase step amount is designed such that diffraction efficiency of laser light for BD is not 100%, if the diffractive lens structure is designed so as not to have the aberration correction effect with respect to BD, each of the phase steps constituting the diffractive lens structure has the amount of the aberration correction shown in Table 2 with respect to laser light for DVD and laser light for CD. That is, when only the phase step amount changes, in Table 2, only diffraction efficiency of BD/DVD/CD changes. Further, the amount of the aberration correction or diffraction efficiency described in Table 2 is a schematic value given as an example so as to determine the diffraction order to be used all the way for reference. The distribution of the phase steps of the actual diffractive lens structure, that is, the height from the optical axis of each of the phase steps, is designed by use of a design method, such as a phase function method or the like. Further, with the relationship between the refractive index of the material to be used and the wavelength, diffraction efficiency of BD/DVD/CD is slightly different. Accordingly, in order to estimate accurate diffraction efficiency, the refractive index property of the material to be actually used needs to be considered.

EXAMPLE 1

In general, a diffractive lens structure used for the optical disc has a plurality of concentric minute phase steps, and controls the wavefront of light by use of diffraction of light by the phase steps. As a method of designing such a diffractive lens structure, the phase function method is used. In the phase function method, an infinitely thin phase object is assumed on a surface where the diffractive lens structure is formed, and the aberration is calculated by adding the phase, which is given through a phase function ψ(h) represented by the following equation, with respect to a light beam passing through the distance (height) h from the optical axis. Here, dor is a diffraction order, and $\lambda_0$ is a designed wavelength.

$$\psi(h) = dor \frac{2\pi}{\lambda_0} \sum_i d_i \cdot h^i$$

Here, the phase function ψ(h) is arranged as the following equation, and Δ(h) is referred to as a diffractive lens function.

$$\Psi(h) = dor \cdot 2\pi \cdot \Delta(h)$$

$$\Delta(h) = \frac{1}{\lambda_0} \sum_i d_i \cdot h^i$$

The height from the optical axis of each of the plurality of phase steps constituting the diffractive lens structure is obtained by calculating h when the diffraction lens function becomes an integer number.

Figure 15:
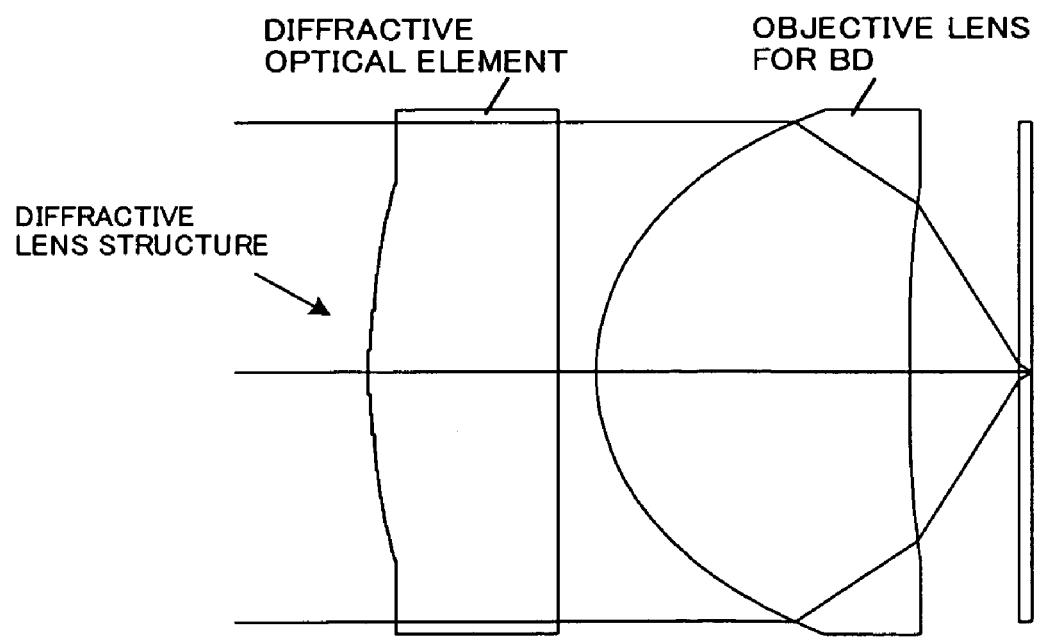
FIG. 15 is a schematic cross-sectional view of an objective lens module having a diffractive optical element according to Example 1 of the present invention and an objective lens.

As shown in FIG. 15, Example 1 has the configuration in which a diffractive optical element for allowing compatible recording and reproducing of BD serving as a first optical information recording medium, DVD serving as a second optical information recording medium, and CD serving as a third optical information recording medium, and a double-sided aspherical lens for BD are incorporated. The configuration of a lens system and the design condition for BD, DVD, and CD are as shown in Table 3.

TABLE 3

|  | BD | DVD | CD |
|---|---|---|---|
| Light Source Wavelength [nm] | 408 | 660 | 780 |
| Magnification | 0 | 0 | 0 |
| Numerical Aperture | 0.85 | 0.65 | 0.50 |
| Effective Diameter [mm] | 4.000 | 3.248 | 2.540 |
| Disc Thickness [mm] | 0.1 | 0.6 | 1.2 |

Figure 16:
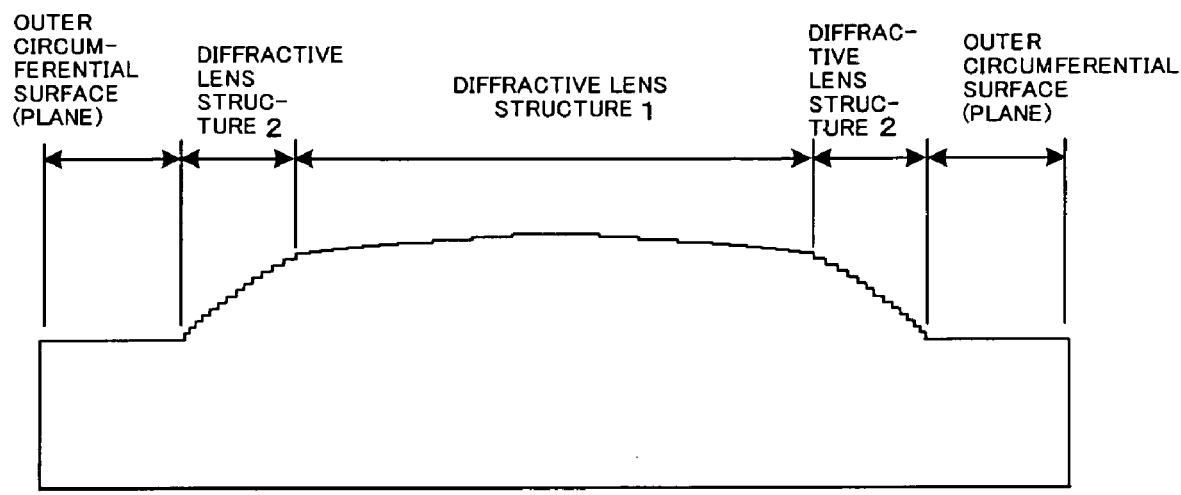
FIG. 16 is a schematic cross-sectional view of the diffractive optical element according to Example 1 of the present invention.
Figure 17:
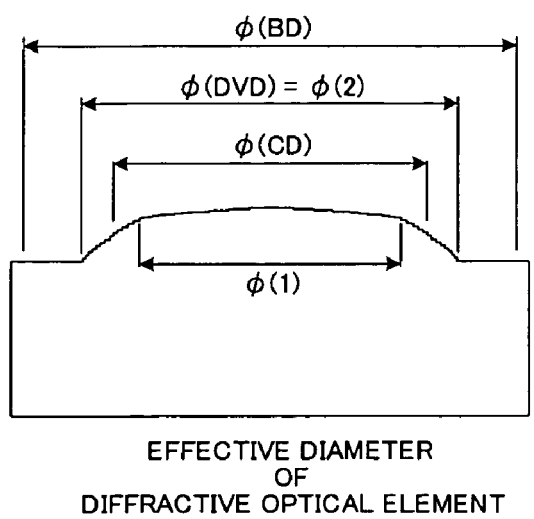
FIG. 17 is a schematic cross-sectional view of the diffractive optical element according to Example 1 of the present embodiment.

In the diffractive optical element of Example 1, as shown in FIG. 16, the diffractive lens structure is formed on one surface, which is a plane. In the diffractive lens structure of Example 1, a plurality of diffractive lens structures having different properties are provided in concentric circle shapes, and have a diffractive lens structure 1 (region 1), a diffractive lens structure 2 (region 2), and an outer circumferential surface (region 3), which is a plane, from an inner circumferential portion.

The aberration caused by the diffractive optical element is the sum of an aberration caused by a macroscopic aspherical shape, in which the diffractive lens structure is formed, and an aberration caused by the phase step formed in the diffractive lens structure. In the present example, since the diffractive optical element and the objective lens for BD are incorporated, the diffractive optical element is designed so as to cancel the aberration caused by the macroscopic aspherical shape and the aberration caused by the phase step each other, such that the aberration in the diffractive optical element does not occur with respect to laser light for BD.

The diameters of outermost phase steps from the phase steps constituting the diffractive lens structure 1 (region 1) and the diffractive lens structure 2 (region 2), which are effective diameters of the individual diffractive lens structures, are referred to as φ(1) and φ(2) (the fourth diffraction effective diameter and the second diffraction effective diameter), respectively. The effective diameter φ(1) (the fourth diffraction effective diameter) of the diffractive lens structure 1 is smaller than the CD effective diameter φ(CD) (the third diffraction effective diameter) in the diffractive optical element, and the effective diameter φ(2) (the second diffraction effective diameter) of the diffractive lens structure 2 is equal to the DVD effective diameter φ(DVD) in the diffractive optical element. The BD effective diameter φ(BD) (the first diffraction effective diameter) is the maximum. The specified numerical values (mm) are shown in Table 4. Moreover, φ(DOE1) represents φ(1), and φ(DOE2) represents φ(2).

TABLE 4

| φ(BD) | φ(DVD) | φ(CD) | φ(DOE1) | φ(DOE2) |
|---|---|---|---|---|
| 4.000 | 3.248 | 2.540 | 2.014 | 3.248 |

In the diffractive lens structure 1 and the diffractive lens structure 2, the diffraction orders to be used in BD are different. The diffractive lens structure 1 has the spherical aberration correction effect on both DVD and CD, and the diffractive lens structure 2 has the spherical aberration correction effect only on DVD and does not have the spherical aberration correction effect on CD.

Hereinafter, the individual diffractive lens structures will be described in detail.

(For Diffractive Lens Structure 1 (Region 1))

Figure 18:
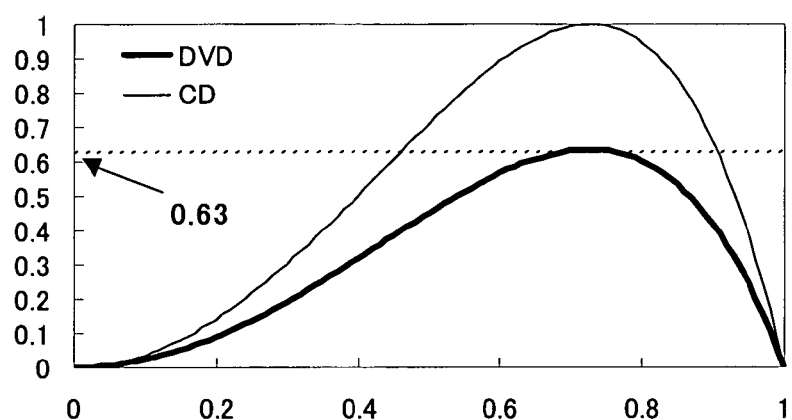
FIG. 18 is a graph showing a spherical aberration of the objective lens, which is used in Example 1 according to the present invention, with respect to DVD and CD.

The diffractive lens structure 1 (region 1) performs the spherical aberration correction on both DVD and CD. The ratio of the spherical aberrations to be generated when DVD and CD are reproduced by the objective lens used in Example 1 is as shown in a spherical aberration graph for DVD and CD of FIG. 18 when the diameters are the same. When the aberration of CD is 1, the aberration of DVD is 0.63. That is, if the ratio of the amounts of the spherical aberration to be corrected by the diffractive lens structure in DVD and CD is 0.63:1≅3:5, the diffractive lens structure can be implemented such that the spherical aberrations in both of them become zero. However, actually, it is impossible to implement the diffractive lens structure having the ratio of the amounts of the spherical aberration correction. In this case, for example, when the magnification of CD changes into a finite system, the spherical aberration can be corrected. However, in case of the CD finite system, it is difficult to allow a light-receiving element, which receives light including a signal from the optical disc, to be shared by BD, DVD, and CD, which causes a problem in that the configuration of a pickup is complicated.

Table 5 shows the diffraction orders of DVD and CD with respect to the diffraction order of the diffractive lens structure to be used for BD, the amount of the aberration correction by the phase step, and diffraction efficiency.

TABLE 5

| | | | | | Structure 1 | | | | | | | |
|---|---|---|---|---|---|---|---|---|---|---|---|---|
| BD | Diffraction Order | 1 | 2 | 3 | 4 | 5 | 6 | 7 | 8 | 9 | 10 |
| | Diffraction Efficiency | 1 | 1 | 1 | 1 | 1 | 1 | 1 | 1 | 1 | 1 |
| DVD | Diffraction Order | 1 | 1 | 2 | 2 | 3 | 4 | 4 | 5 | 5 | 6 |
| | Amount of Aberration Correction [λ] | +0.4 | −0.2 | +0.2 | −0.4 | 0 | +0.4 | −0.2 | +0.2 | −0.4 | 0 |
| | Diffraction Efficiency | 0.573 | 0.875 | 0.875 | 0.573 | 1 | 0.4 | 0.875 | 0.875 | 0.573 | 1 |
| CD | Diffraction Order | 1 | 1 | 2 | 2 | 2 | 3 | 3 | 3 | 4 | 4 | 5 |
| | Amount of Aberration Correction [λ] | +0.5 | 0 | +0.5 | 0 | −0.5 | +0.5 | 0 | −0.5 | 0 | −0.5 | 0 |
| | Diffraction Efficiency | 0.405 | 1 | 0.405 | 1 | 0.405 | 0.405 | 1 | 0.405 | 1 | 0.405 | 1 |

Moreover, diffraction efficiency shown in Table 5 is an example when the diffractive lens structure is blazed such that diffraction efficiency with respect to the light source for BD becomes one. As for actual design, by changing the phase step amount, as described below, design can be achieved in consideration of the balance of diffraction efficiency among BD, DVD, and CD, and thus diffraction efficiency of the diffractive lens structure is not limited to the numerical values of Table 5.

As the diffraction order of DVD, when the diffractive lens structure is blazed such that diffraction efficiency of BD becomes 100%, an order in which the maximum diffraction efficiency with respect to laser light for DVD is obtained is selected.

As the diffraction order of CD, when the spherical aberration correction effect of the same sign as that of DVD is present, a diffraction order in which the maximum diffraction efficiency among them is obtained is selected. The reason that the sign of the amount of the aberration correction of DVD and the sign of the amount of the aberration correction of CD are tuned to each other is because the sign of the spherical aberration to be corrected when the objective lens for BD is used is the same.

The amount of the aberration correction is a value obtained by substituting the phase difference occurring between adjacent orbicular zone-shaped surfaces divided by the phase steps constituting the diffractive lens structure with the difference in optical path length. As for the eleventh or more diffraction order of BD, the combination of Table 5 is repeated.

As apparent from Table 5, since the combination in which the ratio of the aberration correction effects in DVD and CD becomes 3:5 does not exist, a combination of the amounts of the spherical aberration correction close to that combination was used. Then, in consideration of the height of diffraction efficiency of DVD, the combination of a column indicated by Structure 1 of Table 5, that is, third-order diffracted light in BD and second-order diffracted light in DVD and CD, was used.

Hereinafter, the mode of the aberration correction by the diffractive lens structure 1 (region 1) will be described.

Figure 19:
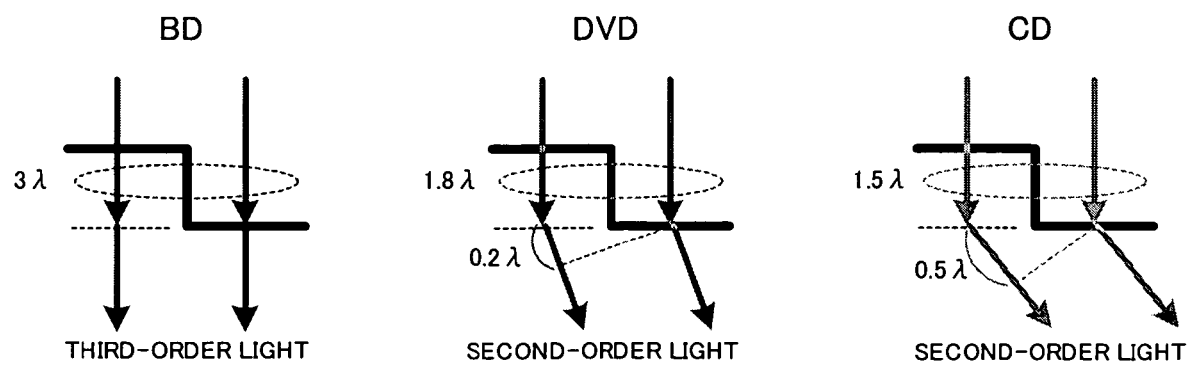
FIG. 19 is a diagram illustrating a phase step constituting a diffractive lens structure 1 of the diffractive optical element according to Example 1 of the present invention and the difference in optical path length of a wavefront passing through the phase step.

The diffractive lens structure 1 uses third-order diffracted light in BD and second-order diffracted light in DVD and CD, and is designed such that the spherical aberration with respect to CD substantially becomes zero, without having influence on the wavefront aberration of BD As shown in FIG. 19, in order to increase diffraction efficiency of third-order diffracted light with respect to laser light for BD, the phase step amount is set such that the difference in optical path length of 3λ is imparted to the wavefront passing through adjacent orbicular zone-shaped surfaces divided by the phase steps.

In the diffractive lens structure set in such a manner, when laser light for DVD is used, as shown in FIG. 19, the wavelength of light extends, and the refractive index of the material is decreased. Accordingly, the difference in optical path length occurring between the adjacent orbicular zone-shaped surfaces becomes about 1.8λ. In general, light progresses only in a direction in which the difference in optical path length between the adjacent surfaces becomes an integer multiple of the wavelength because of its undulate characteristics. Then, second-order diffracted light, to which the difference in optical path length of +0.2λ is further added, and first-order diffracted light, to which the difference in optical path length of −0.8λ is further added, are generated. In the present example, second-order diffracted light is used in DVD, but, in this case, the aberration corresponding to the difference in optical path length +0.2λ is generated by one phase step.

When laser light for CD is used, as shown in FIG. 19, the wavelength of light extends, and the refractive index of the material is decreased. Accordingly, the difference in optical path length occurring between the adjacent orbicular zone-shaped surfaces becomes 1.5λ. In this case, second-order diffracted light, to which the difference in optical path length of +0.5λ is further added, and first-order diffracted light, to which the difference in optical path length of −0.5λ is further added, are generated. In the present example, since second-order diffracted light is used in CD, the aberration corresponding to the difference in optical path length of +0.5λ is generated by one phase step.

As such, the differences in optical path length occurring between the adjacent orbicular zones of the diffractive lens structure is different according to the wavelength, and thus the spherical aberration can be corrected by use of the difference between the added differences in optical path length.

In the present example, in the diffractive lens structure 1 (region 1), the diffractive lens structure is designed such that the spherical aberrations of BD and CD become zero, and thus a slight aberration with respect to DVD remains. By the way, the amount of the spherical aberration caused by the difference in thickness of the transmissive protection layers (substrates) is increased in proportion to the fourth power of the numerical aperture. In view of this situation, if the diffraction effective diameter to be corrected can be made small, and the numerical aperture can be made small, the residual spherical aberration in DVD can be made small. However, when the effective diameter is simply made small, the numerical aperture with respect to CD is insufficient, which causes a trouble. Accordingly, in general, the diffractive lens structure 1 needs to be provided on the entire surface of the effective diameter to be corrected. In contrast, in the present example, at the time of design of the diffractive lens structure 1, the image surface position of laser light for CD is determined according to the conditions described below, and thus the configuration was implemented in which the diffractive lens structure 1 does not need to be provided on the entire surface of the CD effective diameter.

Figure 20:
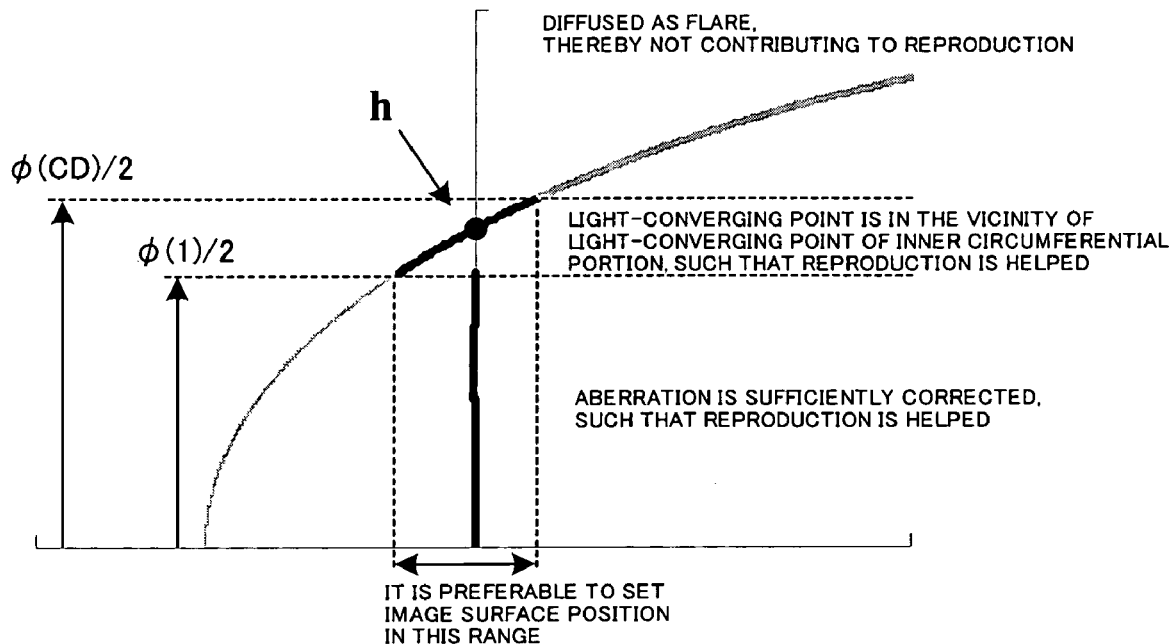
FIG. 20 is a diagram illustrating a graph, which shows a calculation result of a longitudinal spherical aberration for CD using the phase function method when the diffractive optical element according to Example 1 of the present invention and an objective lens for BD are incorporated.

FIG. 20 is a longitudinal spherical aberration diagram for CD when the diffractive optical element according to the present example and the objective lens for BD are incorporated. For comparison, a longitudinal spherical aberration diagram prior to the correction by the diffractive lens structure is shown by a thin and minute line. As apparent from FIG. 20, as for light beams of incident light passing through a region up to a height $\phi(1)/2$ from the optical axis, the spherical aberration is corrected by the diffractive lens structure 1 (region 1), such that the light beams are converged on the image surface. Further, as for light beams passing through from a height $\phi(1)/2$ from the optical axis to the height $\phi(CD)/2$, the aberration correction is not performed, and the spherical aberration remains as it is. In this case, however, since, at the time of design of the diffractive lens structure 1, the image surface position is set to a position at which light beams passing through one point h of that region are converged, the light beams passing through that region are converged on the image surface, even through the slight aberration remains. Light beams passing through a position higher than the height $\phi(CD)/2$ from the optical axis are not converged on the image surface and are diffused as flares.

Figure 21:
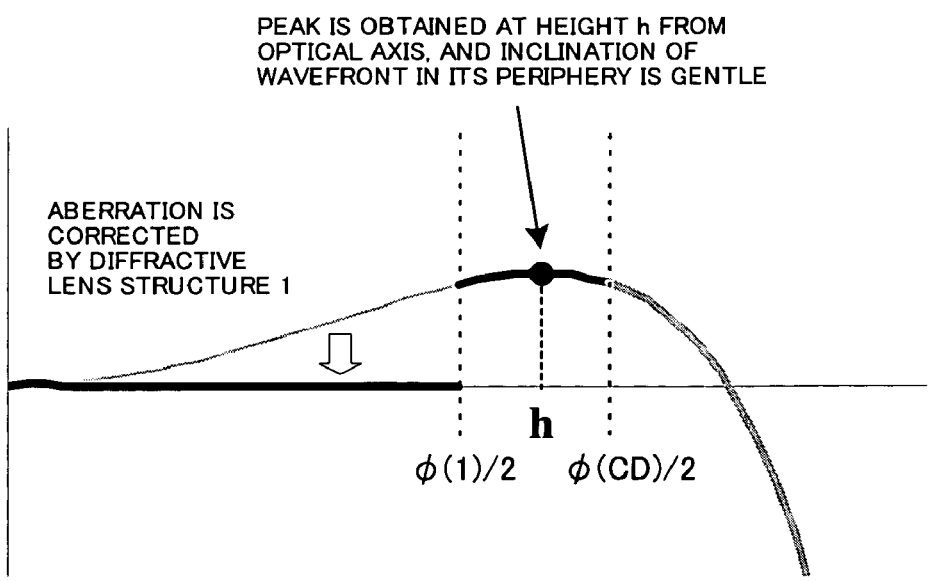
FIG. 21 is a diagram illustrating a graph, which shows a calculation result of a wavefront aberration for CD using the phase function method when the diffractive optical element according to Example 1 of the present invention and an objective lens for BD are incorporated.

FIG. 21 is a wavefront aberration diagram of a lens, which shows longitudinal spherical aberration characteristics, like FIG. 20. The wavefront of a region up to the height $\phi(1)/2$ from the optical axis favorably has a flat wavefront shape since the spherical aberration is corrected by the diffractive lens structure 1 (region 1). On the other hand, the wavefront passing through from the height $\phi(1)/2$ from the optical axis to the height $\phi(CD)/2$ passes through the diffractive lens structure 2 (region 2), but, since the diffractive lens structure 2 does not have the spherical aberration correction effect with respect to laser light for CD, in that wavefront, the spherical aberration remains as it is. However, at a position where the longitudinal spherical aberration becomes zero, the wavefront takes the maximum value, and then the inclination of its periphery is gentle, such that that wavefront contributes to light-convergence. On the other hand, the wavefront outside the height $\phi(CD)/2$ from the optical axis corresponding to the CD effective diameter has a steep inclination, and does not contribute to light-convergence.

By designing the diffractive lens structure 1 (region 1) having such a configuration, the effective diameter of the diffractive lens structure 1 can be limited to the minimum. Further, when the diffractive lens structure 1 optimal for BD and CD is used, the residual spherical aberration in DVD can be reduced. Actually, the effective diameter $\phi(1)$ of the diffractive lens structure 1 is about 79% of the CD effective diameter $\phi(CD)$, and thus the residual spherical aberration amount can be reduced up to about 39% as compared with the case in which the diffractive lens structure 1 is provided on the entire surface of the effective diameter.

Figure 22:
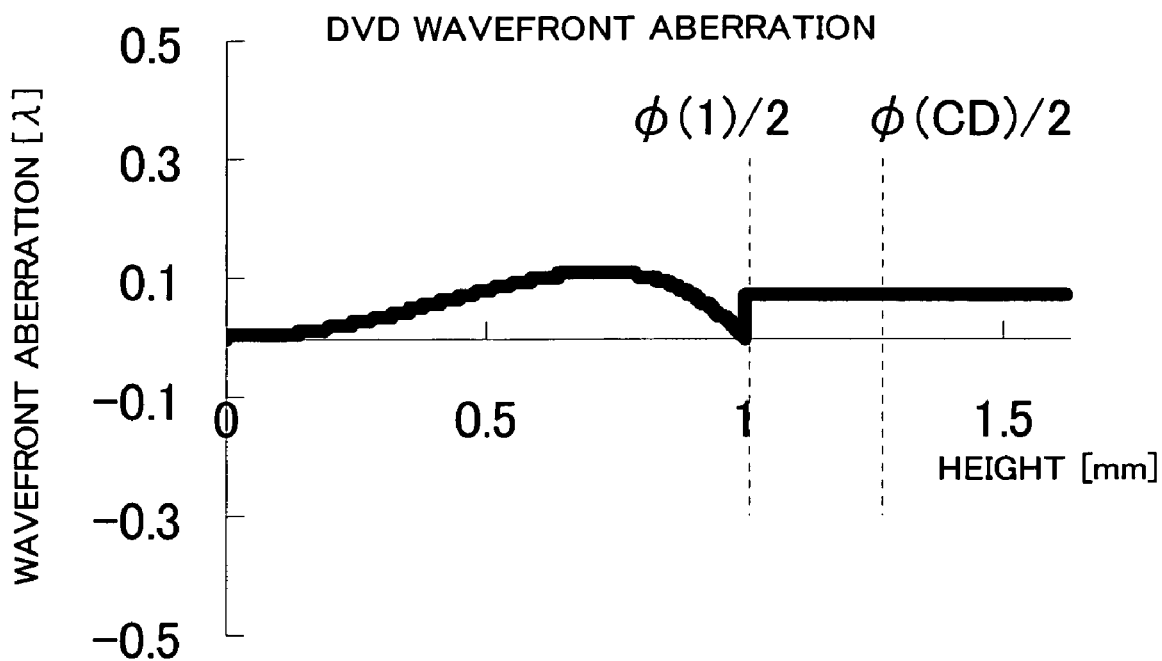
FIG. 22 is a diagram illustrating a graph, which shows a calculation result of a wavefront aberration shape for DVD using the phase function method when the diffractive optical element according to Example 1 of the present invention and an objective lens for BD are incorporated.
Figure 23:
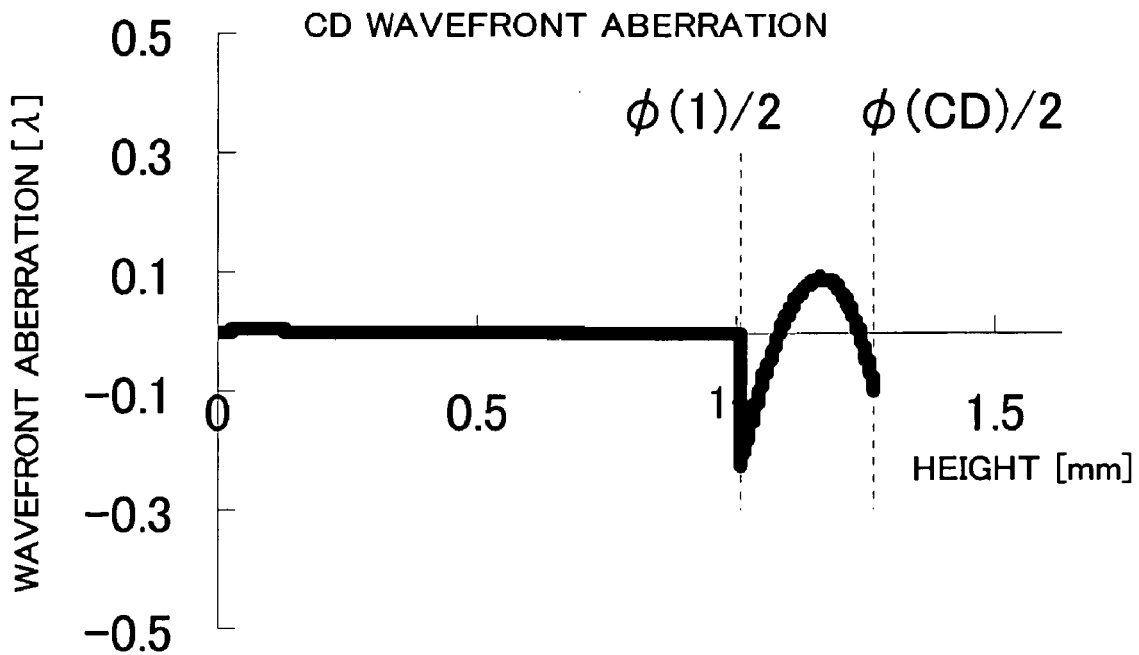
FIG. 23 is a diagram illustrating a graph, which shows a calculation result of a wavefront aberration shape for CD using the phase function method when the diffractive optical element according to Example 1 of the present invention and an objective lens for BD are incorporated.

FIGS. 22 and 23 show the calculation results of the wavefront aberration shapes of DVD and CD by use of the phase function method when the diffractive optical element of Example 1 and the objective lens for BD are incorporated. As for the aberration of DVD of FIG. 22, the residual spherical aberration within the effective diameter $\phi(1)$ of the diffractive lens structure 1 (region 1) itself is small, the ratio of the diffractive lens structure 1 occupying the DVD effective diameter is small, and the aberration of the peripheral portion is sufficiently corrected by the diffractive lens structure 2 (region 2). Therefore, the wavefront aberration is suppressed up to 0.021 λ rms as a whole. On the other hand, the residual aberration of CD of FIG. 23 becomes 0.052 λ rms, and the aberration value is suppressed less than a Marechal's limitation, but seems to be slightly large. However, at the time of a high-order aberration in which the wavefront is partially curved in such a manner, there is little influence, as compared with a low-order aberration of the same amount.

Moreover, in case of calculating the aberration using phase function coefficients suggested as the example, the phase shift between the wavefront inside the height $\phi(1)/2$ and the wavefront outside the height $\phi(1)/2$ occurs. However, in case of acquiring an actual shape from the diffraction lens function, the value of a constant term d0 of the phase function or the step amount in the vicinity of a boundary portion is fine-adjusted, such that the phase shift is corrected. Therefore, it does not matter. In consideration of such correction, the calculation of the aberration is performed in a state in which the constant term of the phase function d0 is provisionally set to 1.4563050E-05 at the time of DVD and −8.715200E-04 at the time of CD, and the phases of the individual regions are tuned to one another. In case of acquiring the shape of the actual diffractive lens structure, the values of d0 are not used. In the examples described below, in case of calculating the aberration in the phase function method, a provisional value of d0 is suitably set such that the phase sift between the individual regions is not generated.

Subsequently, the process of acquiring the shape of the actual diffractive lens structure 1 from the diffractive lens function of the diffractive lens structure 1 (region 1) will be described.

Figure 24:
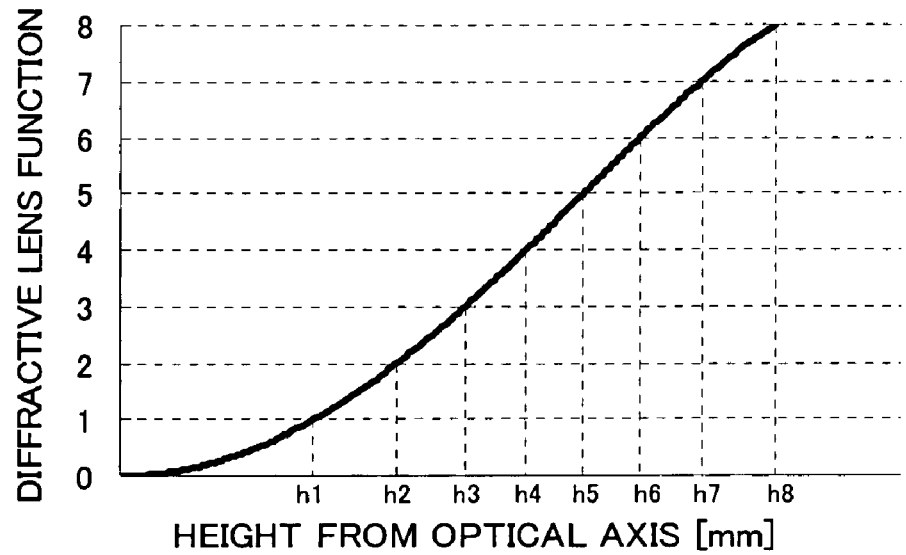
FIG. 24 is a graph of a diffractive lens function of the diffractive lens structure 1 with respect to a height from the optical axis in the diffractive optical element according to Example 1 of the present invention.
Figure 25:
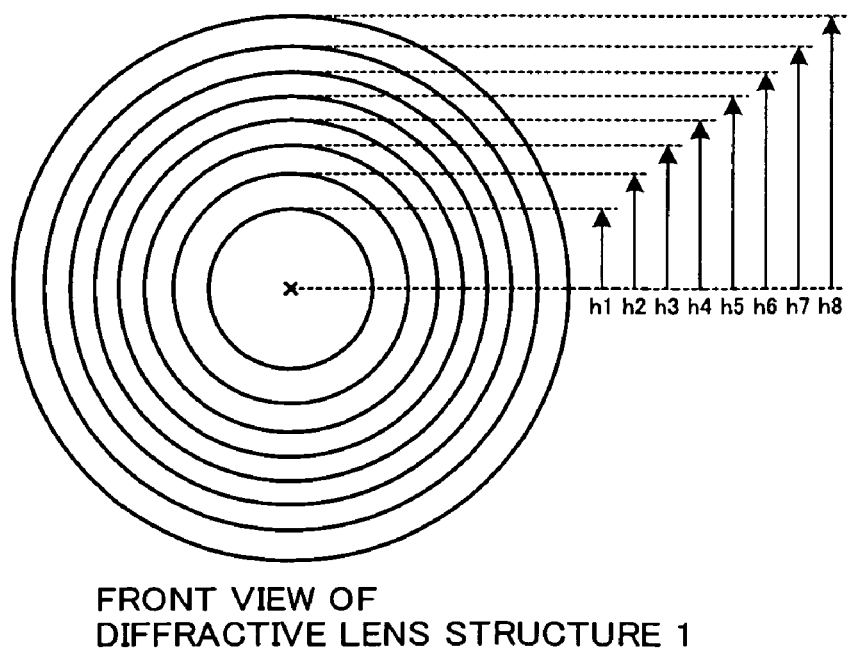
FIG. 25 is a front view of the diffractive lens structure 1 in the diffractive optical element according to Example 1 of the present invention as viewed on the optical axis.

FIG. 24 is a graph of the diffractive lens function of the diffractive lens structure 1. As apparent from FIG. 24, the diffractive lens function is monotonically increased inside the effective diameter of the diffractive lens structure 1. As shown in FIGS. 24 and 25, the heights from the optical axis of the plurality of phase steps constituting the diffractive lens structure 1 can be calculated as the height h1 to h8 from the optical axis at which such a diffractive lens function becomes an integer number. Moreover, the height h8 from the optical axis becomes the outermost phase step of the diffractive lens structure 1, and thus the height h8 from the optical axis becomes the height $\phi(1)/2$ from the optical axis corresponding to the effective diameter.

Next, design of a microscopic shape of a diffractive lens structure will be described.

The diffractive lens function of the diffractive lens structure 1 (region 1) is monotonically increased, and thus the diffractive lens structure 1 is blazed from the macroscopic spherical shape in a direction to be made thicker as it goes from the inner circumferential portion of the diffractive lens structure toward the outer circumferential portion. Further, at the heights h1 to h8 from the optical axis where the diffractive lens function is the integer number, the steps are formed in a direction in which the lens is to be made thinner.

Figure 26:
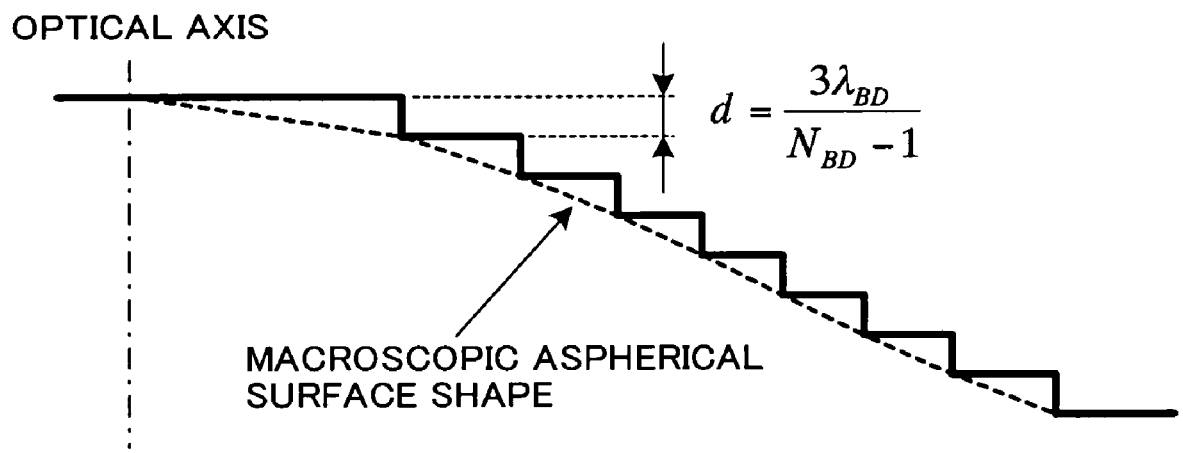
FIG. 26 is a cross-sectional view of a diffractive lens structure when the diffractive lens structure 1 in the diffractive optical element according to Example 1 of the present invention is manufactured such that diffraction efficiency of laser light for BD is 100%.

With respect to laser light for BD, it is designed such that the aberration caused by the macroscopic aspherical shape of the diffractive lens structure and the aberration caused by the phase step cancel each other. Accordingly, as shown in FIG. 26, the steps for forming h1 to h8 are set such that the difference in optical path length by three times as much as the wavelength of laser light for BD is generated. The phase step amount (depth) d satisfies the condition $d=3\lambda_{BD}/(N_{BD}-1)$ (where $\lambda_{BD}$ represents the wavelength of laser light for BD, and $N_{BD}$ represents the number of steps). In this case, all the orbicular zone-shaped surfaces divided by the phase steps are planes perpendicular to the optical axis. Further, in such a case, diffraction efficiency of third-order diffracted light with respect to laser light for BD becomes 100% in theory.

In such a case, however, diffraction efficiency of second-order diffracted light with respect to laser light for CD is only about 40% and first-order diffracted light, which becomes stray light, is about 40%, so it is not preferable.

Figure 27:
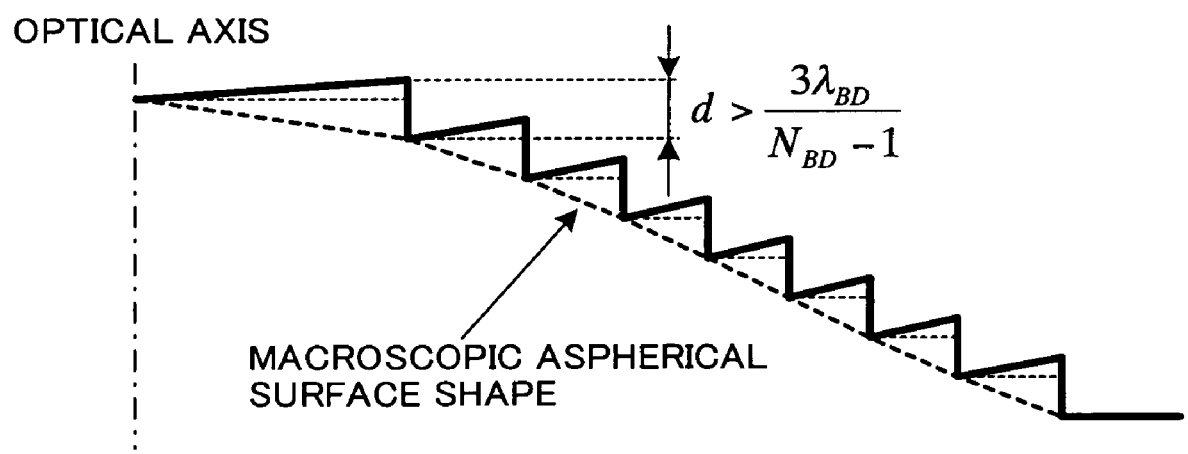
FIG. 27 is a cross-sectional view of a diffractive lens structure according to another example when the diffractive lens structure 1 in the diffractive optical element according to Example 1 of the present invention is manufactured in consideration of uniformity of diffraction efficiency of laser light for BD and laser light for CD.

By the way, the aberration correction characteristic of the diffractive lens structure is determined only by the macroscopic aspherical shape of the diffractive lens structure and the height from the optical axis where the phase step is formed. Then, by changing only the phase step amount, not the macroscopic aspherical shape and the heights of the phase steps from the optical axis, diffraction efficiency can be adjusted, without changing the characteristic as the lens. In addition, in the example, in order to reduce stray light while enhancing diffraction efficiency of CD, the value of the phase step d is made deeper than the depth given by an equation of FIG. 26. FIG. 27 shows a cross-sectional view of the structure of the example. Accordingly, diffraction efficiency of second-order diffracted light with respect to laser light for CD is enhanced, but diffraction efficiency of third-order diffracted light of laser light for BD is decreased, and thus, in Example 1, the step amount was determined in consideration of the balance of diffraction efficiency of both CD and BD. As such, when the step amount is changed, the orbicular zone-shaped surfaces divided by the phase steps are not the planes perpendicular to the optical axis, but conical surfaces or aspherical surfaces, which are inclined such that only the step amount changes while the macroscopic aspherical shape and the radii of the phase steps do not change. In the present example, the orbicular zone-shaped surfaces are shown as the aspherical surfaces.

As described above, it has been studied that the effective diameter φ(1) of the diffractive lens structure 1 is made smaller than the CD effective diameter φ(CD) in order to reduce the residual spherical aberration in DVD. In this case, as described above, when diffraction efficiency of BD in the diffractive lens structure 1 is decreased, the occupied ratio of the diffractive lens structure 1 is made small, such that the reduction in diffraction efficiency is suppressed small as a whole. That is, by making the effective diameter φ(1) of the diffractive lens structure 1 small, secondarily, the reduction of light utilization efficiency of BD caused by the balance of diffraction efficiency could be suppressed.

(For Diffractive Lens Structure 2 (Region 2))

In the diffractive lens structure 2 (region 2), by using the combination of a column indicated by structure 2 of Table 6 described below, second-order diffracted light in BD, and first-order diffracted light in DVD and CD, design is implemented such that the spherical aberration with respect to DVD substantially becomes zero, without having influence on the wavefront aberrations of BD and CD.

TABLE 6

|  |  |  | Structure 2 |  |  |  |  |  |  |  |
|---|---|---|---|---|---|---|---|---|---|---|
| BD | Diffraction Order | 1 | 2 | 3 | 4 | 5 | 6 | 7 | 8 | 9 | 10 |
|  | Diffraction Efficiency | 1 | 1 | 1 | 1 | 1 | 1 | 1 | 1 | 1 | 1 |
| DVD | Diffraction Order | 1 | 1 | 2 | 2 | 3 | 4 | 4 | 5 | 5 | 6 |
|  | Amount of Aberration Correction [λ] | +0.4 | −0.2 | +0.2 | −0.4 | 0 | +0.4 | −0.2 | +0.2 | −0.4 | 0 |
|  | Diffraction Efficiency | 0.573 | 0.875 | 0.875 | 0.573 | 1 | 0.4 | 0.875 | 0.875 | 0.573 | 1 |
| CD | Diffraction Order | 1 | 1 | 2 | 2 | 2 | 3 | 3 | 3 | 4 | 4 | 5 |
|  | Amount of Aberration Correction [λ] | +0.5 | 0 | +0.5 | 0 | −0.5 | +0.5 | 0 | −0.5 | 0 | −0.5 | 0 |
|  | Diffraction Efficiency | 0.405 | 1 | 0.405 | 1 | 0.405 | 0.405 | 1 | 0.405 | 1 | 0.405 | 1 |

Hereinafter, the mode of the aberration correction in the diffractive lens structure 2 (region 2) will be described.

Figure 28:
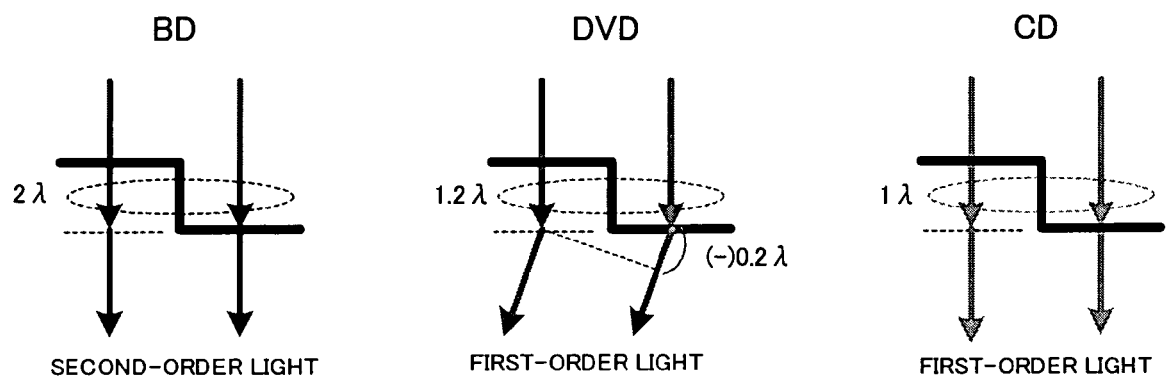
FIG. 28 is a diagram illustrating a phase step constituting a diffractive lens structure 2 in the diffractive optical element according to Example 1 of the present invention and the difference in optical path length of a wavefront passing through the phase step.

As shown in FIG. 28, in order to increase diffraction efficiency of second-order diffracted light with respect to laser light for BD, the phase step amount is set such that the difference in optical path length of 2λ is given to the wavefront passing through adjacent orbicular zone-shaped surfaces, which are divided by the phase steps.

In the diffractive lens structure set in such a manner, when laser light for DVD is used, the wavelength of light extends and the refractive index of the material is decreased, such that the difference in optical path length occurring between adjacent orbicular zone-shaped surfaces becomes about 1.2λ, as shown in FIG. 28. In general, light progresses only in a direction in which the difference in optical path length between the adjacent surfaces becomes an integer multiple of the wavelength because of its undulate characteristics. Then, second-order diffracted light, to which the difference in optical path length of +0.8λ is further added, and first-order diffracted light, to which the difference in optical path length of −0.2λ is further added, are generated. In the present example, first-order diffracted light is used in DVD, but, in this case, the aberration corresponding to the difference in optical path length −0.2λ is generated by one phase step.

When laser light for CD is used, as shown in FIG. 28, the wavelength of light extends and the refractive index of the material is decreased. Accordingly, the difference in optical path length occurring between the adjacent orbicular zone-shaped surfaces becomes about 1λ. In this case, since the difference in optical path length occurring between the adjacent orbicular zones is an integer multiple of the wavelength, first-order diffracted light is generated, while the difference in optical path length is not further added.

As such, in the diffractive lens structure 2 (region 2), the difference in optical path length is added only to laser light for DVD by the phase step, and the difference in optical path length is not newly added to laser light for BD and laser light for CD. That is, the diffractive lens structure 2 can have the aberration correction effect only on laser light for DVD.

At the time of design of the diffractive lens structure 2 (region 2), the best image surface position of laser light for DVD is set to the best image surface position of light passing through inside the effective diameter of the diffractive lens structure 1 (region 1).

Figure 29:
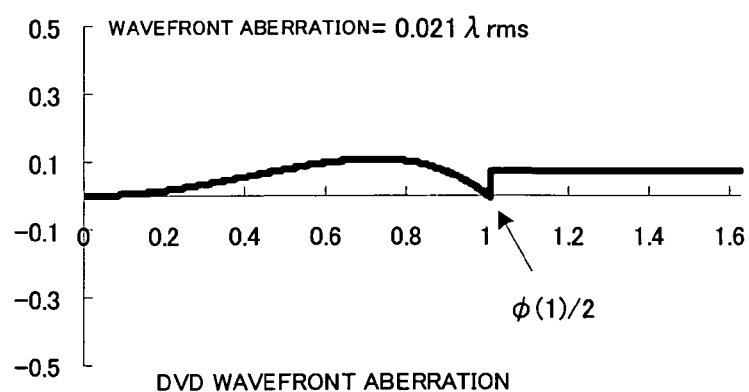
FIG. 29 is a graph showing a calculation result of a wavefront aberration for DVD of an objective lens module, which uses the diffractive optical element according to Example 1 of the present invention, by use of the phase function method.

FIG. 29 shows the wavefront aberration of DVD when the diffractive lens structure 2 (region 2) is designed on the basis of the above-described conditions. The wavefront passing through inside the height $\phi(1)/2$ from the optical axis passes through the diffractive lens structure 1 (region 1), and the spherical aberration remains by a little amount. In the height $\phi(1)/2$ to the height $\phi(2)/2$, the spherical aberration is completely corrected by the diffractive lens structure 2 (region 2), and thus a favorably flat wavefront shape is obtained. Moreover, in case of calculating the aberration by use of the phase function coefficients suggested as the example, the phase shift between the wavefront inside the height $\phi(1)/2$ and the wavefront outside the height $\phi(1)/2$ occurs, but, in case of acquiring an actual shape from the diffractive lens function, the phase shift can be corrected by fine-adjusting the value of the constant term of the phase function or the step amount in the vicinity of the boundary portion. Therefore, it does not matter. In consideration of such correction, the aberration calculation of FIG. 29 is performed in a state in which the constant term d0 of the phase function of the diffractive lens structure 1 (region 1) is provisionally set to 1.4563050E-05. In case of acquiring the shape of the actual diffractive lens structure, these values of d0 are not used.

Subsequently, the process of acquiring the shape of the actual diffractive lens structure 2 from the diffractive lens function of the diffractive lens structure 2 (region 2) will be described.

Figure 30:
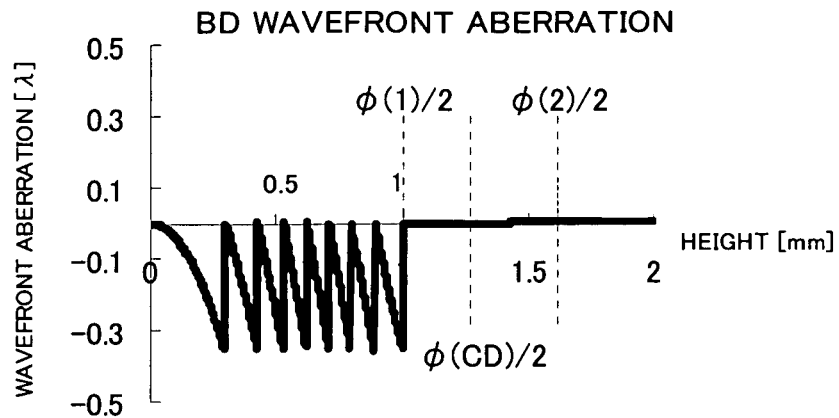
FIG. 30 is a graph showing a calculation result of a wavefront aberration for BD of an objective lens module, which uses the diffractive optical element according to Example 1 of the present invention, by data having a provisional shape.
Figure 31:
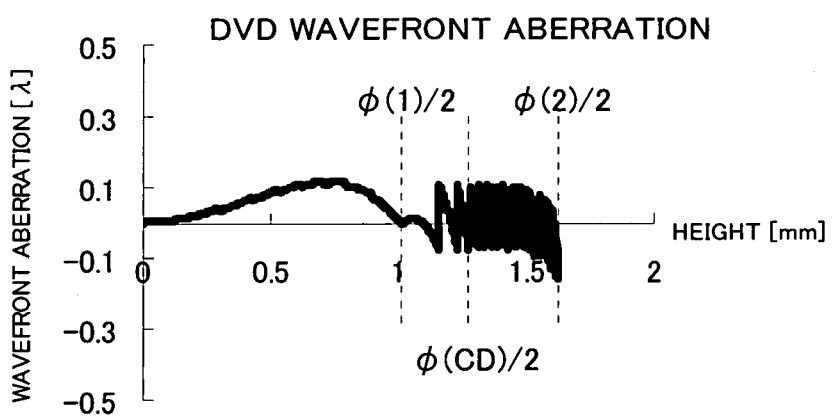
FIG. 31 is a graph showing a calculation result of a wavefront aberration for DVD of an objective lens module, which uses the diffractive optical element according to Example 1 of the present invention, by data having a provisional shape.
Figure 32:
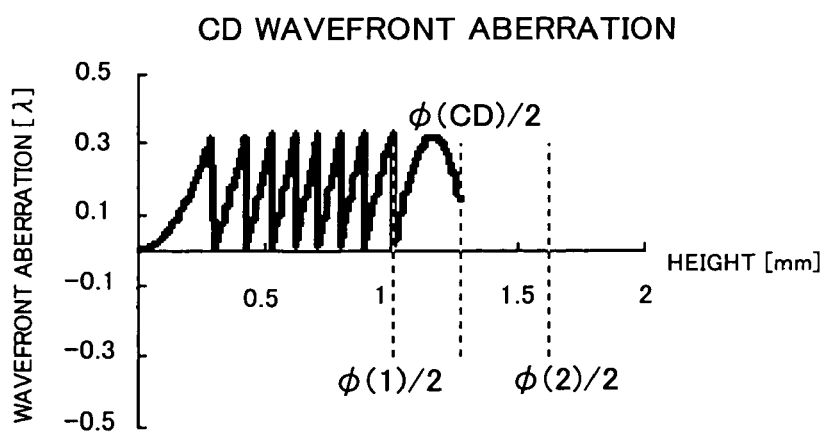
FIG. 32 is a graph showing a calculation result of a wavefront aberration for CD of an objective lens module, which uses the diffractive optical element according to Example 1 of the present invention, by data having a provisional shape.

The shape of the diffractive lens structure 2 can be acquired, like the diffractive lens structure 1 (region 1). In this case, however, the shape needs to be designed while its phase is corrected to tune to the wavefront passing through the diffractive lens structure 1. First, the provisional shapes of the diffractive lens structure 1 and the diffractive lens structure 2 are acquired by use of the macroscopic aspherical shapes and the phase function coefficients suggested as the example. After the shapes are acquired in such a manner, the wavefront aberrations of BD, DVD, and CD are calculated, and the calculation results are shown in FIGS. 30, 31, and 32, respectively. Moreover, the wavefront aberrations of FIGS. 30, 31, and 32 are described by calculating the wavefront aberrations of the actual shapes and by deducing an optically negligible shift amount of an integer multiple of the wavelength.

In the wavefront aberrations of BD and CD, a serrate wave-shaped wavefront aberration exists within the effective diameter $\phi(1)$ of the diffractive lens structure 1 (region 1). This is because, in consideration of the balance of diffraction efficiency of BD and CD, the difference in optical path length caused by the phase step is slightly shifted from the integer multiple of the wavelength, and the shift amount appears as the step of the wavefront aberration. Similarly, in the wavefront aberration of DVD, a serrate wave-shaped wavefront aberration exists in the wavefront passing through between the height $\phi(1)/2$ from the optical axis and the height $\phi(2)/2$ to which the diffractive lens structure 2 (region 2) is provided, but, the difference in optical path length caused by the phase step with respect to laser light for DVD is 1.2λ, which is slightly more than 1λ, such that the shift amount appears as the step of the wavefront aberration.

Actually, even when such a serrate wave-shaped wavefront aberration exists, a bad influence on a spot shape almost not exists, and unnecessary diffracted light is generated a little, such that it does not matter. However, in view of phase tuning of the individual regions, attention needs to be paid. That is, in order to tune the phase with the serrate wave-shaped wavefront, the phase needs to be tuned to the average value of the wavefront.

Figure 33:
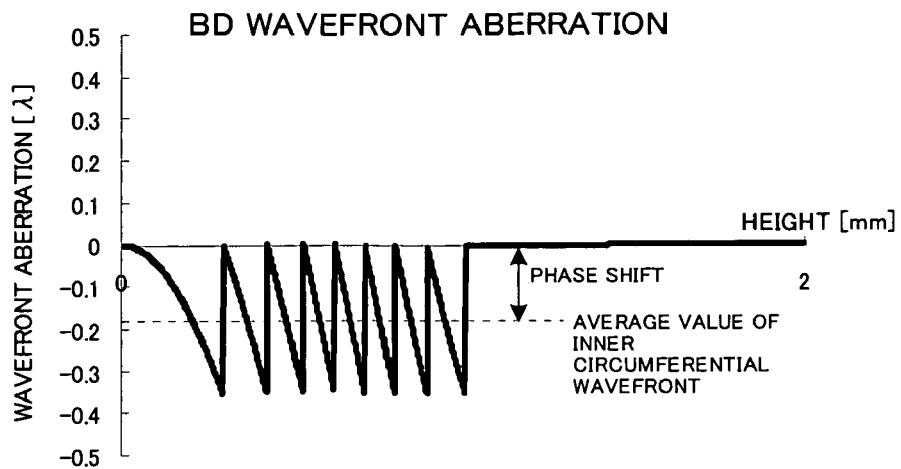
FIG. 33 is a graph showing a calculation result of a wavefront aberration for BD of an objective lens module, which uses the diffractive optical element according to Example 1 of the present invention, by data having a provisional shape.

As shown in FIG. 33, when viewing the wavefront aberration of BD, it is understood that the phase shift between the average value of the serrate wave-shaped wavefront in the inner circumferential portion and the wavefront in the outer circumferential portion occurs.

Figure 34:
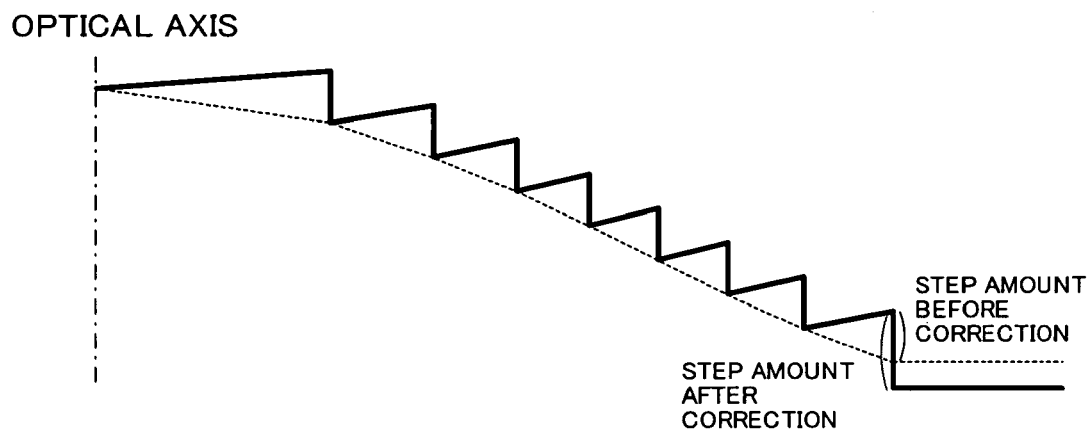
FIG. 34 is a cross-sectional view of a diffractive lens structure when a phase shift is adjusted by the amount of a phase step at a boundary of regions in the diffractive optical element according to Example 1 of the present invention.
Figure 35:
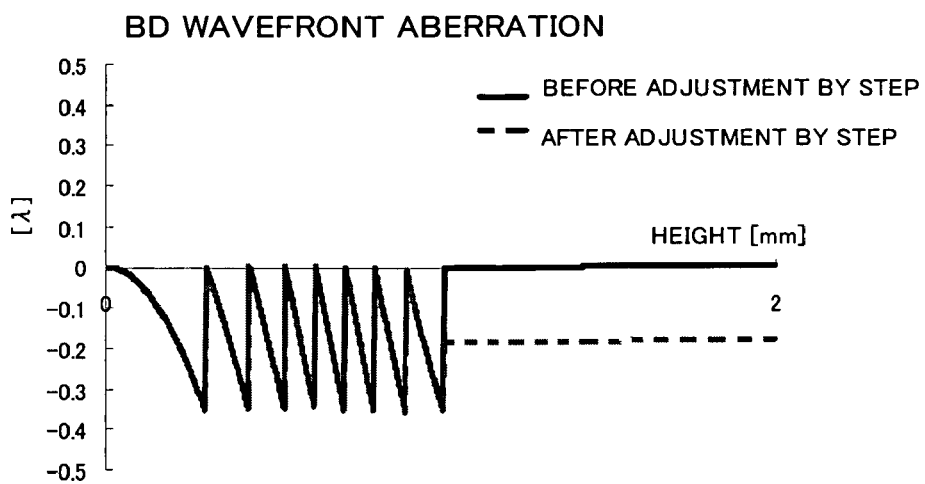
FIG. 35 is a graph showing a wavefront aberration for BD of an objective lens module when a phase shift is adjusted by the amount of a phase step at a boundary of regions in the diffractive optical element according to Example 1 of the present invention.

Such a phase shift can be tuned by adjusting the phase step amount in the vicinity of the boundary portion. In a state in which the value of the constant term d0 of the diffractive lens function is maintained with zero, as shown in FIG. 34, the eighth phase step amount from the inner circumference of the structure was corrected by changing from 0.002515 mm to 0.003875 mm (dotted line). Further, as shown in FIG. 35, the wavefront of the outer circumference was shifted in a negative direction (dotted line).

Figure 36:
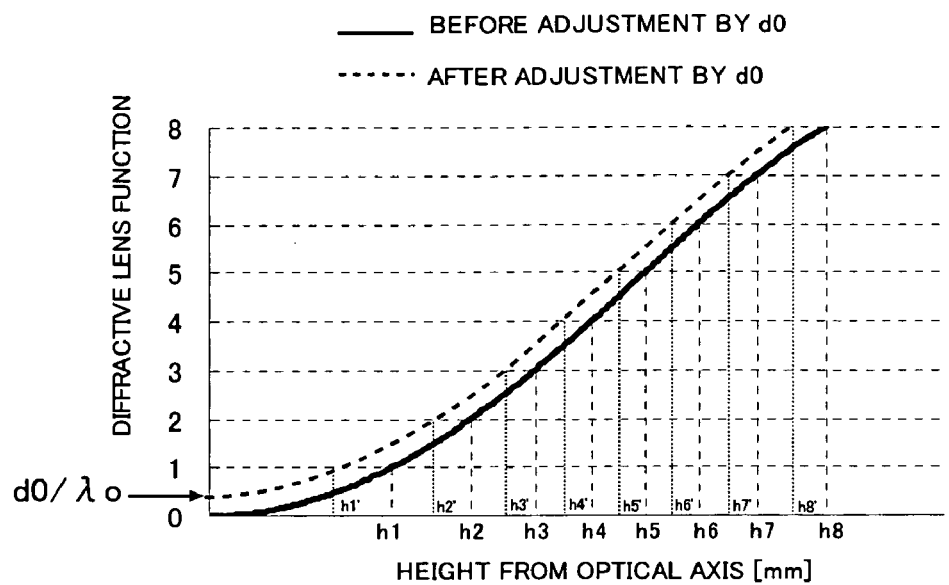
FIG. 36 is a graph of a diffractive lens function of the diffractive lens structure 1 for the height from the optical axis when a phase shift is adjusted by the value of a constant term d0 of the diffractive lens function of the diffractive optical element according to Example 1 of the present invention.
Figure 37:
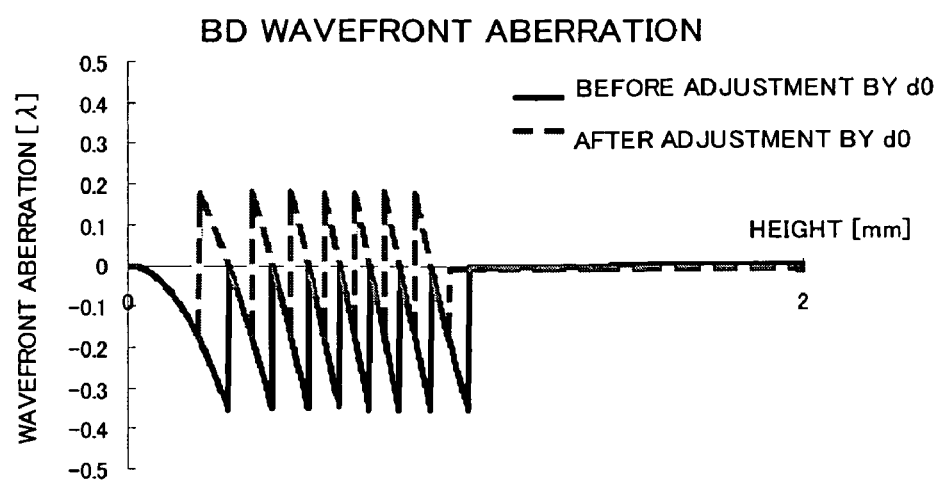
FIG. 37 is a graph showing a wavefront aberration for BD of an objective lens module when a phase shift is adjusted by the value of a constant term d0 of the diffractive lens function of the diffractive lens structure 1 in the diffractive optical element according to Example 1 of the present invention.

Moreover, the phase shift may be tuned by adjusting the value of the constant term d0 of the diffractive lens function (dotted line), as shown in FIG. 36, or may be tuned by shifting the entire phase step to the inner circumference or the outer circumference (dotted line), as shown in FIG. 37.

Table 7 is paraxial data of a specified design result of Example 1.

TABLE 7

| Surface Number | Radius of Curvature | Central Thickness | | | Refractive Index | | |
|---|---|---|---|---|---|---|---|
| | | BD | DVD | CD | BD | DVD | CD |
| 1 | Diffractive Lens Structure | 1.5000000 | ← | ← | 1.5447820 | 1.5228720 | 1.5197300 |
| 2 | ∞ | 0.3000000 | ← | ← | 1.0000000 | ← | ← |
| 3 | 1.7050000 | 2.5000000 | ← | ← | 1.7093690 | 1.6663360 | 1.6594900 |
| 4 | −31.8720000 | 0.8599100 | 0.6803230 | 0.3518650 | 1.0000000 | ← | ← |
| 5 | ∞ | 0.1000000 | 0.6000000 | 1.2000000 | 1.6180700 | 1.5796560 | 1.5740810 |
| 6 | ∞ | 0.0000000 | ← | ← | 1.0000000 | ← | ← |

Figure 38:
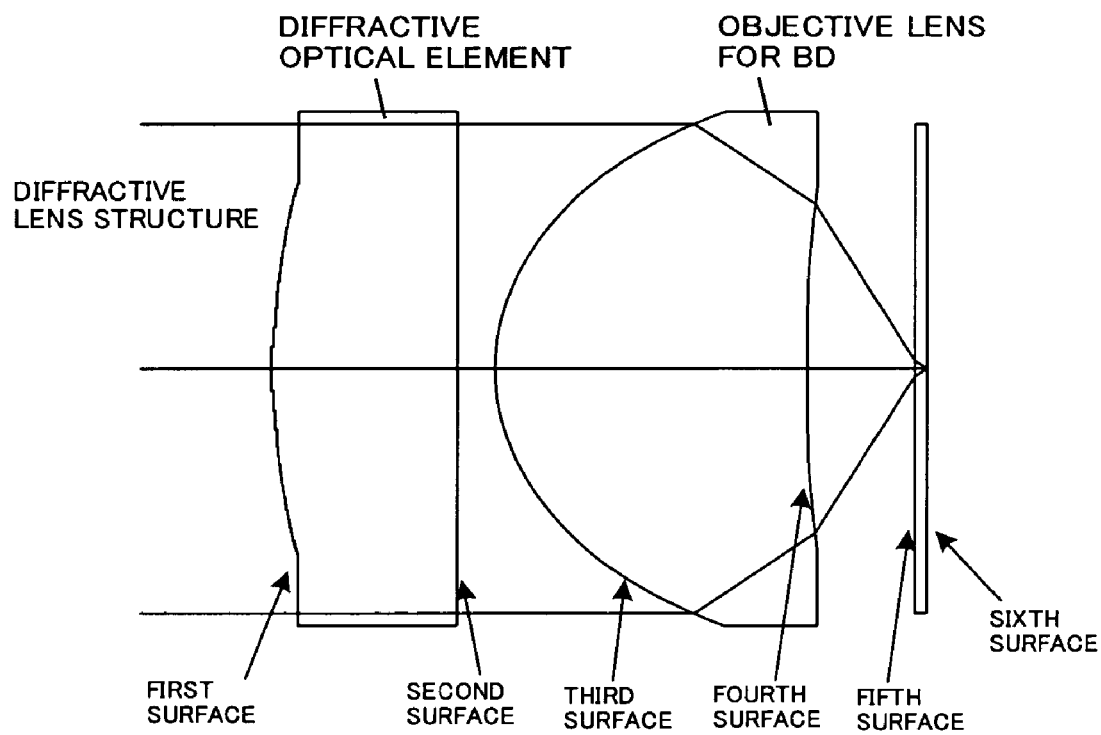
FIG. 38 is a schematic cross-sectional view of an objective lens module having the diffractive optical element according to Example 1 of the present invention and an objective lens.

Moreover, a surface number is defined by a light incident sequence, as shown in FIG. 38. In the examples described below, the same definition method of the surface number is performed. An incident surface and an emergent surface of the diffractive optical element having the diffractive lens structure are referred to as a first surface and a second surface, respectively, an incident surface and an emergent surface of the objective lens for BD are referred to as a third surface and a fourth surface, respectively, and a surface of a transmissive protection layer and a recording layer of BD, DVD, or CD are referred to as a fifth surface and a sixth surface, respectively.

Table 8 shows aspherical coefficients representing the macroscopic aspherical shapes of the diffractive lens structures and the aspherical shape of the objective lens in the design result of Example 1.

TABLE 8

| | Diffractive Lens Structure | | | Objective Lens | |
|---|---|---|---|---|---|
| Name of Coefficient | First Surface (in) (0 < h ≦ 1.007) | First Surface (mid) (1.007 < h ≦ 1.624) | First Surface (out) (h > 1.624) | Third Surface | Fourth Surface |
| Radius of Curvature | 19.1520000 | −21.0480000 | ∞ | 1.7050000 | −31.8720000 |
| CC | 0.000000E+00 | 0.000000E+00 | 0.000000E+00 | −8.837900E−01 | −3.081010E+01 |
| A4 | −7.125200E−03 | 8.293000E−03 | 0.000000E+00 | 1.191000E−02 | 7.534260E−02 |
| A6 | −1.084900E−03 | 1.461200E−03 | 0.000000E+00 | 1.545000E−03 | −5.126470E−02 |
| A8 | −3.138600E−05 | −7.746400E−05 | 0.000000E+00 | −9.654700E−06 | 2.038740E−02 |
| A10 | −2.450400E−05 | 4.620600E−05 | 0.000000E+00 | 2.366400E−04 | −4.851690E−03 |
| A12 | 0.000000E+00 | 0.000000E+00 | 0.000000E+00 | −1.325900E−04 | 6.003500E−04 |
| A14 | 0.000000E+00 | 0.000000E+00 | 0.000000E+00 | 4.987100E−05 | 1.449830E−04 |
| A16 | 0.000000E+00 | 0.000000E+00 | 0.000000E+00 | −1.045100E−05 | −1.653040E−04 |
| A18 | 0.000000E+00 | 0.000000E+00 | 0.000000E+00 | 1.116900E−06 | 5.836630E−05 |
| A20 | 0.000000E+00 | 0.000000E+00 | 0.000000E+00 | −4.791100E−08 | −7.346300E−06 |

Figure 39:
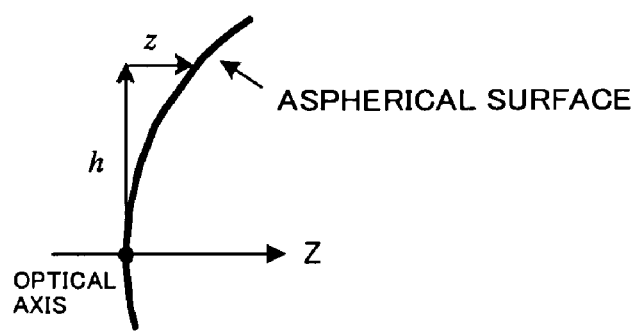
FIG. 39 is a diagram illustrating an aspherical shape which is used for optical design included in a method of manufacturing a diffractive optical element according to the present invention.

Moreover, the aspherical shape is defined as shown in FIG. 39. Here, R represents a paraxial radius of curvature, h represents the height from the optical axis, and z is a sag amount in the optical axis direction at the height h from the optical axis on the basis of a point where the aspherical surface intersects the optical axis, in which the optical axis direction is positive.

Table 9 and 10 are the phase function coefficients of the diffractive lens structure and the diffraction order to be used ($\lambda_0$=408 nm)

TABLE 9

| Name of Coefficient | First Surface (in) (0 < h ≦ 1.007) | First Surface (mid) (1.007 < h ≦ 1.624) | First Surface (out) (h > 1.624) |
|---|---|---|---|
| d0 | 0.000000E+00 | 0.000000E+00 | 0.000000E+00 |
| d2 | 4.740800E−03 | −6.470800E−03 | 0.000000E+00 |

TABLE 9-continued

| Name of Coefficient | First Surface (in) (0 < h ≦ 1.007) | First Surface (mid) (1.007 < h ≦ 1.624) | First Surface (out) (h > 1.624) |
|---|---|---|---|
| d4 | −1.290600E−03 | 2.256300E−03 | 0.000000E+00 |
| d6 | −1.970000E−04 | 3.972100E−04 | 0.000000E+00 |
| d8 | −5.714100E−06 | −2.087700E−05 | 0.000000E+00 |
| d10 | −4.447200E−06 | 1.256500E−05 | 0.000000E+00 |

TABLE 10

| | BD | DVD | CD |
|---|---|---|---|
| First Surface (in) | 3 | 2 | 2 |
| First Surface (mid) | 2 | 1 | 1 |

The phase function is represented by the following equation.

$$\psi(h) = dor \frac{2\pi}{\lambda_0} \sum_i d_i \cdot h^i$$

Here, h represents the height from the optical axis, $\Psi(h)$ represents a phase amount to be given to a light beam passing through the height h from the optical axis on the surface on which the diffractive lens structure is provided, dor represents the diffraction order to be used, and $\lambda_0$ is the designed wavelength, $\lambda_0$=408 nm.

Table 11 shows diffractive lens structure shape data representing a specified shape of the diffractive lens structure in Example 1 which is acquired from macroscopic aspherical data of the diffractive lens structure 1 (region 1) and the diffractive lens structure 2 (region 2) and the diffractive lens function.

TABLE 11

| Step Number | Step Radius [mm] | Orbicular Zone Width [mm] | Step Amount [mm] |
|---|---|---|---|
| 1 | 0.2970000 |  | 0.0025150 |
| 2 | 0.4258000 | 0.1288000 | 0.0025150 |
| 3 | 0.5297000 | 0.1039000 | 0.0025150 |
| 4 | 0.6226000 | 0.0929000 | 0.0025150 |
| 5 | 0.7108000 | 0.0882000 | 0.0025150 |
| 6 | 0.7990000 | 0.0882000 | 0.0025150 |
| 7 | 0.8930000 | 0.0940000 | 0.0025150 |
| 8 | 1.0070000 | 0.1140000 | 0.0038750 |
| 9 | 1.1590000 | 0.1520000 | 0.0014980 |
| 10 | 1.2290000 | 0.0700000 | 0.0014980 |
| 11 | 1.2750000 | 0.0460000 | 0.0014980 |
| 12 | 1.3100000 | 0.0350000 | 0.0014980 |
| 13 | 1.3390000 | 0.0290000 | 0.0014980 |
| 14 | 1.3650000 | 0.0260000 | 0.0014980 |
| 15 | 1.3870000 | 0.0220000 | 0.0014980 |
| 16 | 1.4070000 | 0.0200000 | 0.0014980 |
| 17 | 1.4260000 | 0.0190000 | 0.0014980 |
| 18 | 1.4430000 | 0.0170000 | 0.0014980 |
| 19 | 1.4590000 | 0.0160000 | 0.0014980 |
| 20 | 1.4740000 | 0.0150000 | 0.0014980 |
| 21 | 1.4880000 | 0.0140000 | 0.0014980 |
| 22 | 1.5020000 | 0.0140000 | 0.0014980 |
| 23 | 1.5140000 | 0.0120000 | 0.0014980 |
| 24 | 1.5270000 | 0.0130000 | 0.0014980 |
| 25 | 1.5380000 | 0.0110000 | 0.0014980 |
| 26 | 1.5490000 | 0.0110000 | 0.0014980 |
| 27 | 1.5600000 | 0.0110000 | 0.0014980 |
| 28 | 1.5700000 | 0.0100000 | 0.0014980 |
| 29 | 1.5800000 | 0.0100000 | 0.0014980 |
| 30 | 1.5890000 | 0.0090000 | 0.0014980 |
| 31 | 1.5990000 | 0.0100000 | 0.0014980 |
| 32 | 1.6070000 | 0.0080000 | 0.0014980 |
| 33 | 1.6160000 | 0.0090000 | 0.0014980 |
| 34 | 1.6240000 | 0.0080000 | 0.0004980 |

The diffractive lens structure of Example 1 has 34 phase steps, and a central surface, orbicular zone surfaces 2 to 34, that is, 33 orbicular zone surfaces in total, and an outer circumferential surface (region 3), all of which are divided by the phase steps.

Figure 40:
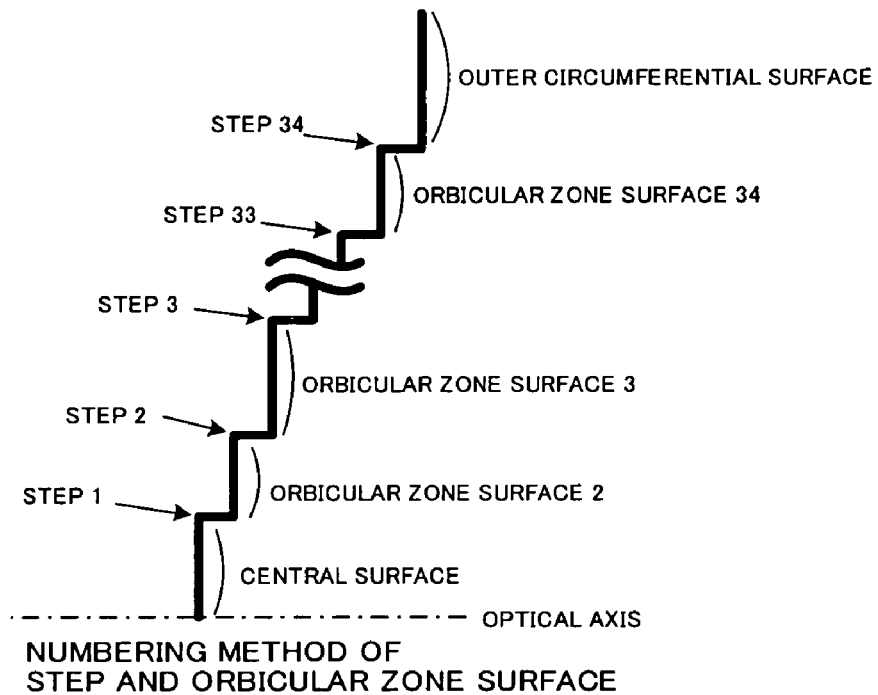
FIG. 40 is a diagram illustrating step numbers and orbicular zone numbers when a design result of a diffractive optical element according to the present invention is represented.
Figure 41:
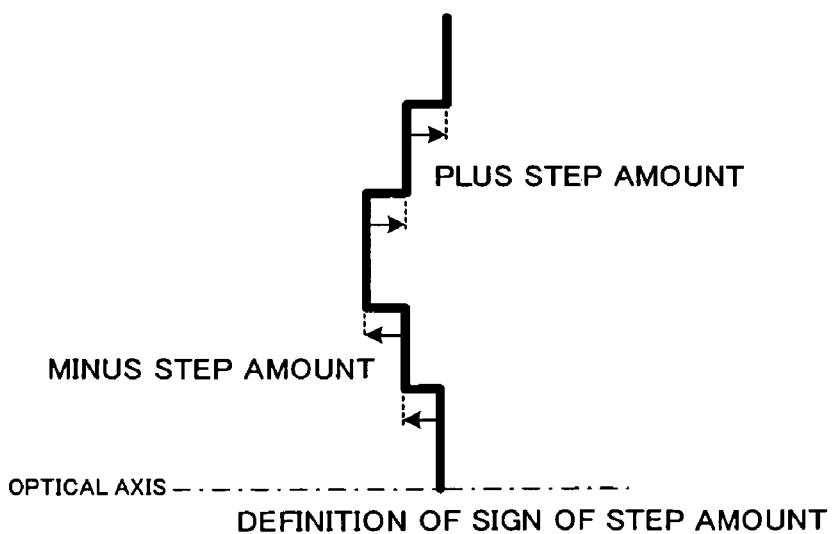
FIG. 41 is a diagram illustrating a sign of a step amount when a design result of a diffractive optical element according to the present invention is represented.

FIGS. 40 and 41 show the step number, the orbicular zone surface number, and the definition of the step number. As shown in FIG. 40, the phase steps are sequentially numbered from the optical axis, and the orbicular zone surfaces divided by the phase steps are sequentially numbered from the optical axis toward the outer circumferential portion. The orbicular zone width represents the difference of the step radiuses of the phase steps inside and outside the orbicular zone. The step amount is measured from the inner circumferential surface to the outer circumferential surface, as shown in FIG. 41, in which the optical axis direction is positive.

As for the phase steps 1 to 7 constituting the diffractive lens structure of Example 1, the depth was determined in consideration of the balance of diffraction efficiency in BD and diffraction efficiency in CD, the aspherical surface of each of the central surface and the orbicular zone surfaces 2 to 8 is an aspherical shape shown in Table 12. That is, the central surface disposed on the optical axis has the aspherical shape shown in Table 12, and each of the orbicular zone shapes 2 to 8 is an orbicular zone-shaped surface in which the aspherical surface shown in Table 12 is shifted in the optical axis direction by the amount according to the step amount.

TABLE 12

| Name of Coefficient | Value |
|---|---|
| Radius of Curvature | −160.8600000 |
| CC | 0.000000E+00 |
| A4 | 8.263400E−04 |
| A6 | 1.456300E−04 |
| A8 | −2.167200E−06 |
| A10 | 5.389000E−06 |

The phase step 8 is set to be slightly deeper than the phase steps 1 to 7 such that the phase of the wavefront passing through each region is arranged. All of the orbicular zone surfaces 9 to 34 and the outer circumferential surface (region 3) disposed outside the phase step 8 are planes perpendicular to the optical axis.

Figure 42:
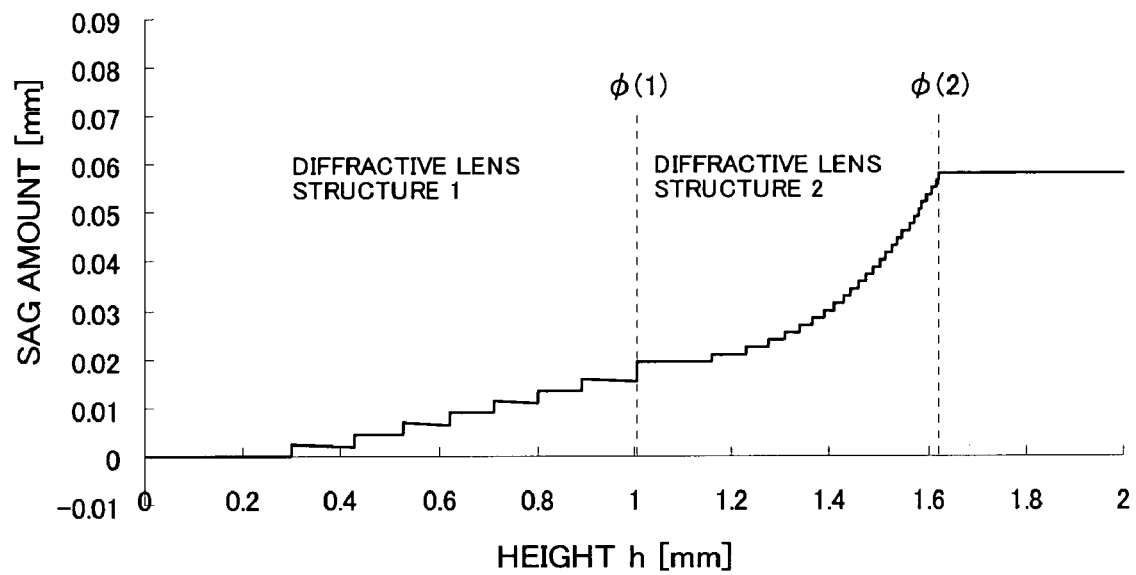
FIG. 42 is a graph schematically showing sections of diffractive lens structures, which are formed in the diffractive optical element according to Example 1 of the present invention.
Figure 43:
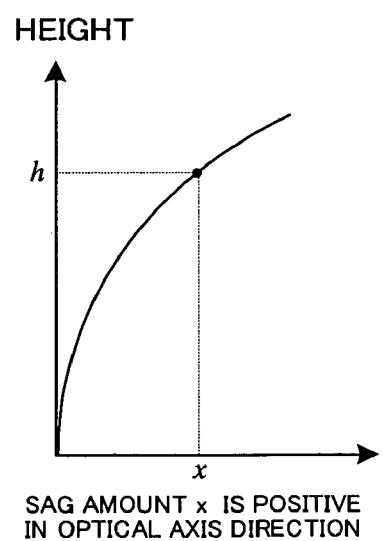
FIG. 43 is a graph illustrating a sag amount of a section of a diffractive lens structure, which is formed in the diffractive optical element according to Example 1 of the present invention.

FIG. 42 is a graph showing the sag amount of the surface with respect to the height from the optical axis, which schematically shows a cross-sectional view of the diffractive lens structure which is formed in the diffractive optical element of Example 1. The sag amount is a bent amount of the surface in the optical axis direction at the height h from the optical axis, as shown in FIG. 43 and is measured on the basis of a point of the surface on the optical axis, in which the optical axis direction is positive. As apparent from FIGS. 42 and 43, the macroscopic aspherical surfaces of the diffractive lens structure 1 (region 1) and the diffractive lens structure 2 (region 2) are convex surfaces. In the diffractive lens structure 1, all the orbicular zone-shaped surfaces divided by the phase steps have aspherical shapes, and, in the diffractive lens structure 2, all the orbicular zone-shaped surfaces are planes perpendicular to the optical axis. In the diffractive lens structure 1 and the diffractive lens structure 2, the diffraction orders to be used in BD are different, and thus the phase step amounts are made different accordingly. Further, the phase step 8 disposed at the boundary of the diffractive lens structure 1 and the diffractive lens structure 2 has a depth so as to tune the phases of the wavefronts passing through both the diffractive lens structures in all BD, DVD, and CD.

Figure 44:
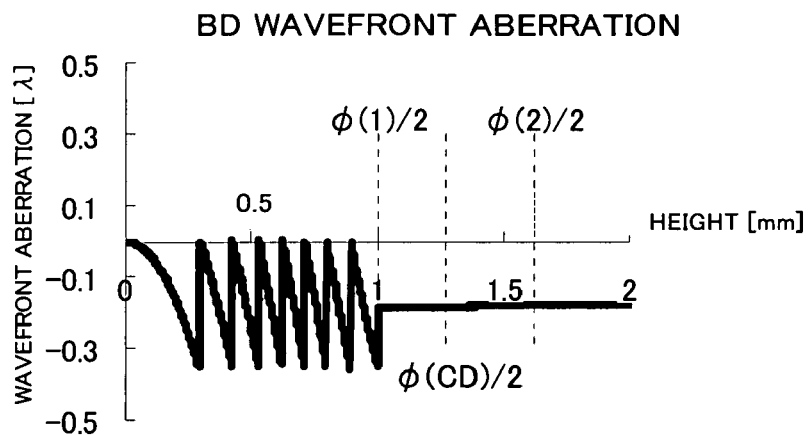
FIG. 44 is a graph showing a calculation result of a wavefront aberration for BD of an objective lens module, which uses the diffractive optical element according to Example 1 of the present invention, by data having an actual shape.
Figure 45:
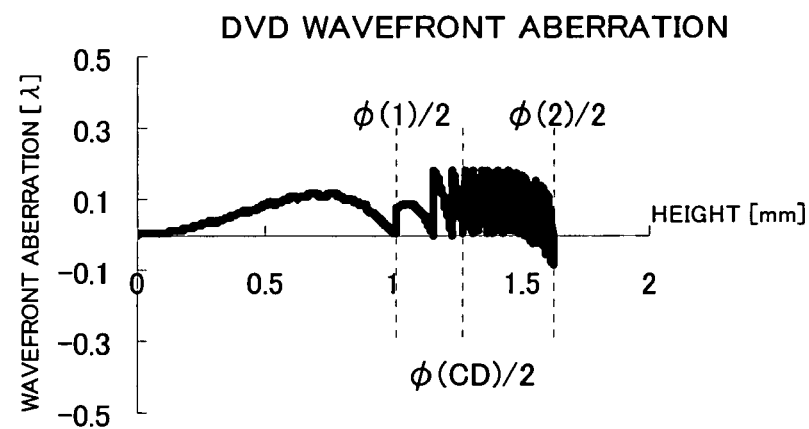
FIG. 45 is a graph showing a calculation result of a wavefront aberration for DVD of an objective lens module, which uses the diffractive optical element according to Example 1 of the present invention, by data having an actual shape.
Figure 46:
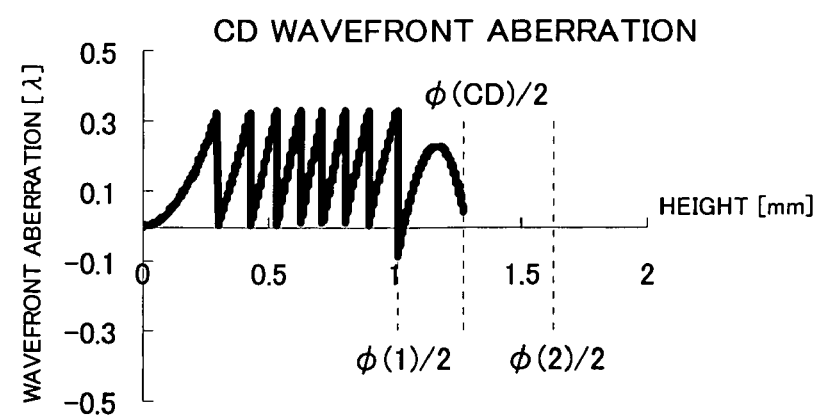
FIG. 46 is a graph showing a calculation result of a wavefront aberration for CD of an objective lens module, which uses the diffractive optical element according to Example 1 of the present invention, by data having an actual shape.

From FIGS. 44, 45, and 46, it can be understood that, in the objective lens module using the diffractive optical element of Example 1, the wavefront aberrations of BD, DVD, and CD exist, but, in all BD, DVD, and CD, the phases of the wavefronts passing through the individual diffractive lens structures within the individual effective diameters are substantially arranged. Further, as described above, the wavefront aberration of CD is not corrected in the region between the height $\phi(1)/2$ from the optical axis and the height $\phi(2)/2$, the aberration value in calculation by the phase function method is slightly large, 0.052 λ rms. However, in view of the wavefront aberration acquired from the actual shape, the wavefront shape between the height $\phi(1)/2$ from the optical axis to the height $\phi(2)/2$ becomes a wavefront having the substantially same amplitude as that of the serrate wave-shaped wavefront of the inner circumferential portion and seems to be equal to the inner serrate wave-shaped wavefront. Therefore, it can be considered that the aberration is substantially zero.

Actually, in case of calculating an undulate-optical spot shape on an optical disc surface on the basis of the wavefront aberration, a favorable spot shape, which is substantially equal to a spot formed by a general aplanatic lens, is obtained.

Figure 47:
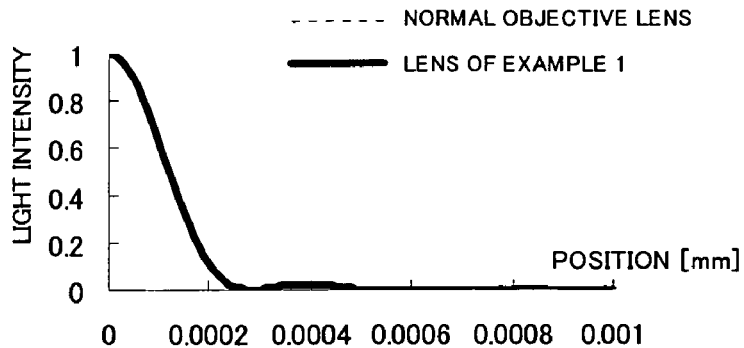
FIG. 47 is a graph showing a spot shape on BD calculated by a wavefront aberration of an objective lens module which is calculated by data having an actual surface shape of the diffractive lens structure in the diffractive optical element according to Example 1 of the present invention.
Figure 48:
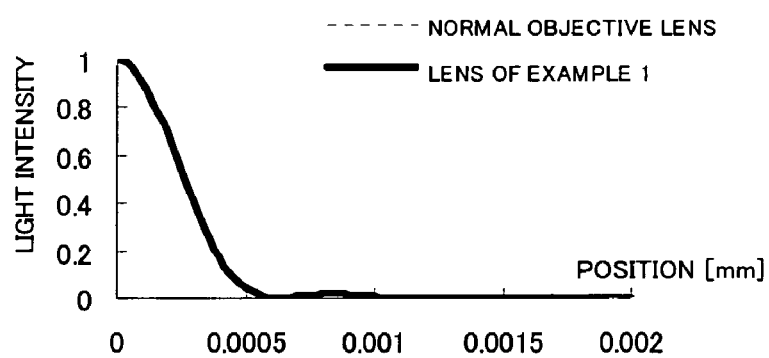
FIG. 48 is a graph showing a spot shape on DVD calculated by a wavefront aberration of an objective lens module which is calculated by data having an actual surface shape of the diffractive lens structure in the diffractive optical element according to Example 1 of the present invention.
Figure 49:
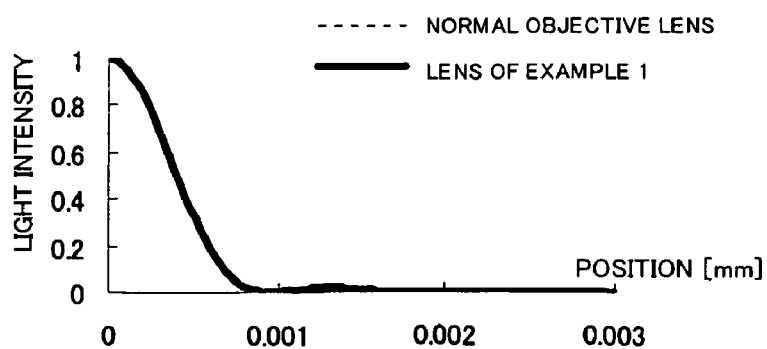
FIG. 49 is a graph showing a spot shape on CD calculated by a wavefront aberration of an objective lens module which is calculated by data having an actual surface shape of the diffractive lens structure in the diffractive optical element according to Example 1 of the present invention.
Figure 50:
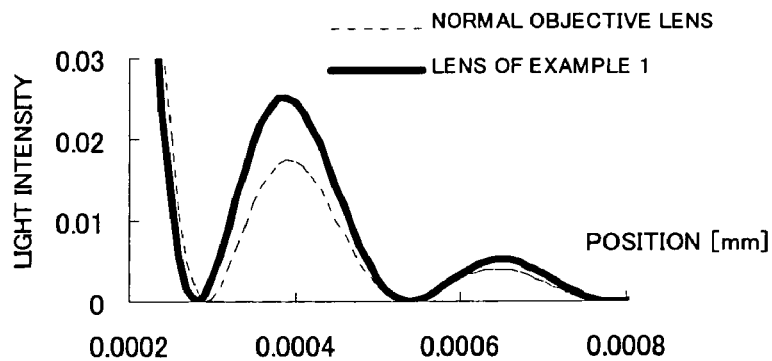
FIG. 50 is a graph showing a spot side-robe shape on BD calculated by a wavefront aberration of an objective lens module which is calculated by data having an actual surface shape of the diffractive lens structure in the diffractive optical element according to Example 1 of the present invention.
Figure 51:
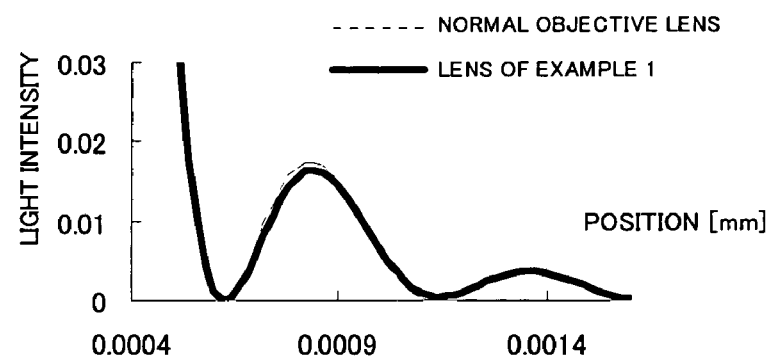
FIG. 51 is a graph showing a spot side-robe shape on DVD calculated by a wavefront aberration of an objective lens module which is calculated by data having an actual surface shape of the diffractive lens structure in the diffractive optical element according to Example 1 of the present invention.
Figure 52:
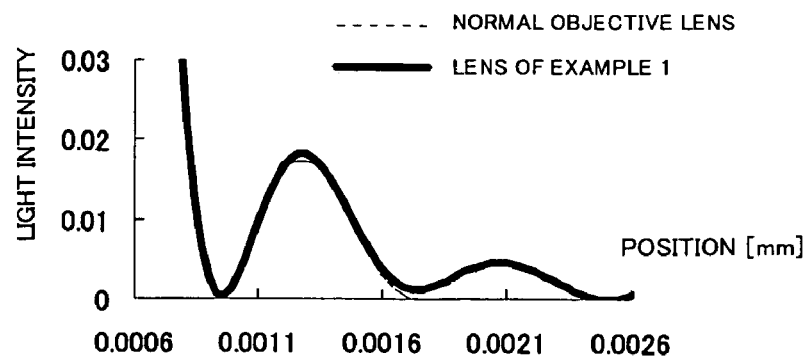
FIG. 52 is a graph showing a spot side-robe shape on CD calculated by a wavefront aberration of an objective lens module which is calculated by data having an actual surface shape of the diffractive lens structure in the diffractive optical element according to Example 1 of the present invention.

FIGS. 47, 48, 49, 50, 51, and 52 are graphs showing the undulate-optical spot shape calculated by use of the aberration caused by an actual surface shape of the diffractive lens structure. In the individual drawings, a vertical axis represents light intensity and a horizontal axis represents a radius distance. FIGS. 47, 48, and 49 show the entire spot shapes in BD, DVD, and CD, respectively, and FIGS. 50, 51, and 52 show side robes of spots in BD, DVD, and CD, respectively. A light-converging spot of BD is slightly small, as compared with a case in which a main spot is converged by a general lens, and the light-converging spot in the side robe is slightly large. This is because an apodization effect is generated by slightly decreasing diffraction efficiency of the inner circumferential portion in the diffractive lens structure 1 (region 1). In this case, however, there is no problem in recording and reproducing. Further, in the semiconductor laser to be used as the light source, in general, as it goes from the center to the periphery, intensity is decreased. Then, it may be preferable that, like Example 1, efficiency of the inner circumferential portion is decreased so as to generate the apodization effect. As for DVD or CD, in consideration of light outside the effective diameter, the spot shape is calculated by the effective diameter φ(BD). That is, the spot shape becomes a spot shape converged without using a special aperture limiting element. Then, it could be understood that, even when aperture limitation is particularly performed, the substantially same spot shape as that of the general objective lens for DVD or objective lens for CD is obtained.

Figure 53:
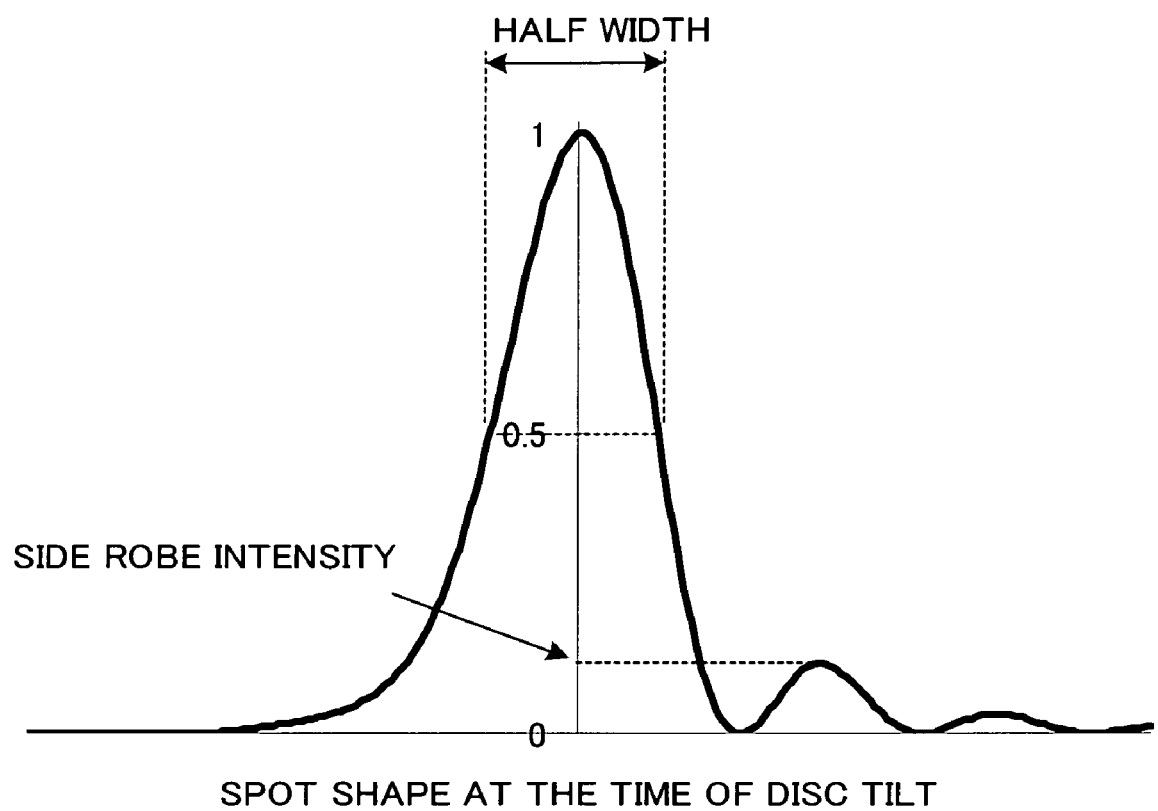
FIG. 53 is a graph showing a full width at half maximum and a side robe intensity representing a spot shape.

Further, when light outside the DVD and CD effective diameters has influence on light-convergence, if a coma aberration is caused by, for example, a disc tilt, the change of the side robe is drastically present, as compared with a normal situation, and thus stable reproduction performance cannot be obtained. Then, when the lens of the present example is used, the change of the spot shape at the time of the disc tilt is calculated and is compared with the general lens. As for the calculation of the change of the spot shape, in order to take an influence of light outside the effective diameter into account, the calculation is performed by use of the effective diameter φ(BD) with respect to DVD and CD. As the values represent the spot shape, a full width at half maximum and a side-robe intensity shown in FIG. 53 are calculated. The full width at half maximum represents the width of the spot at a position where intensity becomes half when the maximum intensity of the spot is 1, and the side-robe intensity represents the side-robe intensity when the maximum intensity of the spot is 1.

Figure 54:
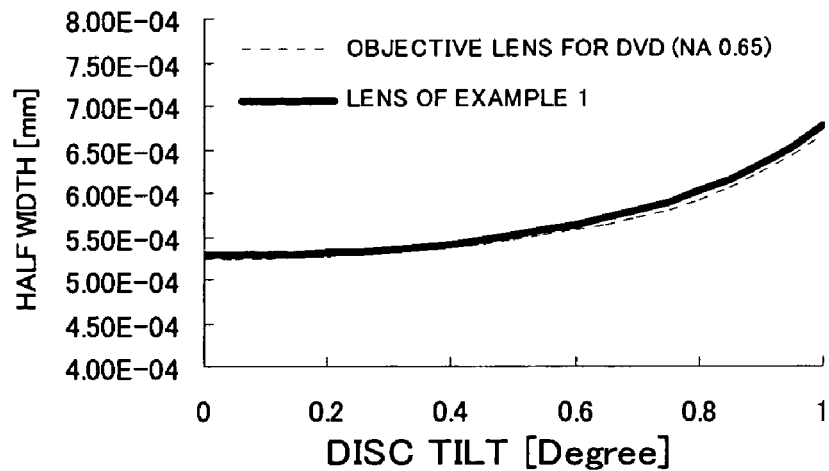
FIG. 54 is a graph showing a relationship between a full width at half maximum of a spot and a disc tilt angle at the time of tilt with respect to DVD when the objective lens module according to Example 1 of the present invention is used.
Figure 55:
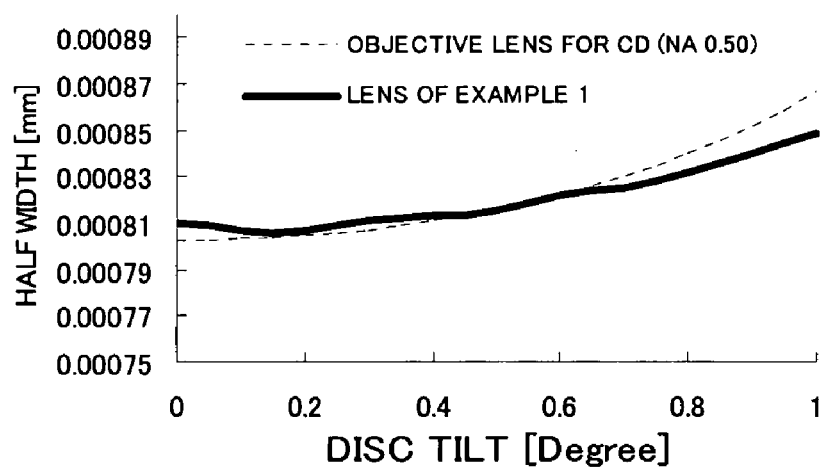
FIG. 55 is a graph showing a relationship between a full width at half maximum of a spot and a disc tilt angle at the time of tilt with respect to CD when the objective lens module according to Example 1 of the present invention is used.
Figure 56:
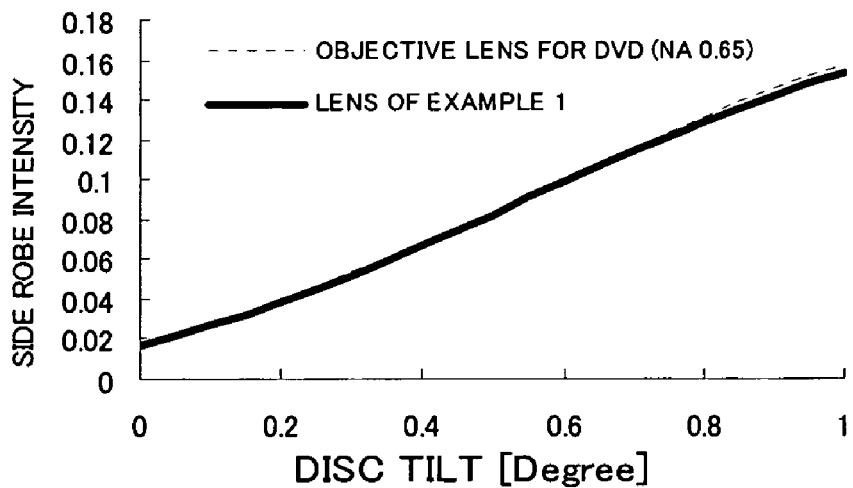
FIG. 56 is a graph showing a relationship between a spot side-robe intensity and a disc tilt angle at the time of tilt with respect to DVD when the objective lens module according to Example 1 of the present invention is used.
Figure 57:
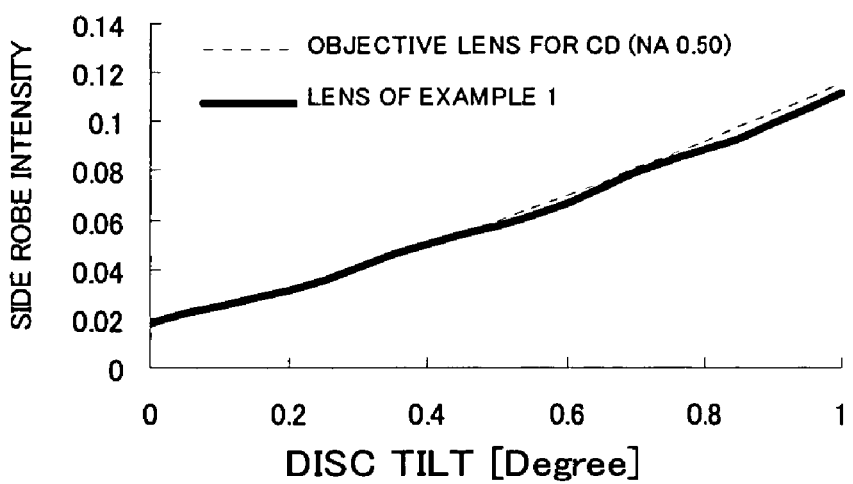
FIG. 57 is a graph showing a relationship between a spot side-robe intensity and a disc tilt angle at the time of tilt with respect to CD when the objective lens module according to Example 1 of the present invention is used.

FIGS. 54, 55, 56, and 57 are graphs showing the calculation results. FIGS. 54 and 55 show the changes of the full width at half maximum of a spot in DVD and CD, respectively. In the drawings, a vertical-axis represents the full width at half maximum of a spot and a horizontal axis represents a disc tilt angle. FIGS. 56 and 57 show the changes of side-robe intensity in DVD and CD, respectively. In the drawings, a vertical axis represents side-robe intensity of the spot and a horizontal axis represents a disc tilt angle. The same characteristics as those of the general lens with respect to any one of DVD and CD are exhibited. From this, it can be understood that, when the objective lens of the present example is used, the same stable reproduction performance as the case in which the related art objective lens for DVD and objective lens for CD are used is obtained, without performing particular aperture limitation.

EXAMPLE 2

Example 2 is also, like Example 1, a diffractive optical element that can record on and reproduce BD, the first optical data storage media; DVD, the second optical data storage media; and CD, the third optical data storage media; and combined with a double aspherical lens for BD. In addition, Example 2 is designed in consideration of the effect of chromatic aberration arising from slight wavelength variation of a light source.

In general, the wavelength of a light source such as a semiconductor laser that is used for an optical disc can be varied by temperature variation or power variation generated during recording and reproducing. As a result, the focal length of an objective lens varies, and spherical aberration occurs. The amount of wavefront aberration of the chromatic aberration arising from the wavelength variation increases with the numerical aperture of a lens. If the wavelength is varied rapidly with operating variation such as recording to reproducing or reproducing to recording in pickup, spot stays in a defocus state until focus servo tracks the focus, thereby the operation becomes unstable. Furthermore, it is preferable that the aberration due to the wavelength variation be small since spherical aberration remains even after the focus servo tracks the focus.

In general, the chromatic aberration is corrected by using a combination lens, which is made by combining two or more kinds of materials having refractive index varying with wavelength variation, or a diffractive lens structure.

When a diffractive lens structure, the characteristics of which varies with region like Example 1, is used, chromatic aberration varies with regions, therefore the whole wavefront can become discontinuous, and when the combination lens is used, the surface shape of the combination lens needs to be discontinuous. In the latter case, although resin materials need to be used since glass is hard to fabricate, there are fewer kinds of resin materials that can be used as optical parts for optical discs than those of glass, thereby the combination of two kinds of resin materials, the refractive index of which varies considerably with wavelength variation, cannot be obtained.

Therefore, it is desirable to use a diffractive optical element in order to correct the chromatic aberration of the objective lens including the diffractive optical element of Example 1. Meanwhile, since the chromatic aberration of the objective lens including the diffractive optical element of Example 1 becomes discontinuous, the diffractive optical element also has discontinuous characteristics in order to correct the aberration.

As described above, when two optical elements, the chromatic aberrations of which become discontinuous, are combined to an optical system, if optical axis is shifted between the both, the discontinuous aberration characteristics cannot be combined well, and the aberration correction is hindered. Therefore, it is required to decrease the optical axis shift of the diffractive optical elements as mush as possible. In addition, when optical axis is shifted between the spherical aberration correction diffractive optical element of Example 1 and the BD optical lens, a great amount of coma aberration occurs on DVD and CD, thereby it is also required to decrease the optical axis shift between the spherical aberration correction diffractive optical element of Example 1 and the BD optical lens as much as possible. That is, the three parts, that is, spherical aberration correction diffractive optical element, chromatic aberration correction diffractive optical element, and objective lens, need to be disposed to suppress the optical axis shift sufficiently. Since the objective lens of an optical disc is constructed to tracking-bias from an actuator in the perpendicular direction to the optical axis in order to track the eccentricity of the optical disc, the diffractive optical elements need to be mounted on the actuator and tracking-biased in conjunction with the objective lens.

Considering the above, the spherical aberration correction diffractive lens structure and the chromatic aberration correction diffractive lens structure of DVD or CD are formed at the same optical element in Example 2. When the diffractive optical elements constructed like the above are mounted on the actuator with the objective lens, optical axis is not shifted even when the objective lens tracking-biases. In addition, it is preferable to integrate the spherical aberration correction diffractive lens structure with the chromatic aberration correction diffractive lens structure, since the number of parts can be decreased, and thus the simplification and cost-down of the optical system can be achieved.

Figure 58:
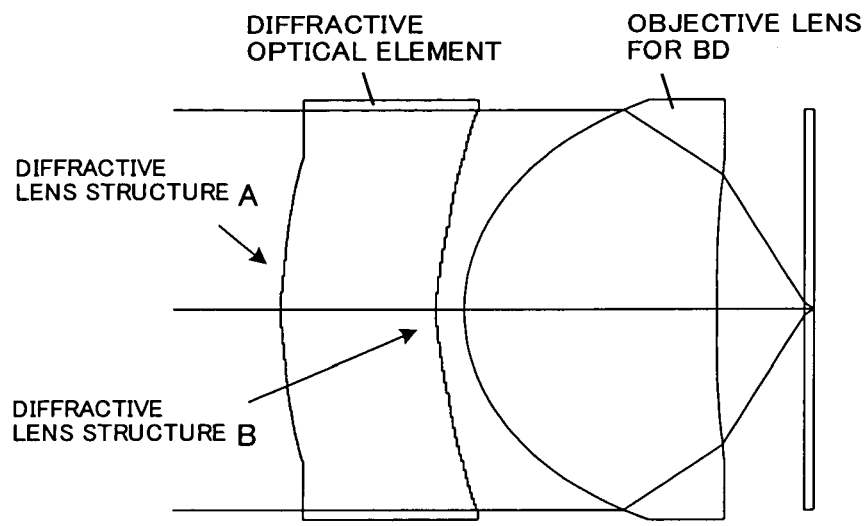
FIG. 58 is a schematic cross-sectional view of an objective lens module having a diffractive optical element according to Example 2 of the present invention and an objective lens.

As shown in FIG. 58, Example 2 is composed by combining a diffractive optical element including diffractive lens structures A and B, which can record on and reproduce BD, the first optical data storage media, DVD, the second optical data storage media, and CD, the third optical data storage media, and a double aspherical lens for BD. Table 13 illustrates the composition of the lens system and the designing conditions for BD, DVD and CD.

TABLE 13

|  | BD | DVD | CD |
| --- | --- | --- | --- |
| Wavelength of light source [nm] | 408 | 660 | 780 |
| Magnification | 0 | 0 | 0 |
| Numerical aperture | 0.85 | 0.65 | 0.50 |
| Effective diameter [mm] | 4.000 | 3.256 | 2.540 |
| Disc thickness [mm] | 0.1 | 0.6 | 1.2 |

The diffractive optical element has the diffractive lens structure A, which is designed to correct the spherical aberration occurring among BD, DVD and CD and to control the opening, on the left-side surface (first surface) of FIG. 58 and the chromatic aberration correction diffractive lens structure B on the right-side surface (second surface) of FIG. 58. The diffractive lens structure A is composed of a diffractive lens structure A1 (Region 1) at the inner circumferential portion; and a diffractive lens structure A2 (Region 2) at the central circumferential portion, and has no diffractive lens structure exerted at the outer circumferential portion like the diffractive lens structure 1 (Region 1) of Example 1. The diffractive lens structure B is composed of a diffractive lens structure B1, which is designed to correct the chromatic aberration occurring when the diffractive lens structure A1 (Region 1) and the objective lens are combined, at the inner circumferential portion; a diffractive lens structure B2, which is designed to correct the chromatic aberration occurring when the diffractive lens structure A2 (Region 2) and the objective lens are combined, at the central circumferential portion; and a diffractive lens structure B3, which is designed to correct the chromatic aberration of the objective lens at the outer circumferential portion. Meanwhile, in Example 2 and later examples, the diffractive lens structure A means a diffractive lens structure for correcting the difference of the spherical aberration occurring among BD, DVD and CD, and the diffractive lens structure B means a diffractive lens structure for decreasing the chromatic aberration in BD. The diffractive lens structures A and B are composed of a plurality of diffractive lens having different characteristics, and, hereinafter, their partial diffractive lens structures are denoted by adding numbers at the ends of the diffractive lens structure like diffractive lens structure A1 (Region 1).

Figure 59:
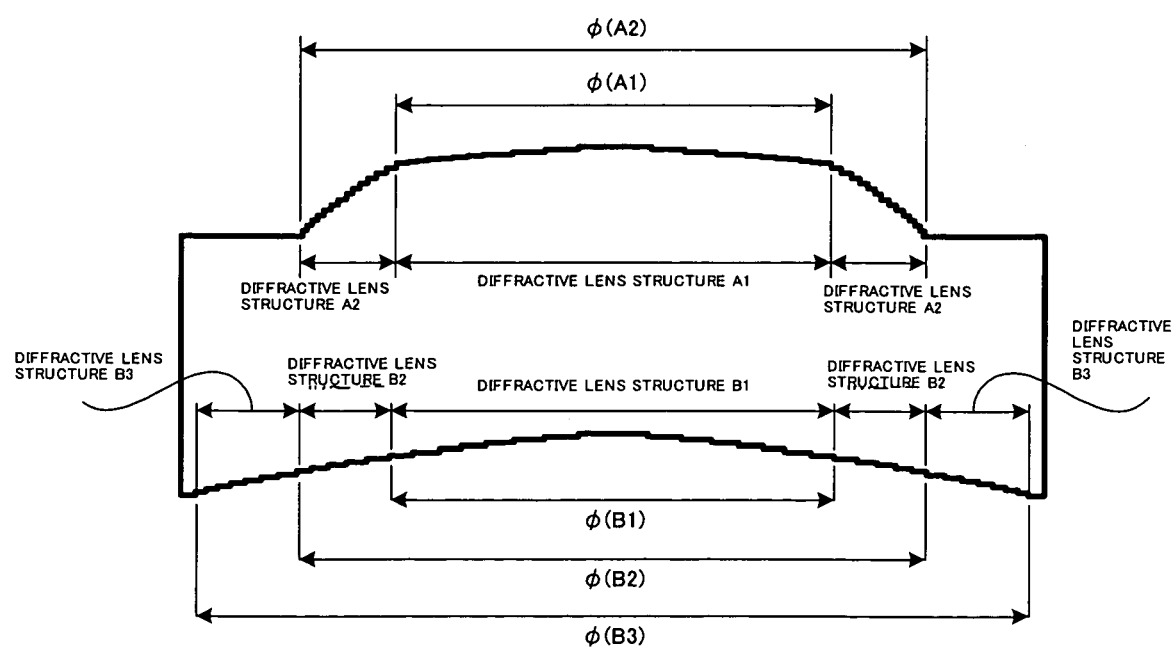
FIG. 59 is a schematic cross-sectional view of the diffractive optical element according to Example 2 of the present invention.

FIG. 59 is a cross-sectional view of the diffractive optical element of Example 2. The diffractive lens structure A is composed of the diffractive lens structure A1 (Region 1) at the inner circumferential portion; the diffractive lens structure A2 (Region 2) at the central circumferential portion; and flat outer circumferential portion (Region 3). The diffractive lens structure B is composed of diffractive lens structure B1 (Region 1), diffractive lens structure B2 (Region 2), and diffractive lens structure B3 (Region 3) in turn from the inner circumferential portion. The effective diameters of the diffractive lens structures are shown in FIG. 59. The effective diameters $\phi1(A1)$, $\phi2(A2)$ of the spherical aberration correction diffractive lens structures A1 and A2 are determined in the same way as Example 1.

The effective diameters $\phi(B1)$, $\phi(B2)$ and $\phi(B3)$ of the chromatic aberration correction diffractive lens structures B1 (Region 1), B2 (Region 2) and B3 (Region 3) are determined respectively according to the diameters of the wavefronts having penetrated the diffractive lens structure A1 (Region 1) of a surface, on which the spherical aberration correction diffractive lens structure is executed, the wavefront having penetrated the diffractive lens structure A2 (Region 2) and the wavefront having penetrated the outer circumferential portion, on which the diffractive lens structure is not executed.

The combination of the diffraction orders used in the diffractive lens structures A1 (Region 1) and A2 (Region 2) is determined in the same way as Example 1. That is, the combinations of the columns denoted structures A1 and A2 in Table 14, that is, second-order diffractive light for BD, first-order diffractive light for DVD and CD; and third-order diffractive light for BD, second-order diffractive light for DVD and CD are used.

TABLE 14

| | | Structure A2 | Structure A1 | | | | | | | | Structure B |
|---|---|---|---|---|---|---|---|---|---|---|---|
| BD | Diffraction order | 1 | 2 | 3 | 4 | 5 | 6 | 7 | 8 | 9 | 10 |
| | Diffraction efficiency | 1 | 1 | 1 | 1 | 1 | 1 | 1 | 1 | 1 | 1 |
| DVD | Diffraction order | 1 | 1 | 2 | 2 | 3 | 4 | 4 | 5 | 5 | 6 |
| | Amount of aberration correction [λ] | +0.4 | -0.2 | +0.2 | -0.4 | 0 | +0.4 | -0.2 | +0.2 | -0.4 | 0 |
| | Diffraction efficiency | 0.573 | 0.875 | 0.875 | 0.573 | 1 | 0.4 | 0.875 | 0.875 | 0.573 | 1 |
| CD | Diffraction order | 1 | 1 | 2 | 2 | 2 | 3 | 3 | 3 | 4 | 4 | 5 |
| | Amount of Aberration correction [λ] | +0.5 | 0 | +0.5 | 0 | -0.5 | +0.5 | 0 | -0.5 | 0 | -0.5 | 0 |
| | Diffraction efficiency | 0.405 | 1 | 0.405 | 1 | 0.405 | 0.405 | 1 | 0.405 | 1 | 0.405 | 1 |

Basically, the diffractive lens structure A is designed in the same sequence as Example 1. However, since the diffractive lens structure B is combined in designing using phase functions, and thus the tendency of aberration varies slightly, it is required to combine the diffractive lens structure B and then design the diffractive lens structure A.

The chromatic aberration correction diffractive lens structure B corrects only chromatic aberration, thereby the chromatic aberration correction diffractive lens structure B needs to be designed to offset aberration due to the macroscopic aspherical surface shape with aberration due to phase steps for all of BD, DVD and CD. Therefore, the combination of diffraction orders shown in the column 'structure B' in Table 14, that is, tenth-order diffraction light for BD, sixth-order diffraction light for DVD, and fifth-order diffraction light for CD, is used as the combination of the diffraction orders used in the diffractive lens structures B1 (Region 1), B2 (Region 2), and B3 (Region 3). If the above combination of diffraction order is employed, a diffractive lens structure correcting the chromatic aberration at BD and not correcting aberration at all of BD, DVD and CD can be obtained. Furthermore, it is preferable that the chromatic aberration be small, however, small chromatic aberration requires a great number of phase steps, and thus the diffractive lens structure B is hard to fabricate. Therefore, in Example 2, the chromatic aberration is not corrected completely. When the diffractive lens structure B is used in the BD objective lens unit used in Example 2, the optimal image surface position varies about 5 μm, and 0.07 λrms of spherical aberration occurs if the wavelength is changed from 408 nm to 403 nm. On the other hand, when the diffractive optical element of Example 2 is added, the varying amount of the optimal image surface position when the wavelength is changed from 408 nm to 403 nm is suppressed 1.6 μm, and the residual spherical aberration at this time is suppressed 0.01 λrms or below. That is, it is possible to record on and reproduce BD more stably as well as to record on and reproduce DVD or CD by adding the diffractive optical element of Example 2.

These diffractive lens structures are designed by using the phase function method like Example 1, and the practical surface shape is designed by using the diffractive lens function extracted from the above.

Table 15 illustrates paraxial data, the specific design results of Example 2.

TABLE 15

| Surface No. | Radius of curvature | Central thickness | | | Refractive index | | |
|---|---|---|---|---|---|---|---|
| | | BD | DVD | CD | BD | DVD | CD |
| 1 | Diffractive lens structure A | 1.5000000 | ← | ← | 1.5447820 | 1.5228720 | 1.5197300 |
| 2 | Diffractive lens structure B | 0.3000000 | ← | ← | 1.0000000 | ← | ← |
| 3 | 1.7050000 | 2.5000000 | ← | ← | 1.7093690 | 1.6663360 | 1.6594900 |
| 4 | −31.8720000 | 0.8599110 | 0.6763980 | 0.3511660 | 1.0000000 | ← | ← |
| 5 | ∞ | 0.1000000 | 0.6000000 | 1.2000000 | 1.6180700 | 1.5796560 | 1.5740810 |
| 6 | ∞ | 0.0000000 | ← | ← | 1.0000000 | ← | ← |

Table 16 illustrates aspherical surface coefficients representing the macroscopic aspherical surface shapes of the diffractive lens structures A and B, and the aspherical surface shape of the objective lens in Example 2.

Tables 17 and 18 illustrate the phase function coefficients of the diffractive lens structures A and B, and the diffraction orders to be used ($\lambda_0$=408 nm).

TABLE 16

| Name of coefficient | Diffractive lens structure A | | | Diffractive lens structure B |
| --- | --- | --- | --- | --- |
| | First surface (in) DOE A1 (0 < h ≤ 1.007) | First surface (mid) DOE A2 (1.007 < h ≤ 1.628) | First surface (out) (plane) (1.628 < h) | Second surface (in) DOE B1 (0 < h ≤ 1.007) |
| Radius of curvature | 19.1520000 | −20.9560000 | ∞ | 8.2528000 |
| CC | 0.000000E+00 | 0.000000E+00 | 0.000000E+00 | 0.000000E+00 |
| A4 | −7.125200E−03 | 8.277700E−03 | 0.000000E+00 | −5.002500E−03 |
| A6 | −1.084900E−03 | 1.538700e−03 | 0.000000E+00 | −4.695100E−04 |
| A8 | −3.138600E−05 | −1.652100E−04 | 0.000000E+00 | −1.614100E−04 |
| A10 | −2.450400E−05 | 5.565200E−05 | 0.000000E+00 | 1.212700E−05 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| Name of coefficient | Diffractive lens structure B | | Objective lens | |
| --- | --- | --- | --- | --- |
| | Second surface (mid) DOE B2 (1.007 < h ≤ 1.628) | Second surface (out) DOE B3 (1.628 < h) | Third surface | Fourth surface |
| Radius of curvature | 47.6240000 | 14.5020000 | 1.7050000 | −31.8720000 |
| CC | 0.000000E+00 | 0.000000E+00 | −8.837900E−01 | −3.081010E+01 |
| A4 | 1.092100E−02 | 2.238100E−03 | 1.191000E−02 | 7.534260E−02 |
| A6 | 1.877000E−03 | 6.737200E−04 | 1.545000E−03 | −5.126470E−02 |
| A8 | −2.294500E−04 | −1.513900E−04 | −9.654700E−06 | 2.038740E−02 |
| A10 | 9.155800E−05 | 3.916600E−05 | 2.366400E−04 | −4.851690E−03 |
| A12 | 0.000000E+00 | 0.000000E+00 | −1.325900E−04 | 6.003500E−04 |
| A14 | 0.000000E+00 | 0.000000E+00 | 4.987100E−05 | 1.449830E−04 |
| A16 | 0.000000E+00 | 0.000000E+00 | −1.045100E−05 | −1.653040E−04 |
| A18 | 0.000000E+00 | 0.000000E+00 | 1.116900E−06 | 5.836630E−05 |
| A20 | 0.000000E+00 | 0.000000E+00 | −4.791100E−08 | −7.346300E−06 |

TABLE 17

| Name of coefficient | Diffractive lens structure A | | | Diffractive lens structure B | | |
| --- | --- | --- | --- | --- | --- | --- |
| | First surface (in) DOE A1 (0 < h ≤ 1.007) | First surface (mid) DOE A2 (1.007 < h ≤ 1.628) | First surface (out) (plane) (1.628 < h) | Second surface (in) DOE B1 (0 < h ≤ 1.007) | Second surface (mid) DOE B2 1.007 < h ≤ 1.628 | Second surface (out) DOE B3 (1.628 < h) |
| d6 | 0.000000E+00 | 0.000000E+00 | 0.000000E+00 | 0.000000E+00 | 2.856000E−04 | 0.000000E+00 |
| d2 | 4.740800E−03 | −5.312800E+03 | 0.000000E+00 | −3.300600E−03 | −8.078900E−04 | −1.878300E−03 |
| d4 | −1.290600E−03 | 1.769600E−03 | 0.000000E+00 | 2.603800E−04 | −5.012600E−04 | −1.241700E−04 |
| d6 | −1.970600E−04 | 4.854000E−04 | 0.000000E+00 | 2.551900E−05 | −1.135500E−04 | −3.669300E−05 |
| d8 | −5.714100E−06 | −2.467900E−05 | 0.000000E+00 | 8.783200E−06 | 7.745500E−06 | 8.240400E−06 |
| d10 | −4.447200E−06 | 8.936400E−06 | 0.000000E+00 | −6.596500E−07 | −3.653100E−06 | −2.132700E−06 |

TABLE 18

| | BD | DVD | CD |
| --- | --- | --- | --- |
| DOE A1 | 3 | 2 | 2 |
| DOE A2 | 2 | 1 | 1 |
| DOE B1 | 10 | 6 | 5 |
| DOE B2 | 10 | 6 | 5 |
| DOE B3 | 10 | 6 | 5 |

The practical shape of the diffractive lens structure is extracted by using macroscopic aspherical surface shape, phase function coefficient and diffraction order like the above example. Since the shapes of the spherical aberration correction diffractive lens structure A1 (Region 1) and the diffractive lens structure A2 (Region 2) are extracted in the same sequence as Example 1, the detailed description will be omitted.

Table 19 illustrates data representing specific shapes of the diffractive lens structure A in Example 2.

TABLE 19

| Step No. | Radius of step [mm] | Width of orbicular zone [mm] | Amount of step [mm] |
|---|---|---|---|
| 1 | 0.2970000 |  | 0.0025150 |
| 2 | 0.4258000 | 0.1288000 | 0.0025150 |
| 3 | 0.5297000 | 0.1039000 | 0.0025150 |
| 4 | 0.6226000 | 0.0929000 | 0.0025150 |
| 5 | 0.7108000 | 0.0882000 | 0.0025150 |
| 6 | 0.7990000 | 0.0882000 | 0.0025150 |
| 7 | 0.8930000 | 0.0940000 | 0.0025150 |
| 8 | 1.0070000 | 0.1140000 | 0.0038750 |
| 9 | 1.1480000 | 0.1410000 | 0.0014980 |
| 10 | 1.2190000 | 0.0710000 | 0.0014980 |
| 11 | 1.2660000 | 0.0470000 | 0.0014980 |
| 12 | 1.3020000 | 0.0360000 | 0.0014980 |
| 13 | 1.3330000 | 0.0310000 | 0.0014980 |
| 14 | 1.3590000 | 0.0260000 | 0.0014980 |
| 15 | 1.3820000 | 0.0230000 | 0.0014980 |
| 16 | 1.4030000 | 0.0210000 | 0.0014980 |
| 17 | 1.4230000 | 0.0200000 | 0.0014980 |
| 18 | 1.4400000 | 0.0170000 | 0.0014980 |
| 19 | 1.4570000 | 0.0170000 | 0.0014980 |
| 20 | 1.4730000 | 0.0160000 | 0.0014980 |
| 21 | 1.4870000 | 0.0140000 | 0.0014980 |
| 22 | 1.5010000 | 0.0140000 | 0.0014980 |
| 23 | 1.5140000 | 0.0130000 | 0.0014980 |
| 24 | 1.5270000 | 0.0130000 | 0.0014980 |
| 25 | 1.5390000 | 0.0120000 | 0.0014980 |
| 26 | 1.5500000 | 0.0110000 | 0.0014980 |
| 27 | 1.5610000 | 0.0110000 | 0.0014980 |
| 28 | 1.5720000 | 0.0110000 | 0.0014980 |
| 29 | 1.5820000 | 0.0100000 | 0.0014980 |
| 30 | 1.5920000 | 0.0100000 | 0.0014980 |
| 31 | 1.6010000 | 0.0090000 | 0.0014980 |
| 32 | 1.6110000 | 0.0100000 | 0.0014980 |
| 33 | 1.6190000 | 0.0080000 | 0.0014980 |
| 34 | 1.6280000 | 0.0090000 | 0.0014980 |

The diffractive lens structure A of Example 2 is composed of 34 phase steps; central surfaces divided from the steps; total 33 orbicular zone surfaces, that is, orbicular zone surfaces 2 to 34; and outer circumferential surface (Region 3).

In the diffractive lens structure A of Example 2, the phases of the wavefronts penetrating the diffractive lens structures 1 (Region 1) and 2 (Region 2) are fitted with each other for all of BD, DVD and CD by deepening the eighth phase step like Example 1.

In addition, in the diffractive lens structure A1 (Region 1), the depth of the phase step is determined in consideration of the balance between the diffraction efficiencies for BD and CD, and the central surface and the orbicular zone surfaces 2 to 8 are shaped aspherical as illustrated in Table 20. That is, the central surface on the optical axis is the aspherical surface shape illustrated in Table 20, and the orbicular zone surfaces 2 to 8 are orbicular zone surfaces, in which the aspherical surfaces illustrated in Table 20 are shifted in the optical axis direction as much as the respective step amount. The orbicular zone surfaces 9 to 34 and the outer circumferential surface (Region 3), located outside the eighth phase step, are all planes perpendicular to the optical axis.

TABLE 20

| Name of coefficient | Value |
|---|---|
| Radius of curvature | −160.8600000 |
| CC | 0.000000E+00 |
| A4 | 8.263400E−04 |
| A6 | 1.456300E−04 |
| A8 | −2.167200E−06 |
| A10 | 5.389000E−06 |

Figure 60:
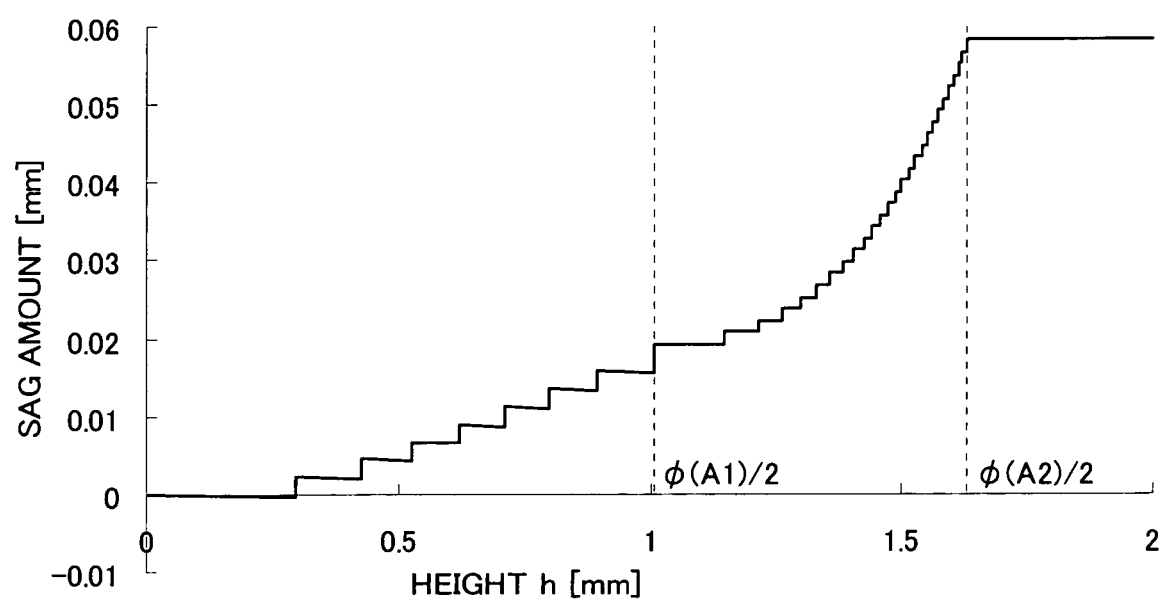
FIG. 60 is a graph schematically showing a section of a diffractive lens structure, which is formed in the diffractive optical element according to Example 2 of the present invention.

FIG. 60 is a diagram showing the cross-sectional shape of the diffractive lens structure A of Example 2.

Hereinafter, the procedure of extracting the shape of the chromatic aberration correction diffractive lens structure B will be described.

Figure 61:
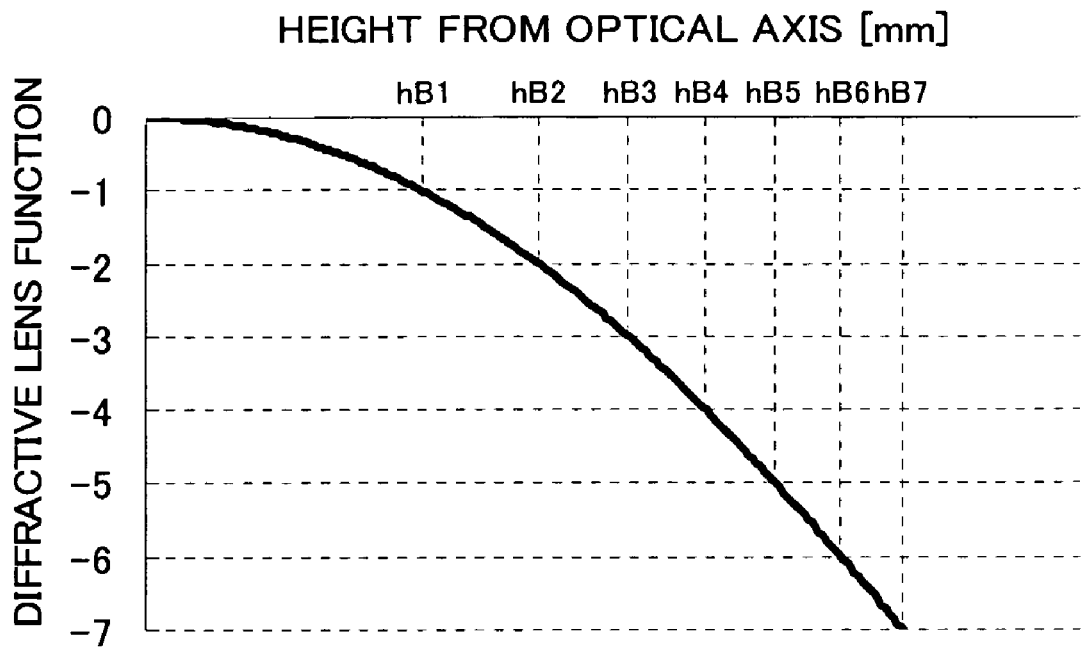
FIG. 61 is a graph of a diffractive lens function of a diffractive lens structure with respect to the height from the optical axis in the diffractive optical element according to Example 2 of the present invention.
Figure 62:
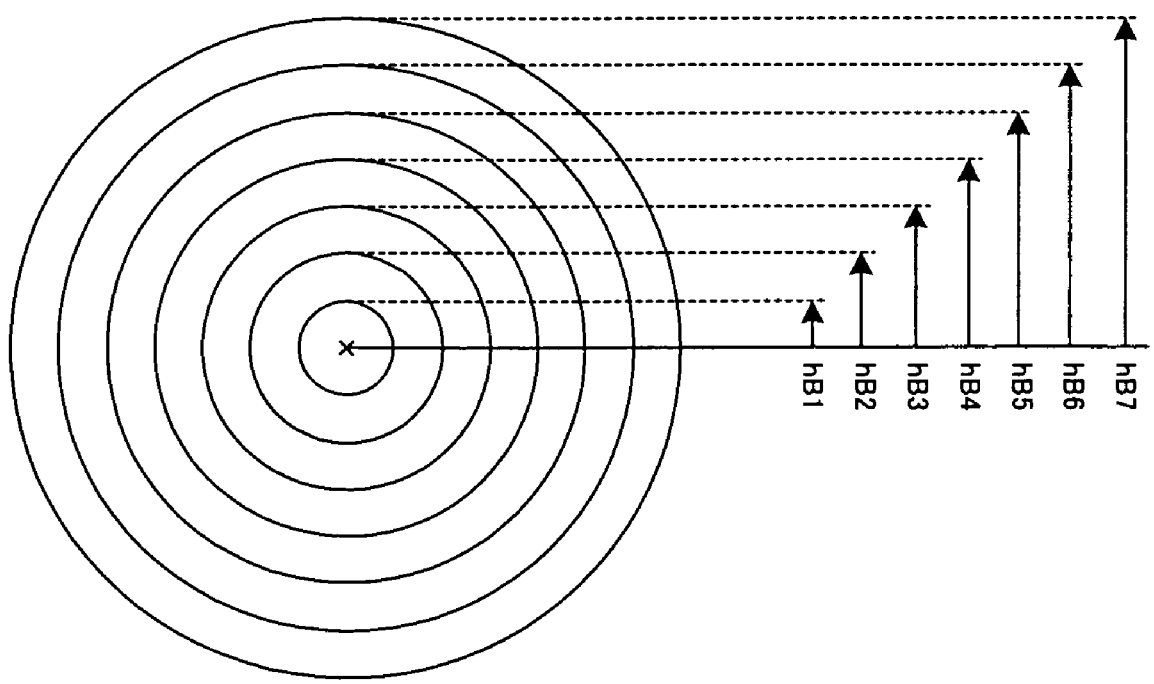
FIG. 62 is a front view of a diffractive lens structure in the diffractive optical element according to Example 2 of the present invention as viewed on the optical axis.

FIG. 61 is a graph of the diffractive lens function of the diffractive lens structure B. The heights from the optical axis of a plurality of phase steps composing the diffractive lens structure B can be extracted as heights from the optical axis hB1 to hB7, at which the diffractive lens functions become integers, as shown in FIGS. 61 and 62. Meanwhile, since the height from the optical axis hB7 becomes the phase step at the outermost circumference of the diffractive lens structure B1, the height from the optical axis hB7 becomes the height from the optical axis $\phi(B1)/2$ corresponding to the effective diameter.

Next, the design of the microscopic shape of the diffractive lens structure will be described.

Since the diffractive lens function of the diffractive lens structure B decreases monotonously, the diffractive lens structure B1 gets blazed in a direction, in which the diffractive lens structure B gets thinner by the macroscopic aspherical shape from the inner circumference to the outer circumference of the diffractive lens structure, and phase steps are formed at the heights from the optical axis hB1 to hB7, at which the diffractive lens functions become integers, in a direction, in which the lens gets thicker.

Figure 63:
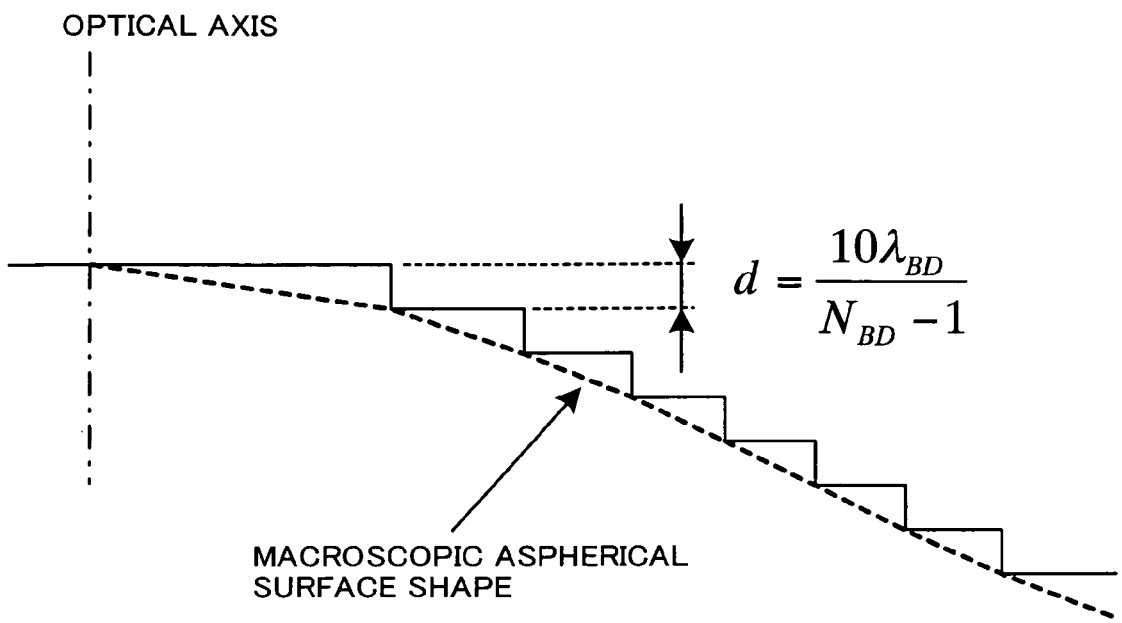
FIG. 63 is a cross-sectional view of a diffractive lens structure when the diffractive optical element according to Example 2 of the present invention is manufactured such that diffraction efficiency of laser light for BD is 100%.

The diffractive lens structure B1 is designed to generate tenth-order light to the BD light source and to negate the aberration generated by the macroscopic aspherical surface shape and the aberration generated by the phase steps at the referential wavelength. When the phase step amount d composing the diffractive lens structure B is set as shown in FIG. 63, the optical path length differences generated at respective phase steps to the BD light source become 10 $\lambda_{BD}$, and the diffraction efficiency of tenth-order light becomes 100% in theory. In this case, all orbicular zone surfaces divided by the phase steps become planes perpendicular to the optical axis as shown in FIG. 63.

In addition, since the optical path length differences generated at the phase steps composing the diffractive lens structure B1 become about 6 $\lambda_{DVD}$ for DVD laser and about 5 $\lambda_{CD}$ for CD laser, the aberration due to the macroscopic aspherical surface and the aberration due to the phase step are almost negated like BD case, and the theoretical diffraction efficiency of sixth-order diffraction light for DVD laser and fifth diffraction light for CD laser become almost 100%.

Although the shapes of the diffractive lens structures B2 (Region 2) and B3 (Region 3) are extracted in the same sequence, phase differences can occur among the wavefronts having penetrated the respective diffractive lens structures when the wavelength of the laser varies, and, in this case, it can be considered to adjust the values at the integer terms d0 of the diffractive lens functions so as to shift the phase steps to the inner or outer circumference entirely or to adjust the values with the step amount in the vicinity of the border, at which phase differences occur. In the chromatic aberration diffractive lens structure B of Example 2, the values are adjusted by making the integer term d0 of the diffractive lens structure B2 (Region 2) 0.0002856.

Table 21 illustrates data representing the specific shapes of the diffractive lens structure B in Example 2.

The diffractive lens structure B of Example 2 is composed of 37 phase steps, central surfaces divided from the steps, total 36 orbicular zone surfaces, that is, orbicular zone surfaces 2 to 37, and the outer circumferential surface (Region 3).

TABLE 21

| Step No. | Radius of step [mm] | Width of orbicular zone [mm] | Amount of step [mm] |
| --- | --- | --- | --- |
| 1 | 0.3534000 | | 0.0074900 |
| 2 | 0.5024000 | 0.1490000 | 0.0074900 |
| 3 | 0.6188000 | 0.1164000 | 0.0074900 |
| 4 | 0.7189000 | 0.1001000 | 0.0074900 |
| 5 | 0.8090000 | 0.0901000 | 0.0074900 |
| 6 | 0.8926000 | 0.0836000 | 0.0074900 |
| 7 | 0.9716000 | 0.0790000 | 0.0074900 |
| 8 | 1.0210000 | 0.0494000 | 0.0074900 |
| 9 | 1.1020000 | 0.0810000 | 0.0074900 |
| 10 | 1.1700000 | 0.0680000 | 0.0074900 |
| 11 | 1.2280000 | 0.0580000 | 0.0074900 |
| 12 | 1.2780000 | 0.0500000 | 0.0074900 |
| 13 | 1.3230000 | 0.0450000 | 0.0074900 |
| 14 | 1.3640000 | 0.0410000 | 0.0074900 |
| 15 | 1.4010000 | 0.0370000 | 0.0074900 |
| 16 | 1.4350000 | 0.0340000 | 0.0074900 |
| 17 | 1.4660000 | 0.0310000 | 0.0074900 |
| 18 | 1.4950000 | 0.0290000 | 0.0074900 |
| 19 | 1.5220000 | 0.0270000 | 0.0074900 |
| 20 | 1.5480000 | 0.0260000 | 0.0074900 |
| 21 | 1.5720000 | 0.0240000 | 0.0074900 |
| 22 | 1.5940000 | 0.0220000 | 0.0074900 |
| 23 | 1.6160000 | 0.0220000 | 0.0074900 |
| 24 | 1.6400000 | 0.0240000 | 0.0074900 |
| 25 | 1.6770000 | 0.0370000 | 0.0074900 |
| 26 | 1.7120000 | 0.0350000 | 0.0074900 |
| 27 | 1.7450000 | 0.0330000 | 0.0074900 |
| 28 | 1.7760000 | 0.0310000 | 0.0074900 |
| 29 | 1.8050000 | 0.0290000 | 0.0074900 |
| 30 | 1.8340000 | 0.0290000 | 0.0074900 |
| 31 | 1.8600000 | 0.0260000 | 0.0074900 |
| 32 | 1.8860000 | 0.0260000 | 0.0074900 |
| 33 | 1.9100000 | 0.0240000 | 0.0074900 |
| 34 | 1.9330000 | 0.0230000 | 0.0074900 |
| 35 | 1.9550000 | 0.0220000 | 0.0074900 |
| 36 | 1.9760000 | 0.0210000 | 0.0074900 |
| 37 | 1.9960000 | 0.0200000 | 0.0074900 |

Figure 64:
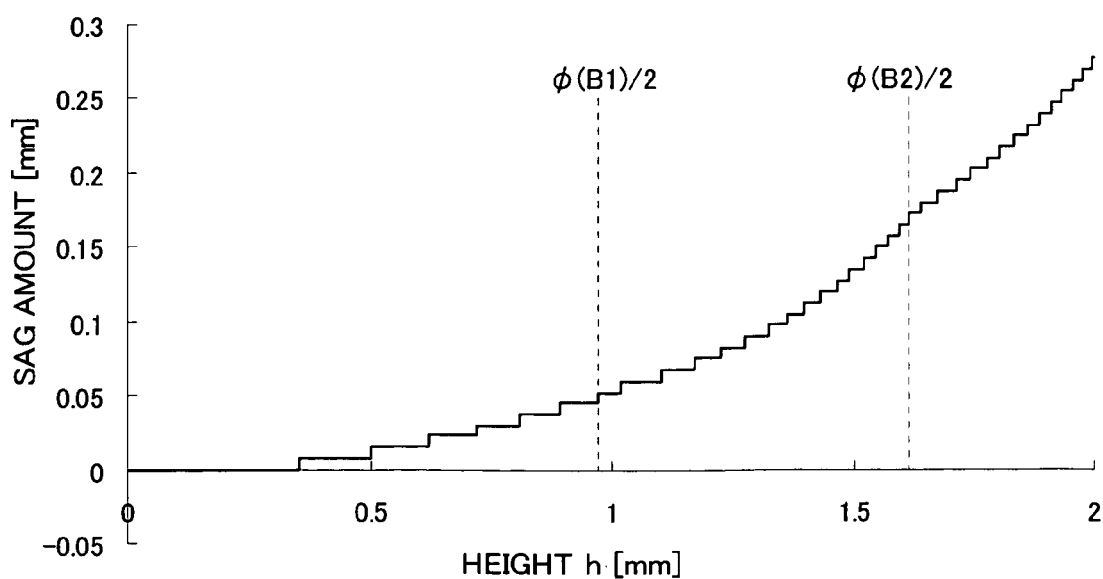
FIG. 64 is a graph schematically showing a section of a diffractive lens structure B, which is formed in the diffractive optical element according to Example 2 of the present invention.

FIG. 64 is a diagram showing the cross-sectional shape of the diffractive lens structure B of Example 2. All the macroscopic aspherical surfaces of the diffractive lens structures B1, B2 (Region 2) and B3 (Region 3) are shaped recessed, and all the orbicular zone surfaces divided by the phase steps are planes perpendicular to the optical axis.

FIGS. 65 to 67 are wavefront aberrations calculated from the practical shape data of the diffractive lens structures and show the phases of the wavefronts inside the effective diameter for all of BD, DVD and CD. Like Example 1, saw-like aberrations exist in the wavefronts, however, they have no bad effect on the spot shapes, thereby they can be ignored.

Figure 68:
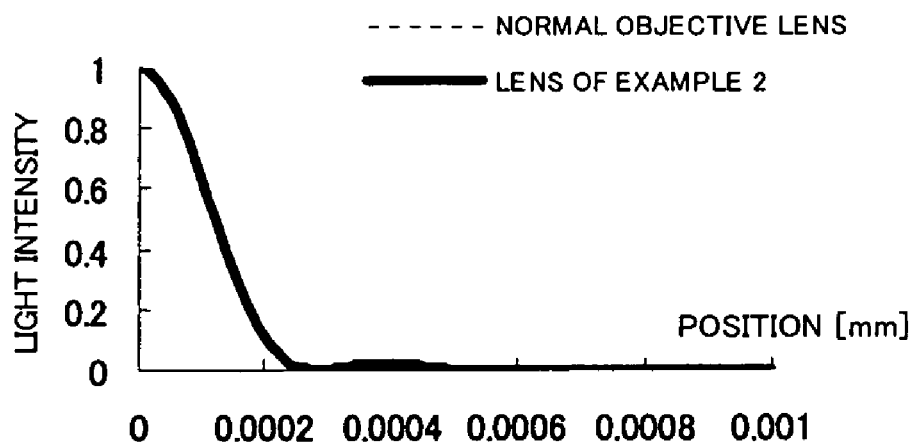
FIG. 68 is a graph showing a spot shape on BD calculated by a wavefront aberration of an objective lens module which is calculated by data having an actual surface shape of the diffractive lens structure in the diffractive optical element according to Example 2 of the present invention.
Figure 69:
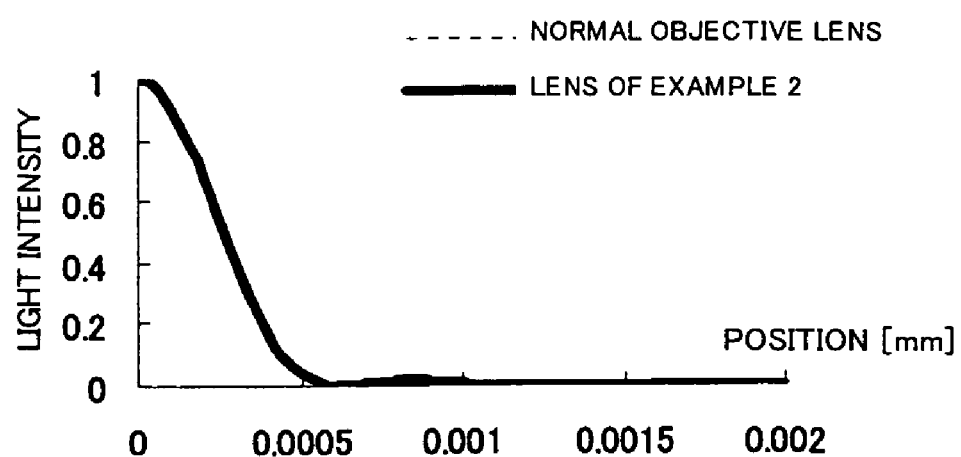
FIG. 69 is a graph showing a spot shape on DVD calculated by a wavefront aberration of an objective lens module which is calculated by data having an actual surface shape of the diffractive lens structure in the diffractive optical element according to Example 2 of the present invention.
Figure 70:
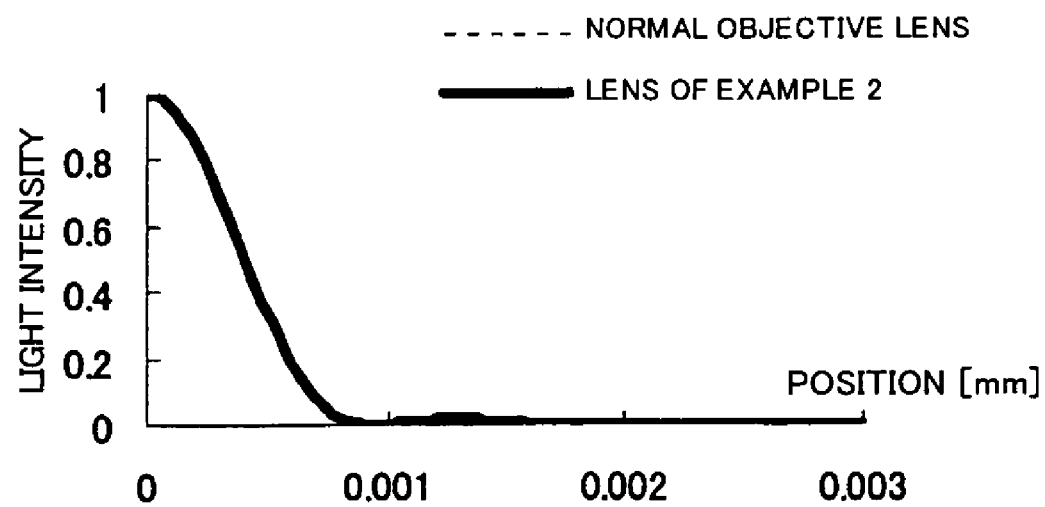
FIG. 70 is a graph showing a spot shape on CD calculated by a wavefront aberration of an objective lens module which is calculated by data having an actual surface shape of the diffractive lens structure in the diffractive optical element according to Example 2 of the present invention.
Figure 71:
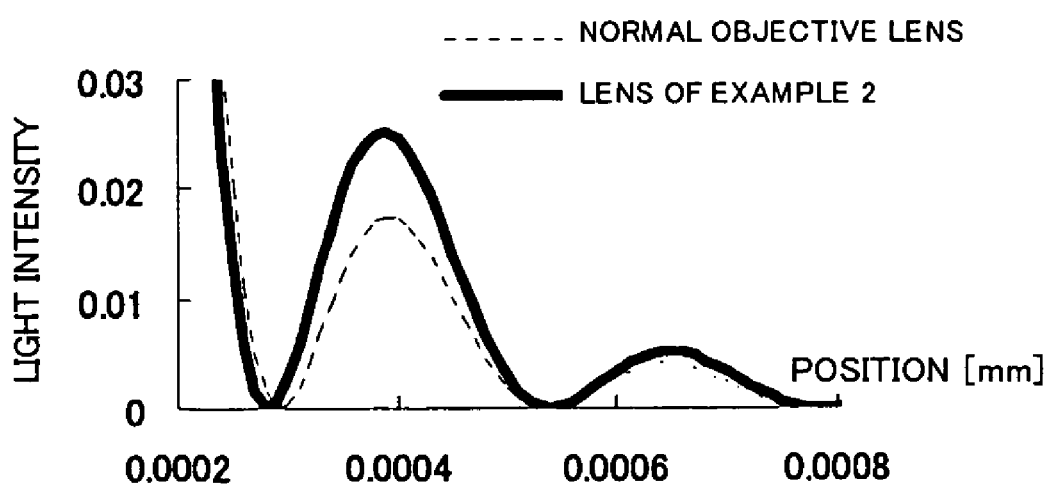
FIG. 71 is a graph showing a spot side-robe shape on BD calculated by a wavefront aberration of an objective lens module which is calculated by data having an actual surface shape of the diffractive lens structure in the diffractive optical element according to Example 2 of the present invention.
Figure 72:
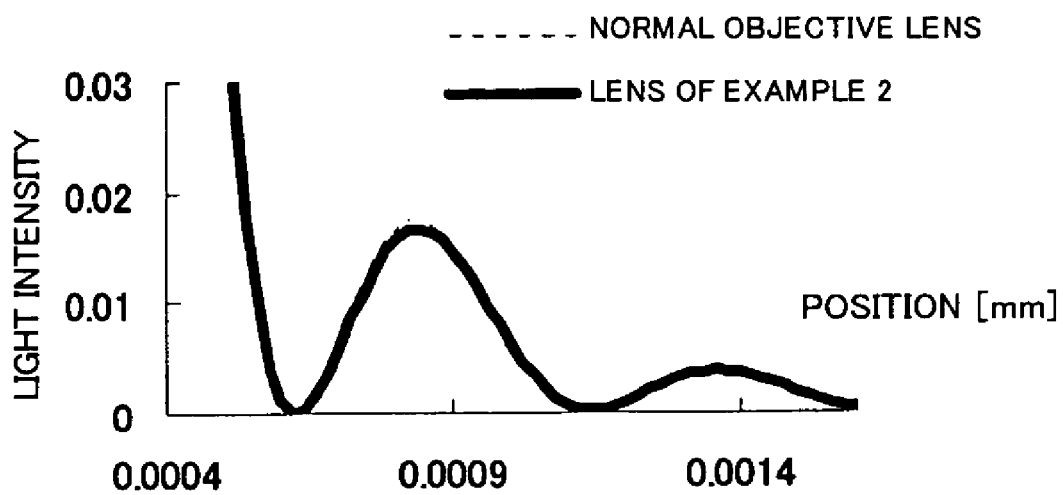
FIG. 72 is a graph showing a spot side-robe shape on DVD calculated by a wavefront aberration of an objective lens module which is calculated by data having an actual surface shape of the diffractive lens structure in the diffractive optical element according to Example 2 of the present invention.
Figure 73:
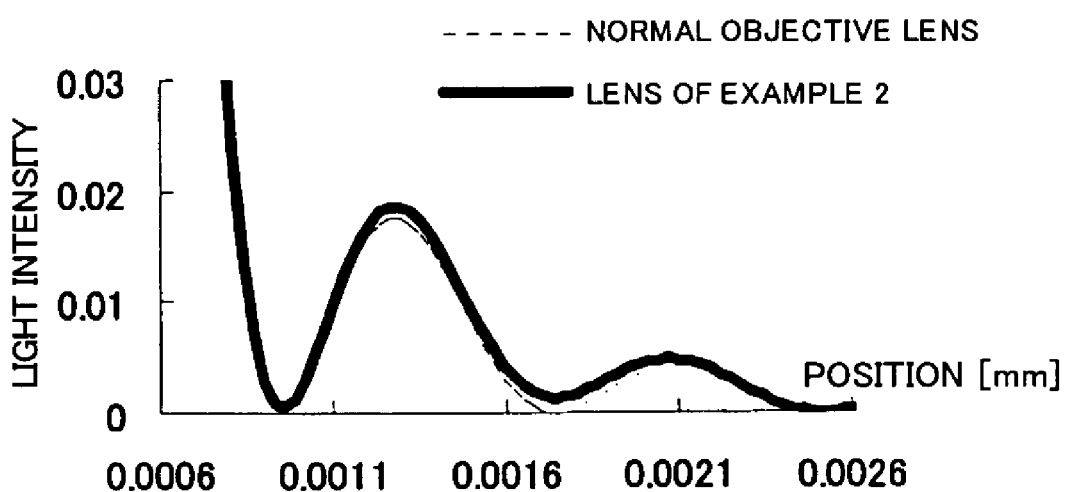
FIG. 73 is a graph showing a spot side-robe shape on CD calculated by a wavefront aberration of an objective lens module which is calculated by data having an actual surface shape of the diffractive lens structure in the diffractive optical element according to Example 2 of the present invention.

FIGS. 68 to 73 are graphs showing the wave-optic spot shapes calculated by using the aberration due to the practical surface shapes of the diffractive lens structures, in which the ordinate represents the optical strength and the abscissa represents the radius. FIGS. 68 to 70 show the whole spot shapes at BD, DVD and CD respectively, and FIGS. 71 to 73 show the side robe of the spots at BD, DVD and CD respectively. In the light-converging spot of BD, the main spot is slightly smaller and the side robe is slightly larger than those of a normal lens. The above fact is due to the apodization effect generated by the diffraction efficiency slightly dropping in the diffractive lens structure A1 (Region 1), however, no troubles occur in recording and reproducing with that degree. In addition, since the intensity of the semiconductor laser used as a light source decreases from center to periphery, it can be preferable to drop the efficiency at the inner circumferential portion so as to generate the apodization effect. Regarding DVD or CD, the spot shapes are calculated in consideration of light outside the respective effective diameters, but the spot shapes are almost the same as those of the normal objective lens.

Figure 74:
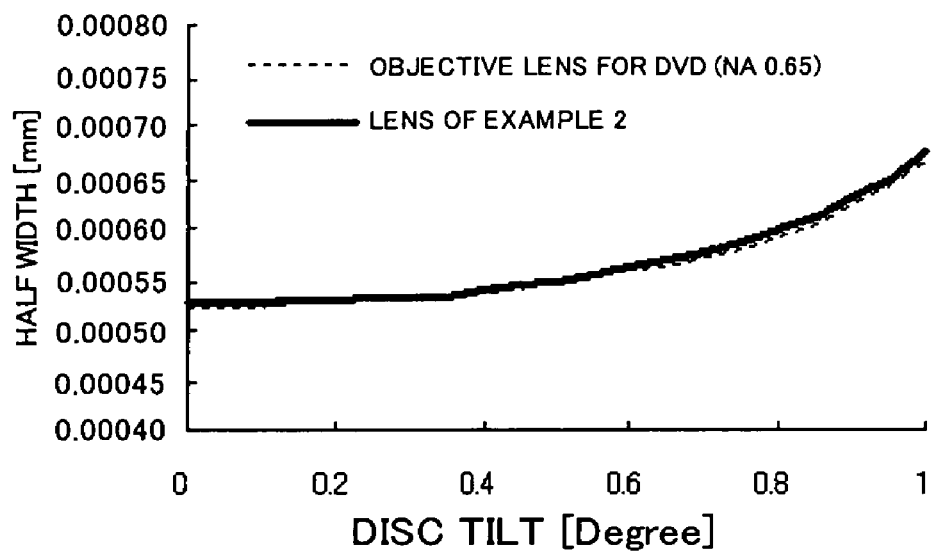
FIG. 74 is a graph showing a relationship between a full width at half maximum of a spot and a disc tilt angle at the time of tilt with respect to DVD when the objective lens module according to Example 2 of the present invention is used.
Figure 75:
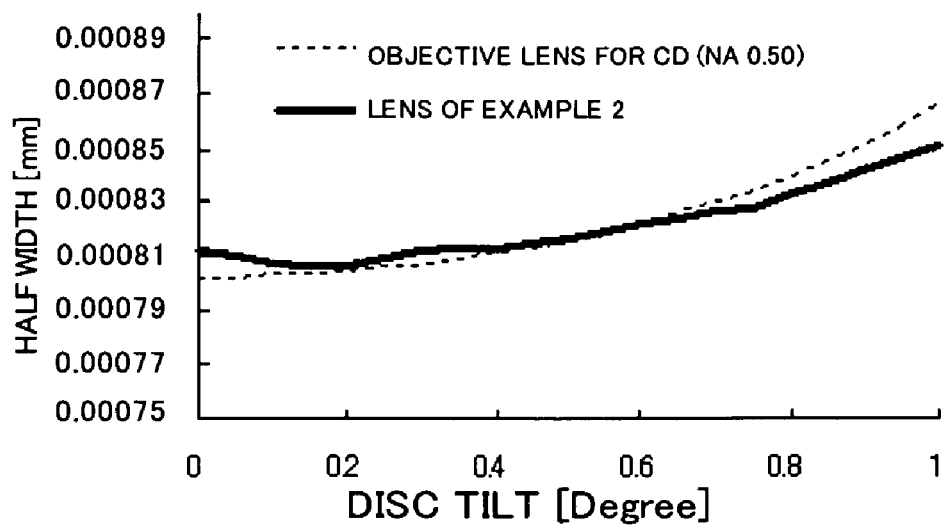
FIG. 75 is a graph showing a relationship between a full width at half maximum of a spot and a disc tilt angle at the time of tilt with respect to CD when the objective lens module according to Example 2 of the present invention is used.
Figure 76:
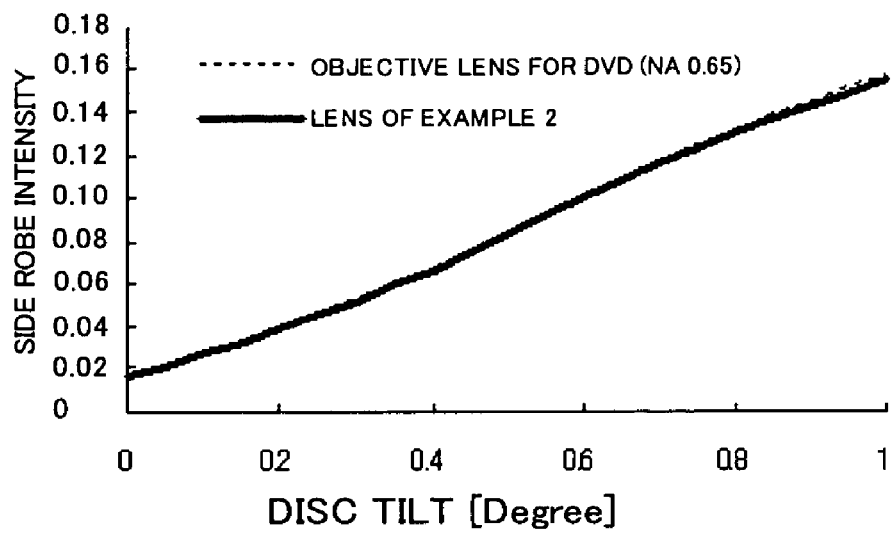
FIG. 76 is a graph showing a relationship between a spot side-robe intensity and a disc tilt angle at the time of tilt with respect to DVD when the objective lens module according to Example 2 of the present invention is used.
Figure 77:
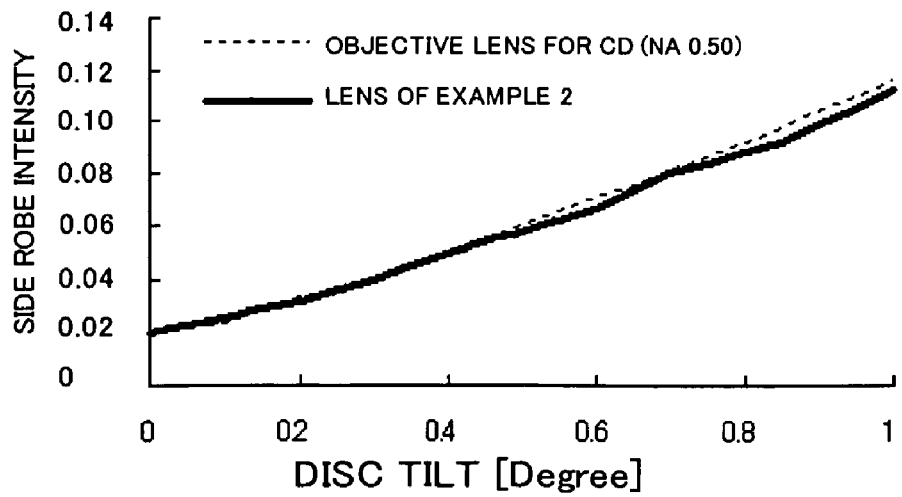
FIG. 77 is a graph showing a relationship between a spot side-robe intensity and a disc tilt angle at the time of tilt with respect to CD when the objective lens module according to Example 2 of the present invention is used.

FIGS. 74 to 77 are graphs showing the calculation result of the spot shape variation to disc tilt. FIGS. 74 and 75 show the full widths at half maximum variation of the spots at DVD and CD respectively, in which the ordinate represents the full width at half maximum and the abscissa represents the disc tilt angle. FIGS. 76 and 77 show the variation of side robe intensity at DVD and CD respectively, in which the ordinate represents the side robe intensity of the spots and the abscissa represents the disc tilt angle. It can be understood that a reproducing-characteristic as stable as that when conventional DVD and CD objective lens are used can be obtained, particularly, with no control of numeric aperture when the objective lens of Example 2 is used since the diffractive lens structure shows almost the same characteristics as those of the normal lens to any one of DVD and CD.

Figure 78:
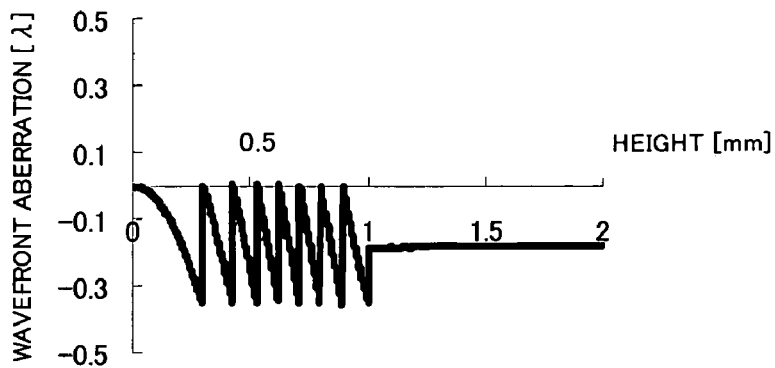
FIG. 78 is graph showing a wavefront aberration shape for BD in a best image surface by the objective lens module according to Example 2 of the present invention.
Figure 79:
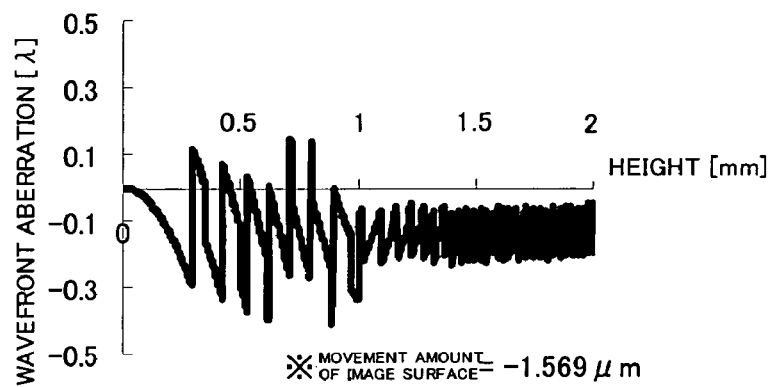
FIG. 79 is a graph showing a wavefront aberration shape for BD in a best image surface by the objective lens module according to Example 2 of the present invention when the wavelength of a light source is changed to 403 nm.
Figure 80:
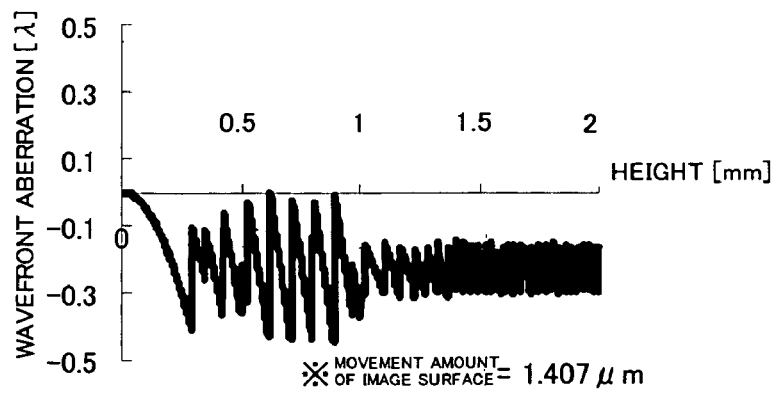
FIG. 80 is a graph showing a wavefront aberration shape for BD in a best image surface by the objective lens module according to Example 2 of the present invention when the wavelength of a light source is changed to 413 nm.

FIGS. 78 to 80 show the wavefront aberration shapes at the optimal image surfaces when the wavelength variation of the light source occurs in the objective lens module of Example 2. Meanwhile, the materials for the diffractive optical element and the objective lens have the refractive index varying with the wavelength variation as shown in Table 22.

TABLE 22

| Wavelength of light source [nm] | Refractive index | |
| --- | --- | --- |
| | Diffractive optical element | Objective lens |
| 403 | 1.546690 | 1.711362 |
| 404 | 1.546284 | 1.710956 |
| 405 | 1.545892 | 1.710553 |
| 406 | 1.545510 | 1.710154 |
| 407 | 1.545140 | 1.709760 |
| 408 | 1.544782 | 1.709369 |
| 409 | 1.544433 | 1.708982 |
| 410 | 1.544095 | 1.708599 |
| 411 | 1.543767 | 1.708220 |
| 412 | 1.543448 | 1.707844 |
| 413 | 1.543138 | 1.707472 |

It can be understood from the wavefront aberration drawings that only slight saw-like wavefront aberration occurs, and the wavefront shapes rarely deteriorate even when ±5 nm of wavelength variation occurs. As described above, the saw-like wavefront aberration has no bad effect on the spot shapes.

Figure 81:
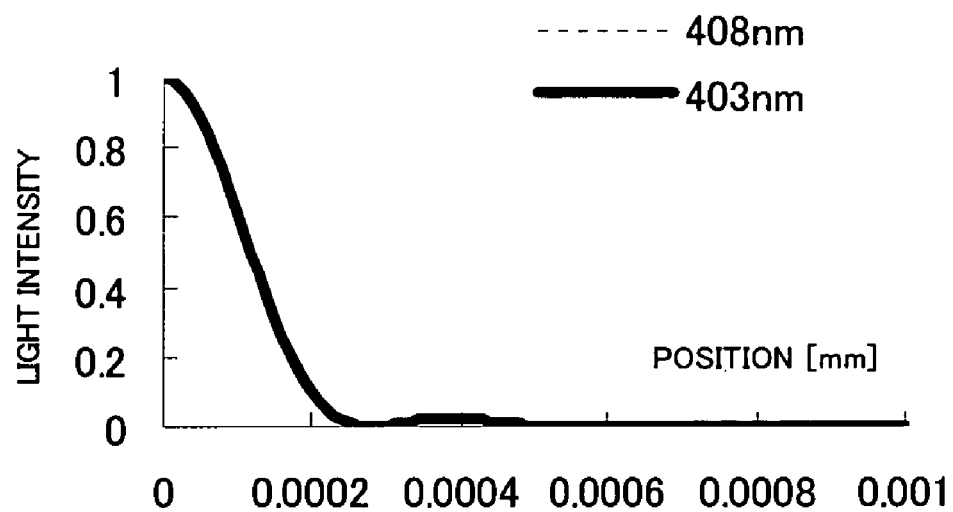
FIG. 81 is a graph showing an entire spot shape at the wavelength 403 nm for BD in the objective lens module according to Example 2 of the present invention.
Figure 82:
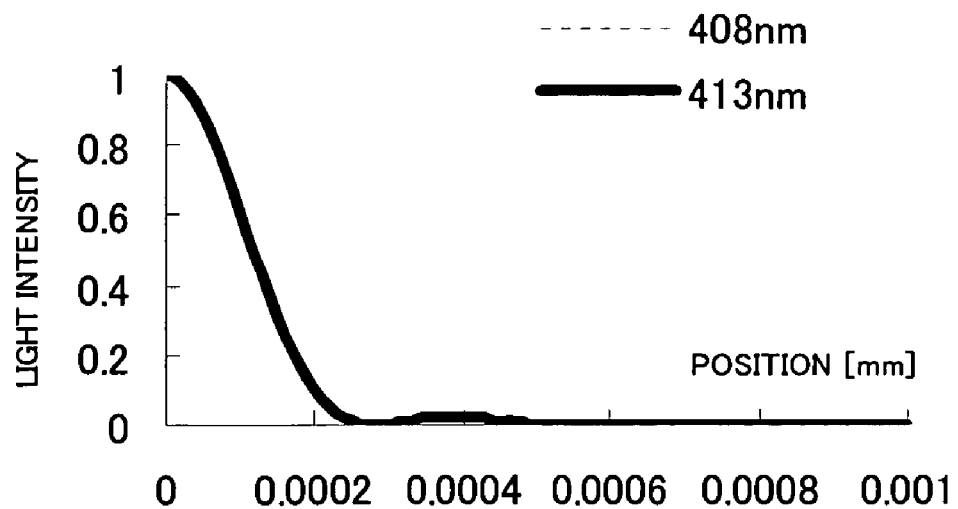
FIG. 82 is a graph showing an entire spot shape at the wavelength 413 nm for BD in the objective lens module according to Example 2 of the present invention.
Figure 83:
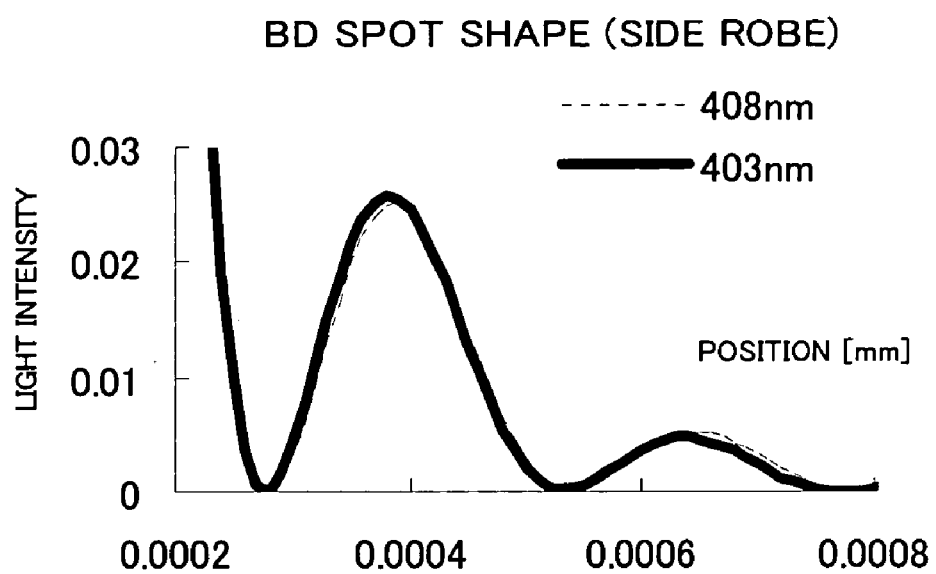
FIG. 83 is a graph showing a side robe of a spot at the wavelength 403 nm for BD in the objective lens module according to Example 2 of the present invention.
Figure 84:
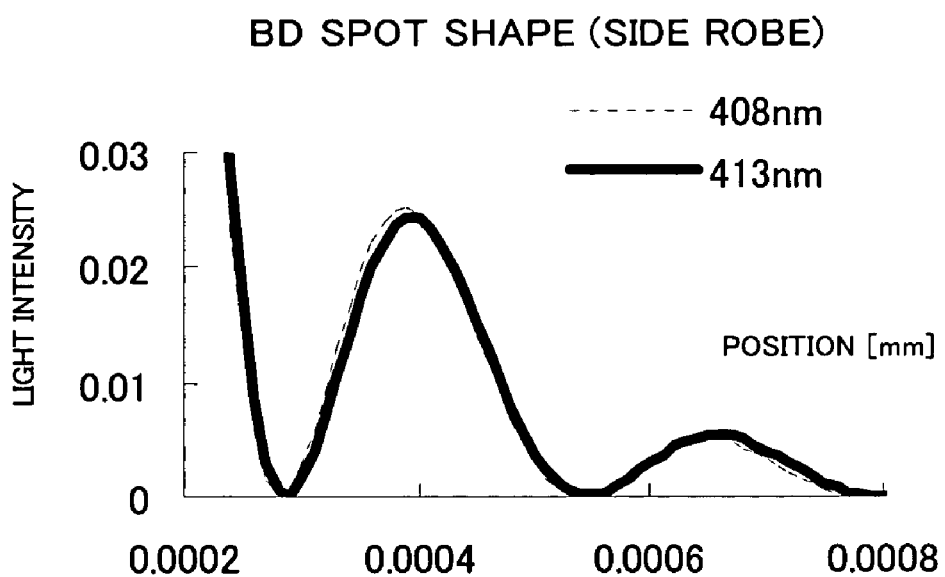
FIG. 84 is a graph showing a side robe of a spot at the wavelength 413 nm for BD in the objective lens module according to Example 2 of the present invention.

FIGS. 81 to 84 are graphs showing the spot shapes of BD at the wavelengths of 403 nm and 413 nm, in which the spot shapes at the design wavelength of 408 nm are overlapped for comparison. The ordinate represents the light intensity, and the abscissa represents the radius. FIGS. 81 and 82 show the entire spot. shapes at the wavelengths of 403 nm and 413 nm respectively, and FIGS. 83 and 84 show the side robe of the spots at the wavelengths of 403 nm and 413 nm respectively. It can be understood from the drawings that the spot shapes rarely deteriorate to ±5 nm of wavelength variation in the lens using the diffractive optical element of Example 2.

Figure 85:
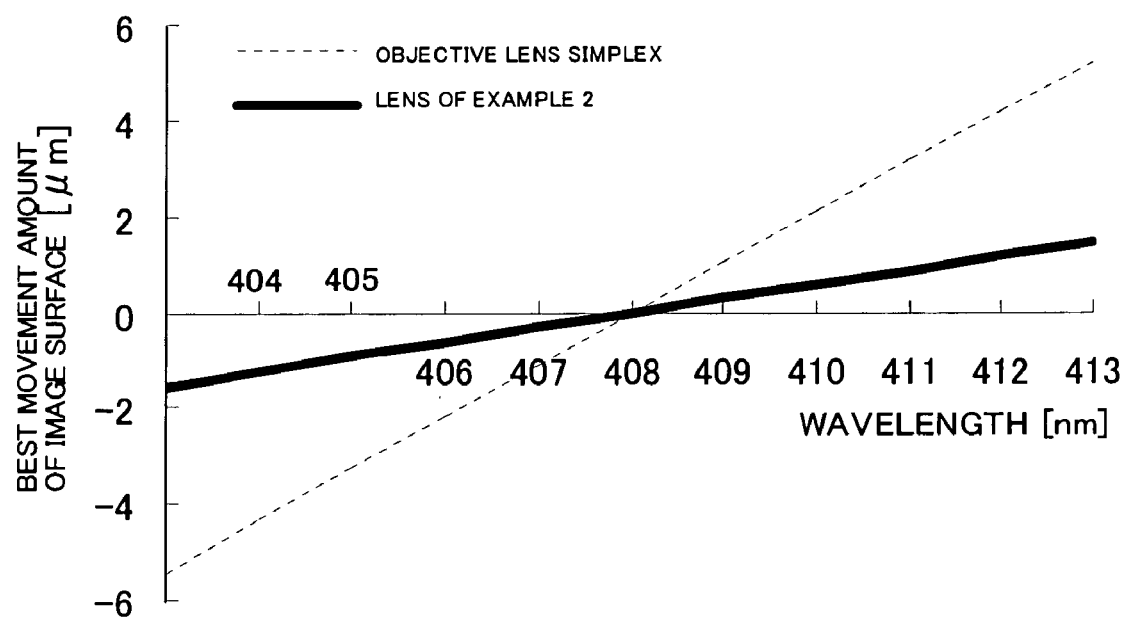
FIG. 85 is a graph showing a movement amount of a best image surface (light-converging point) with respect to the wavelength change of a lens, which uses the diffractive optical element according to Example 2 of the present invention.

FIG. 85 is a graph showing the moving amount of the optimal image surfaces calculated to the wavelength variation of the lens using the diffractive optical element of Example 2. It can be understood that the moving amount of the optimal image surface position to the wavelength variation is smaller than that of the objective lens unit in the lens of Example 2, and thus the performance becomes more stable to the wavelength variation comparing when the objective lens unit is used.

As described above, the lens of Example 2 can record on and reproduce BD, DVD and CD and shows more stable performance to wavelength variation than the objective lens unit for BD.

Meanwhile, in Example 2, two kinds of spherical aberration correction diffractive lens structures are formed at the diffractive lens structure A and three kinds of chromatic aberration correction diffractive lens structures are formed at the diffractive lens structure B, however, they can be employed at any surfaces.

Figure 86:
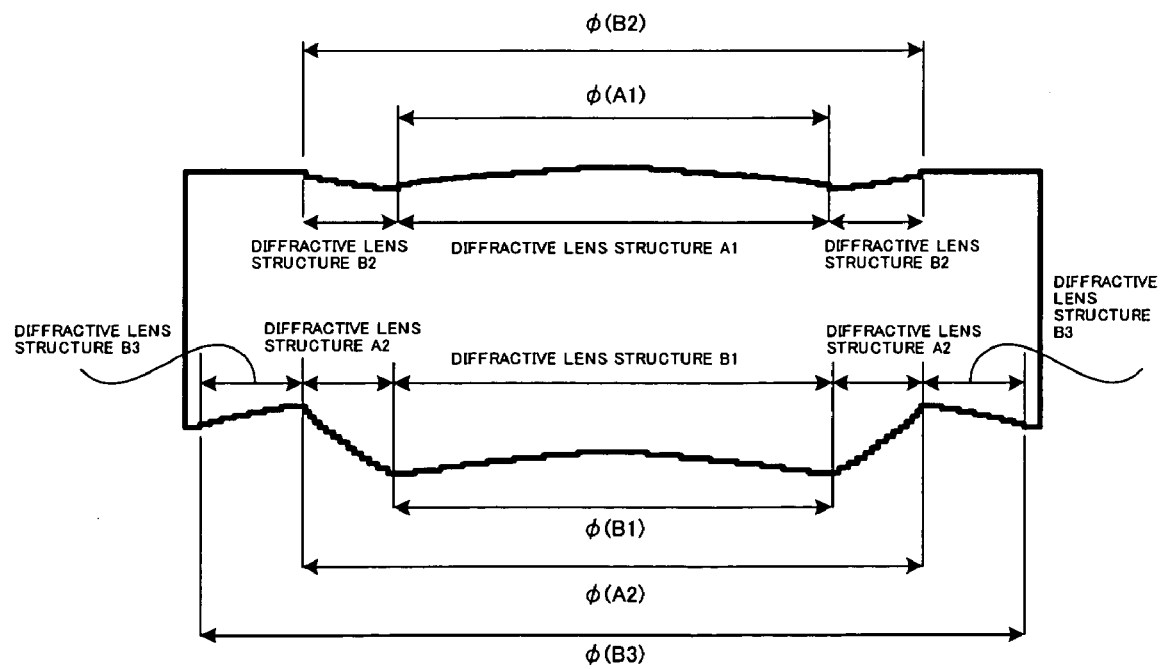
FIG. 86 is a schematic cross-sectional view of a diffractive optical element according to a modification of Example 2 of the present invention.

FIG. 86 is a cross-sectional view of a modified example of the diffractive optical element of Example 2, in which the spherical aberration correction diffractive lens structure A1 (Region 1) and the chromatic aberration correction diffractive lens structure B2 (Region 2) are provided at the first surface, and the spherical aberration correction diffractive lens structure A2 (Region 2) and the chromatic aberration correction diffractive lens structures B1 and B3 are provided at the second surface. As described above, the spherical and chromatic aberration correction diffractive lens structures are not necessarily divided and formed at the same surface by their functions, and the shapes of the diffractive optical element can be considerably changed by changing the composition of the diffractive lens structures, thereby the shape of the diffractive lens structures can be changed properly for easy fabrication.

Meanwhile, the modified example shown in FIG. 86 is not preferable for fabrication since the macroscopic surface shapes of the first and second surfaces are complex. On the other hand, the diffractive optical element of Example 2 is preferable since all the step directions are gathered in the respective surfaces of the first and second surfaces, thereby the mold is easy to fabricate and release in shaping.

EXAMPLE 3

Example 3 is also, like Example 2, a diffractive optical element that can record on and reproduce BD, DVD and CD. In addition, the diffractive optical element of Example 3 is designed in consideration of the effect of the chromatic aberration due to the slight wavelength variation of the light source.

Table 23 illustrates the composition of the lens system and the design conditions for BD, DVD and CD in Example 3.

TABLE 23

|  | BD | DVD | CD |
| --- | --- | --- | --- |
| Light source wavelength [nm] | 408 | 660 | 780 |
| Magnification | 0 | 0 | 0 |

TABLE 23-continued

|  | BD | DVD | CD |
| --- | --- | --- | --- |
| Numeric aperture | 0.85 | 0.65 | 0.50 |
| Effective diameter [mm] | 4.000 | 3.246 | 2.540 |
| Disc thickness [mm] | 0.1 | 0.6 | 1.2 |

Figure 87:
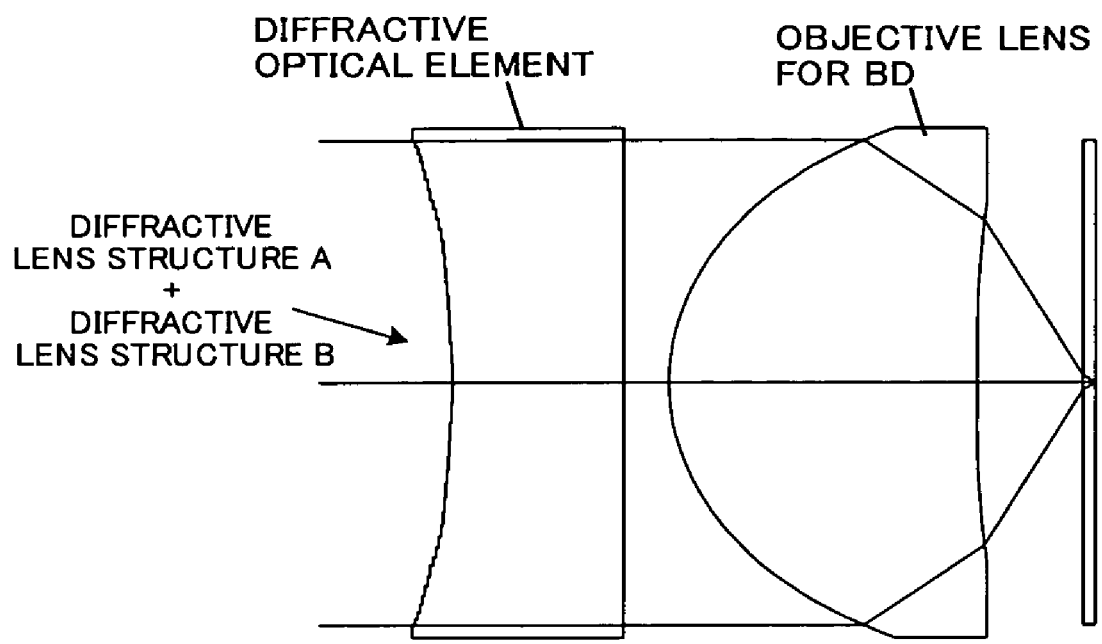
FIG. 87 is a schematic cross-sectional view of an objective lens module having a diffractive optical element according to Example 3 of the present invention and an objective lens.

In Example 2, the diffractive lens structures are formed on both surfaces of the diffractive optical element. However, in this case, since the diffractive lens structures are formed at both surfaces of the element, two high-precision molds including fine phase steps are required, and thus the cost rises. Therefore, in Example 3, all diffractive lens structures are formed at a single surface as shown in FIG. 87, thereby the cost decreases.

In order to realize the above composition, it is enough to extract the practical shapes of the spherical and chromatic aberration correction diffractive lens structures and to fit them with each other geometrically.

Figure 88:
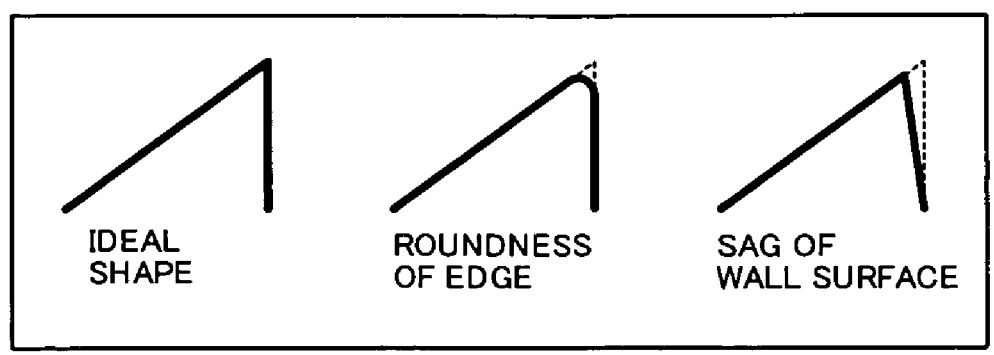
FIG. 88 is a partial cross-sectional view showing a manufacturing error of a step of a diffractive optical element.

However, when a plurality of diffractive lens structures is overlaid at the same surface, the number of the phase steps can increase or the intervals among the phase steps can decrease considerably. It is not preferable that the number of the phase steps increase since diffraction efficiency deteriorates substantially as described below. That is, when the phase steps composing the diffractive lens structure are fabricated, fabrication errors such as edge Roundness or wall surface slope shown in the cross-sectional shapes of FIG. 88 necessarily occur, thereby the diffraction efficiency deteriorates. The deterioration of the diffraction efficiency due to the fabrication errors gets more serious as the number of the phase steps increases. Therefore, the substantial deterioration of the diffraction efficiency can be prevented by reducing the number of the phase steps after the diffractive lens structure is designed.

Therefore, in Example 3, the deterioration of the diffraction efficiency due to the fabrication errors is prevented by synthesizing adjacent phase steps among the phase steps due to the spherical and chromatic aberration correction diffractive lens structures.

The designing sequence of the diffractive lens structure of Example 3 is as follows: first, the phase functions of the spherical aberration correction diffractive lens structure A and the chromatic aberration correction diffractive lens structure B are set, and then their phase function coefficients are optimized. The spherical aberration correction diffractive lens structure A is imagined to have a BD, DVD and CD compatible diffractive lens structure A1 (Region 1) inside the effective diameter φ (A1) smaller than the effective diameter of CD and the diffractive lens structure A2 (Region 2) correcting only spherical aberration for DVD inside the effective diameter of DVD at the outer circumferential portion thereof like Examples 1 and 2. The combinations of the diffraction order used in the diffractive lens structures A1 (Region 1) and A2 (Region 2) are identical to those of Examples 1 and 2. In addition, the chromatic aberration correction diffractive lens structure B is, like Example 2, composed of the diffractive lens structure B1 designed to correct the chromatic aberration generated when the diffractive lens structure A1 (Region 1) and the objective lens are combined; the diffractive lens structure B2 designed to correct the chromatic aberration generated when the diffractive lens structure A2 (Region 2) and the objective lens are combined at the middle circumferential portion; and the objective lens structure B3 designed at the outer circumferential portion to correct the chromatic aberration of the objective lens.

The diffractive lens structures A and B are disposed at the surface, which the light of the diffractive optical element 5 enters.

Table 24 illustrates paraxial data, the specific design results of Example 3.

TABLE 24

| Surface No. | Radius of curvature | Central thickness | | | Refractive index | | |
|---|---|---|---|---|---|---|---|
| | | BD | DVD | CD | BD | DVD | CD |
| 1 | Diffractive lens structure B | 0.0000000 | ← | ← | 1.5447820 | 1.5228720 | 1.5197300 |
| 2 | ∞ | 0.0000000 | ← | ← | 1.0000000 | ← | ← |
| 3 | Diffractive lens structure A | 1.5000000 | ← | ← | 1.5447820 | 1.5228720 | 1.5197300 |
| 4 | ∞ | 0.3000000 | ← | ← | 1.0000000 | ← | ← |
| 5 | 1.7050000 | 2.5000000 | ← | ← | 1.7093690 | 1.6663360 | 1.6594900 |
| 6 | −31.8720000 | 0.8599100 | 0.6764120 | 0.3511690 | 1.0000000 | ← | ← |
| 7 | ∞ | 0.1000000 | 0.6000000 | 1.2000000 | 1.6180700 | 1.5796560 | 1.5740810 |
| 8 | ∞ | 0.0000000 | ← | ← | 1.0000000 | ← | ← |

Meanwhile, Table 24 illustrates the diffractive lens structure by using three surfaces from first to third surfaces, however, it is just the diffractive lens structure illustrated with design denotation, and when the practical surface shape is extracted, the design result of the three surfaces are synthesized and one surface shape is extracted.

Table 25 illustrates aspherical surface coefficients representing the macroscopic aspherical surface shapes of the diffractive lens structures B and A and the aspherical surface shape of the objective lens in Example 3.

TABLE 25

| | Diffractive lens structure B | | | Diffractive lens structure A | |
|---|---|---|---|---|---|
| Name of coefficient | First surface (in) DOE B1 (0 < h ≦ 1.007) | First surface (mid) DOE B2 (1.007 < h ≦ 1.623) | First surface (out) DOE B3 (1.623 < h) | Second surface (in) DOE A1 (0 < h ≦ 1.007) | Second surface (mid) DOE A2 (1.007 < h ≦ 1.623) |
| Radius of curvature | −8.2528000 | −46.7250000 | −14.5020000 | 19.1520000 | −21.2150000 |
| CC | 0.000000E+00 | 0.000000E+00 | 0.000000E+00 | 0.000000E+00 | 0.000000E+00 |
| A4 | 5.065500E−03 | −1.094500E−02 | −2.340100E−03 | −7.125200E−03 | 8.005900E−03 |
| A6 | 4.132000E−04 | −2.480900E−03 | −5.656300E−04 | −1.084900E−03 | 2.517700E−03 |
| A8 | 1.785700E−04 | 3.642000E−04 | 1.146900E−04 | −3.138600E−05 | −5.207600E−04 |
| A10 | −1.388100E−05 | −7.271800E−05 | −3.518500E−05 | −2.450400E−05 | 8.084900E−05 |
| A12 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

| Name of coefficient | Diffractive lens structure A Second surface (out) (plane) (1.623 < h) | Objective lens | |
|---|---|---|---|
| | | Third surface | Fourth surface |
| Radius of curvature | ∞ | 1.7050000 | −31.8720000 |
| CC | 0.000000E+00 | −8.837900E−01 | −3.081010E+01 |
| A4 | 0.000000E+00 | 1.191000E−02 | 7.534260E−02 |
| A6 | 0.000000E+00 | 1.545000E−03 | −5.126470E−02 |
| A8 | 0.000000E+00 | −9.654700E−06 | 2.038740E−02 |

TABLE 25-continued

| | | | |
|---|---|---|---|
| A10 | 0.000000E+00 | 2.366400E-04 | -4.851690E-03 |
| A12 | 0.000000E+00 | -1.325900E-04 | 6.003500E-04 |
| A14 | 0.000000E+00 | 4.987100E-05 | 1.449830E-04 |
| A16 | 0.000000E+00 | -1.045100E-05 | -1.653040E-04 |
| A18 | 0.000000E+00 | 1.116900E-06 | 5.836630E-05 |
| A20 | 0.000000E+00 | -4.791100E-08 | -7.346300E-06 |

Tables 26 and 27 are the phase function coefficients of the diffractive lens structures B and A and the diffraction orders to be used ($\lambda_0$=408 nm).

TABLE 26

| | Diffractive lens structure B | | | Diffractive lens structure A | | |
|---|---|---|---|---|---|---|
| Name of coefficient | First surface (in) DOE B1 ($0 < h \leq 1.007$) | First surface (mid) DOE B2 ($1.007 < h \leq 1.623$) | First surface (out) DOE B3 ($1.623 < h$) | Second surface (in) DOE A1 ($0 < h \leq 1.007$) | Second surface (mid) DOE A2 ($1.007 < h \leq 1.623$) | Second surface (out) (plane) ($1.623 < h$) |
| d0 | 0.000000E+00 | 2.856000E-04 | 0.000000E+00 | 0.000000E+00 | 0.000000E+00 | 0.000000E+00 |
| d2 | -3.300600E-03 | -8.237000E-04 | -1.878300E-03 | 4.740800E-03 | -5.213500E-03 | 0.000000E+00 |
| d4 | 2.638200E-04 | -4.708100E-04 | -1.297300E-04 | -1.290600E-03 | 1.542200E-03 | 0.000000E+00 |
| d6 | 2.244400E-05 | -1.315800E-04 | -3.080300E-05 | -1.970000E-04 | 6.749400E-04 | 0.000000E+00 |
| d8 | 9.720700E-06 | 1.102100E-05 | 6.240700E-06 | -5.714100E-06 | -1.005300E-04 | 0.000000E+00 |
| d10 | -7.555500E-07 | -3.412300E-06 | -1.915800E-06 | -4.447200E-06 | 1.966800E-05 | 0.000000E+00 |

TABLE 27

| | BD | DVD | CD |
|---|---|---|---|
| DOE B1 | 10 | 6 | 5 |
| DOE B2 | 10 | 6 | 5 |
| DOE B3 | 10 | 6 | 5 |
| DOE A1 | 3 | 2 | 2 |
| DOE A2 | 2 | 1 | 1 |

When the practical shape of the diffractive lens structure is extracted, first, the shapes of the diffractive lens structures A and B are extracted respectively, and then the shapes are fitted with each other geometrically. Since the respective shapes of the diffractive lens structures can be extracted in the same sequence as Example 2, the detailed description will be omitted.

Figure 89:
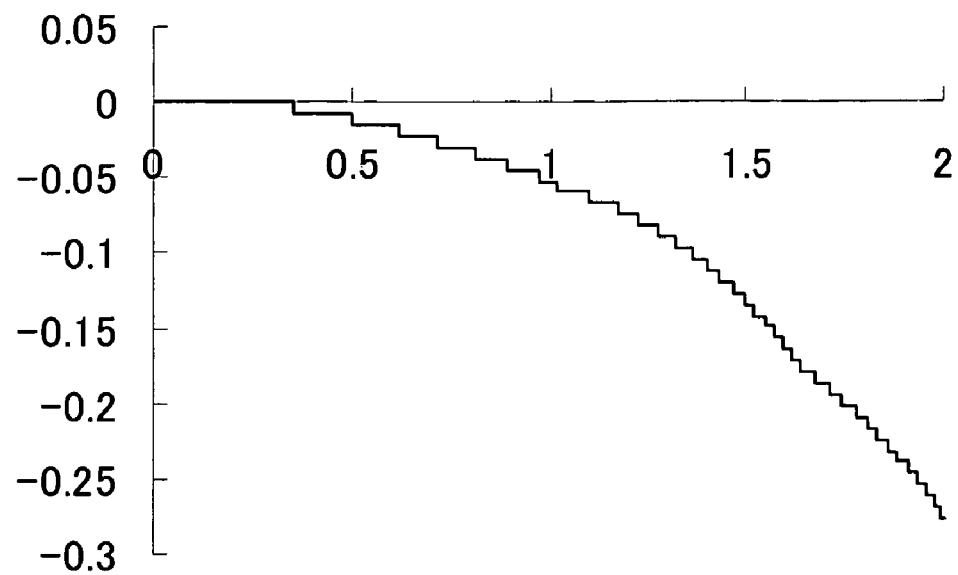
FIG. 89 is a graph schematically showing a section of a diffractive lens structure B, which is formed in the diffractive optical element according to Example 3 of the present invention.
Figure 90:
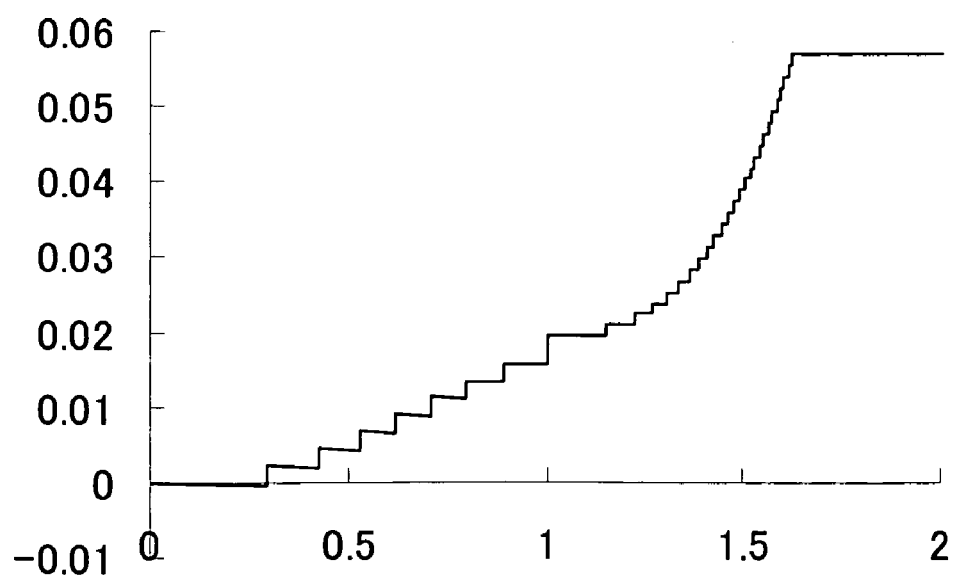
FIG. 90 is a graph schematically showing a section of a diffractive lens structure A, which is formed in the diffractive optical element according to Example 3 of the present invention.

FIGS. 89 and 90 are diagrams of the cross-sections of the diffractive lens structures B and A extracted respectively by using macroscopic aspherical surface shape, phase function coefficient and diffraction order.

Figure 91:
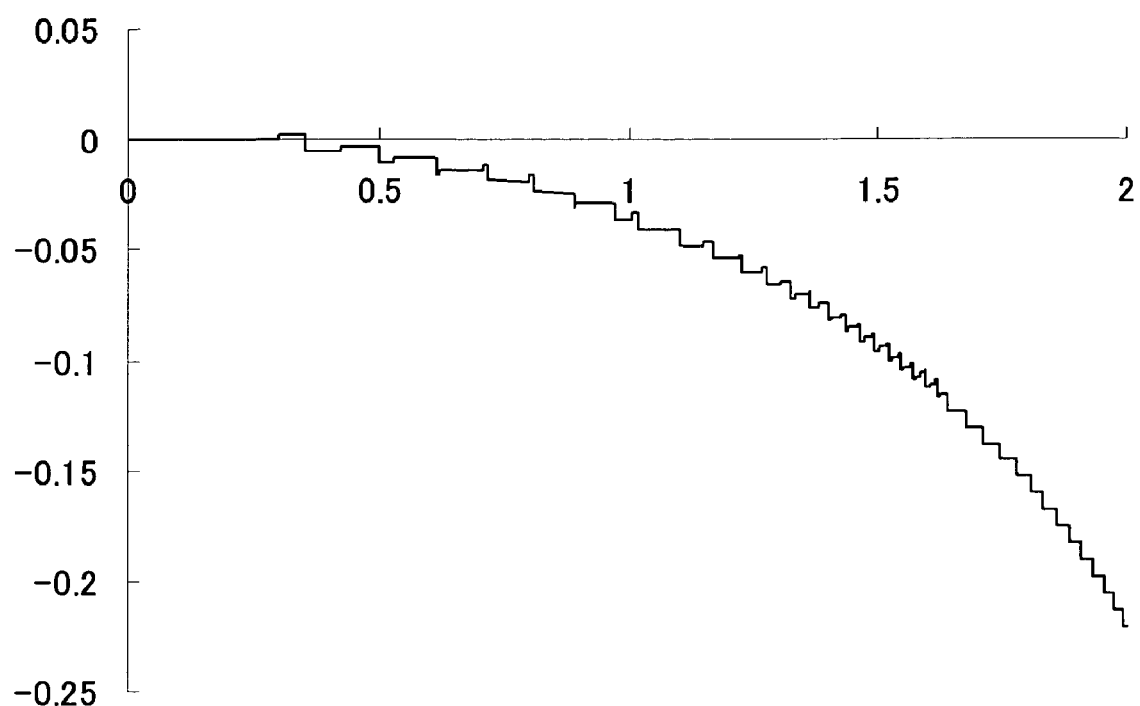
FIG. 91 is a graph schematically showing a section when the diffractive lens structure A and the diffractive lens structure B, which are formed in the diffractive optical element according to Example 3 of the present invention, are synthesized.

If the above diffractive lens structures are synthesized, the diffractive lens structure having the cross-sectional shape shown in FIG. 91 can be obtained. It is possible to record on and reproduce BD, DVD and CD compatibly and to obtain a further stable reproducing characteristic to the wavelength variation by using the diffractive optical element having the diffractive lens structure formed at the first surface.

However, when two or more kinds of diffractive lens structures are synthesized as above, the intervals among phase steps composing the respective diffractive lens structure can be extremely narrow. It is not preferable that the intervals among phase steps become extremely narrow since the mold becomes hard to fabricate and release in shaping. In addition, it is well known that the diffraction efficiency remarkably deteriorates when the intervals among the phase steps are as ten times or less wide as the wavelength of the light to be used. In Example 3, light sources of 408 nm, 660 nm and 780 nm are used, thereby it is desirable that the intervals of the phase steps be ten times or less of 780nm, the longest wavelength, that is, 0.0078 nm or longer.

Table 28 illustrates data representing the shapes of the diffractive lens structure fabricated by synthesizing the diffractive lens structures B and A geometrically.

TABLE 28

| Step No. | Radius of step [mm] | Width of orbicular zone [mm] | Amount of step [mm] |
|---|---|---|---|
| 1 | 0.2970000 | | 0.0025150 |
| 2 | — | — | — |
| 3 | 0.4258000 | 0.0724000 | 0.0025150 |
| 4 | — | — | — |
| 5 | 0.5297000 | 0.0273000 | 0.0025150 |
| 6 | — | — | — |
| 7 | 0.6226000 | 0.0037000 | 0.0025150 |
| 8 | 0.7108000 | 0.0882000 | 0.0025150 |
| 9 | — | — | — |
| 10 | 0.7990000 | 0.0800000 | 0.0025150 |
| 11 | — | — | — |
| 12 | — | — | — |
| 13 | 0.8930000 | 0.0002000 | 0.0025150 |
| 14 | — | — | — |
| 15 | 1.0070000 | 0.0351000 | 0.0038780 |
| 16 | — | — | — |
| 17 | — | — | — |
| 18 | 1.1520000 | 0.0500000 | 0.0014980 |
| 19 | — | — | — |
| 20 | 1.2230000 | 0.0530000 | 0.0014980 |
| 21 | — | — | — |
| 22 | 1.2690000 | 0.0410000 | 0.0014980 |
| 23 | — | — | — |
| 24 | 1.3050000 | 0.0260000 | 0.0014980 |

TABLE 28-continued

| Step No. | Radius of step [mm] | Width of orbicular zone [mm] | Amount of step [mm] |
| --- | --- | --- | --- |
|  |  |  |  |
| 26 | 1.3360000 | 0.0120000 | 0.0014980 |
| 27 | 1.3620000 | 0.0260000 | 0.0014980 |
|  |  |  |  |
| 29 | 1.3850000 | 0.0210000 | 0.0014980 |
|  |  |  |  |
| 31 | 1.4060000 | 0.0050000 | 0.0014980 |
| 32 | 1.4260000 | 0.0200000 | 0.0014980 |
|  |  |  |  |
| 34 | 1.4430000 | 0.0080000 | 0.0014980 |
| 35 | 1.4600000 | 0.0170000 | 0.0014980 |
|  |  |  |  |
| 37 | 1.4760000 | 0.0090000 | 0.0014980 |
| 38 | 1.4900000 | 0.0140000 | 0.0014980 |
|  |  |  |  |
| 40 | 1.5040000 | 0.0080000 | 0.0014980 |
| 41 | 1.5170000 | 0.0130000 | 0.0014980 |
|  |  |  |  |
| 43 | 1.5300000 | 0.0070000 | 0.0014980 |
| 44 | 1.5420000 | 0.0120000 | 0.0014980 |
|  |  |  |  |
| 46 | 1.5530000 | 0.0040000 | 0.0014980 |
| 47 | 1.5640000 | 0.0110000 | 0.0014980 |
|  |  |  |  |
| 49 | 1.5750000 | 0.0020000 | 0.0014980 |
| 50 | 1.5850000 | 0.0100000 | 0.0014980 |
| 51 | 1.5950000 | 0.0100000 | 0.0014980 |
|  |  |  |  |
| 53 | 1.6040000 | 0.0080000 | 0.0014980 |
| 54 | 1.6140000 | 0.0100000 | 0.0014980 |
|  |  |  |  |
| 56 | 1.6230000 | 0.0060000 | 0.0014980 |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

Data in the gray cells represent phase steps composing the diffractive lens structure B, and data in the white cells represent phase steps composing the diffractive lens structure A.

Table 29 illustrates data extracted from the above shape data, the orbicular zone widths of which representing the intervals between phase steps are 0.0078 mm or less. The narrow phase step intervals are not preferable since the diffractive lens structure is hard to fabricate, and the diffraction efficiency deteriorates.

TABLE 29

| Step No. | Radius of step [mm] | Width of orbicular zone [mm] | Amount of step [mm] |
| --- | --- | --- | --- |
| 7 | 0.6226000 | 0.0037000 | 0.0025150 |
| 13 | 0.8930000 | 0.0002000 | 0.0025150 |
| 21 | 1.2280000 | 0.0050000 | −0.0074900 |
| 28 | 1.3640000 | 0.0020000 | −0.0074900 |
| 31 | 1.4060000 | 0.0050000 | 0.0014980 |
| 36 | 1.4670000 | 0.0070000 | −0.0074900 |
| 39 | 1.4960000 | 0.0060000 | −0.0074900 |
| 42 | 1.5230000 | 0.0060000 | −0.0074900 |
| 43 | 1.5300000 | 0.0070000 | 0.0014980 |
| 45 | 1.5490000 | 0.0070000 | −0.0074900 |
| 46 | 1.5530000 | 0.0040000 | 0.0014980 |
| 49 | 1.5750000 | 0.0020000 | 0.0014980 |
| 52 | 1.5960000 | 0.0010000 | −0.0074900 |
| 55 | 1.6170000 | 0.0030000 | −0.0074900 |
| 56 | 1.6230000 | 0.0060000 | 0.0014980 |

Therefore, in Example 3, the orbicular zone widths are made 0.0078 mm or wider by synthesizing two phase steps extremely adjacent to each other.

Meanwhile, two phase steps can be synthesized by forming a phase step as wide as the amount of two phase steps at somewhere between the two synthesized phase steps or by forming a phase step as wide as the amount of two phase steps at one phase step position and removing the other phase step. In Example 3, the phase step composing the diffractive lens structure B is synthesized at the position of the phase step composing the diffractive lens structure A requiring high precision to the errors of phase step radius. Furthermore, for the phase steps other than those having extremely narrow intervals as above, the number of phase steps can be decreased from 70 to 49 by synthesizing all the phase steps, other than the phase steps having extremely small intervals, that can be synthesized on condition of no bad effect on the performance.

Table 30 illustrates the shape data of the diffractive lens structure in Example 3 obtained by the above design sequence. The data in grey cells represent synthesized phase steps.

TABLE 30

| Step No. | Radius of step [mm] | Width of orbicular zone [mm] | Amount of step [mm] |
| --- | --- | --- | --- |
|  |  |  |  |
| 2 | 0.4258000 | 0.1288000 | 0.0025150 |
|  |  |  |  |
|  |  |  |  |
|  |  |  |  |
|  |  |  |  |
|  |  |  |  |
| 8 | 0.9719000 | 0.0789000 | −0.0074900 |
|  |  |  |  |
| 10 | 1.1020000 | 0.0950000 | −0.0074900 |

TABLE 30-continued

| Step No. | Radius of step [mm] | Width of orbicular zone [mm] | Amount of step [mm] |
|---|---|---|---|
| | | | |
| | | | |
| | | | |
| 14 | 1.3050000 | 0.0360000 | 0.0014980 |
| | | | |
| | | | |
| 17 | 1.3850000 | 0.0230000 | 0.0014980 |
| | | | |
| 19 | 1.4260000 | 0.0200000 | 0.0014980 |
| | 1.4430000 | | −0.0059920 |
| | | | |
| 22 | 1.4760000 | 0.0160000 | 0.0014980 |
| | | 0.0140000 | |
| 24 | 1.5040000 | 0.0140000 | 0.0014980 |
| | | | |
| 26 | 1.5300000 | 0.0130000 | 0.0014980 |
| 27 | 1.5420000 | 0.0120000 | 0.0014980 |
| | | | |
| 29 | 1.5640000 | 0.0110000 | 0.0014980 |
| | | | |
| 31 | 1.5850000 | 0.0100000 | 0.0014980 |
| | | | |
| 33 | 1.6040000 | 0.0090000 | 0.0014980 |
| | | | |
| 35 | 1.6230000 | 0.0090000 | 0.0014980 |
| 36 | 1.6400000 | 0.0170000 | −0.0074900 |
| 37 | 1.6770000 | 0.0370000 | −0.0074900 |
| 38 | 1.7120000 | 0.0350000 | −0.0074900 |
| 39 | 1.7450000 | 0.0330000 | −0.0074900 |
| 40 | 1.7760000 | 0.0310000 | −0.0074900 |
| 41 | 1.8050000 | 0.0290000 | −0.0074900 |
| 42 | 1.8330000 | 0.0280000 | −0.0074900 |
| 43 | 1.8600000 | 0.0270000 | −0.0074900 |
| 44 | 1.8850000 | 0.0250000 | −0.0074900 |
| 45 | 1.9100000 | 0.0250000 | −0.0074900 |
| 46 | 1.9330000 | 0.0230000 | −0.0074900 |
| 47 | 1.9550000 | 0.0220000 | −0.0074900 |
| 48 | 1.9760000 | 0.0210000 | −0.0074900 |
| 49 | 1.9960000 | 0.0200000 | −0.0074900 |

Meanwhile, in the diffractive lens structure of Example 3, the phase step amount is determined in consideration of the balance between the diffraction efficiencies of BD and CD in the effective diameter φ (A1) like Examples 1 and 2, and, accordingly, the central surface and the orbicular zone surfaces 2 to 9 are shaped aspherical as shown in Table 31. That is, the central surface on the optical axis is shaped aspherical surface shown in Table 31, and the orbicular zone surfaces 2 to 9 are orbicular zone surfaces shown in Table 31, which are shifted in the optical axis direction as much as the respective step amount.

TABLE 31

| Name of coefficient | Value |
|---|---|
| Radius of curvature | −160.8600000 |
| CC | 0.000000E+00 |

TABLE 31-continued

| Name of coefficient | Value |
|---|---|
| A4 | 8.263400E−04 |
| A6 | 1.456300E−04 |
| A8 | −2.167200E−06 |
| A10 | 5.389000E−06 |

The orbicular zone surfaces 10 to 49 and the outer circumferential surface (Region 3) that are located outside the phase step 9 are all planes perpendicular to the optical axis.

As described above, the intervals among phase steps composing the diffractive lens structure of Example 3 can be made at least 0.0009 mm by synthesizing phase steps, and thus the diffractive lens structure having no large diffraction efficiency deterioration throughout the wavelength can be realized.

In addition, since the number of phase steps can be decreased as well as the intervals among phase steps are widened by synthesizing phase steps, substantial diffraction efficiency deterioration due to the fabrication errors of a mold or the like is minimized. Particularly, regarding the wall surface slope, the diffraction efficiency deteriorates further as steps are deep, however, in Example 3, since the signals of the steps of the diffractive lens structures A and B are opposite, the phase step amount of the diffractive lens structure B having a large phase step amount can be made shallow. As a result, 21 phase steps in grey cells of the shape data are preferable, since they are shallower than deep phase steps before synthesis.

Furthermore, if the opposite-direction phase steps are synthesized, fine protrusions or hollows are removed. In order to fabricate a mold for forming fine protrusions or hollows, the tip of processing machinery needs to be as fine as the fine protrusions or hollows. However, when the tip of the processing machinery is made fine, it becomes difficult to process a mold with high precision due to rigidity shortage. In addition, in the case of hollow mold, materials can stay in the hollow during shaping. As a result, a diffractive lens structure is not shaped satisfactorily, and the lifespan of the mold is shortened. Although the diffractive lens structure before phase step synthesis has the above disadvantages, the disadvantages can be solved by synthesizing phase steps having different depth directions in order to design the diffractive lens structure like Example 3. That is, the mold can be fabricated easily with high precision, shaped satisfactorily, and used for a longer time by employing the designing method of Example 3, thereby the high-quality and cost down of the diffractive optical element can be achieved.

Figure 92:
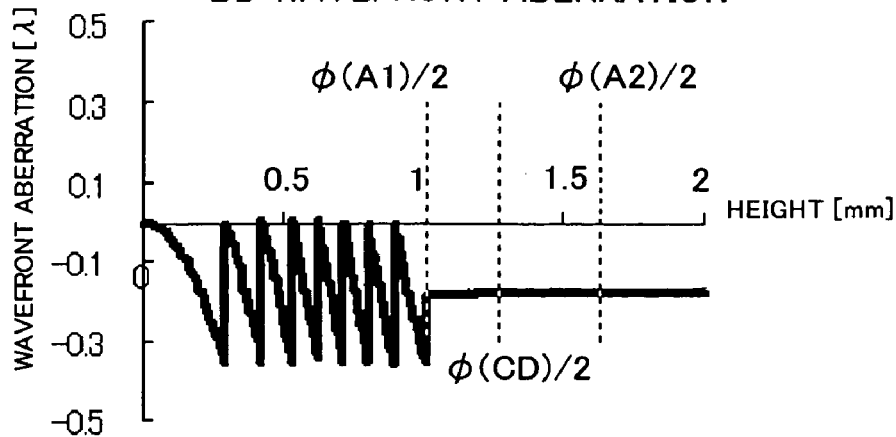
FIG. 92 is a graph showing a calculation result of a wavefront aberration for BD of an objective lens module, which uses the diffractive optical element according to Example 3 of the present invention, by data having an actual shape.
Figure 93:
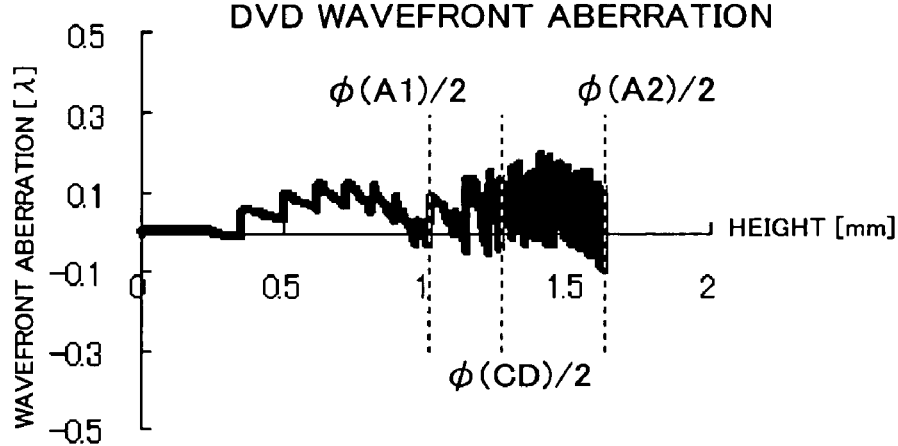
FIG. 93 is a graph showing a calculation result of a wavefront aberration for DVD of an objective lens module, which uses the diffractive optical element according to Example 3 of the present invention, by data having an actual shape.
Figure 94:
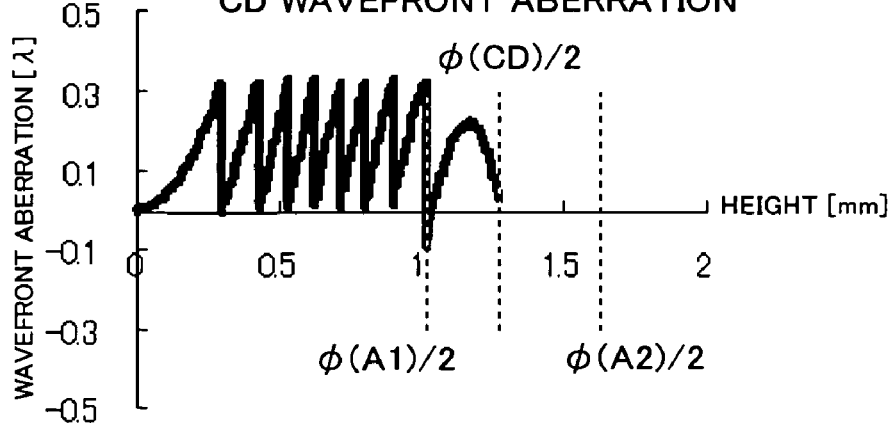
FIG. 94 is a graph showing a calculation result of a wavefront aberration for CD of an objective lens module, which uses the diffractive optical element according to Example 3 of the present invention, by data having an actual shape.

FIGS. 92 to 94 show the wavefront aberration calculated from the shape data of Example 3. For all of BD, DVD and CD, the phases of the wavefronts are gathered in the respective effective diameters. Like Examples 1 or 2, saw-like aberrations exist in the wavefronts, however, they have no bad effect on the spot shapes, thereby they can be ignored.

Figure 95:
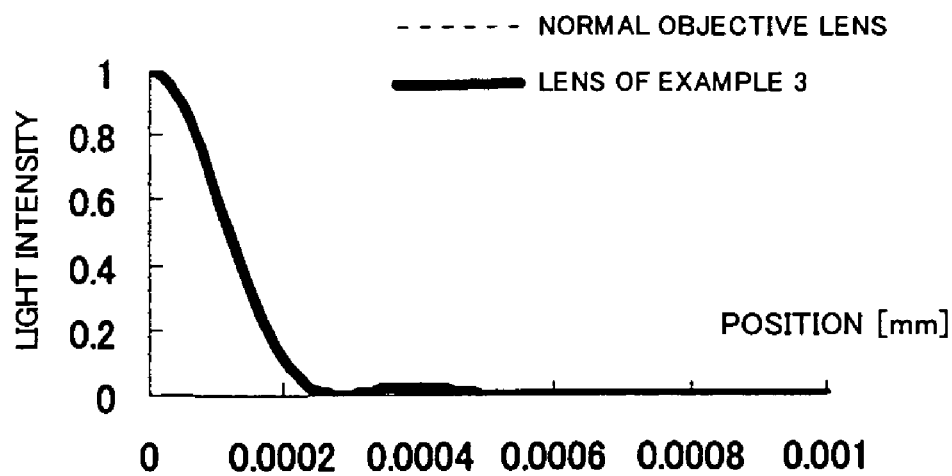
FIG. 95 is a graph showing a spot shape on BD calculated by a wavefront aberration of an objective lens module calculated by data having an actual surface shape of the diffractive lens structure in the diffractive optical element according to Example 3 of the present invention.
Figure 96:
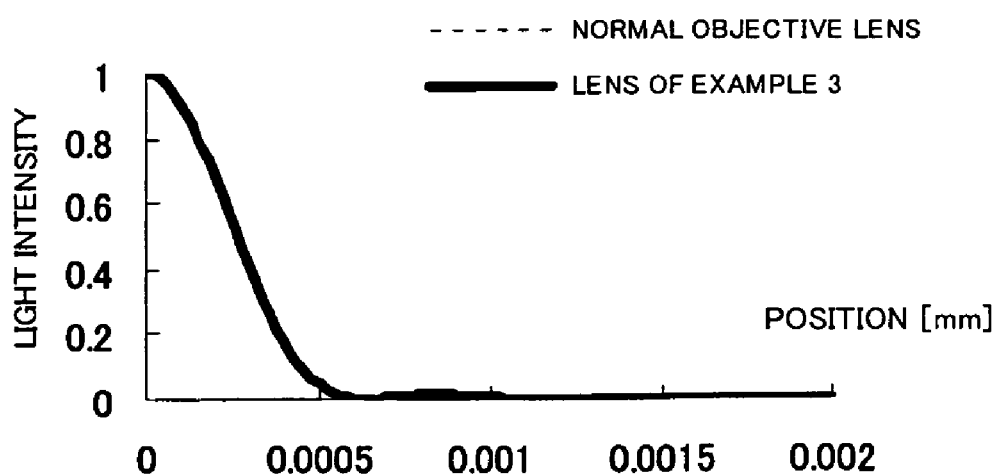
FIG. 96 is a graph showing a spot shape on DVD calculated by a wavefront aberration of an objective lens module which is calculated by data having an actual surface shape of the diffractive lens structure in the diffractive optical element according to Example 3 of the present invention.
Figure 97:
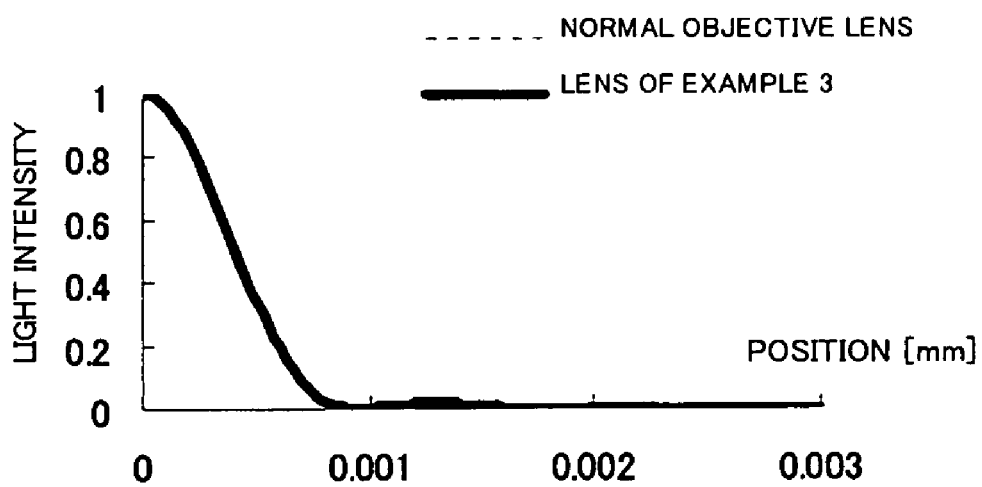
FIG. 97 is a graph showing a spot shape on CD calculated by a wavefront aberration of an objective lens module which is calculated by data having an actual surface shape of the diffractive lens structure in the diffractive optical element according to Example 3 of the present invention.
Figure 98:
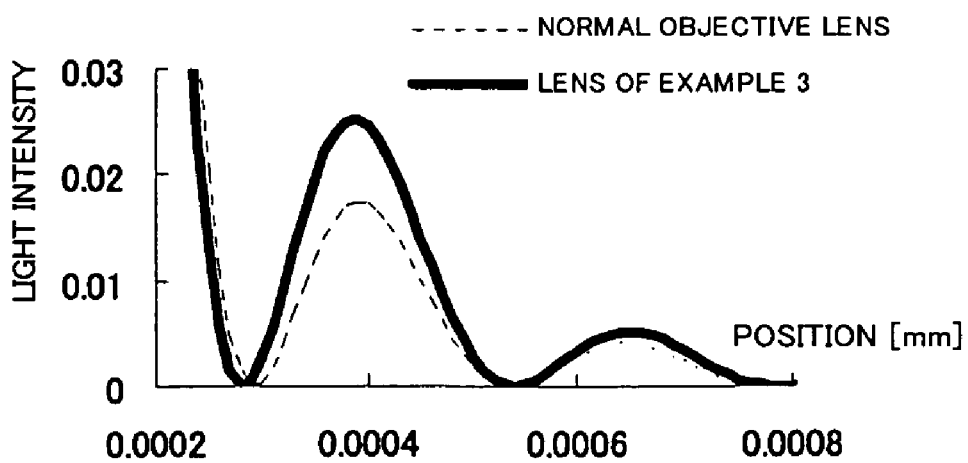
FIG. 98 is a graph showing a spot side-robe shape on BD calculated by a wavefront aberration of an objective lens module which is calculated by data having an actual surface shape of the diffractive lens structure in the diffractive optical element according to Example 3 of the present invention.
Figure 99:
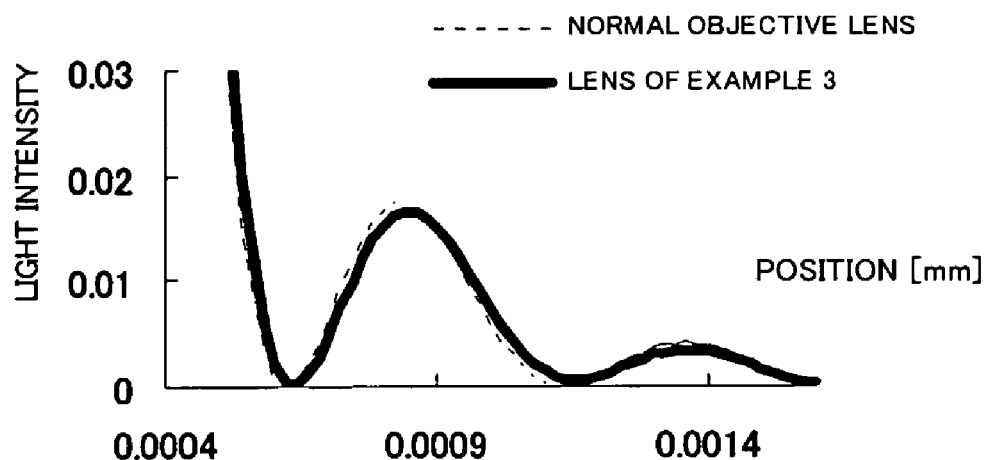
FIG. 99 is a graph showing a spot side-robe shape on DVD calculated by a wavefront aberration of an objective lens module which is calculated by data having an actual surface shape of the diffractive lens structure in the diffractive optical element according to Example 3 of the present invention.
Figure 100:
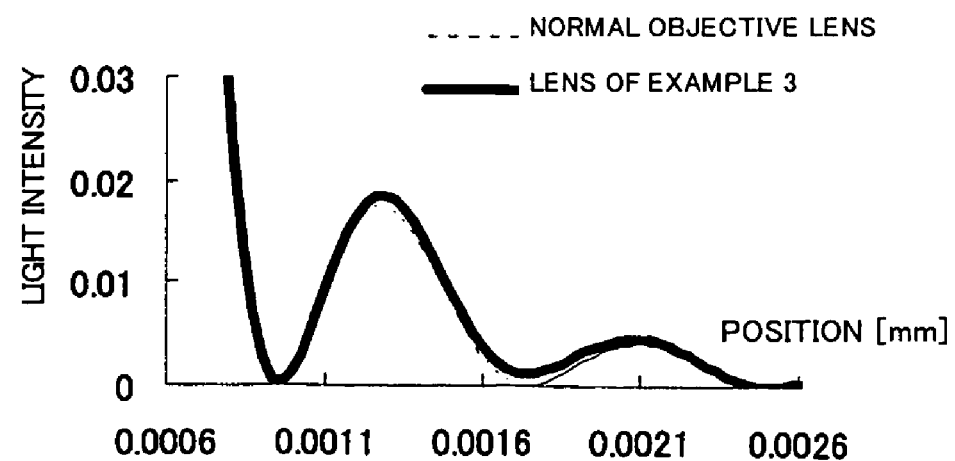
FIG. 100 is a graph showing a spot side-robe shape on CD calculated by a wavefront aberration of an objective lens module which is calculated by data having an actual surface shape of the diffractive lens structure in the diffractive optical element according to Example 3 of the present invention.

FIGS. 95 to 100 are graphs showing the wave-optic spot shapes calculated by using the aberration due to the practical surface shapes of the diffractive lens structure, in which the ordinate represents the optical strength and the abscissa represents the radius. FIGS. 95 to 97 show the whole spot shapes at BD, DVD and CD respectively, and FIGS. 98 to 100 show the side robe of the spots at BD, DVD and CD respectively. The light-converging point of BD has a slightly smaller main spot and a slightly larger side robe than those of a normal lens. The above fact is due to the apodization effect generated by the dropping of the diffraction efficiency at the inner circumferential portion, however, no troubles occur on recording and reproducing with that degree. In addition, since the intensity of the semiconductor laser used as a light source decreases from center to periphery in general, it can be preferable to drop the efficiency at the inner circumferential portion so as to generate the apodization effect. Regarding DVD or CD, the spot shapes are calculated in consideration of light outside the respective effective diameters, however, the spot shapes become almost the same as those of the normal objective lens.

Figure 101:
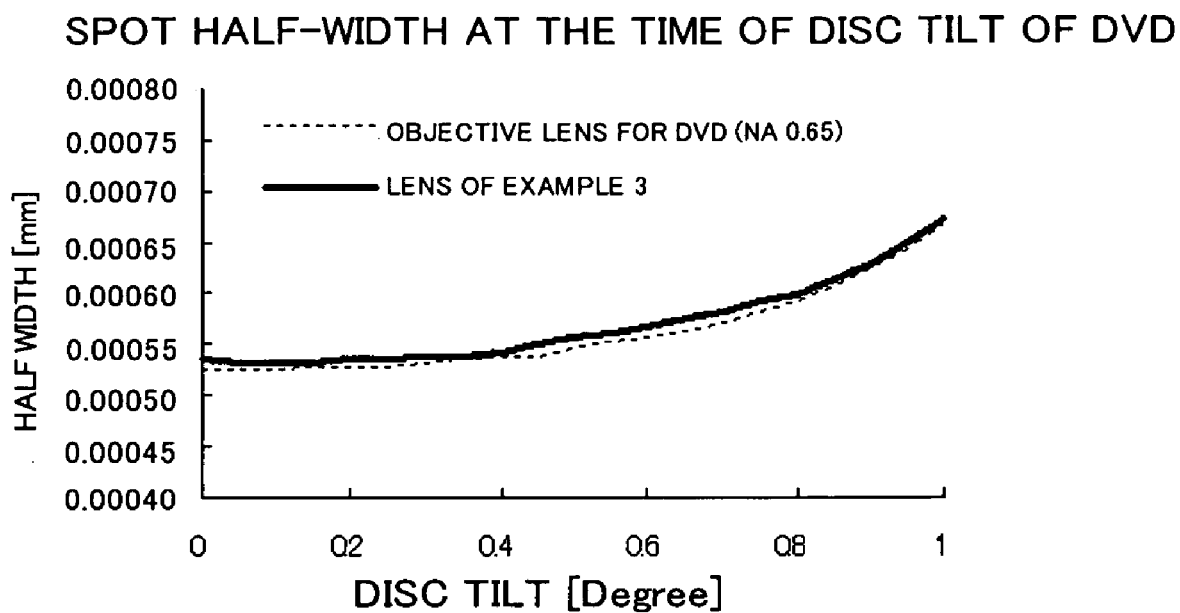
FIG. 101 is a graph showing a relationship between a full width at half maximum of a spot and a disc tilt angle at the time of tilt with respect to DVD when the objective lens module according to Example 3 of the present invention is used.
Figure 102:
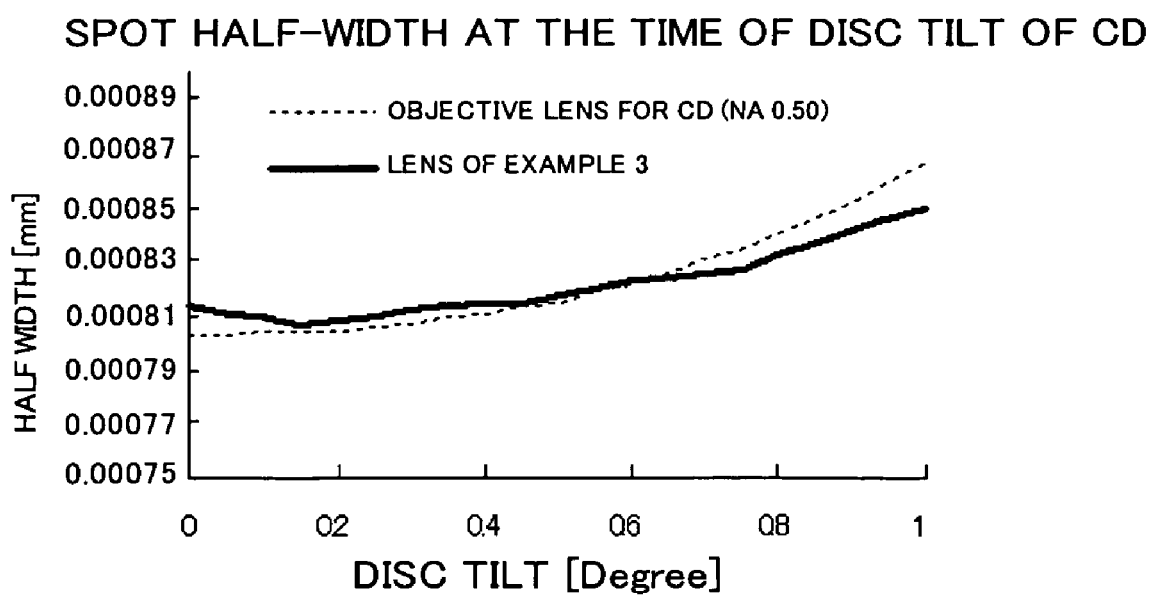
FIG. 102 is a graph showing a relationship between a full width at half maximum of a spot and a disc tilt angle at the time of tilt with respect to CD when the objective lens module according to Example 3 of the present invention is used.
Figure 103:
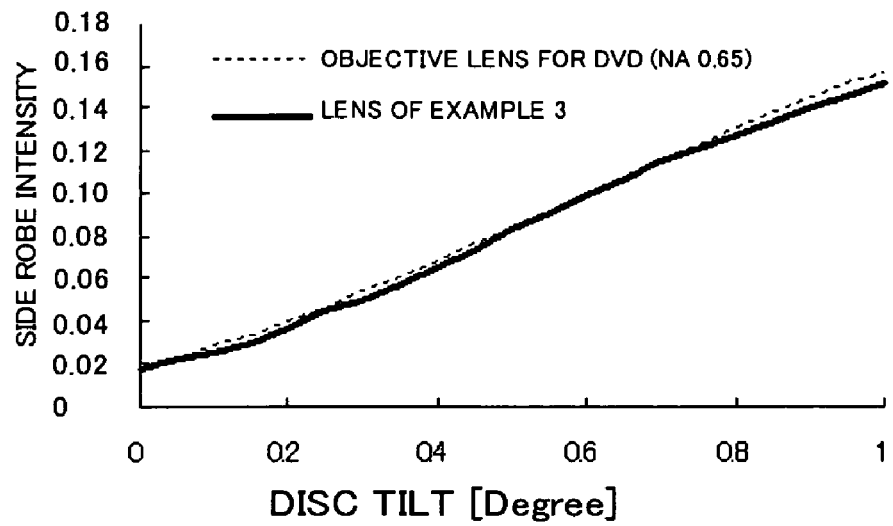
FIG. 103 is a graph showing a relationship between a spot side-robe intensity and a disc tilt angle at the time of tilt with respect to DVD when the objective lens module according to Example 3 of the present invention is used.
Figure 104:
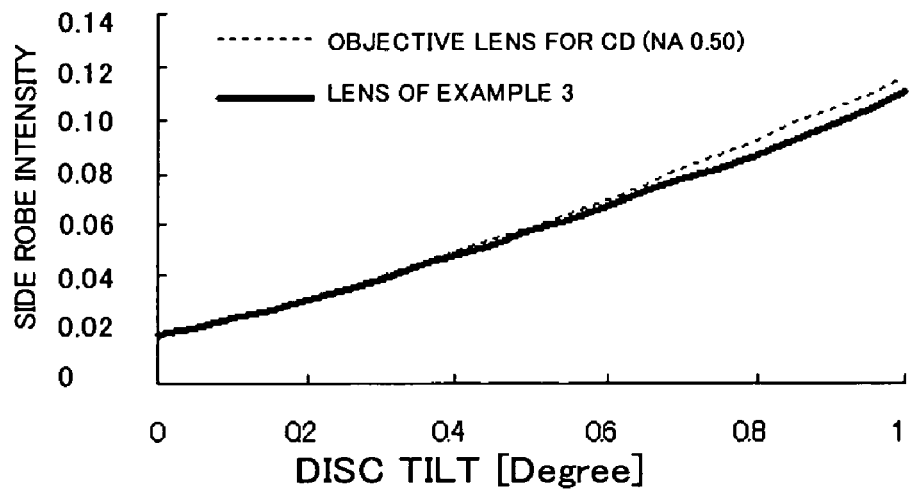
FIG. 104 is a graph showing a relationship between a spot side-robe intensity and a disc tilt angle at the time of tilt with respect to CD when the objective lens module according to Example 3 of the present invention is used.

FIGS. 101 to 104 are graphs showing the calculation result of the spot shape variation to disc tilt. FIGS. 101 and 102 show the full widths at half maximum variations of the spots for DVD and CD respectively, in which the ordinate represents the full width at half maximum and the abscissa represents the disc tilt angle. FIGS. 103 and 104 show the side robe intensity variation for DVD and CD respectively, in which the ordinate represents the side robe intensity of the spots and the abscissa represents the disc tilt angle. It can be understood that a reproducing-characteristic as stable as that when conventional DVD and CD objective lens are used can be obtained with no control of numeric aperture when the objective lens of Example 3 is used since the diffractive lens structure shows almost the same characteristics as those of the normal lens to any one of DVD and CD.

Figure 105:
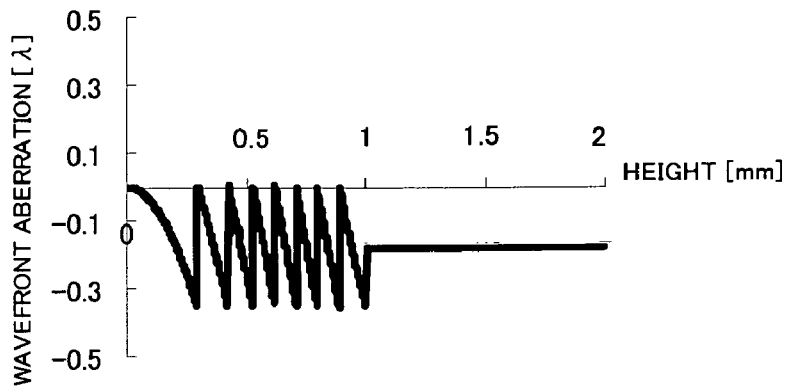
FIG. 105 is graph showing a wavefront aberration shape for BD in a best image surface by the objective lens module according to Example 3 of the present invention.
Figure 106:
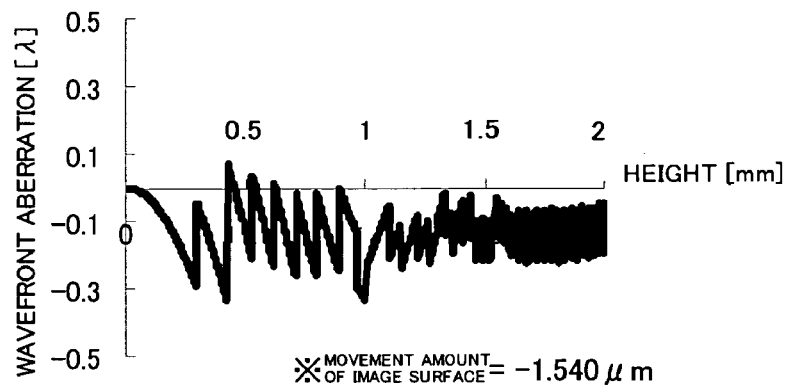
FIG. 106 is a graph showing a wavefront aberration shape for BD in a best image surface by the objective lens module according to Example 3 of the present invention when the wavelength of a light source is changed to 403 nm.
Figure 107:
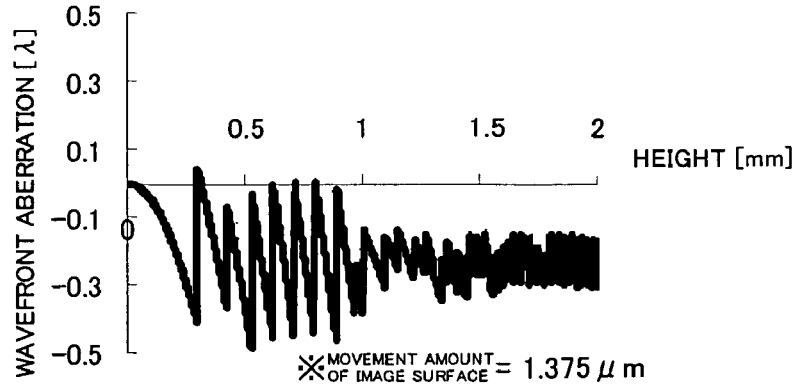
FIG. 107 is a graph showing a wavefront aberration shape for BD in a best image surface by the objective lens module according to Example 3 of the present invention when the wavelength of a light source is changed to 413 nm.
Figure 108:
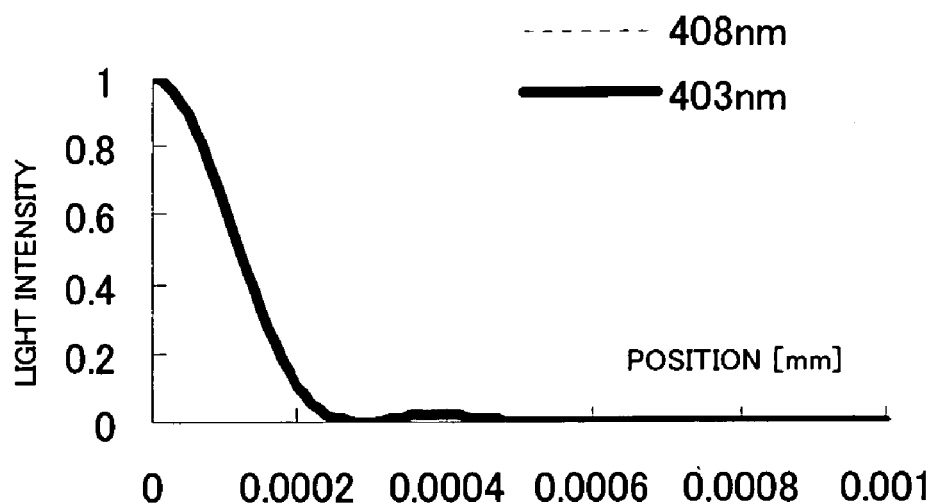
FIG. 108 is a graph showing an entire spot shape at the wavelength 403 nm for BD in the objective lens module according to Example 3 of the present invention.
Figure 109:
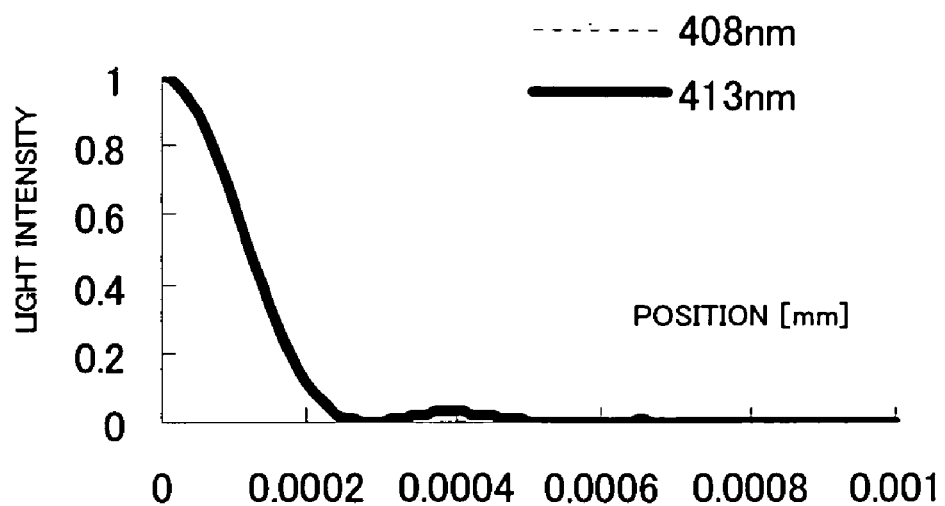
FIG. 109 is a graph showing an entire spot shape at the wavelength 413 nm for BD in the objective lens module according to Example 3 of the present invention.
Figure 110:
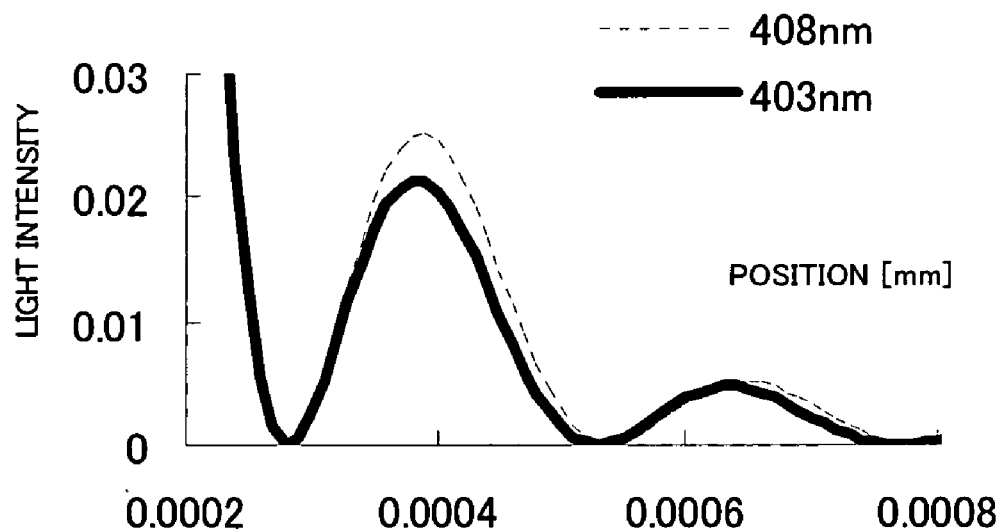
FIG. 110 is a graph showing a side robe of a spot at the wavelength 403 nm for BD in the objective lens module according to Example 3 of the present invention.
Figure 111:
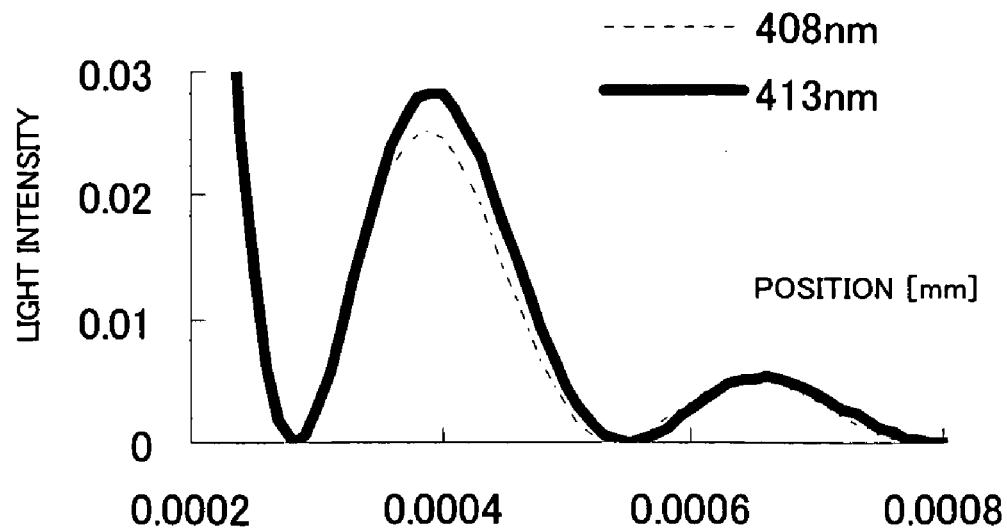
FIG. 111 is a graph showing a side robe of a spot at the wavelength 413 nm for BD in the objective lens module according to Example 3 of the present invention.

FIGS. 105 to 107 show the wavefront aberration shapes at the optimal image surfaces when the wavelength variation of the light source occurs in the lens of Example 3. Meanwhile, the materials for the diffractive optical element and the objective lens have refractive index varying with the wavelength variation as shown in Table 22. It can be understood from the above wavefront aberration drawings that only slight saw-like wavefront aberration occurs, and the wavefront shapes rarely deteriorate even when ±5 nm of wavelength variation occurs. As described above, the saw-like wavefront aberration has no bad effect on the spot shapes.

FIGS. 108 to 111 show the spot shapes at the wavelengths of 403 nm and 413 nm comparing with the spot shapes at the design wavelength of 408 nm. It can be understood from the drawings that the spot shapes rarely deteriorate to ±5 nm of wavelength variation in the lens using the diffractive optical element of Example 3.

Figure 112:
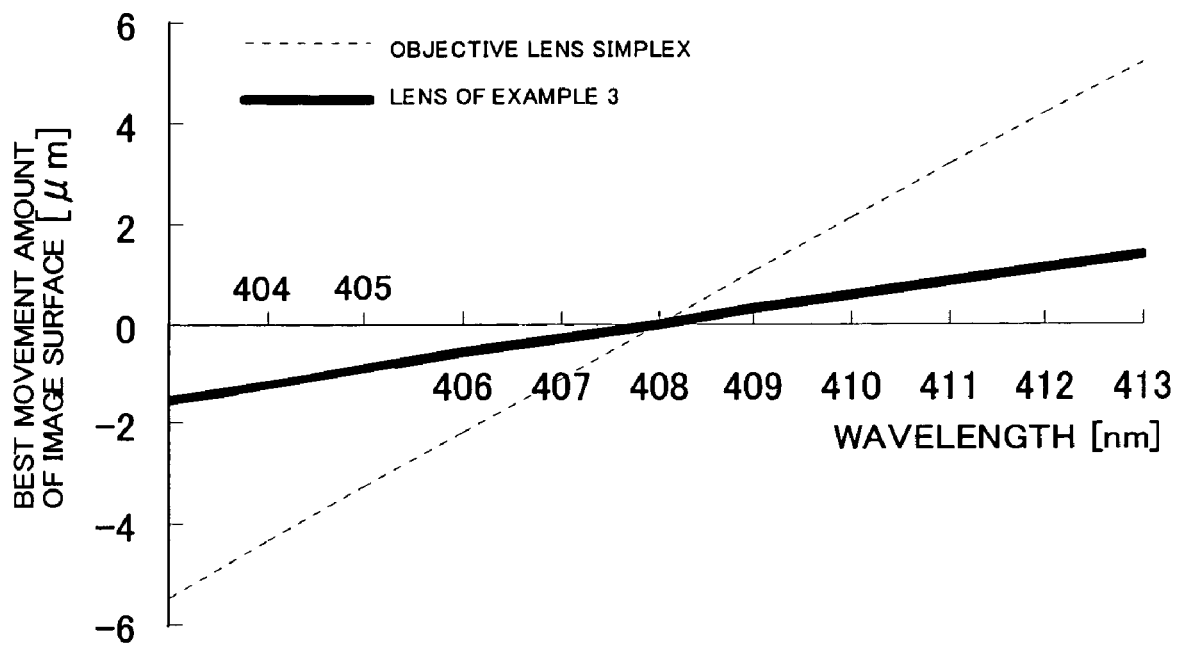
FIG. 112 is a graph showing a movement amount of a best image surface (light-converging point) with respect to the wavelength change of a lens, which uses the diffractive optical element according to Example 3 of the present invention.

FIG. 112 is a graph showing the result of the moving amount of the optimal image surfaces calculated to the wavelength variation of the lens using the diffractive optical element of Example 3. It can be understood that the moving amount of the optimal image surface position to the wavelength variation is smaller than that of the objective lens unit in the lens of Example 3, and the performance becomes more stable to the wavelength variation than that when the objective lens unit is used.

EXAMPLE 4

Example 4 is also, like Example 3, a diffractive optical element that can record on and reproduce BD, DVD and CD, and, additionally, Example 4 is designed in consideration of the effect of the chromatic aberration due to the slight wavelength variation of the light source.

The composition of the lens system is identical to that of Example 3, and Table 32 illustrates the design conditions for BD, DVD and CD.

TABLE 32

|  | BD | DVD | CD |
|---|---|---|---|
| Light source wavelength [nm] | 408 | 660 | 780 |
| Magnification | 0 | 0 | 0 |
| Numeric aperture | 0.85 | 0.65 | 0.50 |
| Effective diameter [mm] | 4.000 | 3.252 | 2.540 |
| Disc thickness [mm] | 0.1 | 0.6 | 1.2 |

In Example 4, by employing the combination of the diffraction orders, which is used in the diffractive lens structure A, different from those of the above examples as shown in Table 33, the chromatic aberration is corrected more efficiently with the small number of phase steps, and high-productivity shape is obtained, while Example 4 shows the same effects as those of Example 3. In the diffractive lens structure A, the combinations of columns structure A1 and A2 in Table 33 such as seventh-order light for BD, fourth-order light for DVD and third-order light for CD; and sixth-order for BD, fourth-order light for DVD and third-order light for CD are used. In the diffractive lens structure B, the combination of column structure B in Table 33 such as tenth-order light for BD, sixth-order light for DVD and fifth-order light for CD is used. The design sequence is identical to that of Example 3.

TABLE 33

|  |  |  |  |  |  |  |  | Structure A2 |  | Structure A1 |  | Structure B |
|---|---|---|---|---|---|---|---|---|---|---|---|---|
| BD | Diffraction order | 1 | 2 | 3 | 4 | 5 | 6 | 7 | 8 | 9 | 10 |
|  | Diffraction efficiency | 1 | 1 | 1 | 1 | 1 | 1 | 1 | 1 | 1 | 1 |
| DVD | Diffraction order | 1 | 1 | 2 | 2 | 3 | 4 | 4 | 5 | 5 | 6 |
|  | Amount of aberration correction [λ] | +0.4 | −0.2 | +0.2 | −0.4 | 0 | +0.4 | −0.2 | +0.2 | −0.4 | 0 |
|  | Diffraction efficiency | 0.573 | 0.875 | 0.875 | 0.573 | 1 | 0.4 | 0.875 | 0.875 | 0.573 | 1 |
| CD | Diffraction order | 1 | 1 | 2 | 2 | 2 | 3 | 3 | 3 | 4 | 4 | 5 |
|  | Amount of aberration correction [λ] | +0.5 | 0 | +0.5 | 0 | −0.5 | +0.5 | 0 | −0.5 | 0 | −0.5 | 0 |

TABLE 33-continued

|  |  |  |  |  |  |  | Structure A2 |  | Structure A1 |  | Structure B |
|---|---|---|---|---|---|---|---|---|---|---|---|
| Diffraction efficiency | 0.405 | 1 | 0.405 | 1 | 0.405 | 0.405 | 1 | 0.405 | 1 | 0.405 | 1 |

Table 34 illustrates paraxial data, the specific design results of Example 4. Meanwhile, although Table 34 illustrates the diffractive lens structure by using three surfaces, that is, the first to third surfaces, Table 34 is just the diffractive lens structure with design denotation, and when the practical surface shape is extracted, a surface shape is extracted by synthesizing the design result of the above three surfaces.

TABLE 34

| Surface No. | Radius of curvature | Central thickness | | | Refractive index | | |
|---|---|---|---|---|---|---|---|
| | | BD | DVD | CD | BD | DVD | CD |
| 1 | Diffractive lens structure B | 0.0000000 | ← | ← | 1.5447820 | 1.5228720 | 1.5197300 |
| 2 | ∞ | 0.0000000 | ← | ← | 1.0000000 | ← | ← |
| 3 | Diffractive lens structure A | 1.5000000 | ← | ← | 1.5447820 | 1.5228720 | 1.5197300 |
| 4 | ∞ | 0.3000000 | ← | ← | 1.0000000 | ← | ← |
| 5 | 1.7050000 | 2.5000000 | ← | ← | 1.7093690 | 1.6663360 | 1.6594900 |
| 6 | −31.8720000 | 0.8599000 | 0.6765510 | 0.3545730 | 1.0000000 | ← | ← |
| 7 | ∞ | 0.1000000 | 0.6000000 | 1.2000000 | 1.6180700 | 1.5796560 | 1.5740810 |
| 8 | ∞ | 0.0000000 | ← | ← | 1.0000000 | ← | ← |

Table 35 illustrates aspherical surface coefficients representing the macroscopic aspherical surface shape of the diffractive lens structures B and A and the aspherical surface shape of the objective lens in Example 4.

TABLE 35

| | Diffractive lens structure B | | | Diffractive lens structure A | |
|---|---|---|---|---|---|
| Name of coefficient | First surface (in) DOE B1 ($0 < h \leq 1.034$) | First surface (mid) DOE B2 ($1.034 < h \leq 1.626$) | First surface (out) DOE B3 ($1.626 < h$) | Second surface (in) DOE A1 ($0 < h \leq 1.034$) | Second surface (mid) DOE A2 ($1.034 < h \leq 1.626$) |
| Radius of curvature | 36.8568310 | −6.3780000 | −9.7036000 | −7.6761000 | 18.6220000 |
| CC | 0.000000E+00 | −2.926600E+00 | −5.221500E+00 | 0.000000E+00 | 0.000000E+00 |
| A4 | −1.933135E−02 | 8.396700E−03 | −4.078300E−03 | 1.699900E−02 | −1.270300E−02 |
| A6 | −3.729034E−03 | 3.192500E−03 | −2.192600E−04 | 2.625900E−03 | −3.361600E−03 |
| A8 | −7.663738E−06 | −3.906600E−04 | −4.565600E−05 | 4.559700E−05 | 2.464800E−04 |
| A10 | 2.784283E−07 | 5.461800E−05 | −1.927500E−05 | 6.289000E−05 | −4.965200E−05 |
| A12 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

| Name of coefficient | Diffractive lens structure A Second surface (out) (plane) ($1.626 < h$) | Objective lens | |
|---|---|---|---|
| | | Third surface | Fourth surface |
| Radius of curvature | ∞ | 1.7050000 | −31.8720000 |
| CC | 0.000000E+00 | −8.837900E−01 | −3.081010E+01 |
| A4 | 0.000000E+00 | 1.191000E−02 | 7.534260E−02 |
| A6 | 0.000000E+00 | 1.545000E−03 | −5.126470E−02 |

TABLE 35-continued

| | | | |
|---|---|---|---|
| A8 | 0.000000E+00 | −9.654700E−06 | 2.038740E−02 |
| A10 | 0.000000E+00 | 2.366400E−04 | −4.851690E−03 |
| A12 | 0.000000E+00 | −1.325900E−04 | 6.003500E−04 |
| A14 | 0.000000E+00 | 4.987100E−05 | 1.449830E−04 |
| A16 | 0.000000E+00 | −1.045100E−05 | −1.653040E−04 |
| A18 | 0.000000E+00 | 1.116900E−06 | 5.836630E−05 |
| A20 | 0.000000E+00 | −4.791100E−08 | −7.346300E−06 |

Tables 36 and 37 are the phase function coefficients of the diffractive lens structures B and A and the diffraction orders to be used ($\lambda_0$=408 nm).

TABLE 36

| | Diffractive lens structure B | | | Diffractive lens structure A | | |
|---|---|---|---|---|---|---|
| Name of coefficient | First surface (in) DOE B1 (0 < h ≦ 1.034) | First surface (mid) DOE B2 (1.034 < h ≦ 1.626) | First surface (out) DOE B3 (h > 1.626) | Second surface (in) DOE A1 (0 < h ≦ 1.034) | Second surface (mid) DOE A2 (1.034 < h ≦ 1.626) | Second surface (out) (plane) (h > 1.626) |
| d0 | 0.000000E+00 | 0.000000E+00 | −2.856000E−04 | 0.000000E+00 | 5.304000E−05 | 0.000000E+00 |
| d2 | 7.386046E−04 | −4.630600E−03 | −2.807100E−03 | −5.069300E−03 | 3.036400E−03 | 0.000000E+00 |
| d4 | −1.052738E−03 | 4.503500E−04 | −1.913300E−04 | 1.301400E−03 | −1.053700E−03 | 0.000000E+00 |
| d6 | −2.035103E−04 | 8.798200E−05 | −1.225300E−05 | 2.042100E−04 | −1.662700E−04 | 0.000000E+00 |
| d8 | −2.618735E−07 | −5.688500E−06 | −2.580700E−06 | 3.537300E−06 | −1.271500E−06 | 0.000000E+00 |
| d10 | −4.361153E−09 | 1.879500E−06 | −1.037700E−06 | 4.895600E−06 | −3.328700E−06 | 0.000000E+00 |

TABLE 37

| | BD | DVD | CD |
|---|---|---|---|
| DOE B1 | 10 | 6 | 5 |
| DOE B2 | 10 | 6 | 5 |
| DOE B3 | 10 | 6 | 5 |
| DOE A1 | 7 | 4 | 3 |
| DOE A2 | 6 | 4 | 3 |

Figure 113:
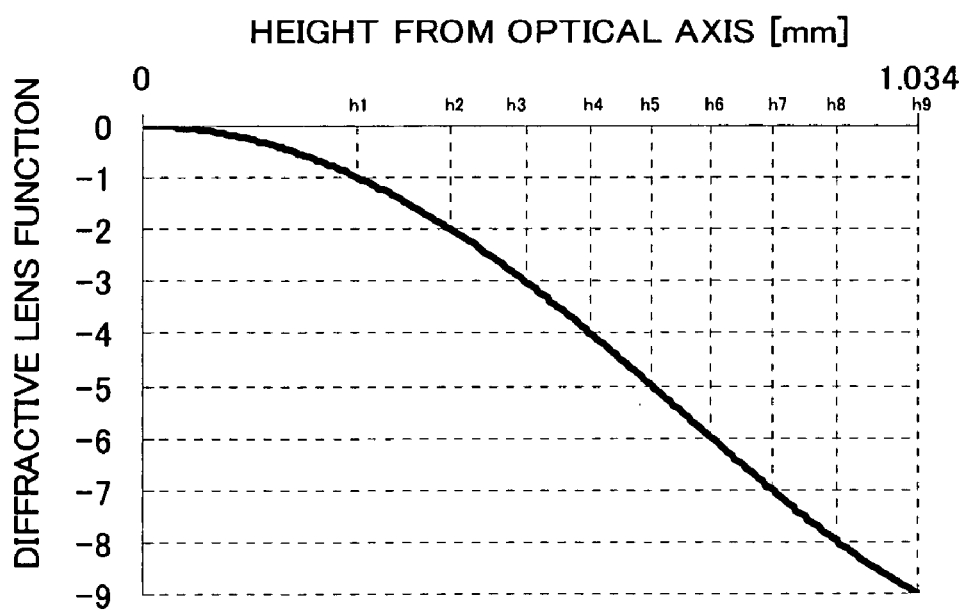
FIG. 113 is a graph showing a diffractive lens function of a diffractive lens structure A1 in Example 4 of the present invention.
Figure 114:
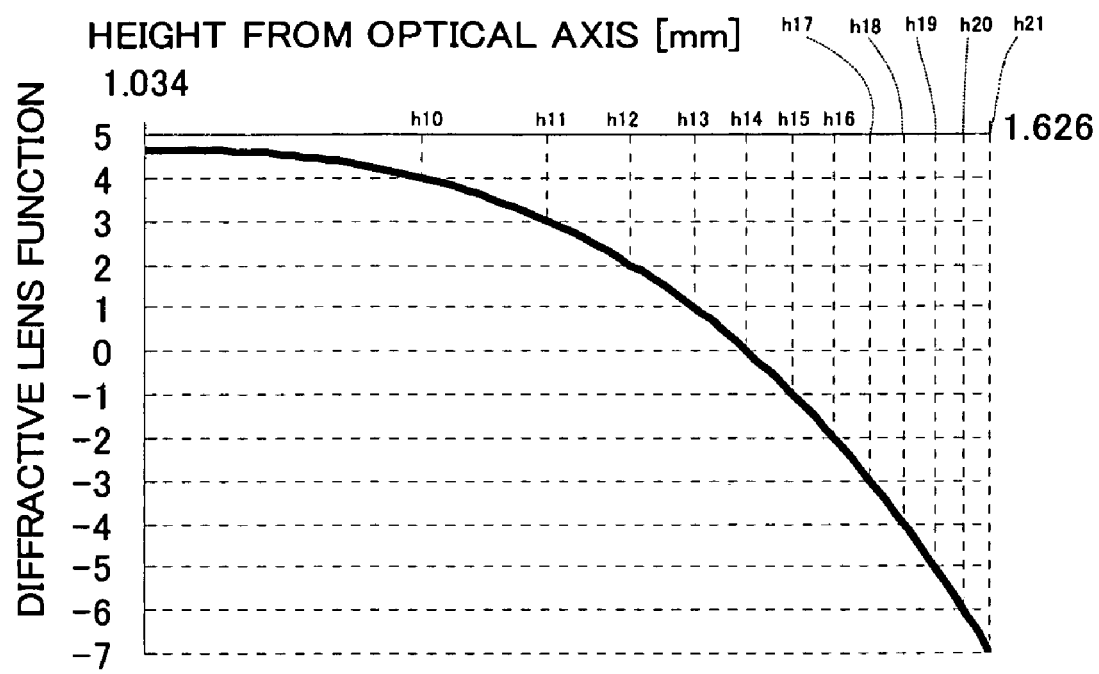
FIG. 114 is a graph showing a diffractive lens function of a diffractive lens structure A2 in Example 4 of the present invention.

FIGS. 113 and 114 are diffractive lens functions of the diffractive lens structures A1 (Region 1) and A2 (Region 2) in Example 4.

The diffractive lens structures A1 and A2 of Example 4 monotonously decrease within the height range from the optical axis formed respectively. Therefore, the practical shape of the diffractive lens structure A gets blazed in a direction, in which the diffractive lens structure A gets thinner by the macroscopic aspherical shape from the inner circumference to the outer circumference of the diffractive lens structure, and phase steps are formed at the heights from the optical axis h1 to h21, at which the diffractive lens function becomes integer, in a direction, in which the lens gets thicker.

Regarding the diffractive lens structure A1 (Region a), the depth of the phase step is determined in consideration of the balance between the diffraction efficiencies at BD and CD like the above examples, and the middle and the orbicular zone surfaces 2 to 9 are shaped aspherical illustrated in Table 38. That is, the central surface on the optical axis is the aspherical surface shape illustrated in Table 38, and the orbicular zone surfaces 2 to 8 are orbicular zone surfaces, in which the aspherical surfaces illustrated in Table 38 are shifted in the optical axis direction as much as the respective step amount.

TABLE 38

| Name of coefficient | Value |
|---|---|
| Radius of curvature | −160.8600000 |
| CC | 0.000000E+00 |
| A4 | 8.263400E−04 |
| A6 | 1.456300E−04 |
| A8 | −2.167200E−06 |
| A10 | 5.389000E−06 |

In addition, if the diffraction order combination employed for the diffractive lens structure A2 (Region 2) in Example 4 is blazed in order to make the diffraction efficiency of BD 100% like the above examples, the diffraction efficiency of DVD decreases to be 57.3%. Therefore, in Example 4, the phase step amount and the surface shape of the diffractive lens structure A2 are changed like the diffractive lens structure A1 (Region 1) in order to consider the balance between the diffraction efficiencies of BD and DVD.

Table 39 illustrates the aspherical surface shape data of the orbicular zone surfaces 10 to 21. That is, the orbicular zone surfaces 10 to 21 are aspherical surfaces shown in Table 39 shifted in the optical axis direction as much as the respective phase step amount.

TABLE 39

| Name of coefficient | Value |
|---|---|
| Radius of curvature | −481.9700000 |
| CC | 0.000000E+00 |
| A4 | 3.443100E−04 |
| A6 | 5.927200E−05 |
| A8 | −2.981600E−06 |
| A10 | 2.875200E−06 |

In addition, since all the phases of the wavefront penetrating the diffractive lens structure A1 (Region 1), the wavefront penetrating the diffractive lens structure A2 (Region 2) and the wavefront penetrating the region, to which the diffractive lens structure is not applied are gathered, the depths of the phase steps 9 and 21 existing on the respective borders can be adjusted, and the practical surface shape data of the diffractive lens structure A can be designed.

The shape data of the diffractive lens structure B can be designed in the same sequence as those of Examples 2 and 3, the detailed description thereof will be omitted.

Figure 115:
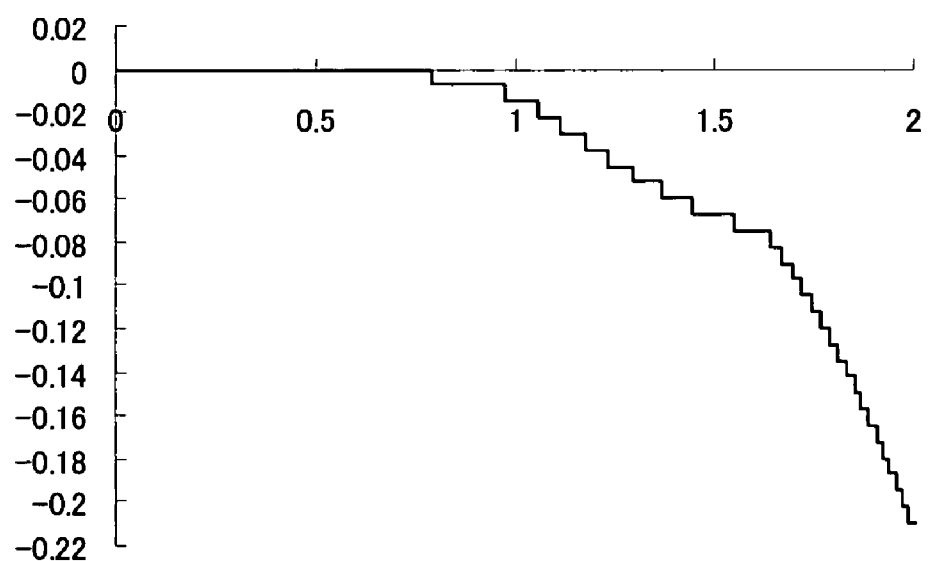
Figure 116:
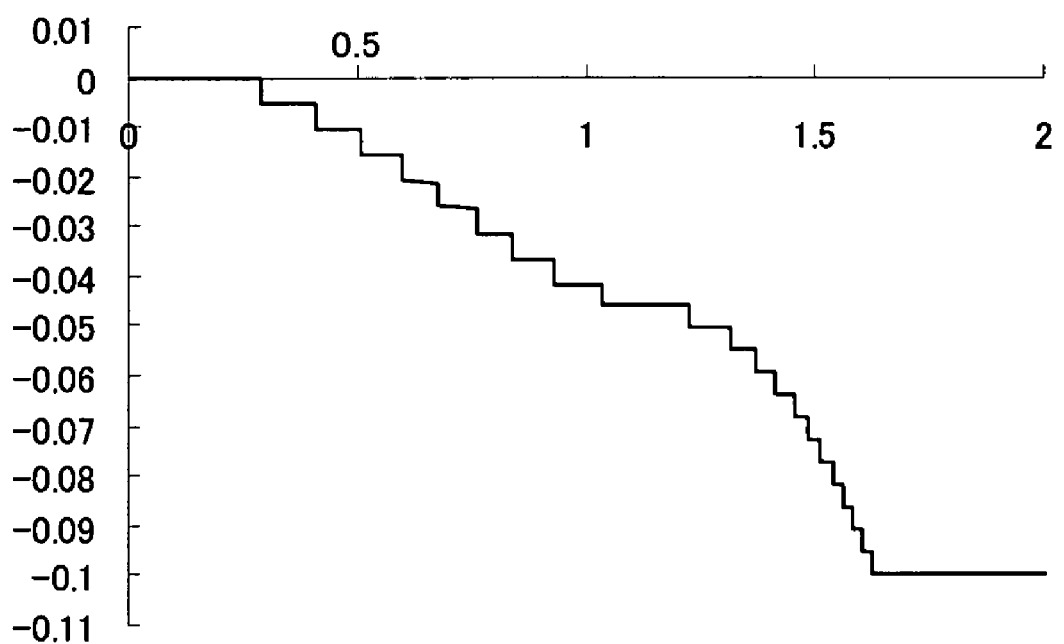

FIGS. 115 and 116 are phase diagrams of the cross-sections of the diffractive lens structures B and A extracted like the above. Different from the above examples, the diffractive lens structure A of Example 4 has a chromatic aberration offsetting the chromatic aberration of the objective lens unit. Furthermore, since the used diffraction orders are high, and thus the absolute amount of the chromatic aberration amount is large, the diffractive lens structure A considerably contributes to the chromatic aberration correction of the objective lens. Therefore, in the diffractive lens structure B, the phase steps are not required as much at the inner circumferential portion, to which the diffractive lens structure A is applied.

The shape of the diffractive lens structure in Example 4 can be extracted by synthesizing the shapes of the diffractive lens structures B and A extracted as above.

Table 40 illustrates data representing the shapes of the diffractive lens structure that is fabricated by synthesizing the diffractive lens structures B and A geometrically.

TABLE 40

| Step No. | Radius of step [mm] | Width of orbicular zone [mm] | Amount of step [mm] |
| --- | --- | --- | --- |
| 1 | 0.2868000 |  | −0.0049970 |
| 2 | 0.4104000 | 0.1236000 | −0.0049970 |
| 3 | 0.5094000 | 0.0990000 | −0.0049970 |
| 4 | 0.5970000 | 0.0876000 | −0.0049970 |
| 5 | 0.6789000 | 0.0819000 | −0.0049970 |
| 6 | 0.7589000 | 0.0800000 | −0.0049970 |
| 7 | | | |
| 8 | 0.8401000 | 0.0490000 | −0.0049970 |
| 9 | 0.9276000 | 0.0875000 | −0.0049970 |
| 10 | | | |
| 11 | 1.0340000 | 0.0636000 | −0.0036500 |
| 12 | | | |
| 13 | | | |
| 14 | | | |
| 15 | 1.2280000 | 0.0550000 | −0.0046330 |
| 16 | | | |
| 17 | | | |
| 18 | 1.3160000 | 0.0180000 | −0.0046330 |
| 19 | | | |
| 20 | 1.3740000 | 0.0080000 | −0.0046330 |
| 21 | 1.4190000 | 0.0450000 | −0.0046330 |
| 22 | | | |
| 23 | 1.4560000 | 0.0110000 | −0.0046330 |
| 24 | 1.4880000 | 0.0320000 | −0.0046330 |
| 25 | 1.5170000 | 0.0290000 | −0.0046330 |
| 26 | 1.5430000 | 0.0260000 | −0.0046330 |
| 27 | | | |
| 28 | 1.5660000 | 0.0160000 | −0.0046330 |
| 29 | 1.5880000 | 0.0220000 | −0.0046330 |
| 30 | 1.6080000 | 0.0200000 | −0.0046330 |
| 31 | 1.6260000 | 0.0180000 | −0.0045890 |

TABLE 40-continued

| Step No. | Radius of step [mm] | Width of orbicular zone [mm] | Amount of step [mm] |
| --- | --- | --- | --- |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | 0.0150000 | |

Data in the gray cells represent phase steps composing the diffractive lens structure B, and data in the white cells represent phase steps composing the diffractive lens structure A. Like Example 3, substantial diffraction efficiency deterioration can be prevented, and diffractive lens structures having shapes preferable for mass production can be designed by synthesizing properly the phase steps composing the diffractive lens structures A and B so as to decrease the number of the phase steps.

The data of Table 41 are shape data of the diffractive lens structure in Example 4 obtained by the above sequence. The data in the grey cells illustrate the synthesized phase steps. As described above, the required number of steps can be reduced from 49 to 42 by synthesizing the steps properly so as to decrease the number of the phase step.

TABLE 41

| Step No. | Radius of step [mm] | Width of orbicular zone [mm] | Amount of step [mm] |
| --- | --- | --- | --- |
| 1 | 0.2868000 |  | −0.0049970 |
| 2 | 0.4104000 | 0.1236000 | −0.0049970 |
| 3 | 0.5094000 | 0.0990000 | −0.0049970 |
| 4 | 0.5970000 | 0.0876000 | −0.0049970 |
| 5 | 0.6789000 | 0.0819000 | −0.0049970 |
| 6 | | | |
| 7 | 0.8401000 | 0.0812000 | −0.0049970 |
| 8 | 0.9276000 | 0.0875000 | −0.0049970 |
| 9 | 0.9704000 | 0.0428000 | −0.0074900 |
| 10 | | | |
| 11 | 1.1140000 | 0.0800000 | −0.0074900 |

TABLE 41-continued

| Step No. | Radius of step [mm] | Width of orbicular zone [mm] | Amount of step [mm] |
|---|---|---|---|
| 12 | 1.1730000 | 0.0590000 | −0.0074900 |
| 13 | ░░░░░░ | ░░░░░░ | ░░░░░░ |
| 14 | ░░░░░░ | ░░░░░░ | ░░░░░░ |
| 15 | ░░░░░░ | ░░░░░░ | ░░░░░░ |
| 16 | 1.4190000 | 0.0450000 | −0.0046330 |
| 17 | ░░░░░░ | ░░░░░░ | ░░░░░░ |
| 18 | 1.4880000 | 0.0320000 | −0.0046330 |
| 19 | 1.5170000 | 0.0290000 | −0.0046330 |
| 20 | ░░░░░░ | ░░░░░░ | ░░░░░░ |
| 21 | 1.5660000 | 0.0230000 | −0.0046330 |
| 22 | 1.5880000 | 0.0220000 | −0.0046330 |
| 23 | 1.6080000 | 0.0200000 | −0.0046330 |
| 24 | 1.6260000 | 0.0180000 | −0.0045890 |
| 25 | 1.6440000 | 0.0180000 | −0.0074900 |
| 26 | 1.6700000 | 0.0260000 | −0.0074900 |
| 27 | 1.6960000 | 0.0260000 | −0.0074900 |
| 28 | 1.7200000 | 0.0240000 | −0.0074900 |
| 29 | 1.7440000 | 0.0240000 | −0.0074900 |
| 30 | 1.7660000 | 0.0220000 | −0.0074900 |
| 31 | 1.7880000 | 0.0220000 | −0.0074900 |
| 32 | 1.8100000 | 0.0220000 | −0.0074900 |
| 33 | 1.8300000 | 0.0200000 | −0.0074900 |
| 34 | 1.8500000 | 0.0200000 | −0.0074900 |
| 35 | 1.8690000 | 0.0190000 | −0.0074900 |
| 36 | 1.8870000 | 0.0180000 | −0.0074900 |
| 37 | 1.9050000 | 0.0180000 | −0.0074900 |
| 38 | 1.9230000 | 0.0180000 | −0.0074900 |
| 39 | 1.9400000 | 0.0170000 | −0.0074900 |
| 40 | 1.9560000 | 0.0160000 | −0.0074900 |
| 41 | 1.9720000 | 0.0160000 | −0.0074900 |
| 42 | 1.9870000 | 0.0150000 | −0.0074900 |

Table 42 illustrates data representing the aspherical surface shapes of the central surface and the orbicular zone surfaces 2 to 10 of the diffractive lens structure in Example 4. That is, the central surface on the optical axis is the aspherical surface shape illustrated in Table 42, and the orbicular zone surfaces 2 to 10 are orbicular zone surfaces, in which the aspherical surfaces illustrated in Table 42 are shifted in the optical axis direction as much as the respective step amount.

TABLE 42

| Name of coefficient | Value |
|---|---|
| Radius of curvature | −160.8600000 |
| CC | 0.000000E+00 |
| A4 | 8.263400E−04 |
| A6 | 1.456300E−04 |
| A8 | −2.167200E−06 |
| A10 | 5.389000E−06 |

Table 43 illustrates data representing the aspherical surface shapes of the orbicular zone surfaces 11 to 24. That is, the orbicular zone surfaces 11 to 24 are orbicular zone surfaces, in which the aspherical surfaces illustrated in Table 43 are shifted in the optical axis direction as much as the respective step amount.

TABLE 43

| Name of coefficient | Value |
|---|---|
| Radius of curvature | −481.9700000 |
| CC | 0.000000E+00 |
| A4 | 3.443100E−04 |
| A6 | 5.927200E−05 |
| A8 | −2.981600E−06 |
| A10 | 2.875200E−06 |

The orbicular zone surfaces 25 to 42 and the outer circumferential surface (Region 3) that are located outside the twenty fourth phase step are planes perpendicular to the optical axis.

Figure 117:
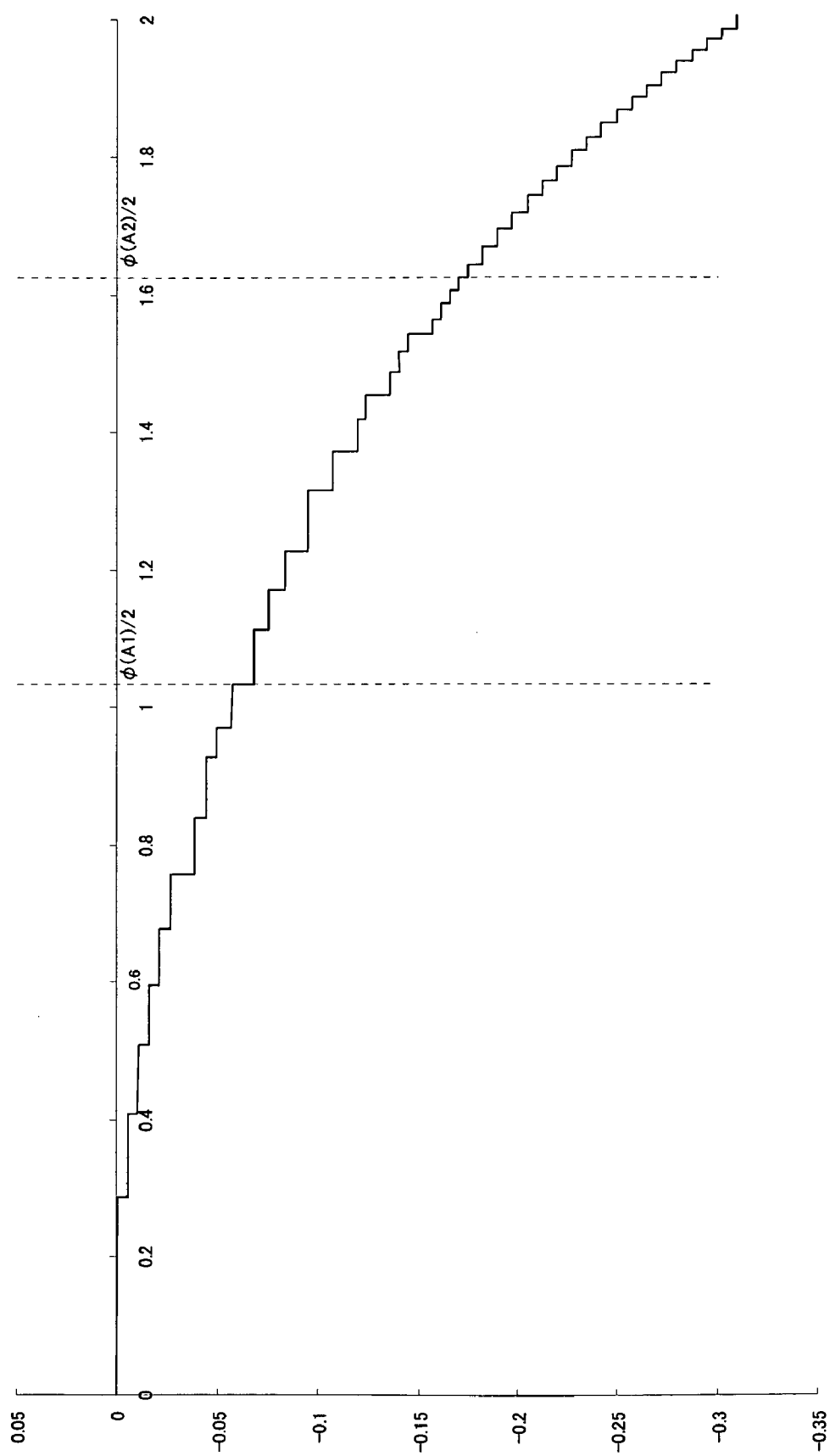

FIG. 117 is a phase diagram showing the cross-section of the diffractive lens structure of Example 4. Since all phase steps composing the diffractive lens structure face in the minus direction, the mold becomes easy to fabricate, and materials rarely remain in the mold, thereby inferior shaping products rarely occur, and the mold can be used for a longer time. That is, the mold becomes easy to fabricate, inferior shaping products rarely occur, and the mold can be used for a longer time by employing the designing method of Example 4, thereby the high-quality and cost down of the diffractive optical element can be achieved.

Figure 118:
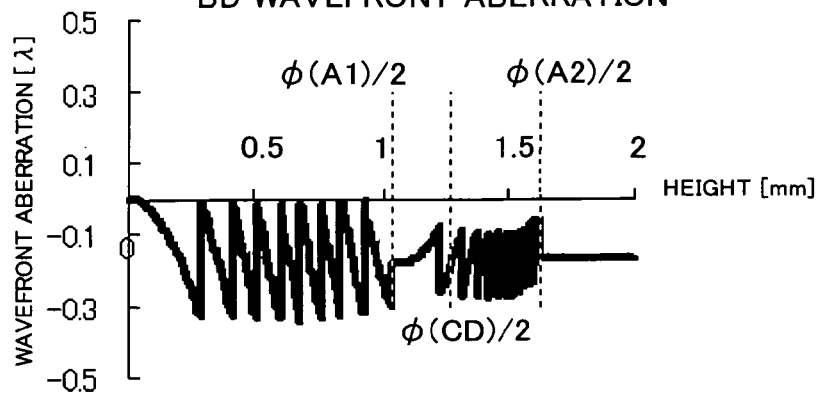
Figure 119:
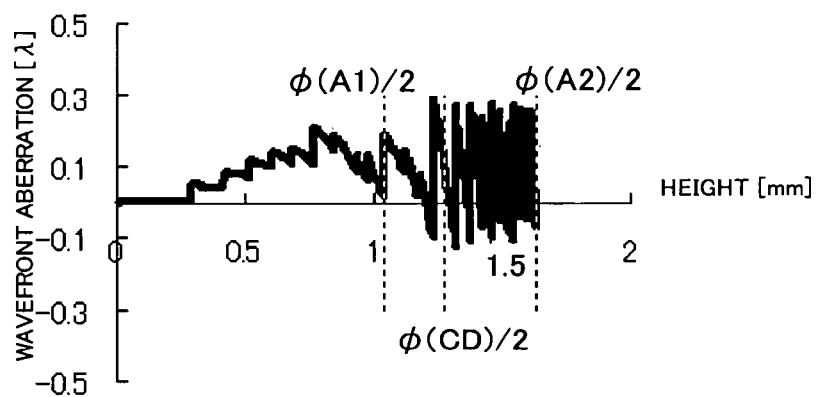
Figure 120:
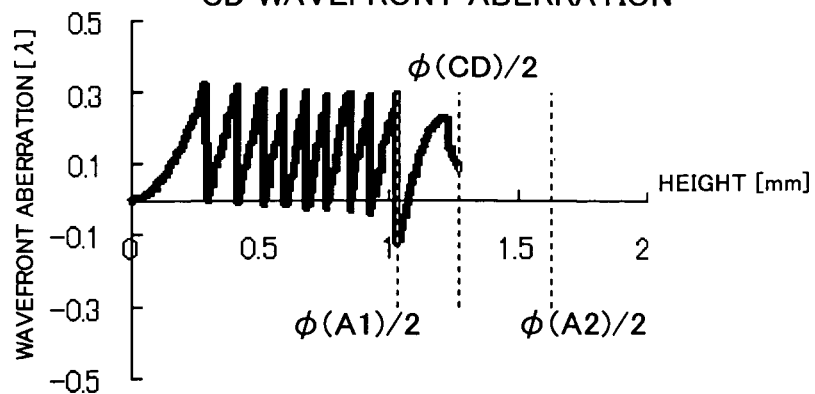
Figure 121:
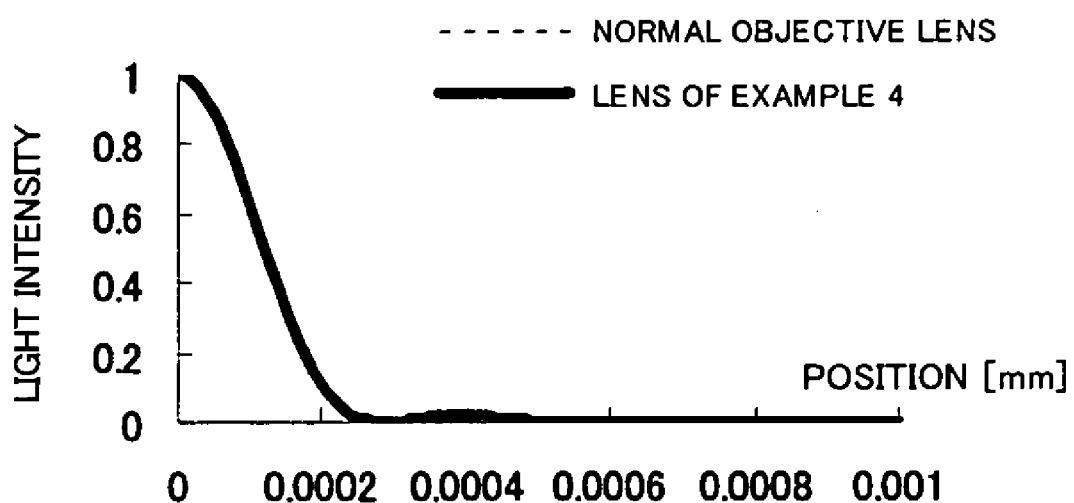
Figure 122:
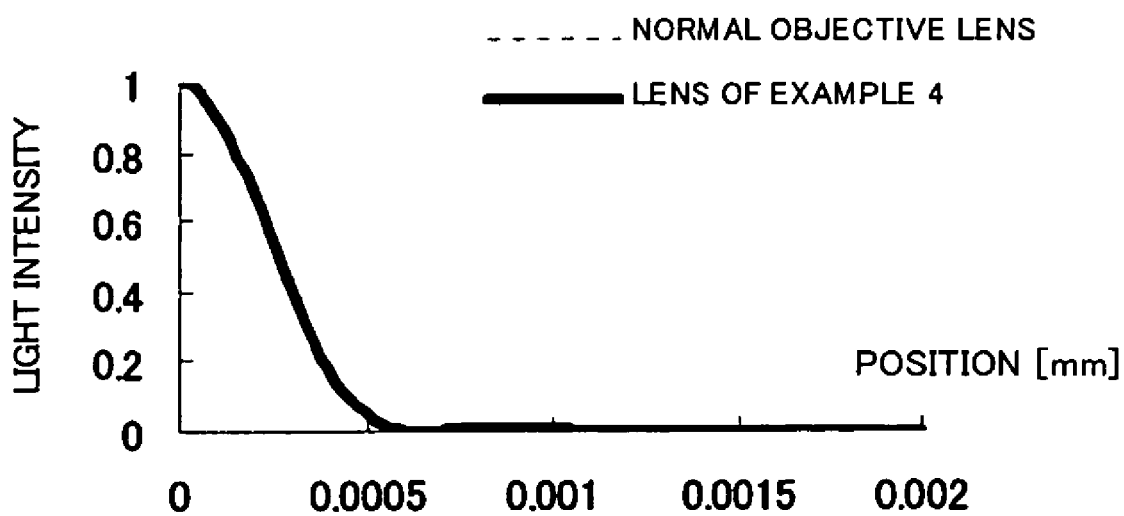
Figure 123:
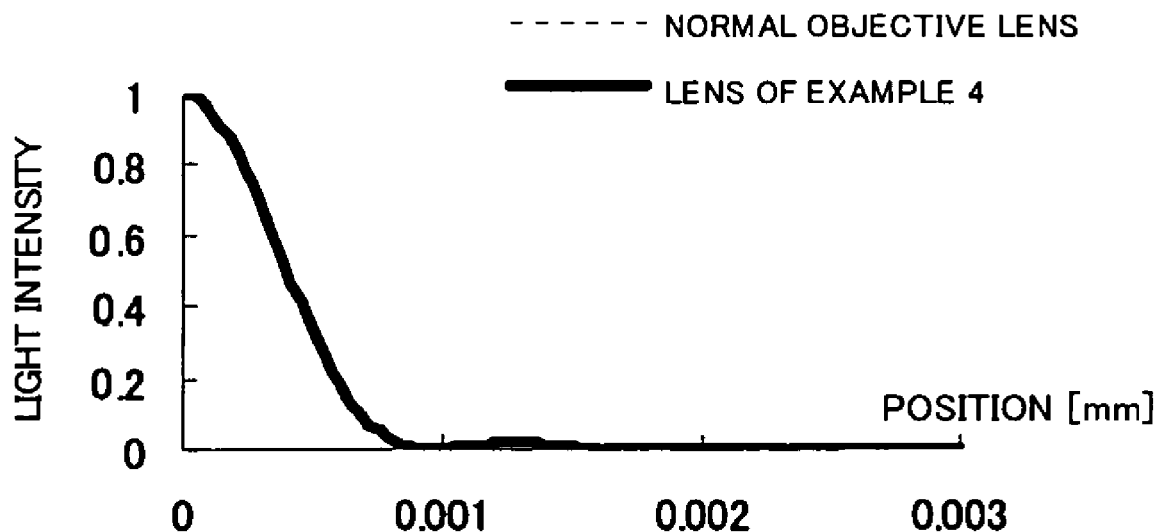
Figure 124:
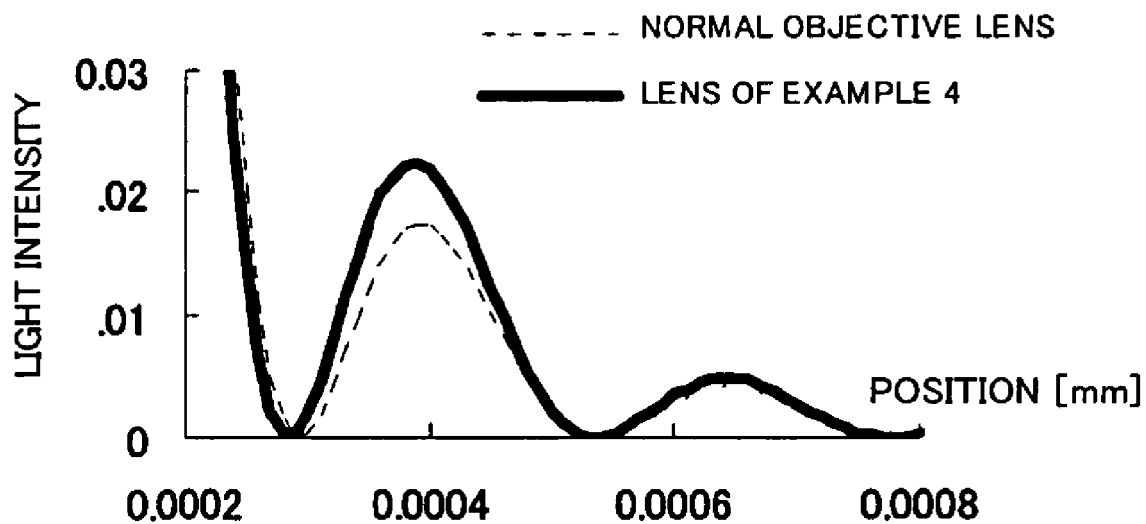
Figure 125:
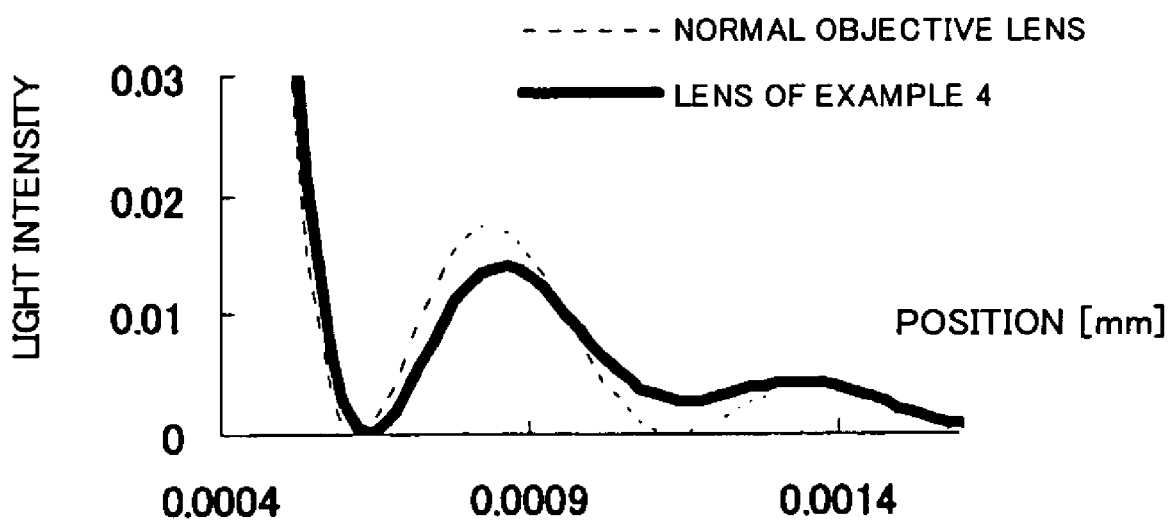
Figure 126:
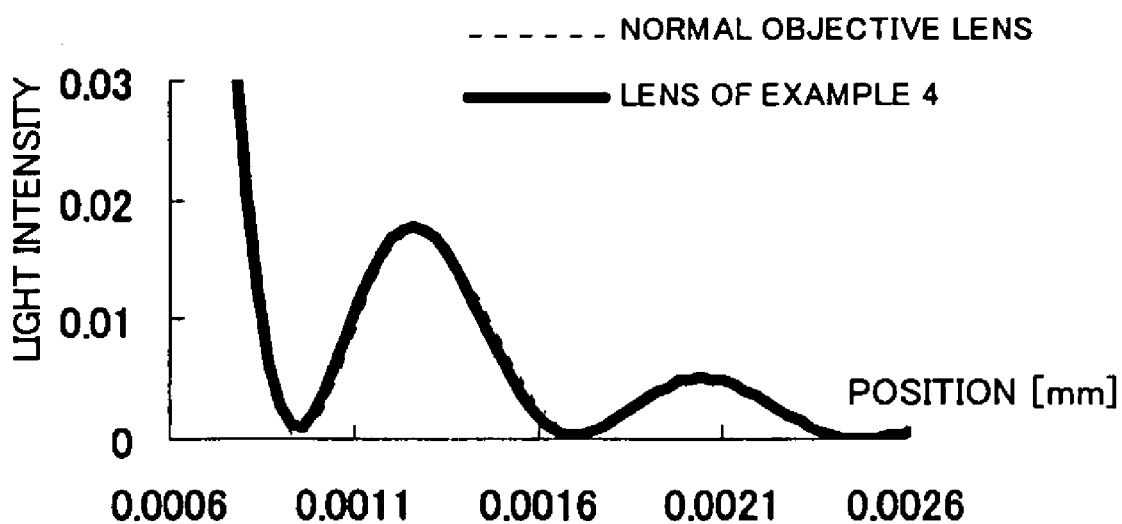

FIGS. 118 to 120 show the wavefront aberration calculated from the shape data of Example 3 (the conditions are identical to those of the above examples). For all of BD, DVD and CD, the phases of the wavefronts inside the respective effective diameters are gathered. Although saw-like aberrations exist in the wavefronts, they have no bad effect on the spot shapes, thereby they can be ignored.

FIGS. 121 to 126 are graphs showing the wave-optic spot shapes calculated by using the aberration due to the practical surface shapes of the diffractive lens structure (the conditions are identical to those of the above examples). For DVD or CD, the spot shapes are calculated in consideration of light outside the respective effective diameters. For all of BD, DVD and CD, the spot shapes that are almost as good as those when light are collected by normal objective lens can be obtained.

FIGS. 127 to 130 are graphs showing the calculation result of the spot shape variation to disc tilt (the conditions are identical to those of the above examples). It can be understood that a reproducing-characteristic as stable as that when conventional DVD and CD objective lens are used can be obtained, in particular, with no control of numeric aperture when the objective lens of the example is used since the diffractive lens structure shows almost the same characteristics as those of the normal lens to any one of DVD and CD.

FIGS. 131 to 133 show the wavefront aberration shapes at the optimal images when the wavelength variation of the light source occurs in the objective lens module of Example 4 (the conditions are identical to those of the above examples). Meanwhile, the materials for the diffractive optical element and the objective lens are those that vary with the wavelength variation as shown in Table 22. It can be understood from the above wavefront aberration drawings that only slight saw-like wavefront aberration occurs, and the wavefront shapes rarely deteriorate even when ±5 nm of wavelength variation occurs. As described above, the saw-like wavefront aberration has no bad effect on the spot shapes.

FIGS. 134 to 137 show the spot shapes at the wavelengths of 403 nm and 413 nm comparing with the spot shapes at the design wavelength of 408 nm (the conditions are identical to those of the above examples). It can be understood from the drawings that the spot shapes rarely deteriorate to the ±5 nm of wavelength variation in the lens using the diffractive optical element of Example 4.

FIG. 138 is a graph showing the result of the moving amount of the optimal images calculated to the wavelength variation of the lens using the diffractive optical element of Example 4 (the conditions are identical to those of the above examples). It can be understood that the moving amount of the optimal image surface position to the wavelength variation is considerably decreased comparing with that of the objective lens unit or that when the lens of Example 3 is used, and the performance that is extremely stable to the wavelength variation can be obtained.

EXAMPLE 5

Example 5 is also, like Example 1, a diffractive optical element that can record on and reproduce BD, the first optical data storage media; DVD, the second optical data storage media; and CD, the third optical data storage media; and combined with a double aspherical lens for BD. Table 44 illustrates the composition of the lens system and the design conditions for BD, DVD and CD.

As shown in FIG. 139, the diffractive optical element of Example 5 has a diffractive lens structure at one surface, and the other surface is a plane. FIG. 140 is a cross-sectional view of the diffractive optical element of Example 5. The diffractive lens structure is composed of a plurality of diffractive lens structure having different characteristics and disposed concentrically; diffractive lens structures 1 and 3 synthesized at Region 1 in the inner circumferential portion; and diffractive lens structure 2 at Region 2 in the central portion. Region 3, the outer circumferential portion, is a plane.

Meanwhile, the diffractive optical element of Example 5 includes, different from Example 1, no chromatic aberration correction diffractive lens structure and is composed of only spherical aberration correction diffractive lens structure.

Region 1 is the region of the inner circumferential portion inside the fourth effective diameter as shown in FIG. 140, Region 2 is an orbicular zone shaped region having the inner diameter at the fourth effective diameter and the outer diameter at the fifth effective diameter, and Region 3 is an orbicular zone shaped region having the inner diameter at the fourth effective diameter and the outer diameter at the first effective diameter.

The diffractive lens structures 1 to 3 employ the combinations of the diffraction order like columns structures 1 to 3 in Table 45.

TABLE 45

| | | | Structure 3 | Structure 1 | Structure 2 | | | | | | |
|---|---|---|---|---|---|---|---|---|---|---|---|
| BD | Diffraction order | 1 | 2 | 3 | 4 | 5 | 6 | 7 | 8 | 9 | 10 |
| | Diffraction efficiency | 1 | 1 | 1 | 1 | 1 | 1 | 1 | 1 | 1 | 1 |
| DVD | Diffraction order | 1 | 1 | 2 | 2 | 3 | 4 | 4 | 5 | 5 | 6 |
| | Amount of aberration correction [λ] | +0.4 | −0.2 | +0.2 | −0.4 | 0 | +0.4 | −0.2 | +0.2 | −0.4 | 0 |
| | Diffraction efficiency | 0.573 | 0.875 | 0.875 | 0.573 | 1 | 0.4 | 0.875 | 0.875 | 0.573 | 1 |
| CD | Diffraction order | 1 | 1 | 2 | 2 | 2 | 3 | 3 | 3 | 4 | 4 | 5 |
| | Amount of aberration correction [λ] | +0.5 | 0 | +0.5 | 0 | −0.5 | +0.5 | 0 | −0.5 | 0 | −0.5 | 0 |
| | Diffraction efficiency | 0.405 | 1 | 0.405 | 1 | 0.405 | 0.405 | 1 | 0.405 | 1 | 0.405 | 1 |

TABLE 44

| | BD | DVD | CD |
|---|---|---|---|
| Light source wavelength [nm] | 408 | 660 | 780 |
| Magnification | 0 | 0 | 0 |
| Numeric aperture | 0.85 | 0.65 | 0.50 |
| Effective diameter [mm] | 4.000 | 3.260 | 2.540 |
| Disc thickness [mm] | 0.1 | 0.6 | 1.2 |

Since the diffractive lens structure 1 of Example 5 does not correct the aberration of BD light source, but corrects the aberrations of DVD and CD light sources, the diffractive lens structure 1 uses third-order light for BD and second-order light for DVD and CD, and is designed to correct aberration for CD. Although the diffractive lens structure 1 corrects the aberration for DVD, it cannot correct the aberration completely.

Since the diffractive lens structure 2 of Example 5 does not correct the aberration of BD and CD light sources, but corrects the aberrations of DVD light source only, the diffractive lens structure 2 uses second-order light for BD and first-order light for DVD and CD, and is designed to correct aberration for DVD.

Since the diffractive lens structure 3 of Example 5 does not correct the aberration of BD and CD light sources, but corrects the aberrations of DVD light source only, the diffractive lens structure 3 uses second-order light for BD and first-order light for DVD and CD, and is designed to correct aberration for DVD, which the diffractive lens structure 1 does not correct completely.

Since the image surface position of CD in designing the diffractive lens structure 1 is set in the same way as Example 1, it is possible to set the size of the fourth effective diameter, the effective diameter of the diffractive lens structure 1, smaller than the third-order effective diameter corresponding the effective diameter of CD in the diffractive optical element.

In the design of the diffractive lens structure 2 in Example 5, different from the above examples, it is devised that the effective diameter of the diffractive lens structure 2 can be made the fifth diffractive effective diameter smaller than the second diffractive effective diameter corresponding the effective diameter of DVD in the diffractive optical element. That is, as shown in FIG. 141, the light-converging position of the diffractive light that the DVD laser desires is set at the position, at which the vertical spherical aberration before correction becomes zero in Regions 3 and 5, which is the effective diameter of DVD, and Region 2 is limited to make the outer diameter of Region 2 smaller than the effective diameter of DVD. Since one-cycle length of the phase step increase with the diameter, the light amount loss due to the fabrication error of the phase step increases with the diameter. From this viewpoint, the diffractive lens structure of Example 5 is preferable since the regions, at which the phase steps exist, are set smaller than the effective diameter of DVD.

Table 46 illustrates paraxial data, that is, the specific design results of Example 5.

TABLE 46

| Surface No. | Radius of curvature | Central thickness | | | Refractive index | | |
|---|---|---|---|---|---|---|---|
| | | BD | DVD | CD | BD | DVD | CD |
| 1 | Diffractive lens structure 3 | 0.0000000 | ← | ← | 1.5447820 | 1.5228720 | 1.5197300 |
| 2 | ∞ | 0.0000000 | ← | ← | 1.0000000 | ← | ← |
| 3 | Diffractive lens structure 2 | 0.0000000 | ← | ← | 1.5447820 | 1.5228720 | 1.5197300 |
| 4 | ∞ | 0.0000000 | ← | ← | 1.0000000 | ← | ← |
| 5 | Diffractive lens structure 1 | 1.5000000 | ← | ← | 1.5447820 | 1.5228720 | 1.5197300 |
| 6 | ∞ | 0.3000000 | ← | ← | 1.0000000 | ← | ← |
| 7 | 1.7050000 | 2.5000000 | ← | ← | 1.7093690 | 1.6663360 | 1.6594900 |
| 8 | −31.8720000 | 0.8599090 | 0.7163708 | 0.3514209 | 1.0000000 | ← | ← |
| 9 | ∞ | 0.1000000 | 0.6000000 | 1.2000000 | 1.6180700 | 1.5796560 | 1.5740810 |
| 10 | ∞ | 0.0000000 | ← | ← | 1.0000000 | ← | ← |

Meanwhile, although Table 46 illustrates the diffractive lens structure by using five surfaces, that is, the first to fifth surfaces, Table 46 is just the diffractive lens structure with design denotation, and when the practical surface shape is extracted, a surface shape is extracted by synthesizing the design result of the above five surfaces. Table 47 illustrates the macroscopic aspherical surface shape of the diffractive lens structures 1 to 3 and the aspherical surface shape of the objective lens in Example 5.

TABLE 47

| | Diffractive lens structure 3 | | | Diffractive lens structure 2 | |
|---|---|---|---|---|---|
| Name of coefficient | First surface (in) (plane) ($0 < h \leq 1.007$) | First surface (mid) DOE 3 ($1.007 < h \leq 1.463$) | First surface (out) (plane) ($h > 1.463$) | Third surface (in) DOE 2 ($0 < h \leq 1.007$) | Third surface (out) (plane) ($h > 1.007$) |
| Radius of curvature | ∞ | −8.5923000 | ∞ | −13.2720000 | ∞ |
| CC | 0.000000E+00 | 0.000000E+00 | 0.000000E+00 | 0.000000E+00 | 0.000000E+00 |
| A4 | 0.000000E+00 | 6.770400E−03 | 0.000000E+00 | 1.162200E−03 | 0.000000E+00 |
| A6 | 0.000000E+00 | 1.553900E−03 | 0.000000E+00 | 5.076500E−04 | 0.000000E+00 |
| A8 | 0.000000E+00 | −2.545300E−04 | 0.000000E+00 | −1.630600E−04 | 0.000000E+00 |
| A10 | 0.000000E+00 | 8.155400E−05 | 0.000000E+00 | 3.520700E−05 | 0.000000E+00 |
| A12 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 |

TABLE 47-continued

| | | | | | |
|---|---|---|---|---|---|
| A16 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

| | Diffractive lens structure 1 | | Object lens | |
|---|---|---|---|---|
| Name of coefficient | Fifth surface (in) DOE 1 ($0 < h \leq 1.007$) | Fifth surface (out) (plane) ($h > 1.007$) | Third surface | Fourth surface |
| Radius of curvature | 19.1520000 | ∞ | 1.7050000 | −31.8720000 |
| CC | 0.000000E+00 | 0.000000E+00 | −8.837900E−01 | −3.081010E+01 |
| A4 | −7.125200E−03 | 0.000000E+00 | 1.191000E−02 | 7.534260E−02 |
| A6 | −1.084900E−03 | 0.000000E+00 | 1.545000E−03 | −5.126470E−02 |
| A8 | −3.138600E−05 | 0.000000E+00 | −9.654700E−06 | 2.038740E−02 |
| A10 | −2.450400E−05 | 0.000000E+00 | 2.366400E−04 | −4.851690E−03 |
| A12 | 0.000000E+00 | 0.000000E+00 | −1.325900E−04 | 6.003500E−04 |
| A14 | 0.000000E+00 | 0.000000E+00 | 4.987100E−05 | 1.449830E−04 |
| A16 | 0.000000E+00 | 0.000000E+00 | −1.045100E−05 | −1.653040E−04 |
| A18 | 0.000000E+00 | 0.000000E+00 | 1.116900E−06 | 5.836630E−05 |
| A20 | 0.000000E+00 | 0.000000E+00 | −4.791100E−08 | −7.346300E−06 |

Tables 48 and 49 are the phase function coefficients of the diffractive lens structures 1 to 3 and the diffraction orders to be used ($\lambda_0$=408 nm).

TABLE 48

| | Diffractive lens structure 3 | | | Diffractive lens structure 2 | | Diffractive lens structure 1 | |
|---|---|---|---|---|---|---|---|
| Name of coefficient | First surface (in) (plane) ($0 < h \leq 1.007$) | First surface (mid) DOE 3 ($1.007 < h \leq 1.463$) | First surface (out) (plane) ($h > 1.463$) | Third surface (in) DOE 2 ($0 < h \leq 1.007$) | Third surface (out) (plane) ($h > 1.007$) | Fifth surface (in) DOE 1 ($0 < h \leq 1.007$) | Fifth surface (out) (plane) ($h > 1.007$) |
| d0 | 0.000000E+00 | 0.000000E+00 | 0.000000E+00 | 0.000000E+00 | 0.000000E+00 | 0.000000E+00 | 0.000000E+00 |
| d2 | 0.000000E+00 | −1.585100E−02 | 0.000000E+00 | −1.026200E−02 | 0.000000E+00 | 4.740800E−03 | 0.000000E+00 |
| d4 | 0.000000E+00 | 1.792000E−03 | 0.000000E+00 | 3.034000E−04 | 0.000000E+00 | −1.290600E−03 | 0.000000E+00 |
| d6 | 0.000000E+00 | 4.217200E−04 | 0.000000E+00 | 1.370800E−04 | 0.000000E+00 | −1.970000E−04 | 0.000000E+00 |
| d8 | 0.000000E+00 | −6.900000E−05 | 0.000000E+00 | −4.407500E−05 | 0.000000E+00 | −5.714100E−06 | 0.000000E+00 |
| d10 | 0.000000E+00 | 2.218300E−05 | 0.000000E+00 | 9.555900E−06 | 0.000000E+00 | −4.447200E−06 | 0.000000E+00 |

TABLE 49

| | BD | DVD | CD |
|---|---|---|---|
| DOE 1 | 3 | 2 | 2 |
| DOE 2 | 2 | 1 | 1 |
| DOE 3 | 2 | 1 | 1 |

Hereinafter, the procedure extracting the shape of the diffractive lens structure will be described.

In extracting the practical shape of the diffractive lens structure, first, the respective practical shapes of the diffractive lens structures 1 to 3 are extracted by using the diffractive lens function, the macroscopic aspherical surface shape and the diffraction order to be used. That is, like the above examples, the height from the optical axis, at which the diffractive lens functions become integers, is extracted, and then phase steps having proper direction and depth are formed to generate a given diffractive light at the height on the macroscopic aspherical surface. Furthermore, these practical shapes are geographically fitted with one another to be a synthesized surface.

Hereinafter, the specific procedure will be described.

Regarding how to extract the practical shape of the diffractive lens structure 1, since the diffractive lens structure 1 of Example 1 is equal to the design result, and the practical shape is extracted in the same way, the detailed description will be omitted.

Next, the method of extracting the practical shape of the diffractive lens structure 2 will be described. FIG. 142 is a graph showing the diffractive lens function of the diffractive lens structure 2. Since the diffractive lens function of the diffractive lens structure 2 decreases monotonously in Region 2, the diffractive lens structure is blazed in a direction, in which the diffractive lens structure gets thinner than the macroscopic aspherical surface shape from the inner circumferential portion to the outer circumferential portion of the diffractive lens structure, and phase steps are formed at the heights from the optical axis h201 to h221, at which the diffractive lens functions become integers, in a direction, in which the thickness of the lens increases. Although the phase step amount is determined to make the second-order diffraction efficiency for BD 100%, in this case, the plurality of orbicular zone surfaces divided at the phase steps are all planes perpendicular to the optical axis.

Next, the method of extracting the practical shape of the diffractive lens structure 3 will be described. FIG. 143 is a graph showing the diffractive lens function of the diffractive lens structure 3. Since the diffractive lens function of the diffractive lens structure 3 decreases monotonously in Region 1, the diffractive lens structure is blazed in a direction, in which the diffractive lens structure gets thinner than the macroscopic aspherical surface shape from the inner circumferential portion to the outer circumferential portion of the diffractive lens structure, and phase steps are formed at the heights from the optical axis h301 to h324, at which the diffractive lens functions become integers, in a direction, in which the thickness of the lens increases. Although the phase step amount is determined to make the second-order diffraction efficiency for BD 100%, in this case, the plurality of orbicular zone surfaces divided at the phase steps are all planes perpendicular to the optical axis.

If the specific shapes of the diffractive lens structures 1 to 3 are extracted respectively as described above, the surfaces are synthesized into one surface. Since the diffractive lens structures 1 and 3 are formed at the common region, when the two diffractive lens structures are synthesized, like Example 3 or 4, the diffractive lens structure, the diffraction efficiency of which does not deteriorate across the whole wavelength by synthesizing all the synthesizable phase steps on condition that there is no bad effect on the performance can be realized.

In addition, it is preferable to synthesize the phase steps as described above since the intervals among the phase steps can increase, and the substantial diffraction deterioration of the mold or the like due to the fabrication error can be prevented.

Table 50 illustrates the shape data of the diffractive lens structure representing the specific shapes of the diffractive lens structure in Example 5. In Table 50, the data in the grey cells are phase steps made by synthesizing the phase steps composing the diffractive lens structures 1 and 3.

TABLE 50

| Step No. | Radius of step [mm] | Width of orbicular zone [mm] | Amount of step [mm] |
| --- | --- | --- | --- |
| 1 | 0.1995000 | | −0.0014980 |
| 2 | *(synthesized)* | *(synthesized)* | *(synthesized)* |
| 3 | 0.3460000 | 0.0490000 | −0.0014980 |
| 4 | 0.3998000 | 0.0538000 | −0.0014980 |
| 5 | 0.4258000 | 0.0260000 | 0.0025150 |
| 6 | 0.4473000 | 0.0215000 | −0.0014980 |
| 7 | 0.4903000 | 0.0430000 | −0.0014980 |
| 8 | *(synthesized)* | *(synthesized)* | *(synthesized)* |
| 9 | 0.5670000 | 0.0373000 | −0.0014980 |
| 10 | 0.6019000 | 0.0349000 | −0.0014980 |
| 11 | 0.6226000 | 0.0207000 | 0.0025150 |
| 12 | 0.6349000 | 0.0123000 | −0.0014980 |
| 13 | 0.6665000 | 0.0316000 | −0.0014980 |
| 14 | 0.6967000 | 0.0302000 | −0.0014980 |
| 15 | 0.7108000 | 0.0141000 | 0.0025150 |
| 16 | 0.7258000 | 0.0150000 | −0.0014980 |
| 17 | 0.7538000 | 0.0280000 | −0.0014980 |
| 18 | 0.7810000 | 0.0272000 | −0.0014980 |
| 19 | *(synthesized)* | *(synthesized)* | *(synthesized)* |
| 20 | 0.8329000 | 0.0339000 | −0.0014980 |
| 21 | 0.8579000 | 0.0250000 | −0.0014980 |
| 22 | 0.8822000 | 0.0243000 | −0.0014980 |
| 23 | 0.8930000 | 0.0108000 | 0.0025150 |
| 24 | 0.9060000 | 0.0130000 | −0.0014980 |
| 25 | 0.9293000 | 0.0233000 | −0.0014980 |
| 26 | 0.9522000 | 0.0229000 | −0.0014980 |
| 27 | 0.9746000 | 0.0224000 | −0.0014980 |
| 28 | 0.9966000 | 0.0220000 | −0.0014980 |
| 29 | *(synthesized)* | *(synthesized)* | *(synthesized)* |
| 30 | 1.0270000 | 0.0200000 | −0.0014980 |

TABLE 50-continued

| Step No. | Radius of step [mm] | Width of orbicular zone [mm] | Amount of step [mm] |
| --- | --- | --- | --- |
| 31 | 1.0450000 | 0.0180000 | −0.0014980 |
| 32 | 1.0630000 | 0.0180000 | −0.0014980 |
| 33 | 1.0820000 | 0.0190000 | −0.0014980 |
| 34 | 1.1010000 | 0.0190000 | −0.0014980 |
| 35 | 1.1190000 | 0.0180000 | −0.0014980 |
| 36 | 1.1380000 | 0.0190000 | −0.0014980 |
| 37 | 1.1580000 | 0.0200000 | −0.0014980 |
| 38 | 1.1770000 | 0.0190000 | −0.0014980 |
| 39 | 1.1970000 | 0.0200000 | −0.0014980 |
| 40 | 1.2180000 | 0.0210000 | −0.0014980 |
| 41 | 1.2380000 | 0.0200000 | −0.0014980 |
| 42 | 1.2600000 | 0.0220000 | −0.0014980 |
| 43 | 1.2820000 | 0.0220000 | −0.0014980 |
| 44 | 1.3060000 | 0.0240000 | −0.0014980 |
| 45 | 1.3310000 | 0.0250000 | −0.0014980 |
| 46 | 1.3570000 | 0.0260000 | −0.0014980 |
| 47 | 1.3870000 | 0.0300000 | −0.0014980 |
| 48 | 1.4200000 | 0.0330000 | −0.0014980 |
| 49 | 1.4630000 | 0.0430000 | −0.0014980 |

The diffractive lens structure of Example 5 is composed of 49 phase steps, central surfaces divided from the phase steps, total 48 orbicular zone surfaces from orbicular zone surfaces 2 to 49, and outer circumferential surface. Although the depths of the phase steps composing the diffractive lens structure 1 in Example 5 are +0.0025150 mm, the depth of the phase step of the outermost circumference is set +0.003875 mm because the phases of Regions 1 and 2 are synthesized for all of BD, DVD and CD. The depths of the phase steps composing the diffractive lens structures 2 and 3 are −0.0014980 mm.

In the diffractive lens structure 1 of Example 5, the radius corresponding to the effective diameter of Region 1 is 1.007 mm, and steps 1 to 29 exist on the above diameter. It is evident from Table 50 that a phase step, the depth of which corresponds to that made by fitting the phase step composing the diffractive lens structure 1, the phase step composing the diffractive lens structure 3, and the phase step composing the diffractive lens structures 1 and 3, exists in Region 1. Furthermore, although Phase step 29, the outermost circumferential phase step of Region 1, is a synthesized phase step, as described above, the Phase step 29 is set deep to gather the phases of Regions 1 and 2 for all of BD, DVD and CD, thereby the phase step amount is different from those of the other phase step. That is, Phase step 29 is a phase step deeper in the brazing direction than Phase steps 2, 8 and 19, which are the other synthesized phase steps.

From the above, there are 29 phase steps having four kinds of different depths in Region 1.

In addition, since the signals of the phase steps composing the synthesized diffractive lens structures 1 and 3 are opposite in the diffractive optical element of Example 5, the synthesized diffractive phase steps are made thinner by synthesizing the above phase steps, which is preferable since the substantial diffraction efficiency deterioration due to the wall surface slope can be prevented.

That is, if the phase steps having the opposite signals are synthesized as above, the fine protrusions or hollows of the phase steps are removed. Generally, in order to form fine protrusion or hollows, it is required to make the tip of the processing machinery fine correspondingly in fabricating molds. However, it becomes difficult to process the mold with high precision due to rigidity shortage as the tip of the processing machinery is made thinner. In addition, when the mold is shaped hollow, materials remain in the mold, thereby inferior shaping products easily occur, and the mold can not be used for a longer time. Although the diffractive lens structure before phase step synthesis has the above disadvantages, the disadvantages can be solved by synthesizing phase steps having different depth directions in order to design the diffractive lens structure like Example 5. That is, by employing the designing method of Example 5, the mold can be fabricated easily with high precision, shaped satisfactorily, and used for a longer time, thereby the high-quality and cost down of the diffractive optical element can be achieved.

In Region 1, the phase step amount of the diffractive lens structure 1 is determined in consideration of the balance between the diffraction efficiencies of BD and CD, and accordingly the central surface and the orbicular zone surfaces 2 to 29 existing in Region 1 are shaped aspherical as shown in Table 51. That is, the central surface on the optical axis is shaped aspherical surface shown in Table 51, and the orbicular zone surfaces 2 to 29 are orbicular zone surface shown in Table 51 shifted in the optical axis direction as much as the respective phase steps.

TABLE 51

| Name of coefficient | Value |
| --- | --- |
| Radius of curvature | −160.8600000 |
| CC | 0.000000E+00 |
| A4 | 8.263400E−04 |
| A6 | 1.456300E−04 |
| A8 | −2.167200E−06 |
| A10 | 5.389000E−06 |

The orbicular zone surfaces 30 to 49 existing in Region 2 and the outer circumferential surface are planes perpendicular to the optical axis.

FIG. 144 is a view showing the cross-section of the diffractive lens structure formed at the diffractive optical element of Example 5, that is, a graph showing the sag amount to the height from the optical axis.

FIGS. 145 to 147 show the wavefront aberrations of BD, DVD and CD in the objective lens module using the diffractive optical element of Example 5, and it can be understood that the phases of the wavefronts penetrating the respective diffractive lens structures are gathered in the respective effective diameters for all of BD, DVD and CD.

FIGS. 148 to 153 are graphs showing the wave-optic spot shapes calculated by using the aberration due to the practical surface shapes of the diffractive lens structure, in which the ordinate represents the optical strength and the abscissa represents the radius. FIGS. 148 to 150 show the whole spot shapes at BD, DVD and CD respectively, and FIGS. 151 to 153 show the side robe of the spots at BD, DVD and CD respectively. The light-converging point of BD has a slightly smaller main spot and a slightly larger side robe than a normal lens. The above fact arises from the apodization effect generated by the fact that the diffraction efficiency of the inner circumferential portion is slightly dropped at Region 1, however, no troubles occur on recording and reproducing with that degree. In addition, since the intensity of the semiconductor laser used as a light source, in general, decreases from center to periphery, it can be preferable to drop the efficiency at the inner circumferential portion to generate the apodization effect like Example 5. Regarding DVD or CD, the spot shapes at the effective diameters φ(BD) are calculated in consideration of light outside the respective effective diameters. That is, although the spot shapes are spot shapes converging light with no special numeric aperture control element, the spot shapes almost the same as those of the normal objective lens for DVD or CD can be obtained particularly without performing opening limit.

FIGS. 154 to 157 are graphs showing the calculation result of the spot shape variation to disc tilt. FIGS. 154 and 155 show the full widths at half maximum variation of the spots for DVD and CD respectively, in which the ordinate represents the full width at half maximum and the abscissa represents the disc tilt angle. FIGS. 156 and 157 show the side robe intensity variation for DVD and CD respectively, in which the ordinate represents the side robe intensity of the spots and the abscissa represents the disc tilt angle. It can be understood that a reproducing-characteristic as stable as that when conventional DVD and CD objective lens are used can be obtained, in particular, with no control of numeric aperture when the objective lens of the example is used since the diffractive lens structure shows almost the same characteristics as those of the normal lens to any one of DVD and CD.

As described above, it can be understood from the lens of Example 5 that a reproducing-characteristic as stable as that when conventional DVD and CD objective lens are used can be obtained, in particular, with no control of numeric aperture.

APPLICATION EXAMPLES TO HD-DVD OBJECTIVE LENS

As a next generation optical disc system using blue light source other than BD, High Density-DVD (hereinafter referred to as HD-DVD) having 0.6 mm-thick penetration protective layer, 400 to 410 nm corresponding wavelength and 0.65 of objective lens opening is suggested. Since HD-DVD has the same values as DVD in the numerical apertures or the depth of the penetration protective layer of the objective lens, DVD can be reproduced if an objective lens designed for HD-DVD is used. However, since the refraction index of lens material varies with the wavelength practically, spherical aberration occurs in a normal aspherical surface lens designed for HD-DVD, and thus the reproduction of DVD becomes difficult. In the case of CD reproduction, since the thickness of the penetration protective layer also varies, the reproduction of DVD is further difficult. Therefore, in order to record on and reproduce DVD or CD by using a HD-DVD objective lens, it is required to correct the aberration by using the diffractive lens structure like the above-mentioned BD, DVD and CD compatible objective lens module.

The regulated numerical apertures of the objective lens of HD-DVD, DVD and CD are 0.65, 0.60 and 0.45. Therefore, the effective diameters of the objective lens are largest for HD-DVD and smallest for CD. That is, it is required to control the sizes of the openings different respectively for DVD or CD. Like the above, there are the same problems as the above-mentioned BD/DVD/CD compatible objective lens or module in the HD-DVD/DVD/CD compatible objective lens module. The problems can be solved by using the HD-DVD/DVD/CD compatible objective lens and the module or the diffractive optical element of the embodiment. That is, the diffractive lens structure formed at the diffractive optical element is at least, as shown in FIG. 158A, provided at one surface of the substrate and divided at a plurality of regions determined at radius positions varying with the effective diameter corresponding the recording media of the objective lens. The diffractive lens structure is formed to correct the spherical aberration due to the difference in the depth of the penetration protective layer or the wavelength.

The specific structure of the diffractive lens structure of the HD-DVD/DVD/CD compatible lens module is as follows.

The first diffractive lens structure (the first aberration correction means) is formed at Region 1 of the innermost circumference in order to use the combinations of the diffractive light, which can realize the diffractive lens structure that does not correct the spherical aberration for the first laser (HD-DVD laser, wavelength 408 nm), but corrects the spherical aberration for the second laser (DVD laser, wavelength 660 nm) and the third laser (CD laser, wavelength 780 nm) {for example, (HD-DVD: first-order light, DVD: first-order light, CD: first-order light), (HD-DVD: third-order light, DVD: second-order light, CD: second-order light), (HD-DVD: seventh-order light, DVD: fourth-order light, CD: third-order light), (HD-DVD: ninth-order light, DVD: fifth-order light, CD: fourth-order light)}. Meanwhile, although in the HD-DVD/DVD/CD compatible objective lens module, the (HD-DVD: fifth-order light, DVD: third-order light, CD: second or third-order light) combination, the phase steps generated at the phase steps composing the diffractive lens structure with HD-DVD laser and DVD laser are gathered, the spherical aberration generated to DVD is small, thereby the combination can be considered as an effective combination.

The second diffractive lens structure (the second aberration correction means) is formed at Region 2 located in the central portion outside Region 1 in order to use the combinations of the diffractive light, which can realize the diffractive lens structure that does not correct the spherical aberration for HD-DVD laser and CD laser, but corrects the spherical aberration only for DVD laser {for example, (HD-DVD: second-order light, DVD: first-order light, CD: first-order light), (HD-DVD: fourth-order light, DVD: second-order light, CD: second-order light), (HD-DVD: sixth-order light, DVD: fourth-order light, CD: third-order light), (HD-DVD: eighth-order light, DVD: fifth-order light, CD: fourth-order light)}. In the case of tenth-order light to HD-DVD, phase differences generated at the phase steps composing the diffractive lens structure to the laser corresponding to the recording and reproducing of all media are almost gathered, thereby the aberration is not selectively corrected only for DVD laser. Therefore, the diffractive lens structure is designed to make the diffraction order, the diffraction efficiency of which becomes the maximum, among the diffractive lights generated when the HD-DVD laser penetrates the second diffractive lens structure even numbers except the multiple of 10. The depth of the phase steps composing the diffractive lens structure can be set to generate optical path length difference such that the diffraction efficiency of the HD-DVD laser becomes the maximum according to the requested specifications or the balance between the diffraction efficiencies of HD-DVD laser and DVD laser can be considered. Furthermore, when saw-like wavefront aberration occurs, like the case of Region 1, it is preferable that only the phase step of the outermost circumference is set to vary the generated optical path length difference since better light-convergence characteristics can be obtained.

The third diffractive lens structure (the third aberration correction means) is formed at Region 3 located in the outer peripheral portion outside Region 2 in order to use the combinations of the diffractive light, which can realize the diffractive lens structure that does not correct the spherical aberration throughout all wavelength (for example, HD-DVD: tenth-order light, DVD: sixth-order light, CD: fifth-order light). In addition, Region 3 can include no diffractive lens structure (that is, only zero-order light penetrates). Therefore, the given HD-DVD opening number, 0.65, can be realized.

Next, a means correcting the spherical aberration, the amount of which is different for DVD and CD, will be described.

Since the thickness of the DVD penetration protective layer (substrate) is 0.6 mm, and that of the CD penetration protective layer (substrate) is 1.2 mm, the spherical aberrations to be corrected are different. That is, the spherical aberration for CD cannot be corrected completely in the diffractive lens structure designed for HD-DVD/DVD compatible. Similarly, the spherical aberration for DVD cannot be corrected completely in the diffractive lens structure designed for HD-DVD/CD compatible. The above facts arise from the fact that the ratio of values of the aberration amount that can correct with one phase step composing the diffractive lens structure, that is, [Round [(N−1)×d/λ]−{(N−1)×d/λ}]λ cannot be made equal to the ratio of the spherical aberration amount of DVD and CD to be corrected. In this case, the spherical aberration that cannot be corrected by the diffractive lens structure can be corrected by making the incident light from either DVD or CD a diverging or converging light. However, for example, when HD-DVD/DVD employs the incident of parallel light and CD only employs diverging or converging light, the composition of pickup becomes complex, and thus, from the above viewpoint, it is desirable that parallel light enters in all of HD-DVD/DVD/CD.

The above fact can be realized with the method used in the above-mentioned BD/DVD/CD compatible lens module. That is, as the first method, the first diffractive lens structure formed at Region 1 commonly used at DVD/CD in such a composition as FIG. 158B is designed to correct the spherical aberration amount in the middle of the spherical aberration amount of DVD and CD to be corrected, and a method taking the balance of the spherical aberration amount remaining at DVD and CD. In addition, as the second method, it can be considered that the first diffractive lens structure and the fourth diffractive lens structure generating diffractive light having even number-order except 10 to the HD-DVD laser are mixed at Region 1 as shown in FIG. 158C. In this method, first, the first diffractive lens structure is designed for HD-DVD/CD compatible. Although the first diffractive lens structure corrects the spherical aberration for DVD laser, the correcting amount is different from the spherical aberration amount to be corrected, thereby a spherical aberration corresponding to the difference remains. The remaining aberration is corrected by adding the second diffractive lens structure correcting the spherical aberration remaining at DVD and the fourth diffractive lens structure generating even number-order diffractive light to the HD-DVD laser. Since the fourth diffractive lens structure does not correct the aberration for HD-DVD laser and is designed to generate even number-order diffractive light, the fourth diffractive lens structure does not correct the aberration for CD laser. That is, there is no bad effect on the wavefront of CD by adding the fourth diffractive lens structure. In this method, it is possible to design to suppress the aberration in Region 1 of DVD/CD sufficiently. Meanwhile, although the interval between the phase step composing the first diffractive lens structure and the phase step composing the fourth diffractive lens structure can become extremely small according to the design result, in that case, it is possible to decrease the total number of phase steps by synthesizing the two phase steps into one phase step. That is, a phase step having the phase step amount corresponding to the phase step amount of two adjoining phase steps can be disposed either at the position of one of the fitted phase steps or between the phase steps. When the phase steps are synthesized, although the performance slightly deteriorates since the respective phase steps slightly deviate from the originally designed value, the deviation is small when the synthesized two phase steps are close to each other, the performance deterioration cannot be a serious problem. Since the number of the phase steps requiring two can be decreased into one by synthesizing two phase steps, the mold becomes easy to fabricate and to release easily in shaping, thereby the mold can be used for a longer time and shaped satisfactorily.

As the third method, as shown in FIG. 158*d*, the remaining spherical aberration can be decreased by making Region 1, which is a common design region of DVD/CD, smaller than the third diffractive effective diameter corresponding to the effective diameter of CD to decrease numerical aperture. For example, when the common design region of DVD/CD is about 80%, the remaining spherical aberration is decreased to 41%. Particularly, since HD-DVD and DVD have the same penetration protective layer thicknesses, the spherical aberration amount generated at DVD is not that large. Therefore, there can be cases, in which the spherical aberration is not required for DVD light source in the region by making the common region of DVD/CD small. Meanwhile, since the numerical aperture to CD becomes small when the common design region decreases monotonously, troubles can occur on the recording and reproducing of CD. However, a given numerical apertures can be obtained for CD by setting the light-converging position for CD laser like the above-mentioned BD/DVD/CD compatible lens module. That is, when the first diffractive lens structure is designed in CD, Region 1 can be made small by setting the image surface position, in which the vertical spherical aberration becomes zero, at anywhere in Region 4. In addition, since the phase steps composing the plurality of diffractive lens structures are not mixed at Region 1 in this designing method, a design not accompanying the increase in the number of phase steps can be preferably provided. Furthermore, it is required to consider the balance between HD-DVD laser and diffraction efficiency in Region 1 as described above, however, even when the diffraction efficiency of HD-DVD is dropped in consideration of the diffraction efficiency of CD laser, the effect can be suppressed small comparing with the case that the area of Region 1 is not made small, since the size of Region 1 is made small.

Figure 159:
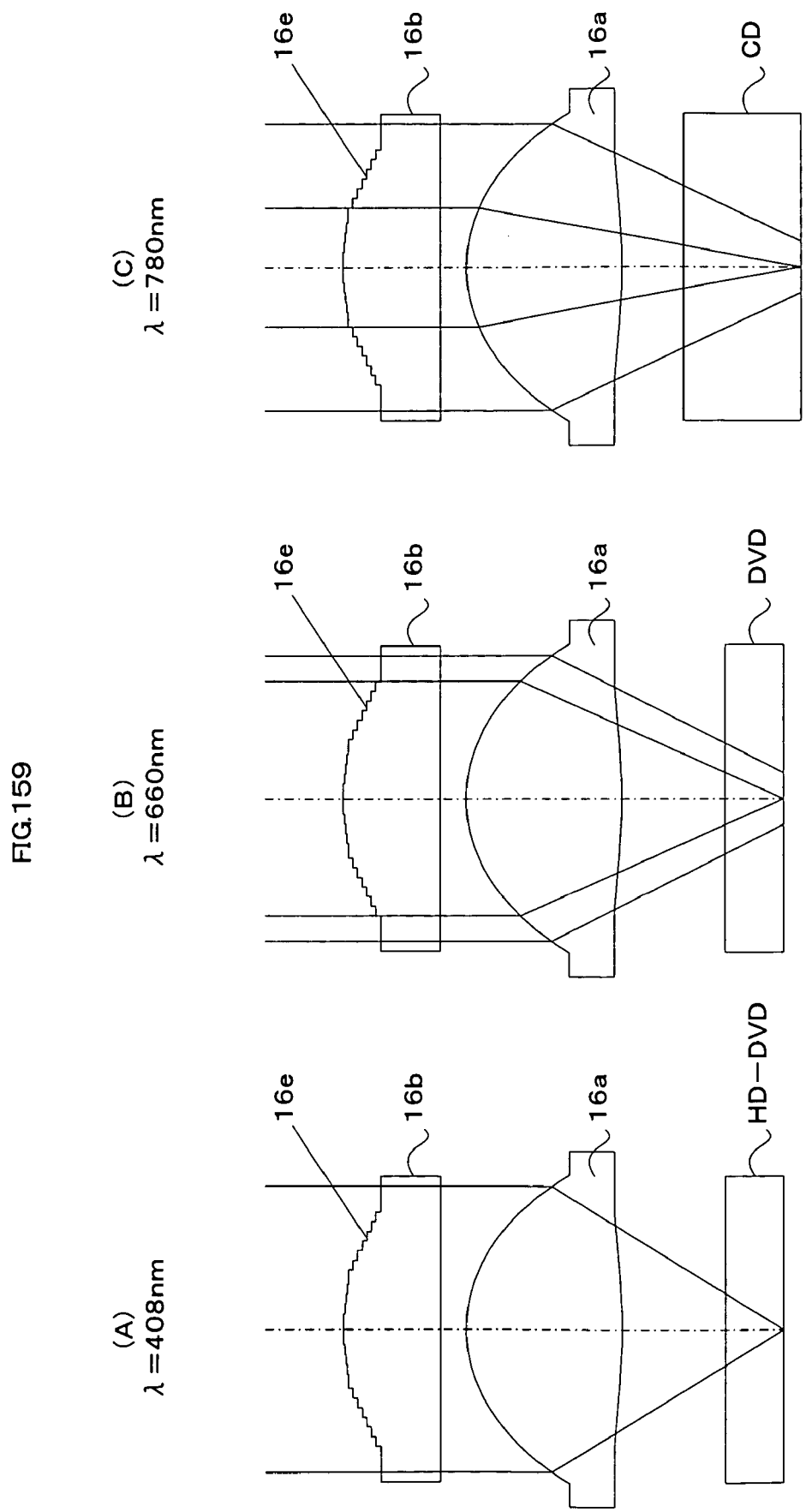

FIG. 159 shows the operation of the objective lens module.

As shown in FIG. 159A, when the first laser of $\lambda_{HD\text{-}DVD}$ enters the diffractive optical element 16*b* about parallel, the light penetrating the whole regions reaches the HD-DVD objective lens 16*a* as it is about parallel. The light converged by the objective lens 16*a* penetrates the HD-DVD protective layer and is converged on a signal-recording surface.

In addition, as shown in FIG. 159B, when the second laser of $\lambda_{DVD}$ enters about parallel, the light penetrating Regions 1 and 2 in the second diffraction effective diameter corresponding to the effective diameter of DVD in the diffractive optical element is converged by the HD-DVD objective lens 16*a*, penetrates the HD-DVD protective layer and is converged on a signal-recording surface. On the other hand, although light penetrating outside the second diffraction effective diameter in the diffractive optical element is converged by the lens 16*a* and penetrates the DVD protective layer, the spherical aberration is not corrected so as to become flare, thereby the light does not contribute to reproducing.

Furthermore, as shown in FIG. 159C, when the third laser of $\lambda_{CD}$ enters about parallel, the light penetrating Regions 1 and 4 in the third diffraction effective diameter corresponding to the effective diameter of CD is converged by the HD-DVD objective lens 16*a*, penetrates the CD protective layer and is converged on a signal-recording surface. On the other hand, although light penetrating outside the third diffraction effective diameter in the diffractive optical element is converged by the lens 16*a* and penetrates the CD protective layer, the spherical aberration is not corrected so as to become flare, thereby the light does not contribute to reproducing.

In addition, although the numbers of openings of the objective lens required for DVD and CD are regulated 0.6 and 0.45 respectively, better performance can be obtained when an objective lens including the slightly more numerical apertures than the regulation is employed. Particularly, considering recording, it is common that the numbers of openings are about 0.65 and 0.5 for DVD and CD. For example, when the numerical aperture is 0.65 for DVD, since the numbers of openings become equal for HD-DVD and DVD, the effective diameters thereof are considered equal. However, since the light source wavelengths are different for HD-DVD and DVD, and thus the focal length of the objective lens becomes different, the effective diameters (2×focal length×numerical apertures) in the objective lens also become different. In general, since the diffractive index of glass increases as the wavelength of light penetrating the glass becomes short, the focal length of the HD-DVD aspherical surface objective lens decreases as the wavelength becomes short. Therefore, comparing with HD-DVD having short light source wavelength, the focal length of the objective lens becomes long in DVD, as a result, the effective diameter becomes large. In this case, the effective diameter of DVD becomes the maximum in the objective lens module, and then the effective diameter of HD-DVD becomes large, and the effective diameter of CD becomes the minimum. That is, the effective diameter of the objective lens module becomes equal to that of DVD, the control of numeric aperture of different sizes is performed by the diffractive lens structure for HD-DVD and CD.

The above functions can be realized by the diffractive optical element having such compositions as FIGS. 160A, 160B and 160D, and the objective lens module combining the HD-DVD objective lens. Herein, it is required to set a surface shape to correct the aberration only for DVD at Region 3 of the optical element shown in FIGS. 160A to 160C.

Furthermore, when a DVD objective lens is used in the objective lens 16*a* combined with the above-mentioned optical element, the diffractive lens structures are designed respectively as follows.

That is, the diffractive lens structure, which does not correct the aberration for DVD, but corrects the aberration for HD-DVD and CD, is constituted at the first diffractive lens structure in FIGS. 160A to 160C.

In addition, the diffractive lens structure, which does not correct the aberration for DVD and CD, but corrects the aberration only for HD-DVD, is constituted at the second diffractive lens structure.

Furthermore, in the third diffractive lens structure, the third diffractive lens structure is constituted to make it possible to use the combination of diffractive light not correcting the aberration for all of HD-DVD/DVD/CD (for example, HD-DVD: tenth-order light, DVD: sixth-order light, CD: fifth-order light) or no diffractive lens is constituted (only zero-order light penetrates).

Still furthermore, in the fourth diffractive lens structure shown in FIG. 160B, like the second diffractive lens structure, the diffractive lens structure, which does not correct the aberration for DVD and CD, but corrects the aberration only for HD-DVD, is constituted.

The diffraction orders used at the diffractive lens structures respectively are determined like the cases, in which the diffractive lens structure is combined with the HD-DVD objective lens to be used.

For example, the diffractive lens structure 1 can be designed to use {for example, (HD-DVD: first-order light, DVD: first-order light, CD: first-order light), (HD-DVD: third-order light, DVD: second-order light, CD: second-order light), (HD-DVD: fifth-order light, DVD: third-order light, CD: second or third-order light), (HD-DVD: seventh-order light, DVD: fourth-order light, CD: third-order light), (HD-DVD: ninth-order light, DVD: fifth-order light, CD: fourth-order light)}, the diffractive lens structures 2 and 4 can be designed to use {for example, (HD-DVD: second-order light, DVD: first-order light, CD: first-order light), (HD-DVD: fourth-order light, DVD: second-order light, CD: second-order light), (HD-DVD: sixth-order light, DVD: fourth-order light, CD: third-order light), (HD-DVD: eighth-order light, DVD: fifth-order light, CD: fourth-order light)}, and the diffractive lens structure 3 can be designed to use {for example, (HD-DVD: tenth-order light, DVD: sixth-order light, CD: fifth-order light)}. That is, like the above-mentioned BD/DVD/CD compatible lens module, the combination of diffraction orders for HD-DVD, DVD and CD can be obtained by the above equations (1) to (18) and HD-DVD instead of BD. Although the diffractive lens structure generating the above-mentioned number of diffraction order can design the diffractive optical element having desired functions, among those, further desirable combinations can be extracted from the following Table 52.

structures, the combinations of the diffraction efficiency of HD-DVD, DVD and CD are not limited to the values of Table 52.

The diffractive lens structure 1 is required to have a function of correcting the aberrations generated at HD-DVD and CD when using the DVD objective lens. In this case, since the spherical aberrations generated at HD-DVD and CD have opposite signs in general, it is desirable that the phase step composing the diffractive lens structure 1 have the opposite signal amount of aberration correction respectively with respect to HD-DVD and CD.

It is desirable that the diffractive lens structure 2 correct the aberration with respect to HD-DVD and do not correct the aberration or increase the aberration with respect to CD. In this case, it is desirable that the phase steps composing the diffractive lens structure 2 have the same-signal amount of aberration correction with respect to HD-DVD and CD. If the diffractive lens structure correcting the aberration of HD-DVD is designed with the above diffraction-order, the spherical aberration can be increased further with respect to CD.

It is desirable that the phase step composing the diffractive lens structure 3 do not correct the aberration or have the opposite-signal amount of aberration correction respectively with respect to HD-DVD and CD since the diffractive lens structure 3 does not correct the aberration or increases the aberration with respect to HD-DVD and CD. Although the light penetrating the diffractive lens structure 3 is not required for both of HD-DVD and CD, originally the light is combined with the DVD objective lens and thus becomes flare due to the spherical aberration with no additional work, thereby an effect the same as that when the control of numeric aperture is performed can be obtained. In addition, although the effect of the light penetrating the region can be decreased by adding the aberrations with the diffractive lens structure 3, when the diffractive lens structure generates the aberration, there can generate diffractive light other than the diffractive order originally imagined, and, in this case, it can

TABLE 52

| Diffractive lens structure | | 2 and 4 | 1 (and 3) | 1 (and 3) | 1 (and 3) | 2 and 4 | 3 |
|---|---|---|---|---|---|---|---|
| HD-DVD | Diffraction order | 2 | 3 | 5 | 7 | 8 | 10 |
| | Amount of aberration correction [λ] | 0.33 | −0.33 | 0.00 | 0.33 | −0.33 | 0.00 |
| | Diffraction efficiency | 0.684 | 0.684 | 1 | 0.684 | 0.684 | 1 |
| DVD | Diffraction order | 1 | 2 | 3 | 4 | 5 | 6 |
| | Diffraction efficiency | 1 | 1 | 1 | 1 | 1 | 1 |
| CD | Diffraction order | 1 | 2 | 3 | 3 | 4 | 5 |
| | Amount of aberration correction [λ] | 0.17 | 0.33 | 0.50 | −0.33 | −0.17 | 0.00 |
| | Diffraction efficiency | 0.912 | 0.684 | 0.405 | 0.684 | 0.912 | 1 |

Table 52 illustrates the diffraction-orders of HD-DVD and CD with respect to the diffraction-order of the diffractive lens structure used in DVD, the aberration amount corrected by one phase step (the value of the diffraction-order to be used subtracted with the optical path length difference generated at the phase steps) and the diffraction efficiency. Meanwhile, the diffraction efficiency illustrated in Table 52 is an example when the diffractive lens structure is blazed to make the diffraction efficiency 1 with respect to DVD light source, and in the practical design, it is possible to design in consideration of the balance of the diffraction efficiency in HD-DVD, DVD and CD by changing the amount of the phase steps. Therefore, in the practical diffractive lens become difficult to make the plurality of diffractive light flare. From the above fact, it is desirable to form no diffractive lens structure in Region 3 or to apply the combination of the diffraction-order that does not correct the aberration throughout the whole wavelength and has a high diffraction efficiency (for example, HD-DVD: tenth-order light, DVD: sixth-order light, CD: fifth-order light).

Figure 161:
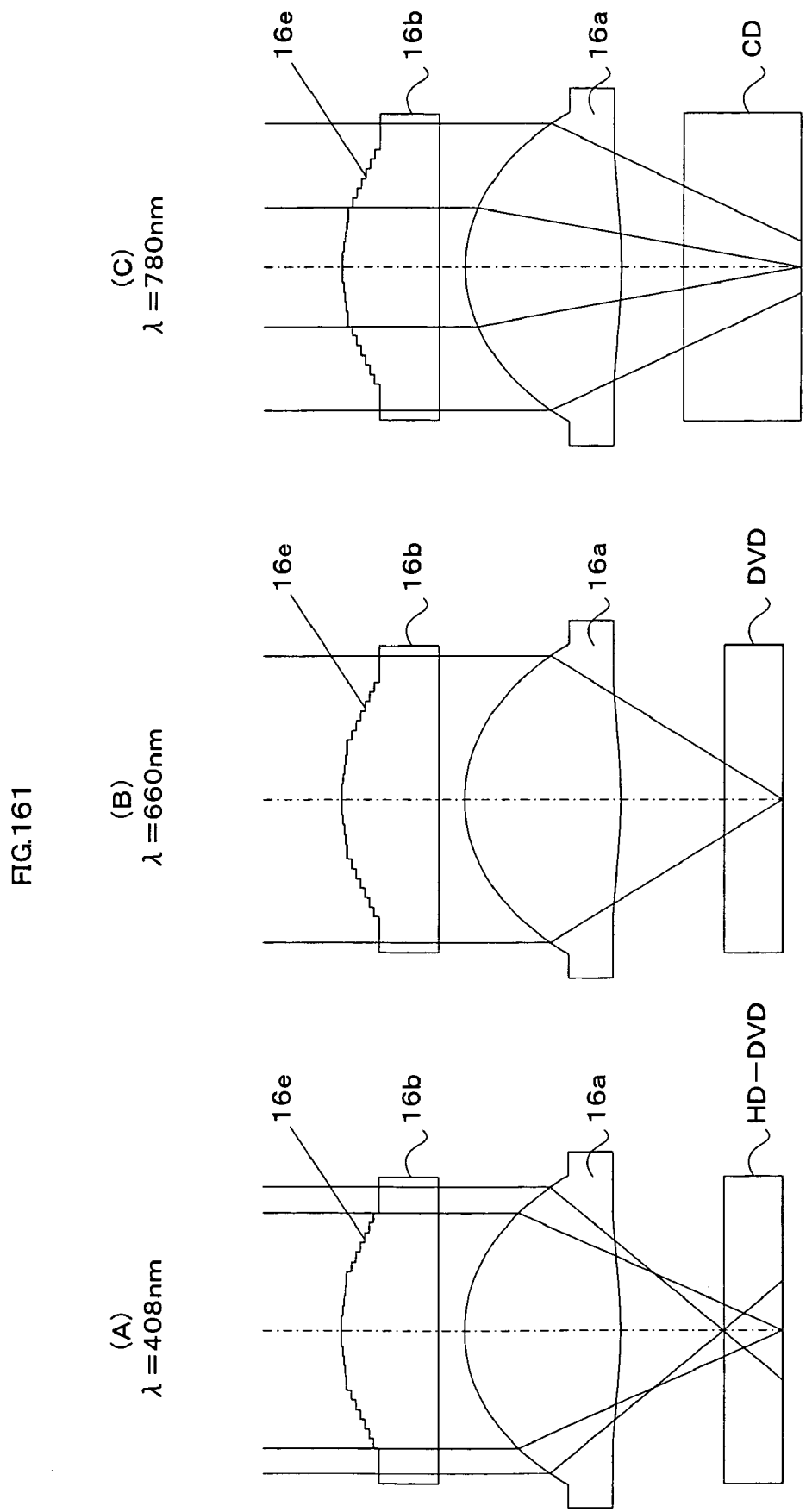

FIG. 161 shows the operation of the objective lens module.

As shown in FIG. 161A, when the first laser of $\lambda_{HD\text{-}DVD}$ enters the diffractive optical element 16b about parallel, the light penetrating Regions 1 and 2 inside the first diffractive effective diameter corresponding to the effective diameter of HD-DVD in the diffractive optical element is converged by the objective lens 16a for HD-DVD., penetrates the HD-DVD protective layer and is converged on a signal-recording surface. On the other hand, although light penetrating outside the first diffraction effective diameter in the diffractive optical element is converged by the lens 16a and penetrates the DVD protective layer, the spherical aberration is not corrected so as to become flare, thereby the light does not contribute to reproducing.

In addition, as shown in FIG. 161B, when the second laser of $\lambda_{DVD}$ enters about parallel, the light penetrating all the regions reaches the HD-DVD objective lens 16a as it is about parallel. The light converged by the objective lens 16a penetrates the DVD protective layer and is converged on a signal-recording surface.

Furthermore, as shown in FIG. 161C, when the third laser Of $\lambda_{CD}$ enters about parallel, the light penetrating Regions 1 and 4 in the third diffraction effective diameter corresponding to the effective diameter of CD is converged by the HD-DVD objective lens 16a, penetrates the CD protective layer and is converged on a signal-recording surface. On the other hand, although light penetrating outside the third diffraction effective diameter in the diffractive optical element is converged by the objective lens 16a and penetrates the DVD protective layer, the spherical aberration is not corrected so as to become flare, thereby the light does not contribute to reproducing.

In addition, an example of design determining the numerical apertures of DVD to gather the effective diameters of HD-DVD and DVD is possible. In this case, the control of numeric aperture can be performed only with respect to CD, and HD-DVD/DVD/CD compatible can be realized with a form, in which Region 3 of the outermost circumference is removed from the diffractive lens structures exemplified so far.

In this case, the diffractive lens structures have the shapes shown in FIGS. 162A to 162C.

FIG. 163 shows the operation of the objective lens module using the diffractive optical element, the numerical apertures of which is determined to gather the effective diameters of HD-DVD and DVD.

As shown in FIG. 163A, when the first laser of $\lambda_{HD\text{-}DVD}$ enters the diffractive optical element 16b about parallel, the light penetrating the whole regions reaches the HD-DVD objective lens 16a as it is about parallel. The light converged by the objective lens 16a penetrates the HD-DVD protective layer and is converged on a signal-recording surface.

In addition, as shown in FIG. 163B, when the first laser of $\lambda_{DVD}$ enters the diffractive optical element 16b about parallel, the light penetrating the whole regions reaches the HD-DVD objective lens 16a as it is about parallel. The light converged by the objective lens 16a penetrates the HD-DVD protective layer and is converged on a signal-recording surface.

Furthermore, as shown in FIG. 163C, when the third laser Of $\lambda_{CD}$ enters about parallel, the light penetrating Regions 1 and 4 in the third diffraction effective diameter corresponding to the effective diameter of CD is converged by the HD-DVD objective lens 16a, penetrates the CD protective layer and is converged on a signal-recording surface. On the other hand, although light penetrating outside the third diffraction effective diameter in the diffractive optical element is converged by the lens 16a and penetrates the DVD protective layer, the spherical aberration is not corrected so as to become flare, thereby the light does not contribute to reproducing.

EXAMPLE 6

Example 6 is a diffractive optical element that can record on and reproduce HD-DVD, the first optical data storage media; DVD, the second optical data storage media; and CD, the third optical data storage media; and combined with a double aspherical lens for HD-DVD. Table 53 illustrates the composition of the lens system and the design conditions for HD-DVD, DVD and CD.

TABLE 53

|  | HD-DVD | DVD | CD |
|---|---|---|---|
| Light source wavelength [nm] | 408 | 660 | 780 |
| Magnification | 0 | 0 | 0 |
| Numeric aperture | 0.65 | 0.60 | 0.50 |
| Effective diameter [mm] | 3.000 | 2.886 | 2.412 |
| Disc thickness [mm] | 0.6 | 0.6 | 1.2 |

As shown in FIG. 164, the diffractive optical element of Example 6 has a diffractive lens structure at one surface, and the other surface is a plane. FIG. 165 is a cross-sectional view of the diffractive optical element of Example 6. The diffractive lens structure is composed of a plurality of diffractive lens structure having different characteristics and disposed concentrically; diffractive lens structures 1 at Region 1 in the inner circumferential portion; and diffractive lens structure 2 at Region 2 in the central portion. Region 3, the outer circumferential portion, is a plane.

Region 1 is the region of the inner circumferential portion inside the fourth effective diameter as shown in FIG. 165, Region 2 is an orbicular zone shaped region having the inner diameter at the fourth effective diameter and the outer diameter at the second effective diameter, and Region 3 is an orbicular zone shaped region having the inner diameter at the second effective diameter and the outer diameter at the first effective diameter. The diffractive lens structures 1 and 2 employ the combinations of the diffraction order like columns structures 1 and 2 in Table 54.

TABLE 54

|  |  | Structure 1 | | | | | Structure 2 | | | | |
|---|---|---|---|---|---|---|---|---|---|---|---|
| HD-DVD | Diffraction order | 1 | 2 | 3 | 4 | 5 | 5 | 6 | 7 | 8 | 9 | 10 |
|  | Diffraction efficiency | 1 | 1 | 1 | 1 | 1 | 1 | 1 | 1 | 1 | 1 | 1 |
| DVD | Diffraction order | 1 | 1 | 2 | 2 | 3 | 3 | 4 | 4 | 5 | 5 | 6 |
|  | Amount of aberration | +0.4 | −0.2 | +0.2 | −0.4 | 0 | 0 | +0.4 | −0.2 | +0.2 | −0.4 | 0 |

TABLE 54-continued

|  |  | Structure 1 | | | | | | Structure 2 | | | |
|---|---|---|---|---|---|---|---|---|---|---|---|
| | correction [λ] | | | | | | | | | | |
| | Diffraction efficiency | 0.573 | 0.875 | 0.875 | 0.573 | 1 | 1 | 0.4 | 0.875 | 0.875 | 0.573 1 |
| CD | Diffraction order | 1 | 1 | 2 | 2 | 2 | 3 | 3 | 3 | 4 | 4 5 |
| | Amount of aberration correction [λ] | +0.5 | 0 | +0.5 | 0 | −0.5 | +0.5 | 0 | −0.5 | 0 | −0.5 0 |
| | Diffraction efficiency | 0.405 | 1 | 0.405 | 1 | 0.405 | 0.405 | 1 | 0.405 | 1 | 0.405 1 |

Since the diffractive lens structure 1 of Example 6 does not correct the aberrations of HD-DVD and DVD light source, but corrects the aberration of CD light sources, the diffractive lens structure 1 uses fifth-order light for HD-DVD, third-order light for DVD and second-order light for CD, and is designed to correct aberration for CD.

Since the diffractive lens structure 2 of Example 6 does not correct the aberration of HD-DVD and CD light sources, but corrects the aberrations of DVD light source only, the diffractive lens structure 1 uses eighth-order light for HD-DVD, fifth-order light for DVD and fourth-order light for CD, and is designed to correct aberration for DVD.

Since the image surface position of CD in designing the diffractive lens structure 1 is set in the same way as Example 1, it is possible to set the size of the fourth effective diameter, the effective diameter of the diffractive lens structure 1, smaller than the third-order effective diameter corresponding to the effective diameter of CD in the diffractive optical element. The aberration generated at the region is suppressed a sufficiently small value in DVD by setting the effective diameter of the diffractive lens structure 1 small as described above, even when the diffractive lens structure does not correct the aberration with respect to DVD light source.

Table 55 illustrates paraxial data, that is, the specific design results of Example 6.

TABLE 55

| Surface No. | Radius of curvature | Central thickness | | | Refractive index | | |
|---|---|---|---|---|---|---|---|
| | | HD-DVD | DVD | CD | HD-DVD | DVD | CD |
| 1 | Diffractive lens structure | 1.0000000 | ← | ← | 1.5447820 | 1.5228720 | 1.5197300 |
| 2 | ∞ | 0.3000000 | ← | ← | 1.0000000 | ← | ← |
| 3 | 1.4766000 | 1.6000000 | ← | ← | 1.5447820 | 1.5228720 | 1.5197300 |
| 4 | −5.2170000 | 1.0546120 | 1.1266020 | 0.7885430 | 1.0000000 | ← | ← |
| 5 | ∞ | 0.6000000 | ← | 1.2000000 | 1.6180700 | 1.5228720 | 1.5197300 |
| 6 | ∞ | 0.0000000 | ← | ← | 1.0000000 | ← | ← |

Table 56 illustrates aspherical surface coefficients representing the macroscopic aspherical surface shape of the diffractive lens structures 1 and 2 and the aspherical surface shape of the objective lens in Example 6.

TABLE 56

| | Diffractive lens structure | | | Objective lens | |
|---|---|---|---|---|---|
| Name of coefficient | First surface (in) (0 < h ≦ 0.8735) | First surface (mid) (0.8735 < h ≦ 1.443) | First surface (out) (h > 1.443) | Third surface | Fourth surface |
| Radius of curvature | −18.2770000 | 236.2900000 | ∞ | 1.4766000 | −5.2170000 |
| CC | 0.000000E+00 | 0.000000E+00 | 0.000000E+00 | −5.620100E−01 | −4.139700E+01 |
| A4 | 9.231700E−03 | −7.372300E−03 | 0.000000E+00 | 3.043900E−03 | 1.625600E−02 |
| A6 | 8.879400E−04 | −1.248900E−03 | 0.000000E+00 | 3.793300E−04 | −4.298000E−03 |
| A8 | 4.375800E−04 | 1.334400E−05 | 0.000000E+00 | 1.110600E−04 | 7.128200E−04 |
| A10 | −3.534200E−05 | −8.653800E−05 | 0.000000E+00 | 1.964000E−05 | −5.592300E−05 |

Tables 57 and 58 are the phase function coefficients of the diffractive lens structures 1 and 2 and the diffraction orders to be used ($\lambda_0$=408 nm).

TABLE 57

| Name of coefficient | First surface (in) (0 < h ≦ 0.8735) | First surface (mid) (0.8735 < h ≦ 1.443) | First surface (out) (h > 1.443) |
|---|---|---|---|
| d0 | 0.000000E+00 | 0.000000E+00 | 0.000000E+00 |
| d2 | −2.980600E−03 | 1.441000E−04 | 0.000000E+00 |
| d4 | 1.002300E−03 | −5.020100E−04 | 0.000000E+00 |
| d6 | 9.839200E−05 | −8.510200E−05 | 0.000000E+00 |
| d8 | 4.694000E−05 | 9.416300E−07 | 0.000000E+00 |
| d10 | −3.739300E−06 | −5.899100E−06 | 0.000000E+00 |

TABLE 58

|  | HD-DVD | DVD | CD |
|---|---|---|---|
| First surface (in) | 5 | 3 | 2 |
| First surface (mid) | 8 | 5 | 4 |

Hereinafter, the procedure extracting the shapes of the diffractive lens structures will be described.

When the practical shapes of the diffractive lens structures are extracted, first, the respective practical shapes of the diffractive lens structures 1 to 3 are extracted by using the diffractive lens function, the macroscopic aspherical surface shape and the diffraction order to be used. That is, like the above examples, the height from the optical axis, at which the diffractive lens functions become integers, is extracted, and then phase steps having proper direction and depth are formed to generate a given diffractive light at the height on the macroscopic aspherical surface.

Table 59 illustrates the shape data of the diffractive lens structures showing the specific shapes of the diffractive lens structures in Example 6.

TABLE 59

| Step No. | Radius of step [mm] | Width of orbicular zone [mm] | Amount of step [mm] |
|---|---|---|---|
| 1 | 0.3794000 |  | −0.0035240 |
| 2 | 0.5536000 | 0.1742000 | −0.0035240 |
| 3 | 0.7069000 | 0.1533000 | −0.0035240 |
| 4 | 0.8735000 | 0.1666000 | −0.0036360 |
| 5 | 0.9819000 | 0.1084000 | −0.0059920 |
| 6 | 1.1260000 | 0.1441000 | −0.0059920 |
| 7 | 1.2210000 | 0.0950000 | −0.0059920 |
| 8 | 1.2930000 | 0.0720000 | −0.0059920 |
| 9 | 1.3520000 | 0.0590000 | −0.0059920 |
| 10 | 1.4000000 | 0.0480000 | −0.0059920 |
| 11 | 1.4430000 | 0.0430000 | −0.0059920 |

The diffractive lens structure of Example 6 is composed of 11 phase steps, central surfaces divided from the steps, total 10 orbicular zone surfaces from orbicular zone surfaces 2 to 11 and outer circumferential surface (Region 3).

The depths of Phase steps 1 to 4 composing the diffractive lens structure of Example 6 are determined in consideration of the balance between the diffraction efficiencies of HD-DVD and CD, and the central surface and the orbicular zone surfaces 2 to 4 are shaped aspherical as shown in Table 60. That is, the central surface on the optical axis is the aspherical surface shape illustrated in Table 60, and the orbicular zone surfaces 2 to 4 are orbicular zone surfaces, in which the aspherical surfaces illustrated in Table 60 are shifted in the optical axis direction as much as the respective step amount. The orbicular zone surfaces 5 to 11, located outside Phase step 4, and the outer circumferential surface (Region 3) are planes perpendicular to the optical axis.

TABLE 60

| Name of coefficient | Value |
|---|---|
| Radius of curvature | −309.1200000 |
| CC | 0.000000E+00 |
| A4 | 5.385500E−04 |
| A6 | 7.209000E−05 |
| A8 | 1.215800E−05 |
| A10 | 1.076100E−06 |

In addition, the phase step amount of Phase step 4, which is located at the border of the diffractive lens structures 1 and 2 and at the outermost circumference among a plurality of the phase steps composing the diffractive lens structure 1, is set slightly deeper than Phase steps 1 to 3 in order to gather the phases of the wavefronts penetrating the diffractive lens structures 1 and 2 for all of HD-DVD, DVD and CD.

FIG. 166 is a graph showing the cross-section of the diffractive lens structure constituted at the diffractive optical element of Example 6 and the sag amount to the height from the optical axis. $\phi(1)$ in the drawing represents the effective diameter of the diffractive lens structure 1, and $\phi(2)$ represents the effective diameter of the diffractive lens structure 2. The macroscopic aspherical surface shapes of the diffractive lens structures 1 (Region 1) and 2 (Region 2) are recessed surfaces. The orbicular zone shaped surfaces divided by the phase step are wholly aspherical surface shapes in the diffractive lens structure 1 and planes perpendicular to the optical axis in the diffractive lens structure 2. Since the diffraction-orders used in HD-DVD are different for the diffractive lens structures 1 and 2, the phase step amounts are also different accordingly. In addition, Phase step 4 located on the border between the diffractive lens structures 1 and 2 forms a deep phase step in order to fit the phase of the wavefronts penetrating the both diffractive lens structures for all of HD-DVD, DVD and CD.

FIGS. 167 to 169 show the wavefront aberrations of HD-DVD, DVD and CD in the objective lens module using the diffractive optical element of Example 6, and it can be understood that the phases of the wavefronts penetrating the respective diffractive lens structures are gathered in the respective effective diameters for all of HD-DVD, DVD and CD.

FIGS. 170 to 175 are graphs showing the wave-optic spot shapes calculated by using the aberration due to the practical surface shapes of the diffractive lens structure, in which the ordinate represents the optical strength and the abscissa represents the radius. FIGS. 170 to 172 show the whole spot shapes at HD-DVD, DVD and CD respectively, and FIGS. 173 to 175 show the side robe of the spots at HD-DVD, DVD and CD respectively. The light-converging point of HD-DVD has a slightly smaller main spot and a slightly larger side robe than a normal lens. The above fact arises from the apodization effect generated by the fact that the diffraction efficiency of the inner circumferential portion is slightly dropped at the diffractive lens structure 1 (Region 1), however, no troubles occur on recording and reproducing with that degree. In addition, since the intensity of the semiconductor laser used as a light source, in general, decreases from center to periphery, it can be preferable to drop the efficiency at the inner circumferential portion to generate the apodization effect like Example 1. Regarding DVD or CD, the spot shapes at the effective diameters φ(HD-DVD) are calculated in consideration of light outside the respective effective diameters. That is, it is understood that, although the spot shapes are spot shapes converging light with no special numeric aperture control element, the spot shapes almost the same as those of the normal objective lens for DVD or CD can be obtained particularly without performing opening limit.

In addition, when light outside the effective diameters of DVD and CD affects the light-converging, for example, when coma aberration occurs due to disc tilt, the variation of side robe becomes large comparing with the common case, and stable reproducing characteristics cannot be obtained. Therefore, the variation of the spot shape in disc tilt when the lens of the present example is used is calculated and compared with that of common lens.

FIGS. 176 to 179 are graphs showing the calculation result. FIGS. 176 and 177 show the full widths at half maximum variation of the spots for DVD and CD respectively, in which the ordinate represents the full widths at half maximum and the abscissa represents the disc tilt angle. FIGS. 178 and 179 show the side robe intensity variation for DVD and CD respectively, in which the ordinate represents the side robe intensity of the spots and the abscissa represents the disc tilt angle. It can be understood that a reproducing-characteristic as stable as that when conventional DVD and CD objective lens are used can be obtained, in particular, with no control of numeric aperture when the objective lens of the example is used since the diffractive lens structure shows almost the same characteristics as those of the normal lens to any one of DVD and CD.

EXAMPLE 7

Example 7 is a diffractive optical element that can record on and reproduce HD-DVD, the first optical data storage media; DVD, the second optical data storage media; and CD, the third optical data storage media; and combined with a double aspherical lens for HD-DVD. Table 61 illustrates the composition of the lens system and the design conditions for HD-DVD, DVD and CD.

TABLE 61

|  | HD-DVD | DVD | CD |
|---|---|---|---|
| Light source wavelength [nm] | 408 | 660 | 780 |
| Magnification | 0 | 0 | 0 |
| Numeric aperture | 0.65 | 0.65 | 0.50 |
| Effective diameter [mm] | 3.026 | 3.118 | 2.412 |
| Disc thickness [mm] | 0.6 | 0.6 | 1.2 |

As shown in FIG. 180, the diffractive optical element of Example 7 has a diffractive lens structure at one surface, and the other surface is a plane. FIG. 181 is a cross-sectional view of the diffractive optical element of Example 7. The diffractive lens structure is composed of a plurality of diffractive lens structure having different characteristics and disposed concentrically; a diffractive lens structure 1 at the region in the inner circumferential portion; and diffractive lens structure 2 at Region 2 in the central portion. Region 3, the outer circumferential portion, is an aspherical surface, on which the diffractive lens structure is not formed.

Region 1 is the region inside the fourth effective diameter as shown in FIG. 181, Region 2 is an orbicular zone shaped region having the inner diameter at the fourth effective diameter and the outer diameter at the second effective diameter, and Region 3 is an orbicular zone shaped region having the inner diameter at the second effective diameter and the outer diameter at the first effective diameter. The diffractive lens-structures 1 and 2 employ the combinations of the diffraction order like columns structures 1 and 2 in Table 62 (equal to Table 54).

TABLE 62

| | | | | | | Structure 1 | | | | Structure 2 | | |
|---|---|---|---|---|---|---|---|---|---|---|---|---|
| HD-DVD | Diffraction order | 1 | 2 | 3 | 4 | 5 | 5 | 6 | 7 | 8 | 9 | 10 |
| | Diffraction efficiency | 1 | 1 | 1 | 1 | 1 | 1 | 1 | 1 | 1 | 1 | 1 |
| DVD | Diffraction order | 1 | 1 | 2 | 2 | 3 | 3 | 4 | 4 | 5 | 5 | 6 |
| | Amount of aberration correction [λ] | +0.4 | -0.2 | +0.2 | -0.4 | 0 | 0 | +0.4 | -0.2 | +0.2 | -0.4 | 0 |
| | Diffraction efficiency | 0.573 | 0.875 | 0.875 | 0.573 | 1 | 1 | 0.4 | 0.875 | 0.875 | 0.573 | 1 |
| CD | Diffraction order | 1 | 1 | 2 | 2 | 2 | 3 | 3 | 3 | 4 | 4 | 5 |
| | Amount of aberration correction [λ] | +0.5 | 0 | +0.5 | 0 | -0.5 | +0.5 | 0 | -0.5 | 0 | -0.5 | 0 |
| | Diffraction efficiency | 0.405 | 1 | 0.405 | 1 | 0.405 | 0.405 | 1 | 0.405 | 1 | 0.405 | 1 |

Since the diffractive lens structure 1 of Example 7 does not correct the aberrations of HD-DVD and DVD light source, but corrects the aberration of CD light sources, the diffractive lens structure 1 uses fifth-order light for HD-DVD, third-order light for DVD and second-order light for CD, and is designed to correct aberration for CD.

Since the diffractive lens structure 2 of Example 7 does not correct the aberration of HD-DVD and CD light sources, but corrects the aberrations of DVD light source only, the diffractive lens structure 2 uses eighth-order light for HD-DVD, fifth-order light for DVD and fourth-order light for CD, and is designed to correct aberration for DVD.

Region 3 of the outermost circumference is an aspherical surface shape, the aberration of which is corrected not to generate the aberration at DVD having the largest effective diameter, and the diffractive lens structure is not formed at Region 3. In Region 3, the aberration remains with respect to HD-DVD and CD light sources, thereby light is scattered as flare and does not contribute to reproducing.

Since the image surface position of CD in designing the diffractive lens structure 1 is set in the same way as Example 1, is possible to set the size of the fourth effective diameter, the effective diameter of the diffractive lens structure 1, smaller than the third-order effective diameter corresponding to the effective diameter of CD in the diffractive optical element. The aberration generated at the region is suppressed a sufficiently small value in DVD by setting the effective diameter of the diffractive lens structure 1 small as described above, even when the diffractive lens structure does not correct the aberration with respect to DVD light source.

Table 63 illustrates paraxial data, that is, the specific design results of Example 6.

TABLE 63

| Surface No. | Radius of curvature | Central thickness | | | Refractive index | | |
|---|---|---|---|---|---|---|---|
| | | HD-DVD | DVD | CD | HD-DVD | DVD | CD |
| 1 | Diffractive lens structure | 1.0000000 | ← | ← | 1.5447820 | 1.5228720 | 1.5197300 |
| 2 | ∞ | 0.3000000 | ← | ← | 1.0000000 | ← | ← |
| 3 | 1.4766000 | 1.6000000 | ← | ← | 1.5447820 | 1.5228720 | 1.5197300 |
| 4 | −5.2170000 | 1.0546120 | 1.1265990 | 0.7885430 | 1.0000000 | ← | ← |
| 5 | ∞ | 0.6000000 | ← | 1.2000000 | 1.6180700 | 1.5228720 | 1.5197300 |
| 6 | ∞ | 0.0000000 | ← | ← | 1.0000000 | ← | ← |

Table 64 illustrates aspherical surface coefficients representing the macroscopic aspherical surface shape of the diffractive lens structures 1 and 2, the aspherical surface shape of Region 3 and the aspherical surface shape of the objective lens in Example 7.

TABLE 64

| | Diffractive lens structure | | | Objective lens | |
|---|---|---|---|---|---|
| Name of coefficient | First surface (in) ($0 < h \leq 0.8735$) | First surface (mid) ($0.8735 < h \leq 1.513$) | First surface (out) ($h > 1.513$) | Third surface | Fourth surface |
| Radius of curvature | −18.2770000 | 236.2900000 | −3927.8000000 | 1.4766000 | −5.2170000 |
| CC | 0.000000E+00 | 0.000000E+00 | 0.000000E+00 | −5.620100E−01 | −4.139700E+01 |
| A4 | 9.231700E−03 | −7.372300E−03 | 3.911700E−04 | 3.043900E−03 | 1.625600E−02 |
| A6 | 8.879400E−04 | −1.248900E−04 | 6.988400E−05 | 3.793300E−04 | −4.298000E−03 |
| A8 | 4.375800E−04 | 1.334400E−05 | −2.628900E−06 | 1.110600E−04 | 7.128200E−04 |
| A10 | −3.534200E−05 | −8.653800E−05 | 5.000000E−06 | 1.964000E−05 | −5.592300E−05 |

Tables 65 and 66 are the phase function coefficients of the diffractive lens structures 1 and 2 and the diffraction orders to be used ($\lambda_0=408$ nm).

TABLE 65

| Name of coefficient | First surface (in) ($0 < h \leq 0.8735$) | First surface (mid) ($0.8735 < h \leq 1.513$) | First surface (out) ($h > 1.513$) |
|---|---|---|---|
| d0 | 0.000000E+00 | 0.000000E+00 | 0.000000E+00 |
| d2 | −2.980600E−03 | 1.441000E−04 | 0.000000E+00 |
| d4 | 1.002300E−03 | −5.020100E−04 | 0.000000E+00 |
| d6 | 9.839200E−05 | −8.510200E−05 | 0.000000E+00 |
| d8 | 4.694000E−05 | 9.416300E−07 | 0.000000E+00 |
| d10 | −3.739300E−06 | −5.899100E−06 | 0.000000E+00 |

TABLE 66

|  | HD-DVD | DVD | CD |
| --- | --- | --- | --- |
| The first surface (in) | 5 | 3 | 2 |
| The first surface (mid) | 8 | 5 | 4 |

Hereinafter, the procedure extracting the shapes of the diffractive lens structure will be described.

The shapes of the diffractive lens structures 1 and 2 are extracted by using the macroscopic aspherical surface shape, the phase function coefficient, and the diffraction order to be used. The diffractive lens structure 1 has the same shape as that of Example 6 since the diffractive lens structure 1 has the same design value or effective diameter as those of Example 6. The shape of the diffractive lens structure 2 is slightly different from the shape of Example 6 since the diffractive lens structure 2 has a different effective diameter from that of Example 6 and can gather the phase with Region 3, even though the diffractive lens structure 2 has the same design value as that of Example 6.

Table 67 illustrates data of the shapes of the diffractive structure showing the specific shapes of the diffractive structure in Example 7.

TABLE 67

| Step No. | Step radius [mm] | Orbicular zone width [mm] | Step amount [mm] |
| --- | --- | --- | --- |
| 1 | 0.3794000 |  | −0.0035240 |
| 2 | 0.5536000 | 0.1742000 | −0.0035240 |
| 3 | 0.7069000 | 0.1533000 | −0.0035240 |
| 4 | 0.8735000 | 0.1666000 | −0.0036360 |
| 5 | 0.9819000 | 0.1084000 | −0.0059920 |
| 6 | 1.1260000 | 0.1441000 | −0.0059920 |
| 7 | 1.2210000 | 0.0950000 | −0.0059920 |
| 8 | 1.2930000 | 0.0720000 | −0.0059920 |
| 9 | 1.3520000 | 0.0590000 | −0.0059920 |
| 10 | 1.4000000 | 0.0480000 | −0.0059920 |
| 11 | 1.4430000 | 0.0430000 | −0.0059920 |
| 12 | 1.4800000 | 0.0370000 | −0.0059920 |
| 13 | 1.5130000 | 0.0330000 | −0.0011240 |

The diffractive lens structure of Example 7 is composed of 13 phase steps, central surfaces divided from the steps, total 12 orbicular zone surfaces from orbicular zone surfaces 2 to 13 and outer circumferential surface (Region 3).

The depths of Phase steps 1 to 4 composing the diffractive lens structure of Example 7 are determined in consideration of the balance between the diffraction efficiencies of HD-DVD and CD, and the central surface and the orbicular zone surfaces 2 to 4 are shaped aspherical as shown in Table 68.

TABLE 68

| Name of coefficient | Value |
| --- | --- |
| Radius of curvature | −309.1200000 |
| CC | 0.000000E+00 |
| A4 | 5.385500E−04 |
| A6 | 7.209000E−05 |
| A8 | 1.215800E−05 |
| A10 | 1.076100E−06 |

That is, the central surface on the optical axis is the aspherical surface illustrated in Table 68, and the orbicular zone surfaces 2 to 4 are orbicular zone surfaces, in which the aspherical surfaces illustrated in Table 68 are shifted in the optical axis direction as much as the respective step amount. The orbicular zone surfaces 5 to 11, located outside Phase step 4, are planes perpendicular to the optical axis. The outer circumferential portion, Region 3, is the aspherical surface shape illustrated in Table 69, which is shifted in the optical axis direction to make Phase step 13 a given amount.

TABLE 69

| Name of coefficient | Value |
| --- | --- |
| Radius of curvature | −3927.8000000 |
| CC | 0.000000E+00 |
| A4 | 3.911700E−04 |
| A6 | 6.988400E−05 |
| A8 | −2.628900E−06 |
| A10 | 5.000000E−06 |

The phase step amount of Phase step 4, which is located at the border of the diffractive lens structures 1 and 2 and at the outermost circumference among a plurality of the phase steps composing the diffractive lens structure 1, is set slightly deeper than Phase steps 1 to 3 in order to gather the phases of the wavefronts penetrating the diffractive lens structures 1 and 2 for all of HD-DVD, DVD and CD.

In addition, the phase step amount of Phase step 13, which is located at the border of the diffractive lens structures 2 and 3 and at the outermost circumference among a plurality of the phase steps composing the diffractive lens structure 2, is adjusted to make the phase of the wavefront having penetrated the outer circumferential surface gather the phase of the wavefront having penetrated the diffractive lens structures 1 and 2 for DVD, thereby the step amount is set different from Steps 5 to 12.

FIG. 182 is a graph showing the cross-sectional view of the diffractive lens structure composing the diffractive optical element of Example 7 and the sag amount to the height from the optical axis. φ(1) in the drawing represents the effective diameter of the diffractive lens structure 1, and φ(2) represents the effective diameter of the diffractive lens structure 2. The macroscopic aspherical surface shapes of the diffractive lens structures 1 (Region 1) and 2 (Region 2) are recessed surfaces. The orbicular zone shaped surfaces divided by the phase step are aspherical surface shapes in the diffractive lens structure 1 and planes perpendicular to the optical axis in the diffractive lens structure 2. The outer circumferential surface is shaped aspherical. Since the diffraction-orders used in HD-DVD are different for the diffractive lens structures 1 and 2, the phase step amounts are also different accordingly. In addition, Phase step 4 located on the border between the diffractive lens structures 1 and 2 forms a deep phase step in order to fit the phases of the wavefronts penetrating the both diffractive lens structures for all of HD-DVD, DVD and CD.

FIGS. 183 to 185 show the wavefront aberrations of HD-DVD, DVD and CD in the objective lens module using the diffractive optical element of Example 7, and it can be understood that the phases of the wavefronts penetrating the respective diffractive lens structures are gathered in the respective effective diameters for all of HD-DVD, DVD and CD.

FIGS. 186 to 191 are graphs showing the wave-optic spot shapes calculated by using the aberration due to the practical surface shapes of the diffractive lens structure, in which the ordinate represents the optical strength and the abscissa represents the radius. FIGS. 186 to 188 show the whole spot shapes at HD-DVD, DVD and CD respectively, and FIGS. 189 to 191 show the side robe of the spots at HD-DVD, DVD and CD respectively. The light-converging point of HD-DVD has a slightly smaller main spot and a slightly larger side robe than those of a normal lens. The above fact is due to the apodization effect generated by the diffraction efficiency of the inner circumferential portion slightly dropping at the diffractive lens structure 1 (Region 1), however, no troubles occur on recording and reproducing with that degree. In addition, since the intensity of the semiconductor laser used as a light source decreases from center to periphery in general, it can be preferable to drop the efficiency at the inner circumferential portion to generate the apodization effect like Example 1. Regarding HD-DVD or CD, the spot shapes at the effective diameters ϕ(DVD) are calculated in consideration of light outside the respective effective diameters. That is, it is understood that, although the spot shapes are spot shapes converging light with no special numeric aperture control element, the spot shapes can become almost the same as those of the normal objective lens for HD-DVD or CD with no numeric aperture limit.

In addition, when light outside the effective diameters of HD-DVD and CD affects the light-converging, for example, when coma aberration occurs due to disc tilt, the variation of side robe becomes large comparing with the common case, and stable reproducing characteristics cannot be obtained. Therefore, the variation of the spot shape in disc tilt when the lens of the present example is used is calculated and compared with that of common lens.

FIGS. 192 to 195 are graphs showing the calculation result. FIGS. 192 and 193 show the full widths at half maximum variation of the spots for HD-DVD and CD respectively, in which the ordinate represents the full width at half maximum and the abscissa represents the disc tilt angle. FIGS. 194 and 195 show the side robe intensity variation for HD-DVD and CD respectively, in which the ordinate represents the side robe intensity of the spots and the abscissa represents the disc tilt angle. It can be understood that a reproducing-characteristic as stable as that when conventional HD-DVD and CD objective lens are used can be obtained with no control of numeric aperture when the objective lens of the example is used since the diffractive lens structure shows almost the same characteristics as those of the normal lens to any one of HD-DVD and CD.

EXAMPLE 8

Example 8 is an objective lens that can record on and reproduce HD-DVD, the first optical data storage media; DVD, the second optical data storage media; and CD, the third optical data storage media; and a modified example of Example 7. As shown in FIG. 196, the diffractive optical element of Example 8 has a diffractive lens structure at the first surface of the objective lens, and the other surface is aspherical. Table 70 illustrates the composition of the lens system and design conditions for HD-DVD, DVD, and CD. Meanwhile, since the diffractive lens structure of Example 8 is integrated with the objective lens, contrary to Example 7 having the diffractive lens structure slightly away from the objective lens, the effective diameters of HD-DVD, DVD, and CD are slightly large.

TABLE 70

|  | HD-DVD | DVD | CD |
|---|---|---|---|
| Light source wavelength [nm] | 408 | 660 | 780 |
| Magnification | 0 | 0 | 0 |
| Numeric aperture | 0.65 | 0.65 | 0.50 |
| Effective diameter [mm] | 3.040 | 3.140 | 2.440 |
| Disc thickness [mm] | 0.6 | 0.6 | 1.2 |

FIG. 197 is a cross-sectional view of the objective lens of Example 8.

Table 72 illustrates paraxial data of the specific design result of Example 8.

TABLE 72

| Surface No. | Radius of curvature | Central thickness | | | Refractive index | | |
|---|---|---|---|---|---|---|---|
| | | HD-DVD | DVD | CD | HD-DVD | DVD | CD |
| 1 | Diffractive lens structure | 1.6000000 | ← | ← | 1.5447820 | 1.5228720 | 1.5197300 |
| 2 | −5.2170000 | 1.0546330 | 1.1271510 | 0.7889430 | 1.0000000 | ← | ← |
| 3 | ∞ | 0.6000000 | ← | 1.2000000 | 1.6180700 | 1.5228720 | 1.5197300 |
| 4 | ∞ | 0.0000000 | ← | ← | 1.0000000 | ← | ← |

Table 73 illustrates the aspherical surface coefficients of the specific design result or the offset of the orbicular zone surfaces and the outer circumferential surface of Example 8.

TABLE 73

| | The first surface | | | | |
|---|---|---|---|---|---|
| Name of coefficient | Central surface | Orbicular zone surface 2 | Orbicular zone surface 3 | Orbicular zone surface 4 | Orbicular zone surface 5 |
| Offset | 0.0000000 | −0.0035240 | −0.0070480 | −0.0105720 | −0.0150920 |
| Radius of curvature | 1.4837000 | 1.4849000 | 1.4862000 | 1.4874000 | 1.4819000 |
| CC | −5.418000E−01 | −5.460700E−01 | −5.400600E−01 | −5.443000E−01 | −5.641900E−01 |
| A4 | 2.944700E−03 | 3.052700E−03 | 2.883300E−03 | 2.989700E−03 | 3.078700E−03 |
| A6 | 3.214200E−04 | 4.220000E−04 | 2.830400E−04 | 3.830300E−04 | 4.265300E−04 |
| A8 | 1.274400E−04 | 9.330000E−05 | 1.372400E−04 | 1.032200E−04 | 9.160200E−05 |
| A10 | 1.520300E−05 | 2.551200E−05 | 1.133100E−05 | 2.158900E−05 | 2.434800E−05 |
| | The first surface | | | | |
| Name of coefficient | Orbicular zone surface 6 | Orbicular zone surface 7 | Orbicular zone surface 8 | Orbicular zone surface 9 | Orbicular zone surface 10 |
| Offset | −0.0210840 | −0.0270760 | −0.0330680 | −0.0390600 | −0.0450520 |
| Radius of curvature | 1.4840000 | 1.4861000 | 1.4883000 | 1.4904000 | 1.4925000 |

TABLE 73-continued

| | | | | | |
|---|---|---|---|---|---|
| CC | −5.658700E−01 | −5.676900E−01 | −5.556600E−01 | −5.570600E−01 | −5.585700E−01 |
| A4 | 3.118200E−03 | 3.162500E−03 | 2.795400E−03 | 2.825000E−03 | 2.858300E−03 |
| A6 | 4.584400E−04 | 4.912500E−04 | 2.618200E−04 | 2.919200E−04 | 3.227300E−04 |
| A8 | 8.056000E−05 | 6.958600E−05 | 1.336200E−04 | 1.225000E−04 | 1.114300E−04 |
| A10 | 2.747600E−05 | 3.065100E−05 | 8.431500E−06 | 1.147000E−05 | 1.454500E−05 |

| | The first surface | | | | |
|---|---|---|---|---|---|
| Name of coefficient | Orbicular zone surface 11 | Orbicular zone surface 12 | Orbicular zone surface 13 | Outer circumferential surface | The second surface |
| Offset | −0.0510440 | −0.0570360 | −0.0630280 | −0.0707890 | |
| Radius of curvature | 1.4946000 | 1.4967000 | 1.4988000 | 1.5017000 | −5.2170000 |
| CC | −5.601900E−01 | −5.619400E−01 | −5.638200E−01 | −5.450700E−01 | −4.139700E+01 |
| A4 | 2.895400E−03 | 2.936900E−03 | 2.982800E−03 | 2.658200E−03 | 1.625600E−03 |
| A6 | 3.540000E−04 | 3.860000E−04 | 4.186200E−04 | 3.527300E−04 | −4.298000E−03 |
| A8 | 1.005300E−04 | 8.972700E−05 | 7.907500E−05 | 7.554200E−05 | 7.128200E−04 |
| A10 | 1.763000E−05 | 2.075100E−05 | 2.388900E−05 | 2.076700E−05 | −5.592300E−05 |

A point intersecting the optical axis when the orbicular zone surfaces 2 to 13 composing the diffractive lens structure at the first surface and the outer circumferential surface are extended on the optical axis is offset as much as the amount illustrated in Table 73 from a point, at which the first surface intersects the optical axis. That is, the offset amounts of the orbicular zone surfaces 2 to 13 are o2 to o13 shown in FIG. 197, and the offset amount of the outer circumferential surface is o14. The offset amount is extracted by measuring the position, at which the extended surfaces of the orbicular zone surfaces and the outer circumferential surface intersect the optical axis on the basis of a point of the surface, on which the diffractive lens structures are formed, on the optical axis. In this case, the optical axis direction becomes the positive direction.

Table 74 illustrate data representing step radii, that is, the heights from the optical axis of the phase steps composing the diffractive lens structure, orbicular zone width and step amount. The step radii are h1 to h13 shown in FIG. 197, and the orbicular zone widths are w2 to w13 shown in FIG. 197. In addition, the step amounts are measured from the inner circumferential surface to the outer circumferential surface of the step amount, and the optical axis direction becomes the positive direction.

TABLE 74

| Step No. | Step radius [mm] | Orbicular zone width [mm] | Step amount [mm] |
|---|---|---|---|
| 1 | 0.3794000 | | −0.0035650 |
| 2 | 0.5536000 | 0.1742000 | −0.0036150 |
| 3 | 0.7069000 | 0.1533000 | −0.0036790 |
| 4 | 0.8735000 | 0.1666000 | −0.0038960 |
| 5 | 0.9819000 | 0.1084000 | −0.0065460 |
| 6 | 1.1260000 | 0.1441000 | −0.0067660 |
| 7 | 1.2210000 | 0.0950000 | −0.0069450 |
| 8 | 1.2930000 | 0.0720000 | −0.0071040 |
| 9 | 1.3520000 | 0.0590000 | −0.0072510 |
| 10 | 1.4000000 | 0.0480000 | −0.0073830 |
| 11 | 1.4430000 | 0.0430000 | −0.0075120 |
| 12 | 1.4800000 | 0.0370000 | −0.0076320 |
| 13 | 1.5200000 | 0.0400000 | −0.0062680 |

The diffractive lens structure of Example 8 is composed of 13 phase steps, central surfaces divided from the steps, total 12 orbicular zone surfaces from orbicular zone surfaces 2 to 13 and outer circumferential surface (Region 3). Basically, the height (step radius) of the phase step from the optical axis is the same as that of Example 7. However, among the plurality of phase steps, Phase step 13, which is located at the outermost circumference and determines the effective diameter of HD-DVD, is moved slightly to the outer circumference in order to respond the numeric aperture variation accompanying the position movement of the diffractive lens structure. Furthermore, different from Examples 1 to 7, physical step amount required to generate the same optical path difference varies with the height from the optical axis since the refractive angle of light varies considerably at the inner and outer circumferential portions when the steps are formed directly at the objective lens.

FIGS. 198 to 200 show the wavefront aberrations of HD-DVD, DVD and CD in the objective lens module using the diffractive optical element of Example 7, and it can be understood that the phases of the wavefronts penetrating the respective diffractive lens structures are gathered in the respective effective diameters for all of HD-DVD, DVD and CD.

FIGS. 201 to 206 are graphs showing the wave-optic spot shapes calculated by using the aberration due to the practical surface shapes of the diffractive lens structure, in which the ordinate represents the optical strength and the abscissa represents the radius. FIGS. 201 to 203 show the whole spot shapes at HD-DVD, DVD and CD respectively, and FIGS. 204 to 206 show the side robe of the spots at HD-DVD, DVD and CD respectively. The light-converging point of HD-DVD has a slightly smaller main spot and a slightly larger side robe than those of a normal lens. The above fact is due to the apodization effect generated by the diffraction efficiency of the inner circumferential portion slightly dropping at the diffractive lens structure 1 (Region 1), however, no troubles occur on recording and reproducing with that degree. In addition, since the intensity of the semiconductor laser used as a light source decreases from center to periphery in general, it can be preferable to drop the efficiency at the inner circumferential portion to generate the apodization effect like Example 1. Regarding HD-DVD or CD, the spot shapes at the effective diameters φ(DVD) are calculated in consideration of light outside the respective effective diameters. That is, it is understood that, although the spot shapes are spot shapes converging light with no special numeric aperture control element, the spot shapes can become almost the same as those of the normal objective lens for HD-DVD or CD with no numeric aperture limit.

In addition, when light outside the effective diameters of HD-DVD and CD affects the light-converging, for example, when coma aberration occurs due to disc tilt, the variation of side robe becomes large comparing with the common case, and stable reproducing characteristics cannot be obtained. Therefore, the variation of the spot shape in disc tilt when the lens of the present example is used is calculated and compared with that of common lens.

FIGS. 207 to 210 are graphs showing the calculation result. FIGS. 207 and 208 show the full widths at half maximum variation of the spots for HD-DVD and CD respectively, in which the ordinate represents the full width at half maximum and the abscissa represents the disc tilt angle. FIGS. 209 and 210 show the side robe intensity variation for HD-DVD and CD respectively, in which the ordinate represents the side robe intensity of the spots and the abscissa represents the disc tilt angle. It can be understood that a reproducing-characteristic as stable as that when conventional HD-DVD and CD objective lens are used can be obtained with no control of numeric aperture when the objective lens of the example is used since the diffractive lens structure shows almost the same characteristics as those of the normal lens to any one of HD-DVD and CD.

What is claimed is:

1. An objective lens module comprising:
a light-converging lens that is coaxially disposed with respect to an optical axis of first laser light having a first wavelength; and
a transmission-type diffractive optical element that is coaxially disposed to cause diffracted light of first laser light to be incident on the light-converging lens,
wherein the diffractive optical element has:
an incident surface and an emergent surface; and
first, second, and third regions that are provided on at least one of the incident surface and the emergent surface in the vicinity of the optical axis, and are sequentially defined according to different radius distances from the optical axis to have different diffraction gratings of different diffraction angles, respectively, and
the first region diffracts odd-order diffracted light of first laser light to the light-converging lens, the second region diffracts even-order diffracted light of first laser light to the light-converging lens, and the third region diffracts even-order or zero-order diffracted light of first laser light to the light-converging lens, such that the light-converging lens converges diffracted light from the first, second, and third regions with a predetermined numerical aperture.

2. The objective lens module according to claim 1,
wherein, when second laser light having a second wavelength longer than the first wavelength and third laser light having a third wavelength longer than the second wavelength are incident on the first, second, and third regions along the optical path, the first region diffracts diffracted light of first and second laser light of a diffraction order lower than odd-order or even-order diffracted light of first laser light to the light-converging lens, such that the light-converging lens converges diffracted light from the first region with a second numerical aperture smaller than the predetermined numerical aperture.

3. The objective lens module according to claim 2,
wherein, even when second laser light and third laser light are incident on the first, second, and third regions along the optical path, the second region diffracts only specified diffracted light of second laser light of a diffraction order lower than odd-order or even-order of diffracted light of first laser light to the light-converging lens, such that the light-converging lens converges diffracted light from the second region with a third numerical aperture having a value between the predetermined numerical aperture and the second numerical aperture.

4. The objective lens module according to claim 1,
wherein the first, second, and third regions have a plurality of phase steps which cause diffracted light of a diffraction order to be generated so as to satisfy one of the following combinations:

a combination of the following equations of $F_1 \geq F_2 \geq F_3$, $F_2 = \text{ROUND}\ [\lambda_1/(N_1-1)\times(N_2-1)/\lambda_2 \times F_1] = \text{CEIL}\ [\lambda_1/(N_1-1)\times(N_2-1)/\lambda_2 \times F_1]$, and $F_3 = \text{CEIL}\ [\lambda_1/(N_1-1)\times(N_3-1)/\lambda_3 \times F_1]$, a combination of the following equations of $F_1 \geq F_2 \geq F_3$, $F_2 = \text{ROUND}\ [\lambda_1/(N_1-1)\times(N_2-1)/\lambda_2 \times F_1] = \text{FLOOR}\ [\lambda_1/(N_1-1)\times(N_2-1)/\lambda_2 \times F_1]$, and $F_3 = \text{FLOOR}\ [\lambda_1/(N_1-1)\times(N_3-1)/\lambda_3 \times F_1]$, and a combination of the following equations of $F_1 \geq F_2 \geq F_3$, $F_2 = \text{ROUND}\ [\lambda_1/(N_1-1)\times(N_2-1)/\lambda_2 \times F_1]$, and $F_3 = \text{ROUND}\ [\lambda_1/(N_1-1)\times(N_3-1)/\lambda_3 \times F_1]$, (where $\lambda_1$ is the first wavelength, $\lambda_2$ is the second wavelength, $\lambda_3$ is the third wavelength, $N_1$ is a refractive index of a material used for the diffractive optical element with respect to the first wavelength, $N_2$ is a refractive index of a material used for the diffractive optical element with respect to the second wavelength, $N_3$ is a refractive index of a material used for the diffractive optical element with respect to the third wavelength, $F_1$ is a diffraction order of diffracted light of first laser light, $F_2$ is a diffraction order of diffracted light of second laser light, $F_3$ is a diffraction order of diffracted light of third laser light, ROUND [ ] is a function for rounding-off the value in [ ] with no digits after a decimal point so as to obtain an integer number, CEIL [ ] is a function for rounding-up the value in [ ] with no digits after a decimal point so as to obtain an integer number, and FLOOR [ ] is a function for rounding-down the value in [ ] with no digits after a decimal point so as to obtain an integer number), and the first region is formed such that diffracted light to be generated when first laser light passes through the first region has an odd diffraction order.

5. The objective lens module according to claim 4,
wherein the first region is formed such that, from diffracted light to be generated when first laser light passes through the first region, diffracted light having the maximum diffraction efficiency has an odd diffraction order, excluding a multiple of five.

6. The objective lens module according to claim 5,
wherein the second region is formed such that, from diffracted light to be generated when first laser light passes through the second region, diffracted light having the maximum diffraction efficiency has an even diffraction order, excluding a multiple of ten.

7. The objective lens module according to claim 1, wherein a radius distance of the diffractive optical element, in which a spherical aberration wavefront curved at an image surface position of third laser light passing through the first region and the second region is the maximum, is set to exist in the second region.

8. The objective lens module according to claim 1, wherein the diffractive optical element is provided integrally with the light-converging lens.

9. The objective lens module according to claim 1, further comprising:
a diffractive lens structure for chromatic aberration correction that is provided on the incident or emergent surface of the diffractive optical element so as to correct a chromatic aberration due to a wavelength change of first laser light by a small amount.

10. An optical pickup comprising:
the objective lens module according to any one of claims 1 to 9.

11. An optical information recording and reproducing apparatus comprising:
the optical pickup according to claim 10.

12. A diffractive optical element which is provided on an optical path common to first laser light and plural laser light in order to cause an objective lens for converging first laser light on a first recording medium to be shared for plural laser light having wavelengths different from that of first laser light and a plurality of recording mediums corresponding to plural laser light, plural laser light having second laser light corresponding to a second recording medium and third laser light corresponding to a third recording medium, the diffractive optical element comprising:
a first diffractive lens structure that is provided in the vicinity of an optical axis so as to correct an aberration to be generated on the basis of the difference in wavelength between first laser light and second and third laser light; and
a second diffractive lens structure that is provided in the vicinity of the first diffractive lens structure so as to correct an aberration to be generated on the basis of the difference in wavelength between first laser light and second laser light.

13. The diffractive optical element according to claim 12, wherein, when first, second, and third laser light are incident on the objective lens, diameters of diffraction surfaces in an incident or emergent surface of the diffractive optical element corresponding to effective diameters of first, second, and third laser light required for recording and reproducing the first, second, and third recording mediums, respectively, are a first diffraction effective diameter, a second diffraction effective diameter smaller than the first diffraction effective diameter, and a third diffraction effective diameter smaller than the second diffraction effective diameter, respectively.

14. The diffractive optical element according to claim 12, wherein, when first, second, and third laser light are incident on the objective lens, diameters of diffraction surfaces in an incident or emergent surface of the diffractive optical element corresponding to effective diameters of first, second, and third laser light required for recording and reproducing the first, second, and third recording mediums, respectively, are a first diffraction effective diameter, a second diffraction effective diameter equal to or larger than the first diffraction effective diameter, and a third diffraction effective diameter smaller than the first diffraction effective diameter, respectively.

15. The diffractive optical element according to claim 12, wherein the first diffractive lens structure is formed in a fourth diffraction effective diameter still smaller than the third diffraction effective diameter in an incident or emergent surface of the diffractive optical element, the second diffractive lens structure is formed in the second diffraction effective diameter in the incident or emergent surface of the diffractive optical element, and, in the fourth diffraction effective diameter, an image surface position is set such that a longitudinal spherical aberration by third laser light is zero.

16. The diffractive optical element according to claim 15, wherein the second diffractive lens structure is formed in a fifth diffraction effective diameter still smaller than the second diffraction effective diameter and larger than the third diffraction effective diameter in the incident or emergent surface of the diffractive optical element, and, in the fifth diffraction effective diameter, an image surface position is set such that a longitudinal spherical aberration by second laser light is zero.

17. The diffractive optical element according to claim 15, wherein a light-converging position at which third laser light passing through a region in the fourth diffraction effective diameter converges on the third recording medium in the incident or emergent surface of the diffractive optical element is disposed between a position at which corresponding laser light passing through a height from the optical axis closest to the optical axis outside the fourth diffraction effective diameter of the diffractive optical element intersects the optical axis and a position at which corresponding laser light passing through a height from the optical axis corresponding to the third diffraction effective diameter of the diffractive optical element required for the third recording medium intersects the optical axis.

18. The diffractive optical element according to claim 15, wherein the first diffractive lens structure is formed in a circle having the fourth diffraction effective diameter as an outer diameter, and the second diffractive lens structure is formed in a circle having the second diffraction effective diameter as an outer diameter in the incident surface or the emergent surface.

19. The diffractive optical element according to claim 18, wherein the second diffractive lens structure is formed in an orbicular zone shape having the fourth diffraction effective diameter as an inner diameter.

20. The diffractive optical element according to claim 12, wherein the first recording medium has a recording layer for receiving light through a first transmissive protection layer having a first thickness, the second recording medium has a recording layer for receiving light through a second transmissive protection layer having a second thickness equal to or larger than the first thickness, and the third recording medium has a recording layer for receiving light through a third transmissive protection layer having a third thickness larger than the second thickness.

21. The diffractive optical element according to claim 20, wherein the first diffractive lens structure corrects an aberration to be generated on the basis of the difference in thickness between the first transmissive protection layer and the second and third transmissive protection layers, in addition to the difference in wavelength between first laser light and second and third laser light, and the second diffractive lens structure corrects an aberration to be generated on the basis of the difference in thickness between the first transmissive protection layer and the second transmissive protection layer, in addition to the difference in wavelength between first laser light and second laser light.

22. The diffractive optical element according to claim 12, wherein the first diffractive lens structure and the second diffractive lens structure are formed on one of an incident surface and an emergent surface together.

23. The diffractive optical element according to claim 22, wherein the first diffractive lens structure and the second diffractive lens structure are built in different regions of the incident or emergent surface so as to have concentric circle shapes and orbicular zone shapes.

24. The diffractive optical element according to claim 12, wherein the first and second diffractive lens structures are diffractive lens structures, each having a plurality of concentric phase steps.

25. The diffractive optical element according to claim 12, wherein a difference in optical path length caused by each of phase steps constituting the first diffractive lens structure and a difference in optical path length caused by each of phase steps constituting the second diffractive lens structure are different from each other at the same wavelength.

26. The diffractive optical element according to claim 12, wherein, from phase steps constituting the first diffractive lens structure, a difference in optical path length caused by an outermost phase step and a difference in optical path length caused by each of other phase steps are different from each other at the same wavelength.

27. The diffractive optical element according to claim 12, wherein, from phase steps constituting the second diffractive lens structure, a difference in optical path length caused by an outermost phase step and a difference in optical path length caused by each of other phase steps are different from each other at the same wavelength.

28. The diffractive optical element according to claim 12, wherein all phase steps constituting the first diffractive lens structure and some of phase steps constituting the second diffractive lens structure are mixed in a region within the third diffraction effective diameter in an incident or an emergent surface of the diffractive optical element.

29. The diffractive optical element according to claim 12, wherein at least one phase step having a depth corresponding to the sum of a step amount of each of phase steps constituting the first diffractive lens structure and a step amount of each of phase steps constituting the second diffractive lens structure exists in a region within the third diffraction effective diameter in an incident or an emergent surface of the diffractive optical element.

30. The diffractive optical element according to claim 12, wherein a direction of each of phase steps constituting the first diffractive lens structure and a direction of each of phase steps of constituting the second diffractive lens structure are the same.

31. The diffractive optical element according to claim 30, wherein at least one phase step having a depth corresponding to the sum of a step amount of each of phase steps constituting the first diffractive lens structure, a step amount of each of phase steps constituting the second diffractive lens structure, and a step amount of each of phase steps constituting the third diffractive lens structure exists within the third diffraction effective diameter of the diffractive optical element.

32. The diffractive optical element according to claim 12, wherein the first diffractive lens structure is formed such that, from diffracted light to be generated when first laser light passes through the first diffractive lens structure, diffracted light having the maximum diffraction efficiency has an odd diffraction order.

33. The diffractive optical element according to claim 32, wherein the first diffractive lens structure is formed such that, from diffracted light to be generated when first laser light passes through the first diffractive lens structure, diffracted light having the maximum diffraction efficiency has an odd diffraction order, excluding a multiple of five.

34. The diffractive optical element according to claim 12, wherein the second diffractive lens structure is formed such that, from diffracted light to be generated when first laser light passes through the second diffractive lens structure, diffracted light having the maximum diffraction efficiency has an even diffraction order, excluding a multiple of ten.

35. The diffractive optical element according to claim 12, wherein, when, from diffracted light to be generated when first laser light having a wavelength $\lambda_1$ passes through the diffractive lens structure, diffracted light having the maximum diffraction efficiency has a diffraction order of $F_1$, the diffractive lens structure causes diffracted light of a diffraction order which satisfies one of the following combinations:

a combination of the following equations of $F_1 \geq F_2 \geq F_3$, $F_2 = \text{ROUND } [\lambda_1/(N_1-1)\times(N_2-1)/\lambda_2 \times F_1] = \text{CEIL } [\lambda_1/(N_1-1)\times(N_2-1)/\lambda_2 \times F_1]$, and $F_3 = \text{CEIL } [\lambda_1/(N_1-1)\times(N_3-1)/\lambda_3 \times F_1]$, a combination of the following equations of $F_1 \geq F_2 \geq F_3$, $F_2 = \text{ROUND } [\lambda_1/(N_1-1)\times(N_2-1)/\lambda_2 \times F_1] = \text{FLOOR } [\lambda_1/(N_1-1)\times(N_2-1)/\lambda_2 \times F_1]$, and $F_3 = \text{FLOOR } [\lambda_1/(N_1-1)\times(N_3-1)/\lambda_3 \times F_1]$, and a combination of the following equations of $F_1 \geq F_2 \geq F_3$, $F_2 = \text{ROUND } [\lambda_1/(N_1-1)\times(N_2-1)/\lambda_2 \times F_1]$, and $F_3 = \text{ROUND } [\lambda_1/(N_1-1)\times(N_3-1)/\lambda_3 \times F_1]$, (where $\lambda_2$ is the second wavelength, $\lambda_3$ is the third wavelength, $N_1$ is a refractive index of a material used for the diffractive optical element with respect to the first wavelength, $N_2$ is a refractive index of a material used for the diffractive optical element with respect to the second wavelength, $N_3$ is a refractive index of a material used for the diffractive optical element with respect to the third wavelength, $F_2$ is a diffraction order of diffracted light of second laser light, $F_3$ is a diffraction order of diffracted light of third laser light, ROUND [ ] is a function for rounding-off the value in [ ] with no digits after a decimal point so as to obtain an integer number, CEIL [ ] is a function for rounding-up the value in [ ] with no digits after a decimal point so as to obtain an integer number, and FLOOR [ ] is a function for rounding-down the value in [ ] with no digits after a decimal point so as to obtain an integer number).

36. The diffractive optical element according to claim 12, further comprising:
a third diffractive lens structure that is provided within the first diffraction effective diameter on an incident surface or an emergent surface of the diffractive optical element so as to correct a chromatic aberration to be generated due to a wavelength change of first laser light by a very small amount.

37. The diffractive optical element according to claim 36, wherein, in the incident surface or the emergent surface of the diffractive optical element, the third diffractive lens structure is formed on a different surface from the first diffractive lens structure and the second diffractive lens structure.

38. The diffractive optical element according to claim 36, wherein, in the incident surface or the emergent surface of the diffractive optical element, the third diffractive lens structure is formed on the same surface as the first diffractive lens structure and the second diffractive lens structure.

39. The diffractive optical element according to claim 36, wherein, in the incident surface or the emergent surface of the diffractive optical element, the second diffractive lens structure is formed on a different surface from the first diffractive lens structure.

40. The diffractive optical element according to claim 36, wherein, in the incident surface or the emergent surface of the diffractive optical element, the third diffractive lens structure is formed on the same surface as the first diffractive lens structure.

41. The diffractive optical element according to claim 36, wherein, in the incident surface or the emergent surface of the diffractive optical element, the third diffractive lens structure is formed on the same surface as the second diffractive lens structure.

42. The diffractive optical element according to claim 36, wherein a difference in optical path length caused by each of phase steps constituting the first diffractive lens structure and a difference in optical path length caused by each of phase steps constituting the third diffractive lens structure are different from each other at the same wavelength.

43. The diffractive optical element according to claim 36, wherein a difference in optical path length caused by each of phase steps constituting the second diffractive lens structure and a difference in optical path length caused by each of phase steps constituting the third diffractive lens structure are different from each other at the same wavelength.

44. The diffractive optical element according to claim 36, wherein a difference in optical path length caused by each of phase steps constituting the first diffractive lens structure, a difference in optical path length caused by each of phase steps constituting the second diffractive lens structure, and a difference in optical path length caused by each of phase steps constituting the third diffractive lens structure are different from one another at the same wavelength.

45. The diffractive optical element according to claim 36, wherein a difference in optical path length caused by each of phase steps in the vicinity of the fourth diffraction effective diameter from phase steps constituting the third diffractive lens structure and a difference in optical path length caused by each of other phase steps are different from each other at the same wavelength.

46. The diffractive optical element according to claim 36, wherein a difference in optical path length caused by each of phase steps in the vicinity of the second diffraction effective diameter from phase steps constituting the third diffractive lens structure and a difference in optical path length caused by each of other phase steps are different from each other at the same wavelength.

47. The diffractive optical element according to claim 36, wherein all phase steps constituting the first diffractive lens structure, some of phase steps constituting the second diffractive lens structure, and some of phase steps constituting the third diffractive lens structure are mixed in a region within the third diffraction effective diameter in the incident or emergent surface of the diffractive optical element.

48. The diffractive optical element according to claim 36, wherein all phase steps constituting the first diffractive lens structure and some of phase steps constituting the third diffractive lens structure are mixed in a region within the fourth diffraction effective diameter in the incident or emergent surface of the diffractive optical element.

49. The diffractive optical element according to claim 36, wherein at least one phase step having a depth corresponding to the sum of a step amount of each of phase steps constituting the first diffractive lens structure and a step amount of each of phase steps constituting the third diffractive lens structure exists within the fourth diffraction effective diameter of the diffractive optical element.

50. The diffractive optical element according to claim 36, wherein a direction of each of phase steps constituting the first diffractive lens structure and a direction of each of phase steps constituting the third diffractive lens structure are different from each other.

51. The diffractive optical element according to claim 36, wherein some of or all phase steps of the second diffractive lens structure and some of phase steps of the third diffractive lens structure are mixed in a region between the fourth diffraction effective diameter and the second diffraction effective diameter in the incident or emergent surface of the diffractive optical element.

52. The diffractive optical element according to claim 36, wherein at least one phase step having a depth corresponding to the sum of a step amount of each of phase steps constituting the second diffractive lens structure and a step amount of each of phase steps constituting the third diffractive lens structure exists in a region between the fourth diffraction effective diameter and the second diffraction effective diameter of the diffractive optical element.

53. The diffractive optical element according to claim 36, wherein, in a region between the fourth diffraction effective diameter and the second diffraction effective diameter, a direction of each of phase steps constituting the second diffractive lens structure and a direction of each of phase steps constituting the third diffractive lens structure are different from each other.

54. The diffractive optical element according to claim 36, wherein the first diffractive lens structure, the second diffractive lens structure, and the third diffractive lens structure are formed on one of the incident surface and the emergent surface of the diffractive optical element together, and all directions of phase steps of the first, second, and third diffractive lens structures are the same.

55. The diffractive optical element according to claim 36, wherein the third diffractive lens structure is formed such that, from diffracted light to be generated when first laser light passes through the third diffractive lens structure, diffracted light having the maximum diffraction efficiency has a diffractive order of a multiple of ten.

56. The diffractive optical element according to claim 12, wherein first, second, and third laser light incident on the diffractive optical element are substantially parallel light.

57. The diffractive optical element according to claim 12, wherein the diffractive optical element is provided integrally with the objective lens.

58. The diffractive optical element according to claim 12, wherein first, second, and third laser light have first, second, and third wavelengths, respectively, the second wavelength is longer than the first wavelength, and the third wavelength is longer than the second wavelength.

59. An optical pickup comprising:

the diffractive optical element according to any one of claims 12 to 58.

60. An optical information recording and reproducing apparatus comprising:

the optical pickup according to claim 59.

* * * * *